US010046774B2

(12) United States Patent
Duran Ariza

(10) Patent No.: US 10,046,774 B2
(45) Date of Patent: Aug. 14, 2018

(54) RAIL WITH AUTOMATICALLY ADJUSTABLE LENGTH IN A TRANSPORTATION SYSTEM

(71) Applicant: Gonzalo Duran Ariza, Rockville, MD (US)

(72) Inventor: Gonzalo Duran Ariza, Rockville, MD (US)

( * ) Notice: Subject to any disclaimer, the term of this patent is extended or adjusted under 35 U.S.C. 154(b) by 523 days.

(21) Appl. No.: 14/706,257

(22) Filed: May 7, 2015

(65) Prior Publication Data

US 2015/0353099 A1 Dec. 10, 2015

Related U.S. Application Data

(63) Continuation of application No. 14/458,248, filed on Aug. 12, 2014, now Pat. No. 9,701,319.
(Continued)

(51) Int. Cl.
*B61B 3/00* (2006.01)
*B61B 13/04* (2006.01)
(Continued)

(52) U.S. Cl.
CPC ............. *B61B 3/00* (2013.01); *B60V 3/04* (2013.01); *B61B 3/02* (2013.01); *B61B 13/04* (2013.01); *Y02T 30/40* (2013.01)

(58) Field of Classification Search
CPC .......... E01B 11/20; E01B 11/22; E01B 11/24; E01B 11/26; E01B 23/04; B61B 3/00;
(Continued)

(56) References Cited

U.S. PATENT DOCUMENTS

| 9,701,319 B2 * | 7/2017 | Duran Ariza | B61B 3/00 |
| 2015/0329097 A1 * | 11/2015 | Duran Ariza | B61B 3/02 |
| | | | 104/23.1 |
| 2015/0353100 A1 * | 12/2015 | Duran Ariza | B61B 3/02 |
| | | | 104/93 |

FOREIGN PATENT DOCUMENTS

| GB | 1247878 A * | 9/1971 | ............ B60L 13/03 |
| GB | 1334598 A * | 10/1973 | ............ B60V 3/04 |

(Continued)

OTHER PUBLICATIONS

International Search Report and Written Opinion excerpt (including PCT Claims 57-88 on which these were based), PCT/US2015/015514 (dated Aug. 18, 2015).

*Primary Examiner* — Zachary L Kuhfuss

(57) ABSTRACT

A transportation system is disclosed that includes a monorail (or other vehicle) along a column-supported rail and a movable weight system that repositions and/or accelerates a movable weight with respect to the movable weight's rail to counterbalance a moment associated with the weight and/or a centrifugal force of the monorail relative to the column, where some embodiments also mitigate resonance. Also disclosed is a linear induction motor (LIM) system that enables the LIM to tilt and thereby remain close to the rail, which mitigates potential thrust losses and/or air losses. Further disclosed is an air bearing system where the air bearing has a compliance and a resilience that minimizes air loss between the rail and the bearing. Additionally disclosed is a rotatable wedge system that essentially expands and/or contracts automatically to maintain an adjacency between two rail portions, where some embodiments also mitigate resonance.

47 Claims, 60 Drawing Sheets

Related U.S. Application Data

(60) Provisional application No. 61/865,119, filed on Aug. 12, 2013.

(51) Int. Cl.
*B60V 3/04* (2006.01)
*B61B 3/02* (2006.01)

(58) Field of Classification Search
CPC .... B61B 3/02; B61B 3/06; B61B 3/08; B61B 13/122; B60V 3/04
See application file for complete search history.

(56) References Cited

FOREIGN PATENT DOCUMENTS

GB            2209318 A * 5/1989 ............. B61B 13/06
JP          2011 153501 A    8/2011

* cited by examiner

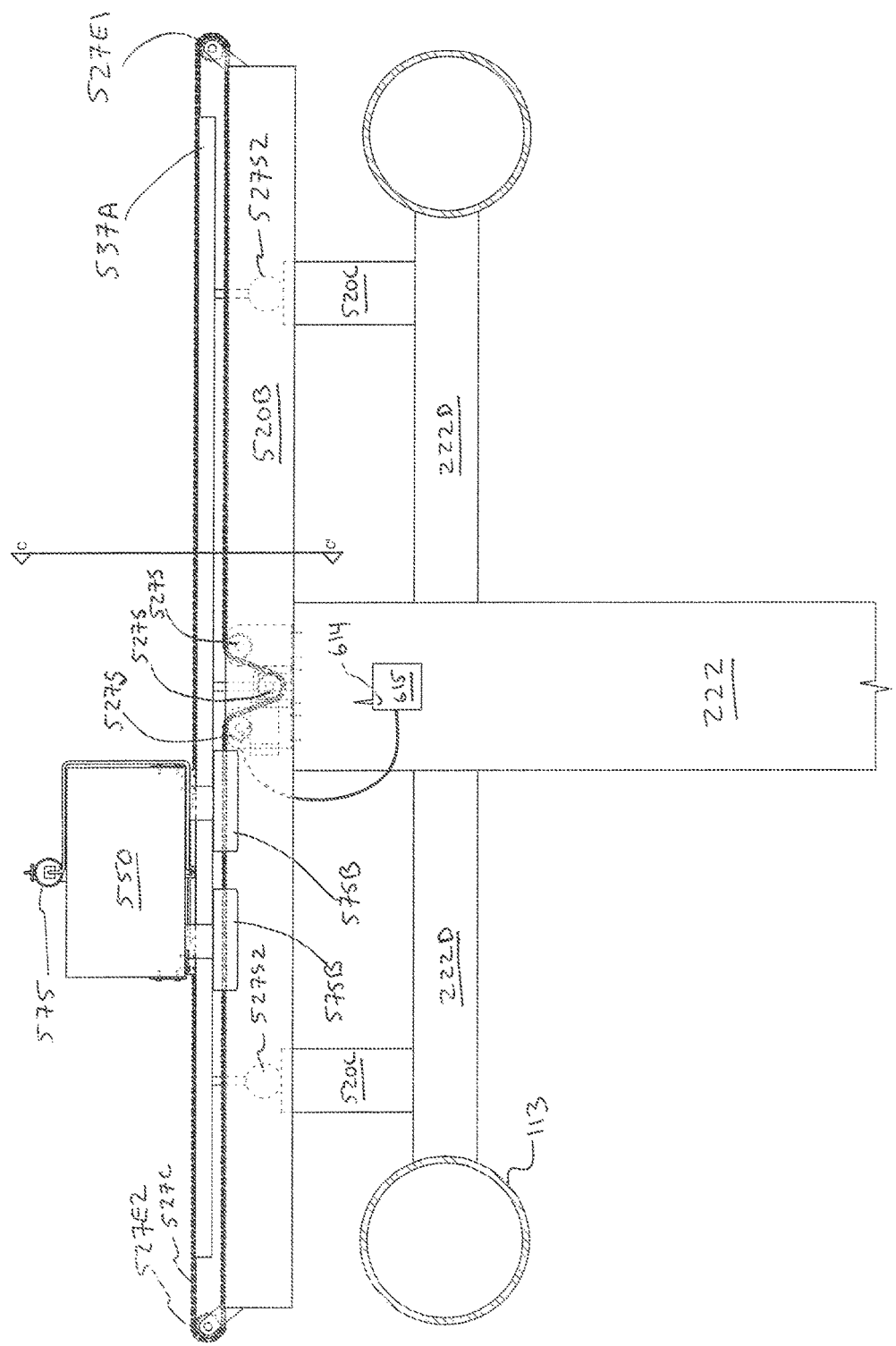

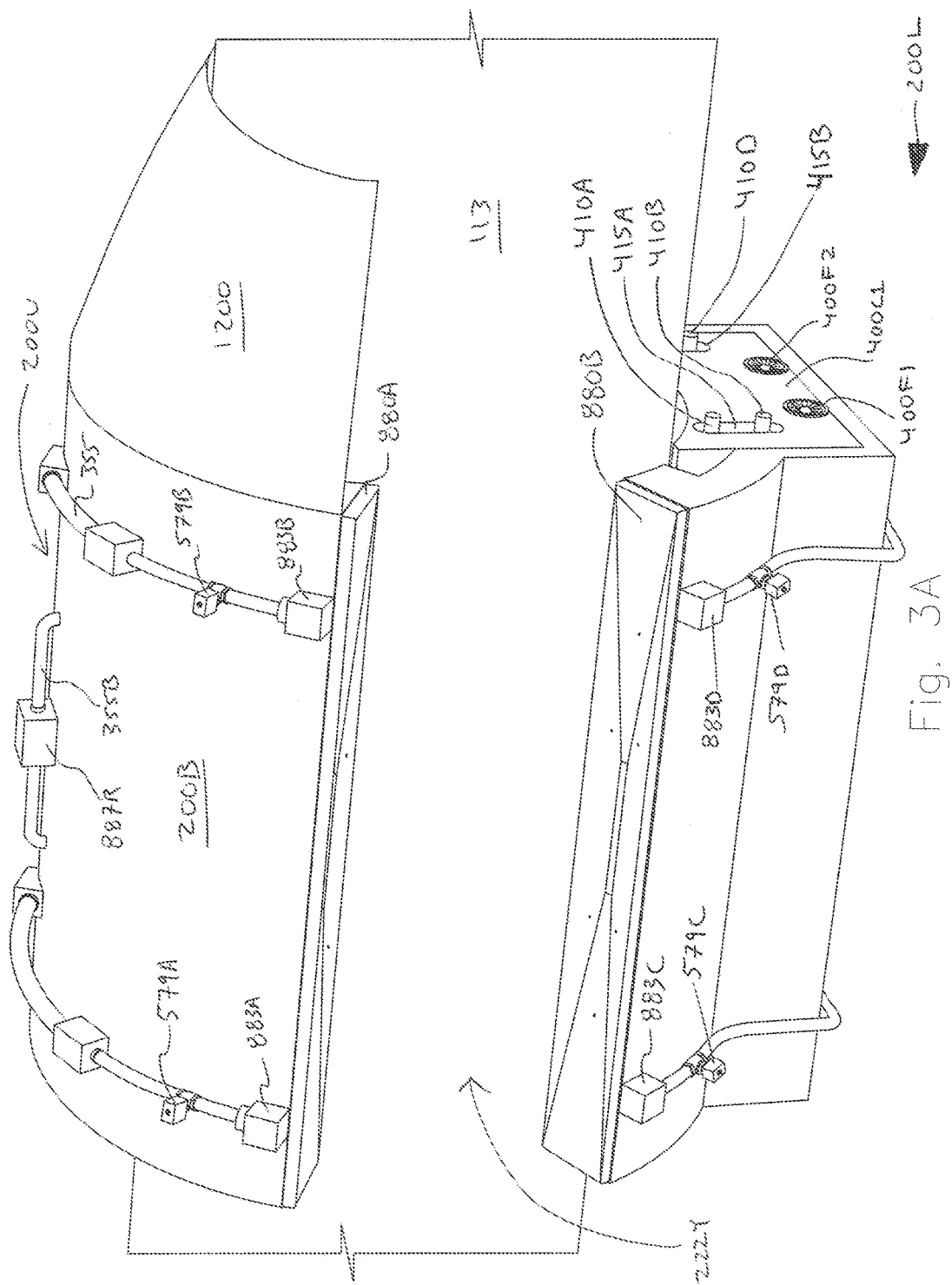

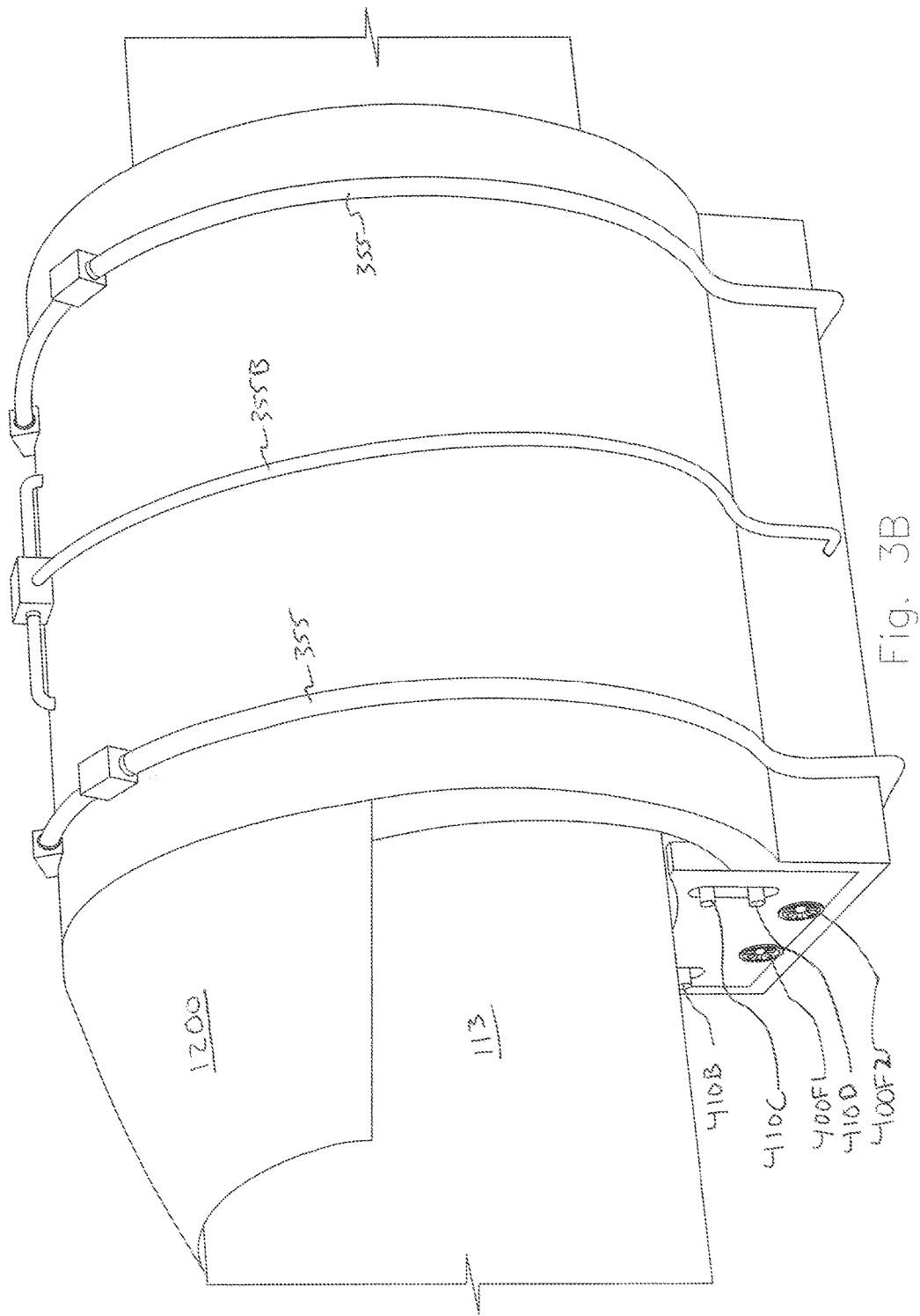

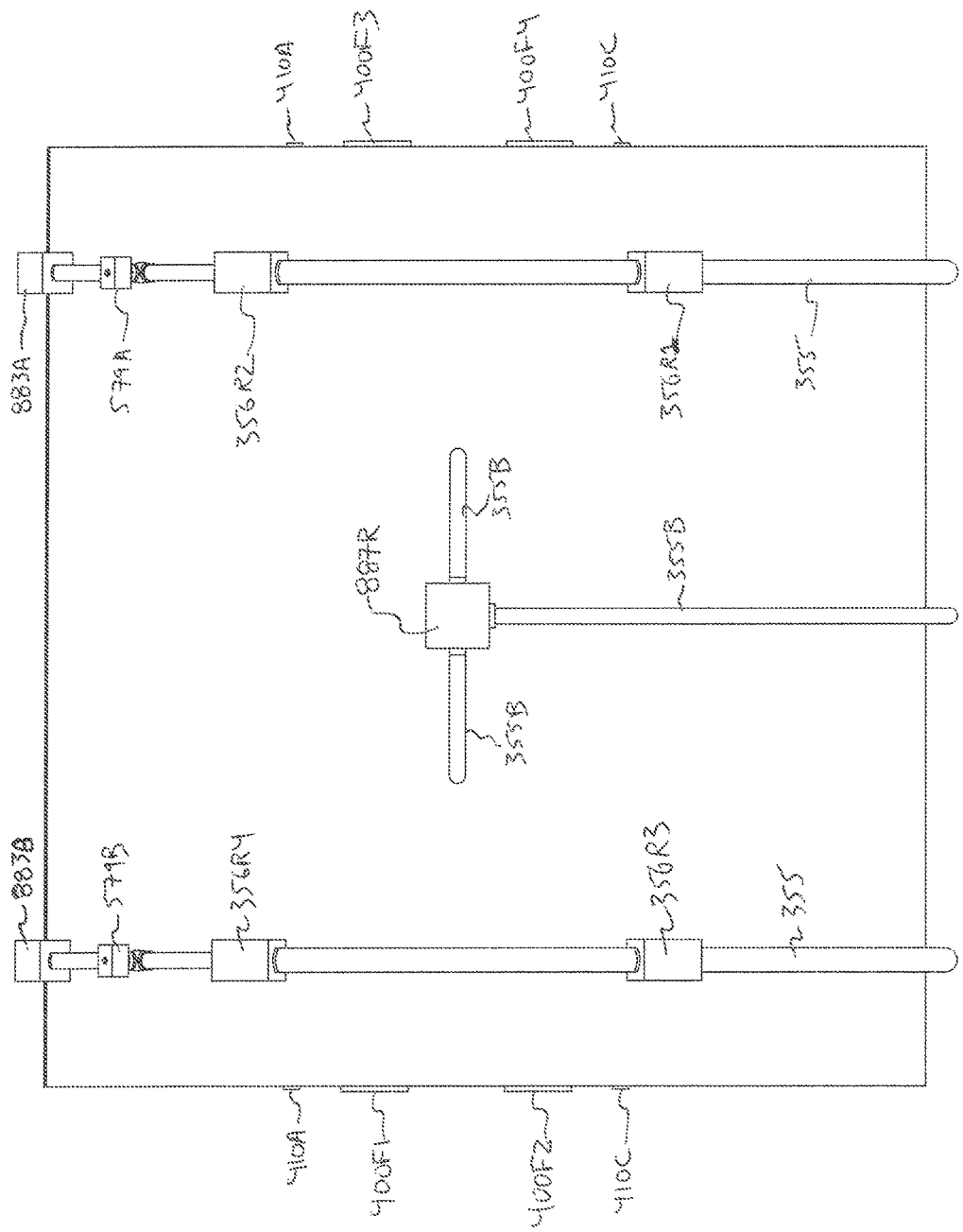

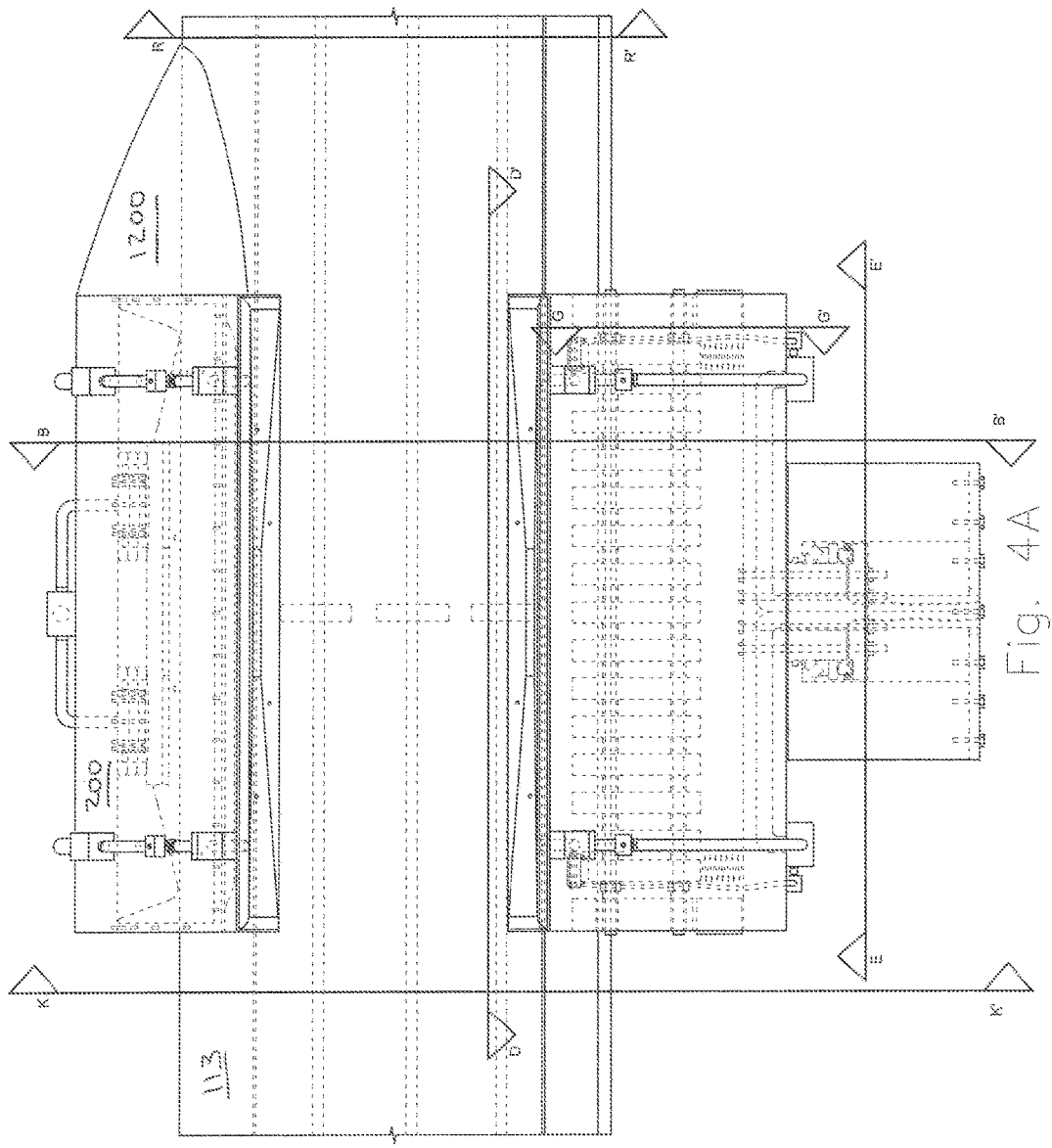

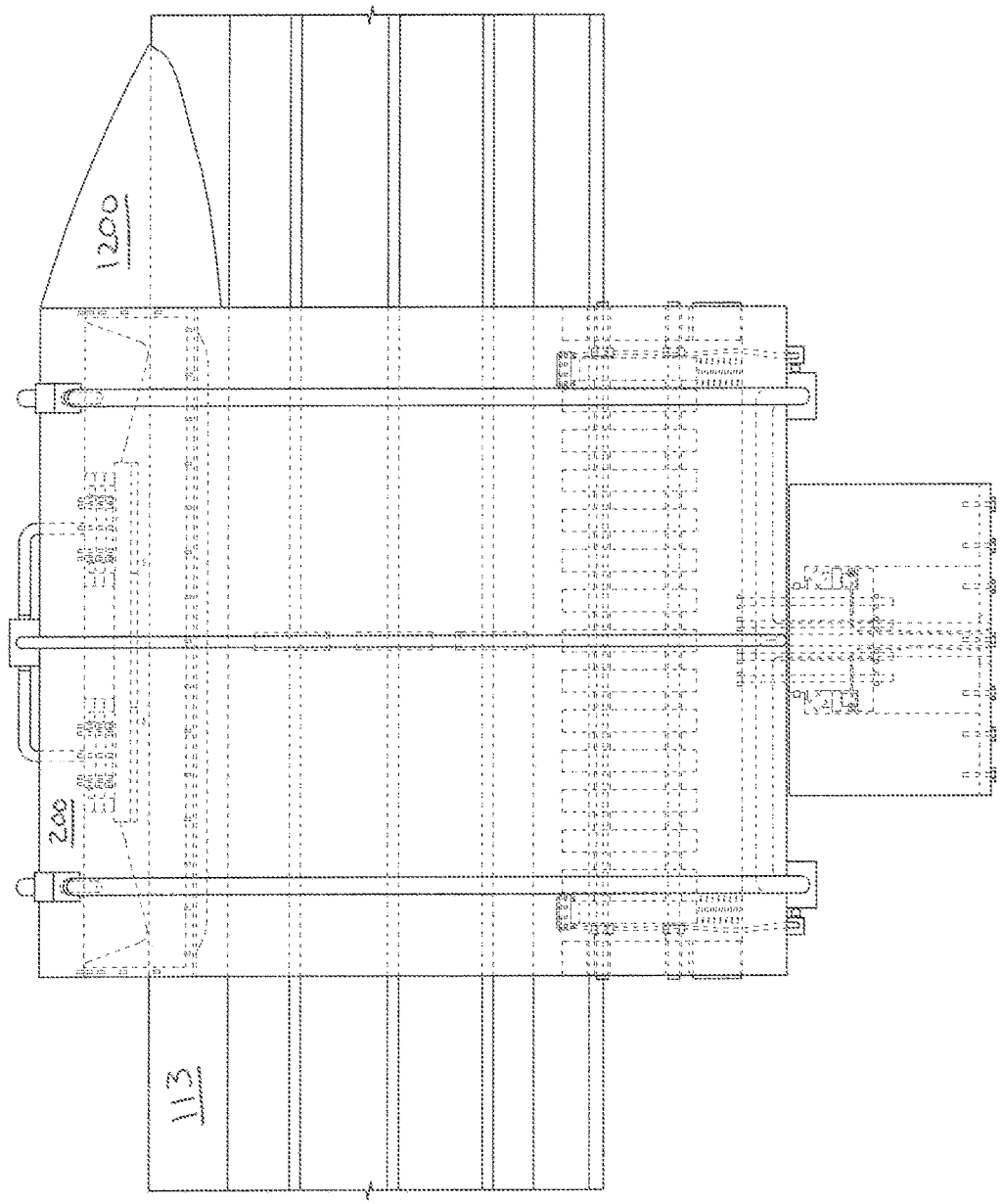

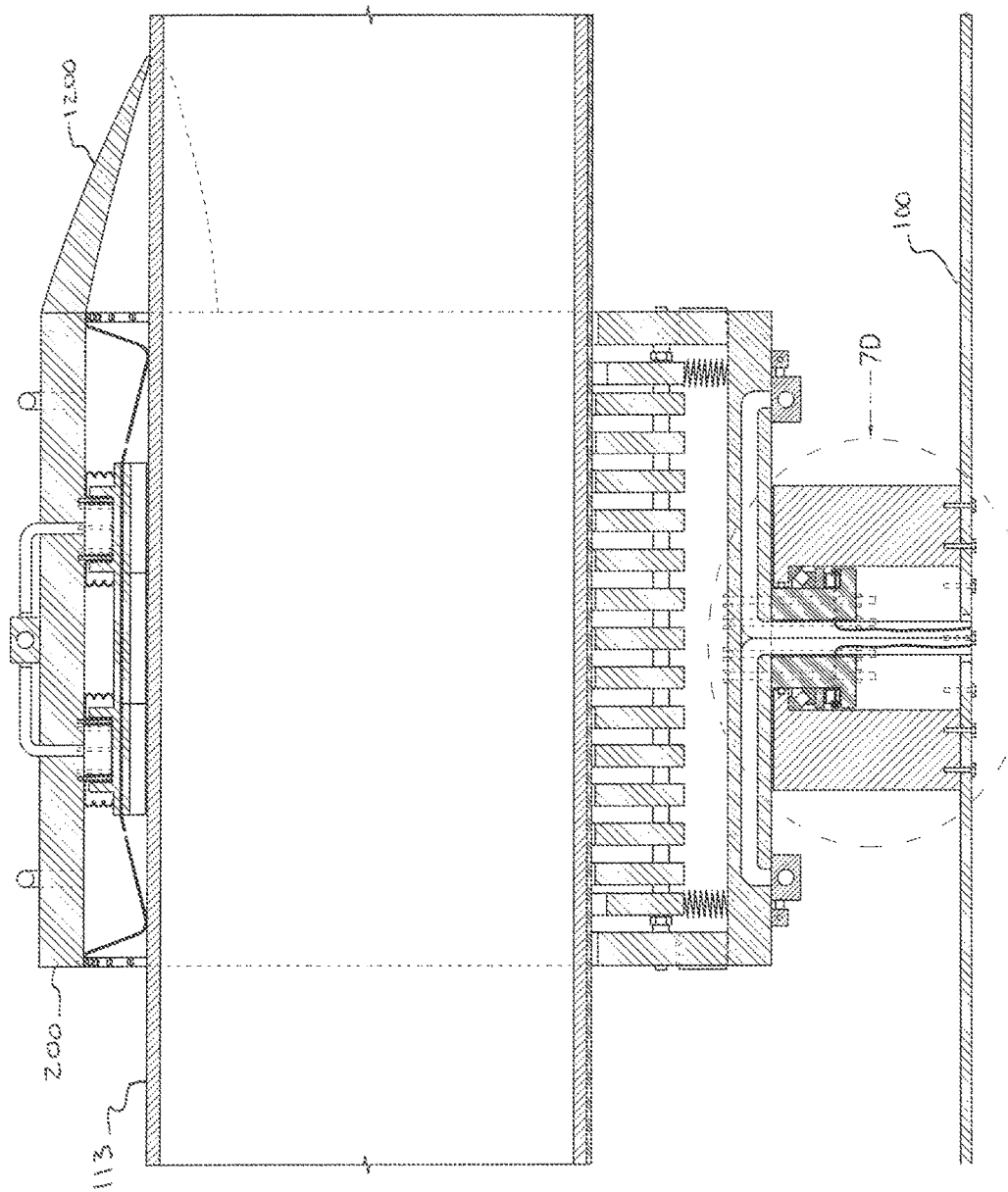

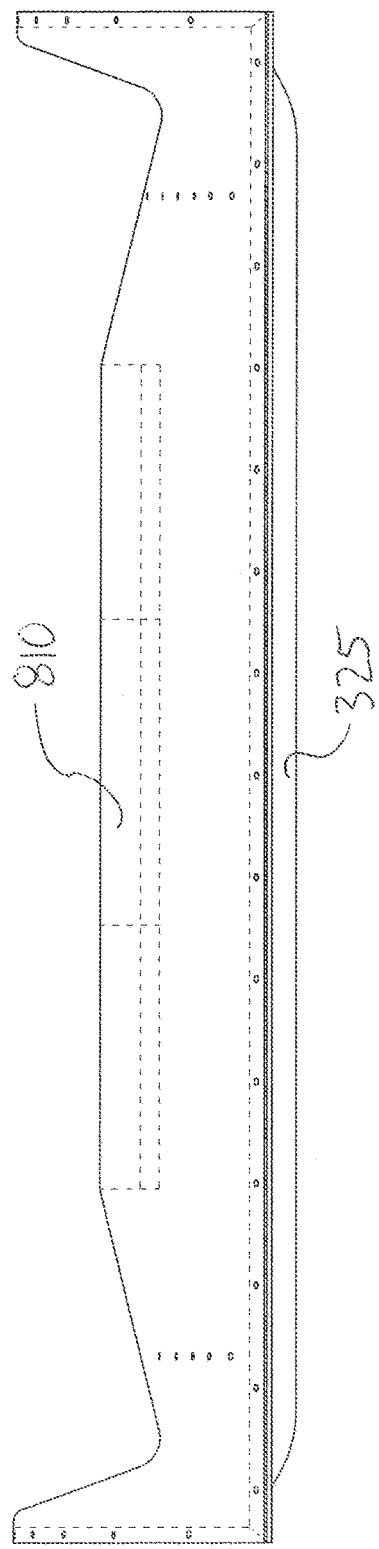

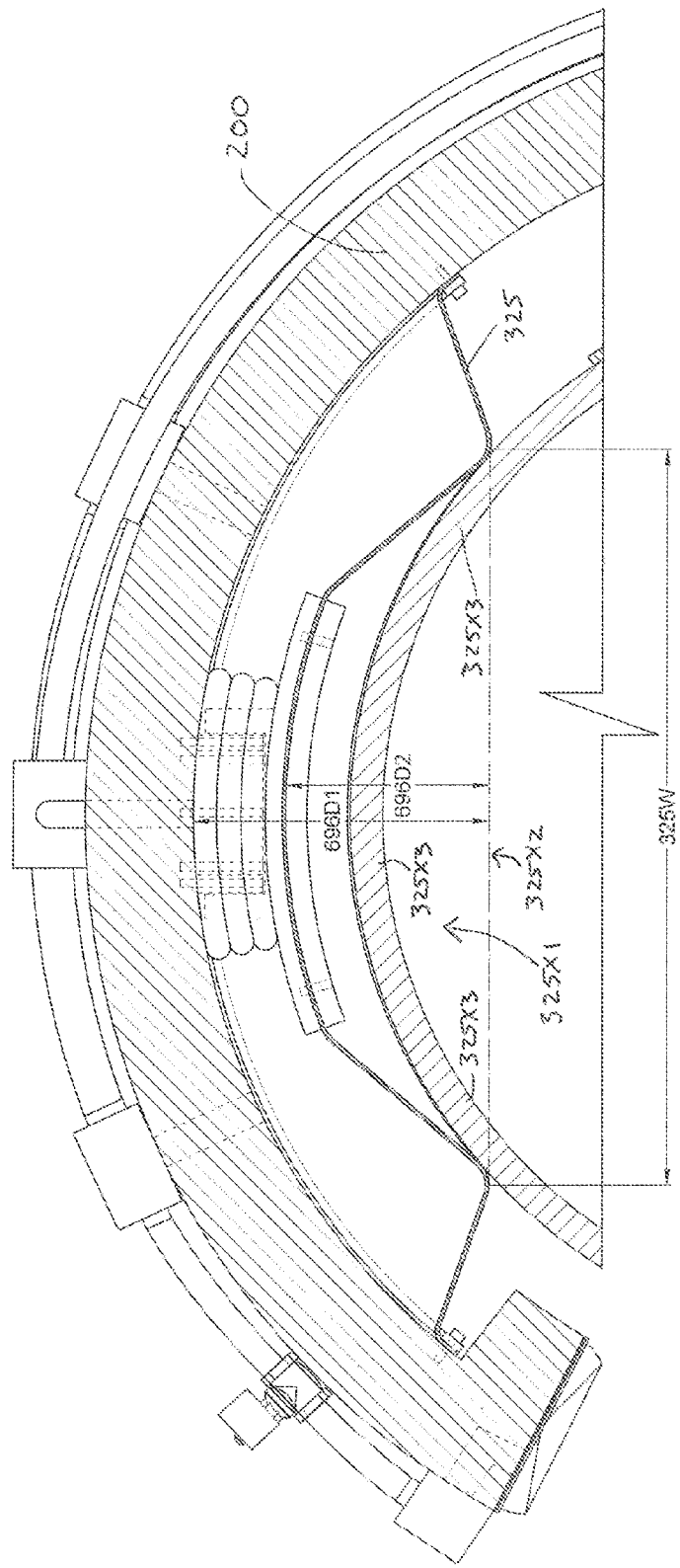

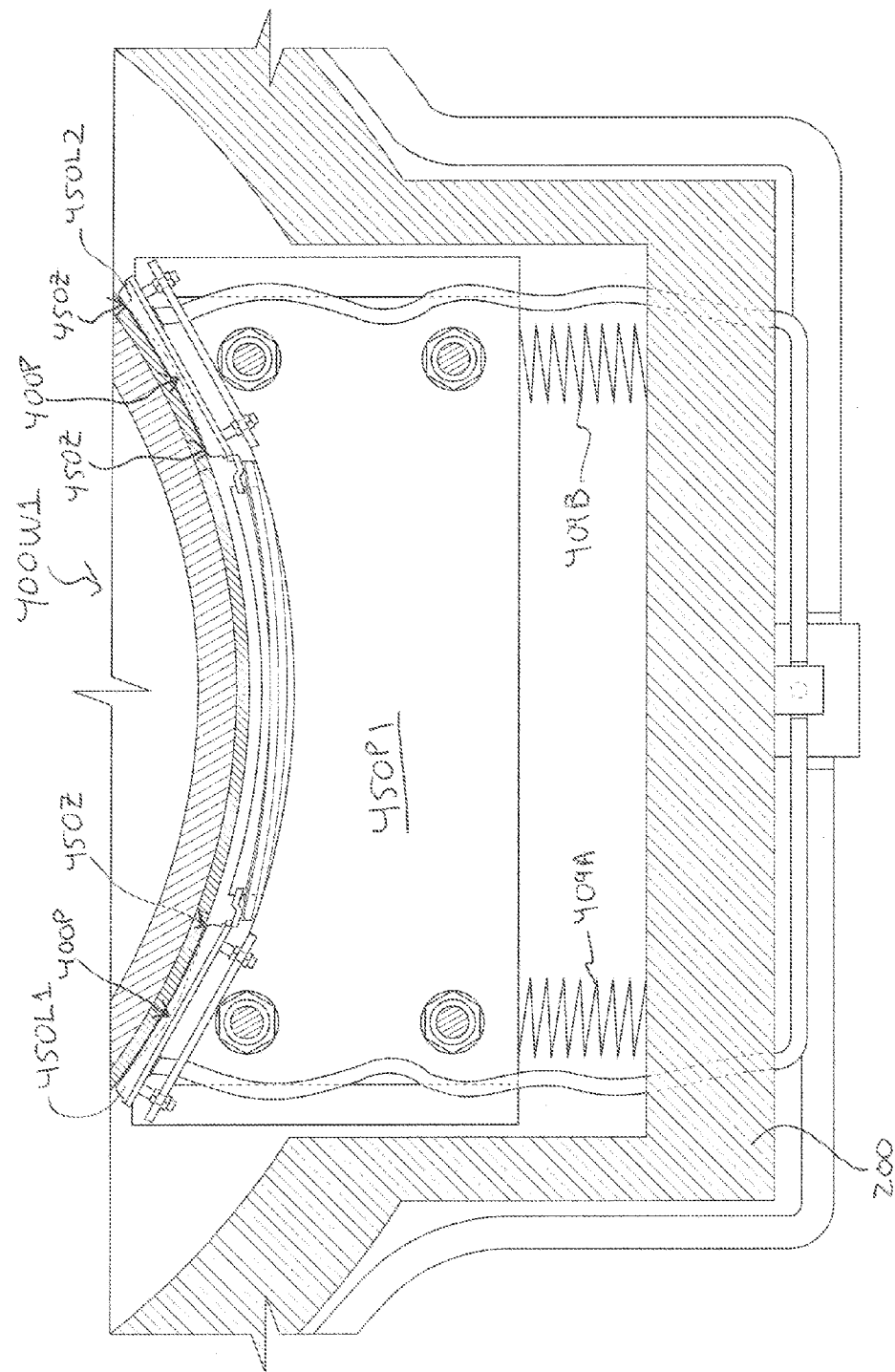

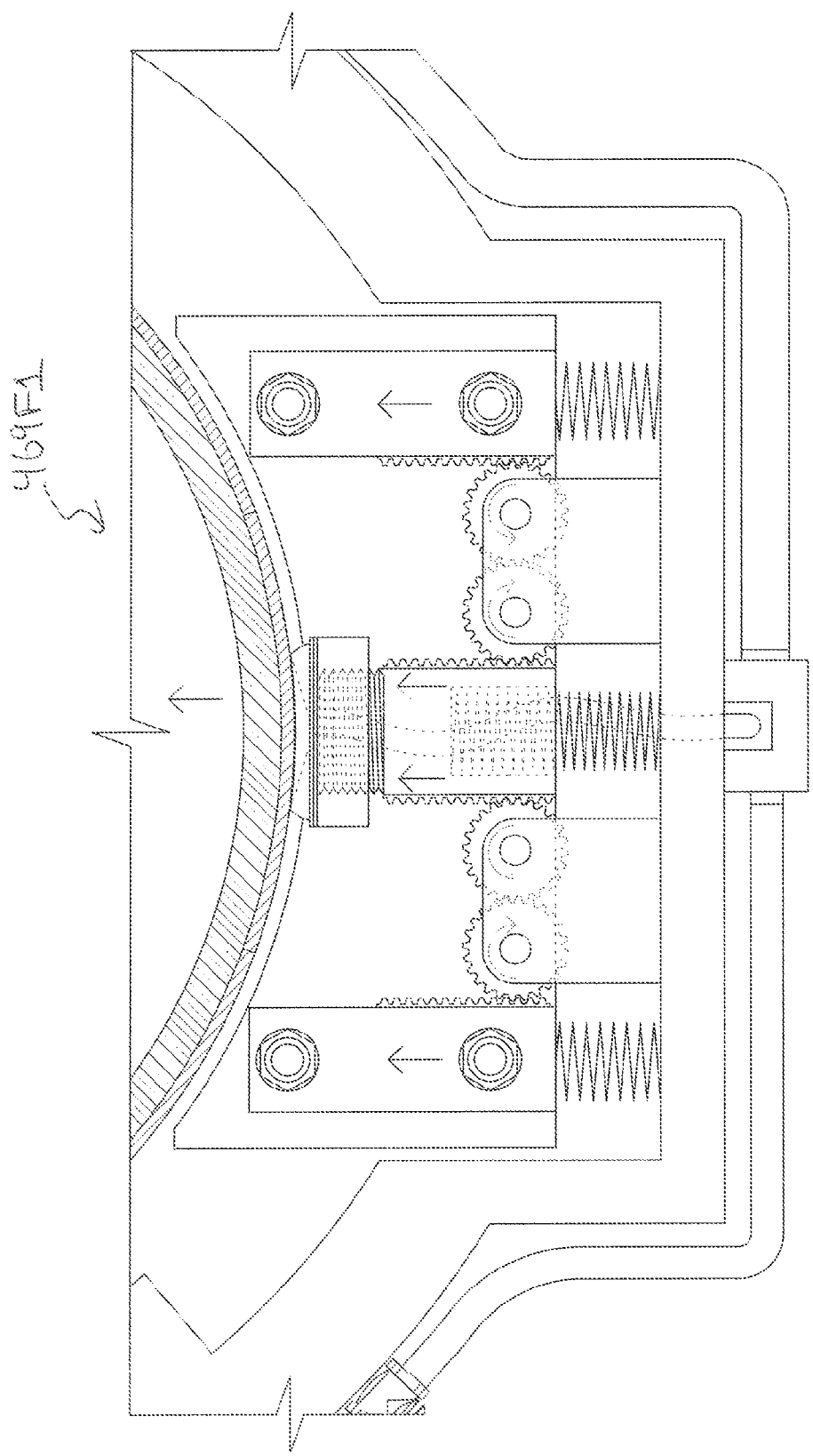

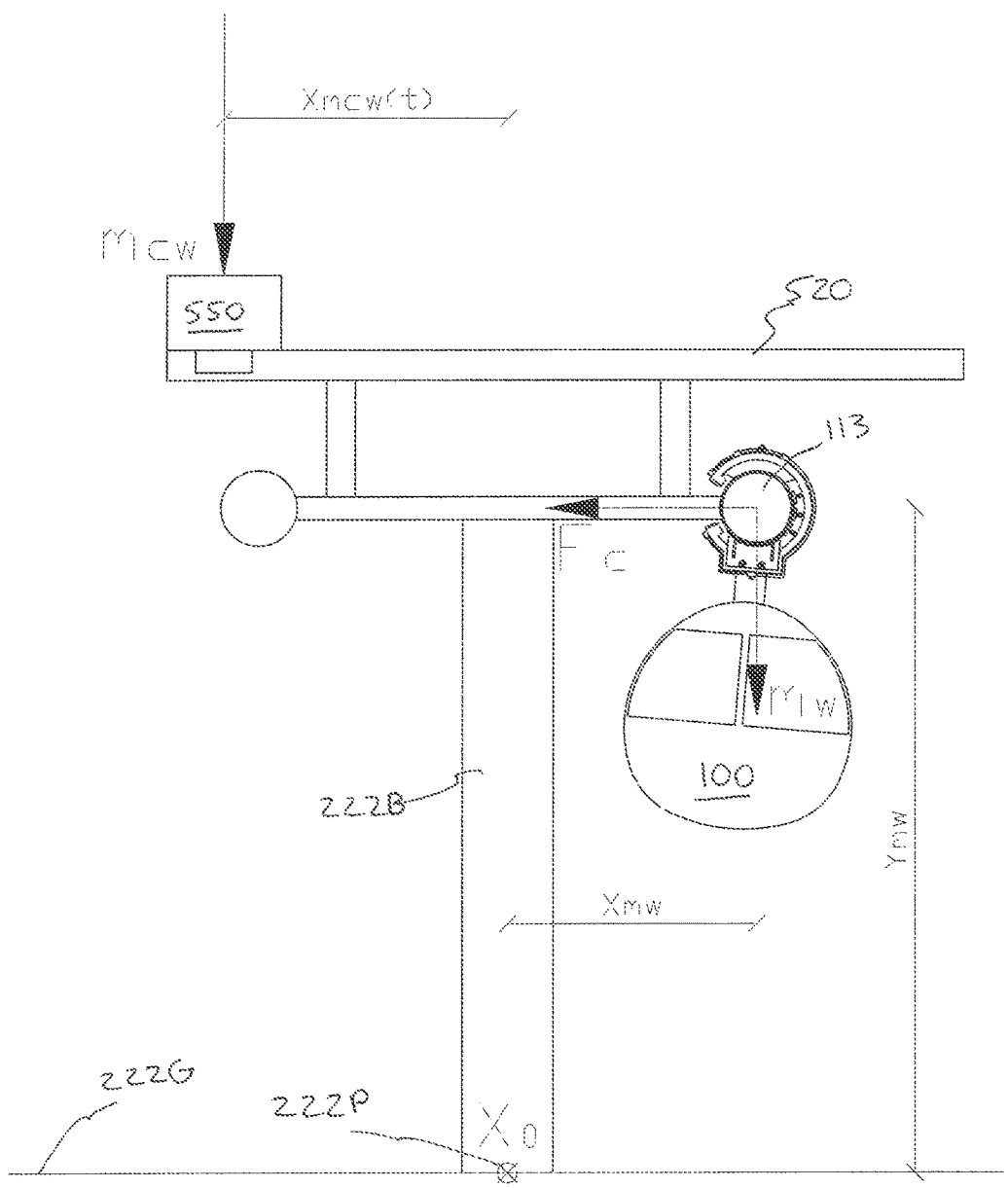
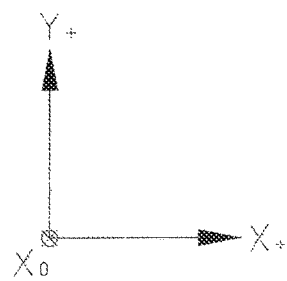
- $F_c$ = Wagon's Centrifugal Force
- $M_w$ = Wagon's Weight
- $M_{cw}$ = Movable Weight's Weight
$$\sum(M_{x_0}) = (m_w * X_{mw} + F_c * Y_{mw} + m_{cw} * X_{mcw(t)})$$
Fig. 12A

DATA FOR COLUMN 2

| Position on Figs. 12B, 12C & 12D | Xmcw(t) [m] | Time [s] | Angle of tilt [°] | %Fc %Mw | mw*Xmw [kN*m] | Fc*Ymw [kN*m] | mcw*Xmcw(t) [kN*m] | ΣMw without c.w [kN*m] | ΣMw with c.w [kN*m] | Red. ΣMw [%] |
|---|---|---|---|---|---|---|---|---|---|---|
| 0 | -4.44 | 0.00 | 4.8 | 0.00 | 0.0 | 0.0 | +348.4 | 0.0 | +348.4 | N/A |
| 1 | -4.44 | 0.50 | 4.8 | 0.25 | -239.1 | +64.7 | +348.4 | -174.4 | +174.0 | 0.2 |
| 2 | -4.44 | 1.00 | 4.8 | 0.50 | -478.2 | +129.4 | +348.4 | -348.8 | +0.3 | 99.9 |
| 3 | -4.44 | 1.50 | 4.8 | 0.75 | -717.3 | +194.1 | +348.4 | -523.2 | -174.7 | 66.6 |
| 4 | -4.44 | 2.00 | 4.8 | 1.00 | -956.4 | +258.9 | +348.4 | -697.6 | -349.2 | 49.9 |
| 5 | -4.44 | 2.50 | 4.8 | 0.75 | -717.3 | +194.1 | +348.4 | -523.2 | -174.7 | 66.6 |
| 6 | -4.44 | 3.00 | 4.8 | 0.50 | -478.2 | +129.4 | +348.4 | -348.8 | +0.3 | 99.9 |
| 7 | -4.44 | 3.50 | 4.8 | 0.25 | -239.1 | +64.7 | +348.4 | -174.4 | +174.0 | 0.2 |
| 8 | -4.44 | 5.70 | 4.8 | 0.00 | 0.0 | 0.0 | +348.4 | 0.0 | +348.4 | N/A | w = Wagon/monorail
c.w. = Counter weight/movable weight
Xmcw(t) = Counter weight's position in time
Fc = Wagon's Centrifugal Force
%Fc = Fc percentage based on %Fc
Mw = Wagon's weight based on column 2
%Mw = Mw percentage based on %Mw
Red ΣMXω = Reduction of moment sum at the column
mw*Xmw = Moment of wagon's weight
Fc*Ymw = Moment of wagon's centrifugal force
mcw*Xmcw(t) = Moment of counter weight's weight in time

Fig. 12K

DATA FOR COLUMN 2

| Position on Figs. 12B, 12C & 12D. | Xmcw(t) [m] | Time [s] | C.W. Velocity [m/s] | C.W. Acceleration [m/s2] | Angle of tilt [°] | %Fc | %Mw | mw*Xmw [kN*m] | Fcw*Ymw [kN*m] | Fcw*Ymcw [kN*m] | mcw*Xmcw(t) [kN*m] | ΣMw without c.w. [kN*m] | ΣMw with c.w. [kN*m] | Red. ΣMw [%] |
|---|---|---|---|---|---|---|---|---|---|---|---|---|---|---|
| 0 | +6.00 | 0.00 | 0.00 | 0.00 | 4.8 | 0.00 | 0.00 | 0.0 | 0.0 | 0.0 | -470.8 | 0.0 | -470.8 | N/A |
| 1 | +6.00 | 0.50 | 0.00 | 0.00 | 4.8 | 0.25 | 0.00 | +239.1 | +64.7 | 0.0 | -470.8 | +303.8 | -167.9 | 45.0 |
| 2 | +6.00 | 1.00 | 0.00 | 0.00 | 4.8 | 0.50 | 0.00 | +478.2 | +129.4 | 0.0 | -470.8 | +607.6 | +136.7 | 77.5 |
| 3 | +6.00 | 1.50 | 0.00 | 0.00 | 4.8 | 0.75 | 0.00 | +717.3 | +194.1 | 0.0 | -470.8 | +911.4 | +440.6 | 51.7 |
| 4 | +6.00 | 2.00 | 0.00 | +6.00 | 4.8 | 1.00 | 0.00 | +956.4 | +258.8 | -576.0 | -470.8 | +1215.3 | +168.4 | 86.1 |
| 5 | +5.42 | 2.50 | +2.00 | +2.00 | 4.8 | 0.75 | 0.00 | +717.3 | +194.1 | -192.0 | -425.3 | +911.4 | +294.1 | 67.7 |
| 6 | +4.25 | 3.00 | +2.50 | 0.00 | 4.8 | 0.50 | 0.00 | +478.2 | +129.4 | 0.0 | -333.5 | +607.6 | +274.1 | 54.9 |
| 7 | +3.03 | 3.50 | +2.30 | -0.80 | 4.8 | 0.25 | 0.00 | +239.1 | +64.7 | +76.8 | -237.8 | +303.8 | +142.8 | 53.0 |
| 8 | +0.31 | 5.70 | 0.00 | -1.29 | 4.8 | 0.00 | 0.00 | 0.0 | 0.0 | +123.9 | -24.3 | 0.0 | +99.6 | N/A |
| 9 | 0.00 | +5.70 | 0.00 | 0.00 | 4.8 | 0.00 | 0.00 | 0.0 | 0.0 | 0.0 | 0.0 | 0.0 | 0.0 | N/A | w = Wagon/monorail
C.W. = Counter weight/movable weight
Xmcw(t) = Counter weight's position in time
Fc = Wagon's Centrifugal Force based on %Fc
%Fc = Fc percentage on column 2
Mw = Wagon's weight based on %Mw
%Mw = Mw percentage based on column 2
Fcw = Force exerted by the counter weight
Red ΣM(t) = Reduction of moment sum at the column
mw*Xmw = Moment of wagon's weight
Fcw*Ymw = Moment of wagon's centrifugal force
Fcw*Ymcw = Moment of counter weight's action
mcw*Xmcw(t) = Moment of counter weight's weight in time

Fig. 12W

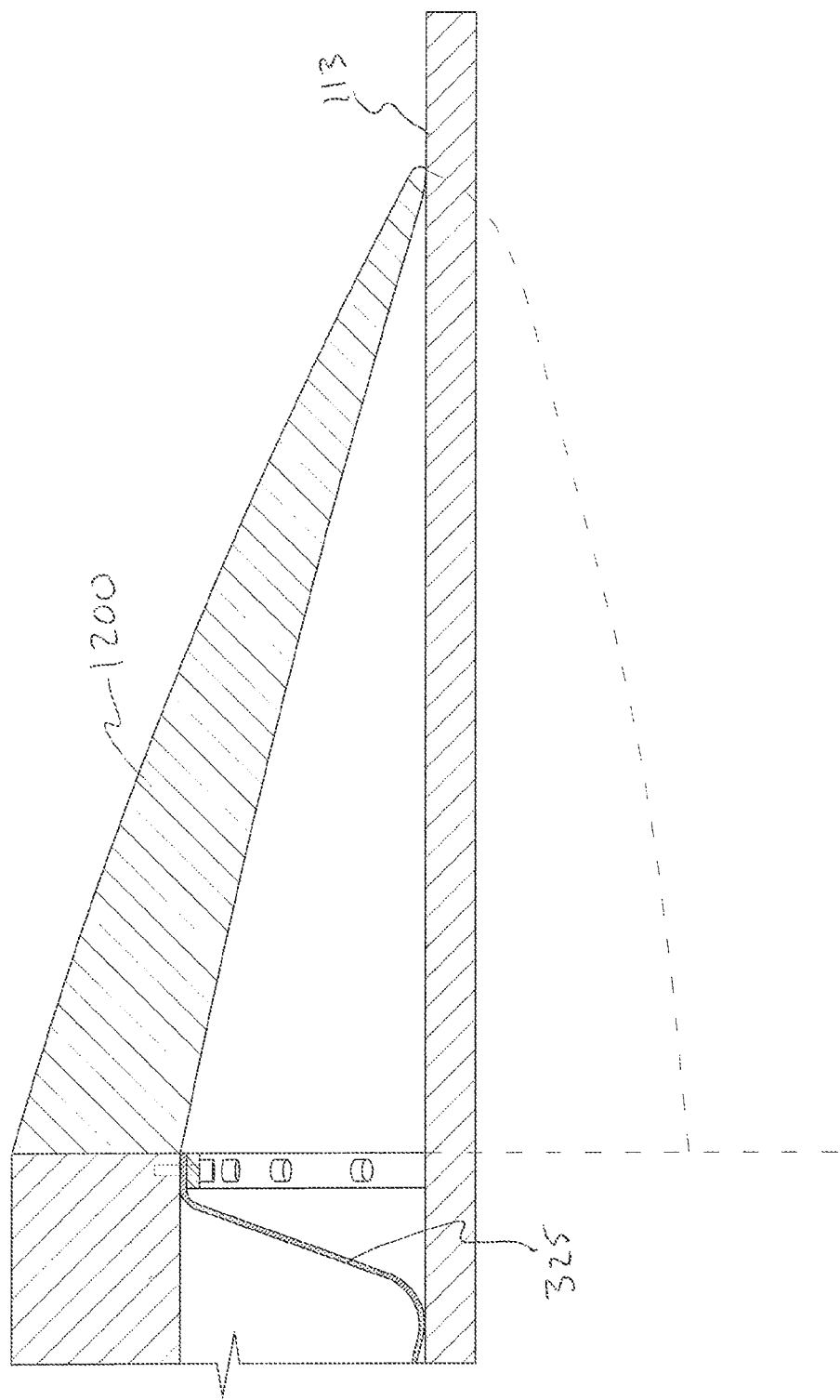

RAIL WITH AUTOMATICALLY ADJUSTABLE LENGTH IN A TRANSPORTATION SYSTEM

CROSS-REFERENCE TO RELATED APPLICATIONS

The present application is a continuation patent application of U.S. patent application Ser. No. 14/458,248, filed Aug. 12, 2014, which is a U.S. non-provisional application that claims the benefit of U.S. provisional patent application No. 61/865,119, filed Aug. 12, 2013. All of the foregoing applications are hereby incorporated herein by reference in their entirety.

BACKGROUND

Despite the fact that traffic congestion plagues many cities around the world, gasoline prices always seem to be rising, and worldwide concern over pollution/global warming continues to grow, most people still rely on cars to commute back and forth to work and to make many other 'point A to B' trips. However, as the public gradually embraces the idea of mass transportation, more and more cities are taking the time to evaluate alternatives to meet this growing demand, particularly in terms of operational efficiency, construction costs, cityscape footprint, etc.

Among the various mass transportation systems that are often considered in this regard, monorail systems possess a number of advantages. For example, in contrast to trolleys that travel on tracks that are weaved through city streets, monorails transport people and/or cargo above roads and thus do not significantly impact the flow of automobile traffic. Moreover, since monorail systems do not require the excavation of enormous tunnels many feet under existing streets, they also display various cost advantages over subway systems.

There are, however, some challenges that must be faced in constructing a monorail system. For instance, deep and/or wide holes often must be dug to plant the thick/strong/wide columns that are typically needed to withstand large imbalanced forces/moments caused by the monorail—which further implies relatively costly constructions, relatively long periods of traffic detours, and relatively large streetscape 'footprints'. To get a rough idea of the potential magnitude of such imbalanced forces/moments one only has to imagine a 30-ton monorail suspended from a rail that is fifteen feet to one side of the column supporting it; and, then further imagine the even greater imbalance that could occur if that same rail is curved and the monorail is traveling at (even) a moderate speed. Accordingly, there is a need for a system(s), method(s), and/or device(s) to at least partially counterbalance one or more such moments/forces.

Another issue that often arises—at least in a number of air cushion-based monorail systems—is the inherent inefficiency resulting from employing a relatively thick layer/cushion of air between the (e.g., steel) bearing and (e.g., steel) rail, which is often needed to prevent (or at least minimize) rail-bearing contact, since thick air layers/cushions often imply relatively large air losses (from between the bearing and rail), relatively large air losses generally mean a lot of air must be pumped in (between the bearing and rail) to replace the air lost, and a fair amount of power consumption is typically required as a result. In fact, one can easily imagine the unwanted contact that would otherwise occur (between the bearing and the rail) without a relatively thick layer of air if a longitudinally straight metal bearing with a curved/concave cross section were traveling along a cylindrically shaped rail at portions of the rail that are curved, undulated, sagging, and/or simply not manufactured with precision. Accordingly, there is a need for a bearing(s), bearing system(s), and/or method(s) that is(are) relatively more efficient in the usage of air. Further, since a number of prior air bearings reflect mirrored shapes of their corresponding rails (e.g., a cylindrical-shaped bearing that matches, or has a slightly larger radius than, its corresponding cylindrical-shaped rail) there is a need for a bearing(s), bearing system(s), and/or method(s) that does(do) not involve so much 'sandwiching' of the air layer between the bearing and rail, especially as it is believed that certain friction-related losses can, at least sometimes, occur in at least some of these 'mirrored' bearing-rail relationships, such as if either of the mated surfaces is not very smooth.

A further issue that is similar to the air layer/cushion thickness issue above is the fact linear induction motors ('LIMs')—which are employed in a number of mass transportation systems—need to maintain a close distance to the rail to avoid thrust losses since these can otherwise become quite substantial. Accordingly, a system(s), method(s), and/or device(s) that tend(s) to automatically maintain relatively efficient LIM-rail distances in one or more ways that are different than prior art systems would be potentially advantageous as well.

An additional issue that some track-based systems, like monorails, commonly confront is the unwanted separation of components, such as two portions of a rail/track that are meant to be adjacent. This may occur for a variety of reasons, such as changes in temperature (e.g., winter versus summer conditions) or a slight shifting of the foundation supporting such structures. While this issue does not necessarily lead to significant inefficiencies in all track-based systems, any gaps between two rails in a monorail system that relies on an air-cushion/layer would generally be undesirable. Thus, a system(s), method(s), and/or device(s) that can at least minimize, if not eliminate, such gaps would also have inherent value.

Finally, since columns supporting rails, as well as the rails themselves, are susceptible to potential damage from tremors and/or resonance, a system(s), method(s), and/or device(s) that has(have) the ability to reduce one or both of these would also be potentially advantageous.

BRIEF DESCRIPTION OF THE DRAWINGS

FIG. 2B largely reflects a cross-sectional view taken along the J-J' axis of FIG. 1, but without the assembly and vehicle/cargo, where this view essentially represents a side view of various components of the movable weight system;

FIG. 3A shows a perspective view of one of the two assemblies shown in FIG. 1;

FIG. 3B shows another perspective view of the assembly shown in FIG. 3A;

FIG. 3D shows a top view of the assembly;

FIG. 4A shows a side view of the assembly, connector, and wind deflector, among other things;

FIG. 4B shows the other side view of the assembly, connector, and wind deflector, among other things;

FIG. 7A shows a cross-sectional view taken along the A-A' axis of FIG. 6A;

FIG. 8D shows a side view of the air bearing (of the air bearing system) and the brake pad/s (of the brake system) of FIG. 8A;

FIG. 9B shows a close-up view of a portion of FIG. 9A, wherein an aperture and semi-enclosed cavity can be clearly seen, among other things;

FIG. 10D shows a cross-sectional view taken along the G-G' axis of FIG. 4A;

FIG. 11C is the same view as the FIG. 11B view but shows movement shows movement of the LIM relative to the assembly;

FIG. 19 shows a close-up view of a portion of FIG. 7A that shows the wind deflector;

FIG. 21B is the same view as FIG. 9A and FIG. 21A is the same view as FIG. 7B, and where the numbers depicted in FIGS. 21A and 21B are in millimeters;

DETAILED DESCRIPTION

Figure 1:
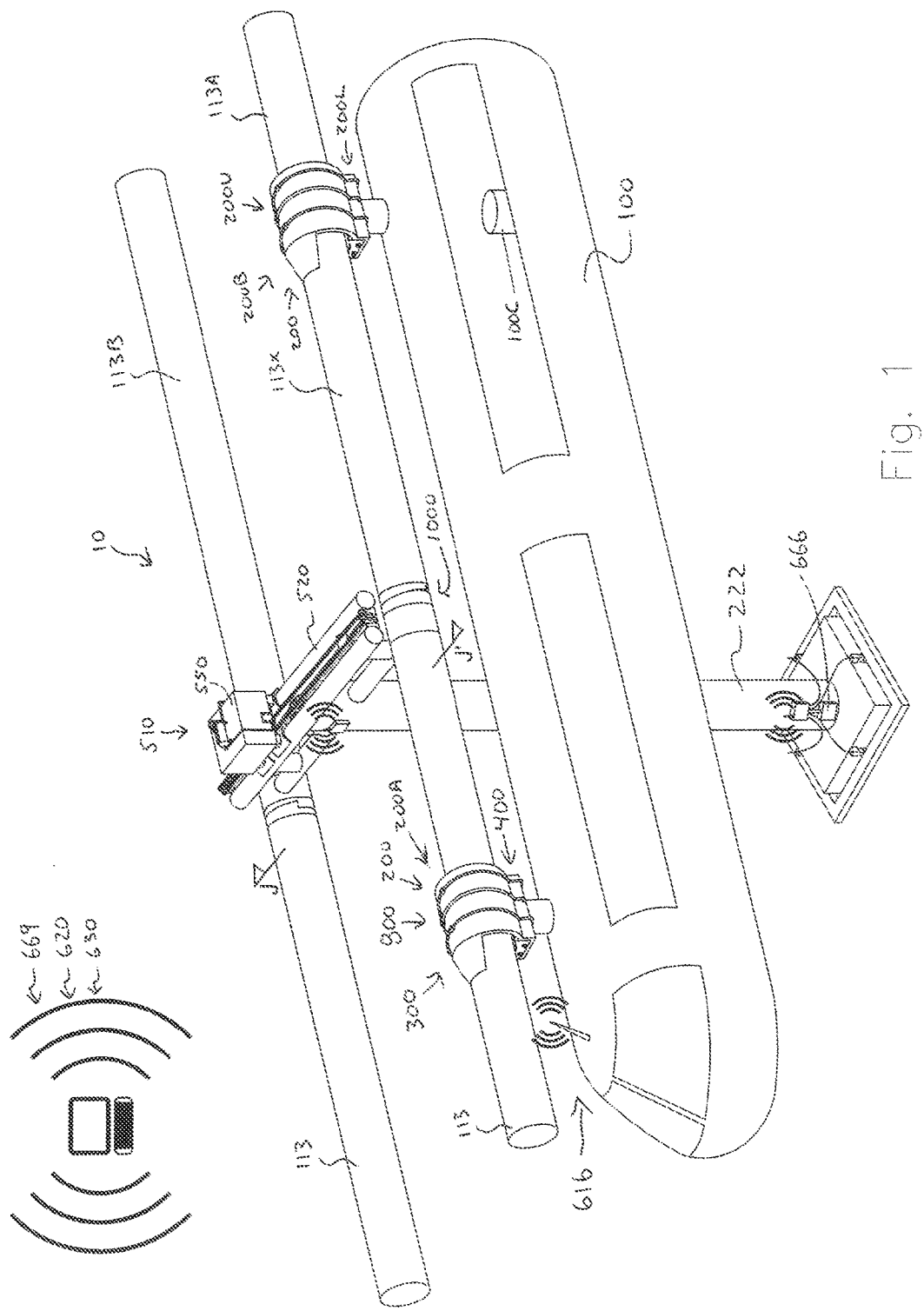
FIG. 1 shows a perspective view of one embodiment of a transportation system that includes, among other things, a monorail/vehicle traveling along a rail via a pair of assemblies, a movable weight system above the rail, and a rotatable wedge system between portions of the rail.

A perspective view of an embodiment of a transportation system 10 is shown in FIG. 1. As can be seen, the transportation system embodiment 10 depicted includes a vehicle (e.g., a monorail) 100, which in some but not all embodiments includes a cargo 100C. As discussed below, in one or more alternative embodiments the transportation system 10 includes the cargo 100C but not the vehicle 100. (Thus, in at least most cases when the phrase 'vehicle/cargo' is used herein it is meant 'the vehicle 100 and/or the cargo 100C', which are each defined below, unless the context makes it evident that only one could logically apply.) The vehicle 100/cargo 100 is movable, and moves, along a rail 113A (of the two rails 113A, 113B included in the FIG. 1 embodiment) in at least one direction vis-à-vis a pair of assemblies 200, though one assembly 200 is possible in alternative embodiments. Associated with each assembly 200 is an air bearing system 300; though, in alternative embodiments the assembly does not include the air bearing system 300, and in further alternatives the air bearing system 300 is associated with an alternative assembly. In one or more but not all embodiments, the air bearing system 300 includes a braking system 800 (as discussed below). While the vehicle/cargo is moved by a linear induction motor ('LIM') system 400, one or more alternative transportation system embodiments employ other LIMs or other systems that at least assist in moving the vehicle/cargo (such as those that include or rely on a fossil fuel-powered engine, a magnetic-based power, solar power, etc.) The transportation system 10 depicted further includes a movable weight ('MW') system 510 and a rotatable wedge system 1000. However, while all five of these systems 300, 800, 400, 510, 1000 are included in one or more embodiments of the transportation system 10 (as depicted in FIG. 1) various alternative embodiments of the transportations system 10 include only one, or alternatively various subsets (of two, three, or four) of these five systems, and one or more of these systems 300, 800, 400, 510, 1000 are employable in contexts other than that of the transportation system 10.

Even though just one support/column 222 is depicted in FIG. 1 and just one support 222 is possible in alternative embodiments, the one or more rails 113 are generally supported by a plurality of supports/columns 222 in the transportation system embodiment 10 depicted in FIG. 1. In one or more alternative embodiments, the assembly 200 is adapted to an alternative rail/track 113, and one or more alternative transportation systems include the vehicle 100 (e.g., monorail, train) moving above, rather than below, the rail/track 113. Moreover, while the rail/track 113 depicted in various Figures is hollow (but is not hollow in one or more alternative embodiments), has a diameter of roughly 1 meter, and an exterior thickness of roughly 25 mm, it will be readily apparent to those skilled in the art that almost any diameter and/or thickness will suffice as long as the rail/track 113 is strong enough to withstand expected forces (though one or more other components (e.g., the assembly 200) may have to be proportionally adjusted in size).

The Movable Weight System (i) Some Fundamentals Underlying One or More Embodiments Before getting into the details of the movable weight system 510, the next few paragraphs will explain broadly what it does, in at least one or more embodiments. Generally speaking, in one or more embodiments the movable weight system 510 at least partially counterbalances a moment—where in one or more embodiments the moment is a sum of two (or alternatively more) moments, and in one or more embodiments at least one the moments or alternatively two of the moments, and/or their sum, includes (statistical) weighting—experienced by the column/support 222 (e.g., at a point 222P associated with the column/support 222; or, in one or more alternative embodiments the moment is experienced by another point that is not associated with the column 222), where the moment/moments reflect/s one or more forces associated with the vehicle/cargo. In one or more embodiments of the movable weight system 510, the moment that is at least partially counterbalanced is associated with at least one time—and/or a plurality of times or all of the times—within a time period (e.g., actual or estimated/expected/predicted) when the vehicle/cargo is 'near' (as defined elsewhere in this document) the point 222P/column 222. In one or more embodiments, the moment that is at least partially counterbalanced reflects a weight associated with the vehicle/cargo (e.g., in one or more embodiments where the rail 113 near the point 222P/column 222 is at least relatively straight and/or is not considered curved); in one or more embodiments the moment that is at least partially counterbalanced reflects at least a centrifugal force associated with the vehicle/cargo (e.g., in one or more embodiments where the rail 113 is curved, and/or not considered straight, near the point 222P/column 222); and, in one or more embodiments the moment that is at least partially counterbalanced reflects both of these—e.g., as is reflected in the two Examples associated with FIGS. 12K and 12W.

In one or more embodiments, this at least partial counterbalancing is accomplished by at least a moment—where in one or more embodiments the moment is a sum of two (or alternatively more) moments—associated with a movable weight 550 (of the movable weight system 510) that is experienced by the column/support 222 (e.g., at the point 222P associated with the column/support 222; or, in one or more alternative embodiments the moment is experienced by another point that is not associated with the column 222), where the moment/moments reflect/s one or more forces associated with the movable weight 550. In one or more embodiments, the at least one moment, or a plurality of moments, associated with a movable weight 550 occur at the same one time—and/or same plurality of times or all of the times—within the same time period (e.g., actual or estimated/expected/predicted) when the vehicle/cargo is 'near' (as defined elsewhere in this document) the point(s) 222P/column 222—i.e., as was discussed above with respect to vehicle/cargo being 'near' the point 222P/column 222. In one or more embodiments the at least one moment, or plurality of moments, associated with the movable weight 550 is associated with the movable weight's 550 weight; in one or more alternative embodiments the at least one moment associated with the movable weight, or plurality of moments, is associated with the movable weight's 550 acceleration and/or de-acceleration; and, in one or more further alternative embodiments both are employed in the (at least partial) counterbalancing. Accordingly, in one or more embodiments the at least partial counterbalancing is at least partially accomplished by (1) repositioning the movable weight 550 and/or accelerating or de-accelerating the movable weight 550 and/or (2) determining that the movable weight 550 should not be moved from its (e.g., present or expected/predicted) location and/or determining that the movable weight's 550 acceleration or de-acceleration should be changed from its (e.g., present or expected/predicted) acceleration or de-acceleration. (Repositioning in this context/herein means at least 'moving' the movable weight 550; and, in one or more embodiments it also means to a particular location/position, to within a range of particular locations/positions, and/or in a particular direction, among others, as discussed further later.) In one or more embodiments such repositioning, accelerating and/or de-accelerating, and/or determining essentially causes a combining of (a) one or more moments associated with the moveable weight 550 with (b) one or more moments associated with the vehicle/cargo as a 'combined moment' associated with at least the one time, and also in one or more embodiments a plurality of 'combined moments' associated with the plurality of times or all of the times, within the time period (e.g., actual or estimated/expected/predicted) when the vehicle/cargo is 'near' (as defined elsewhere in this document) the point/column 222.

It also may be helpful to point out here that in one or more embodiments at least one, or alternatively at least two, of the moments associated with the weight of the vehicle/cargo varies, and/or is expected/predicted to vary, within/during the time period; in one or more embodiments at least one of the moment(s) associated with the acceleration and/or de-acceleration of the vehicle/cargo varies, and/or is expected/predicted to vary, within the time period; and, in one or more embodiments both do. In one or more embodiments, the varying associated with the vehicle/cargo reflects how 'near' (as defined elsewhere in this document) the vehicle/cargo is with respect to the point 222P and/or the column 222; and in one or more embodiments the varying of the one or more moment(s), or two (or more) of the moments, associated with the vehicle/cargo is taken into account via (statistical) weighting. Likewise, in one or more embodiments the moment(s) associated with moveable weight varies, and/or is expected/predicted to vary, within the time period; in one or more embodiments the varying associated with the moment(s) associated with moveable weight is related to a change in its acceleration and/or de-acceleration—which also occurs with respect to the vehicle/cargo in one or more embodiments. On a related note, it may be helpful to point out that in one or more, but not all, embodiments at least one of the moments within the time period (or alternatively immediately before and/or after the time period) has, or is estimated/assumed to have a zero magnitude—e.g., as will be seen and explained in the context of at least one Example below.

In one or more embodiments a result of the above-described at least partial counterbalancing is that at least one 'combined moment' (associated with a time) has a magnitude, i.e., a 'mitigated magnitude'—i.e., at least partially counterbalanced magnitude, that is less than a magnitude of the moment associated with the vehicle/cargo (associated with the same time) on which the 'combined moment' was based (i.e., which was combined with the moment associated with the moveable weight 550). More simply put, in one or more embodiments, the magnitude of at least one moment associated with the vehicle/cargo is at least partially mitigated. In one or more embodiments the 'mitigated magnitude' is at least 1% less than the magnitude of the moment associated with the cargo/vehicle (associated with the same time) on which the 'combined moment' was based; in one or more embodiments the 'mitigated magnitude' is at least 25% less than the magnitude of the moment associated with the cargo/vehicle (associated with the same time) on which the 'combined moment' was based; in one or more embodiments the 'mitigated magnitude' is at least 50% less than the magnitude of the moment associated with the cargo/vehicle (associated with the same time) on which the 'combined moment' was based; in one or more embodiments the 'mitigated magnitude' is at least 75% less than the magnitude of the moment associated with the cargo/vehicle (associated with the same time) on which the 'combined moment' was based; and, in one or more embodiments the 'mitigated magnitude' is at least 99% less than the magnitude of the moment associated with the cargo/vehicle (associated with the same time) on which the 'combined moment' was based; and, in one or more embodiments the 'mitigated magnitude' is zero or at least substantially zero.

In one or more embodiments a result of the above-described at least partial counterbalancing is that an (actual and/or expected/predicted/estimated) maximum magnitude, i.e., 'counterbalanced maximum', with respect to all of the (actual and/or expected/predicted/estimated) magnitudes respectively associated with each of a plurality of 'combined moments'—which are respectively associated with a plurality of times or all of the plurality of times of the time period—is less than a maximum magnitude, i.e., an 'un-counterbalanced maximum', with respect to all of the (actual and/or expected/predicted/estimated) magnitudes respectively associated with each of a plurality of 'combined moments'—which are respectively associated with the same plurality of times or all of the plurality of times of the same time period—that would otherwise occur (or be expected/predicted/estimated to occur) without the at least partial counterbalancing that caused the plurality of 'combined moments'. More simply put, in one or more embodiments, the magnitude of the largest moment associated with the vehicle/cargo is at least partially mitigated. In one or more embodiments the 'counterbalanced maximum' is less than the 'un-counterbalanced maximum' by at least 10% of the 'un-counterbalanced maximum'; in one or more embodiments the 'counterbalanced maximum' is less than the 'un-counterbalanced maximum' by at least 25% of the 'un-counterbalanced maximum'; in one or more embodiments the 'counterbalanced maximum' is less than the 'un-counterbalanced maximum' by at least 49% of the 'un-counterbalanced maximum'; in one or more embodiments the 'counterbalanced maximum' is less than the 'un-counterbalanced maximum' by between 1% and 50% of the 'un-counterbalanced maximum'; in one or more embodiments the 'counterbalanced maximum' is less than the 'un-counterbalanced maximum' by roughly 50% of the 'un-counterbalanced maximum'; in one or more embodiments the 'counterbalanced maximum' is less than the 'un-counterbalanced maximum' by more than 50% of the 'un-counterbalanced maximum'; in one or more embodiments the 'counterbalanced maximum' is less than the 'un-counterbalanced maximum' by more than 60% of the 'un-counterbalanced maximum'; and, in one or more embodiments the 'counterbalanced maximum' is less than the 'un-counterbalanced maximum' by a predetermined range, a predetermined percentage, and/or a predetermined number/amount.

In one or more embodiments, a result of the above-described at least partial counterbalancing is that the 'counterbalanced maximum' is equal, or at least substantially equal, to (a) a (actual and/or expected/predicted/estimated) maximum potentially achievable magnitude of a moment associated with the movable weight's 550 weight (and is not associated with the movable weight's acceleration and/or de-acceleration, if any)—which is often referred to herein as a 'maximum achievable movable weight ('MW') magnitude'—with respect to the point 222P/column 222. More simply put, in one or more embodiments, when the vehicle/cargo is 'near' (as defined elsewhere) point 222P/column 222 the largest magnitude moment associated with the point 222P/column 222 (i.e., 'counterbalanced maximum') will equal, or at least substantially equal, the magnitude of the moment associated with the weight of the movable weight 550 when it is furthest from the column 222 and/or the vehicle/cargo. In one or more embodiments 'substantially equal' means the 'counterbalanced maximum' and 'maximum achievable MW magnitude' differ by less than 1%; in one or more embodiments 'substantially equal' means the 'counterbalanced maximum' and 'maximum achievable MW magnitude' differ by less than 10%; in one or more embodiments 'substantially equal' means the 'counterbalanced maximum' and 'maximum achievable MW magnitude' differ by less than 25%; in one or more embodiments 'substantially equal' means the 'counterbalanced maximum' and 'maximum achievable MW magnitude' differ by less than 49%; and, in one or more embodiments 'substantially equal' means the 'counterbalanced maximum' and 'maximum achievable MW magnitude' differ by a predetermined ranged, predetermined percentage, and/or a predetermined number/amount.

Before moving on, it should be noted that in one or more embodiments only one of the three above-mentioned results occurs, in one or more embodiments a subset of two of the three above-mentioned results occurs, in one or more embodiments two subsets of the three above-mentioned results occurs; and, in one or more embodiments all three of the above-mentioned results occurs (or at least are able to occur). And, in one or more embodiments, all the moments associated with the vehicle/cargo over the entire time period (when the vehicle/cargo is 'near' the column 222/point 222P) are at least partially counterbalanced as much as possible.

Also, for the sake of clarity in one or more but not all embodiments the 'time period' includes the one or more times during which the vehicle/cargo is 'near' the point 222P/column 222—e.g., as reflected in times of 0.5 second, 1 second, 1.5 seconds, 2 seconds, etc. of the 4 second time period in the Example of FIG. 12K. Accordingly, in one or more but not all embodiments the 'time period' is measured from the time when the vehicle/cargo becomes 'near' the column—where 'near' is considered (the instant) just before the vehicle/cargo's effect, via its weight and/or acceleration or de-acceleration, on the column 222 is about to become not-zero, or in one or more alternative embodiments is less than 0.0001% of the 'un-counterbalanced maximum'—until the vehicle/cargo becomes 'not near' the column, where 'not near' is considered (the instant) just after the vehicle/cargo's effect, via its weight and/or acceleration of de-acceleration, on the column 222 has again become zero, or in one or more alternative embodiments is greater than 0.0001% of the 'un-counterbalanced maximum'. (The definition of 'near' and related issues are discussed elsewhere.)

With the above in mind, the document will now discuss more specifically how (in one or more embodiments) one or more moment(s) associated with the vehicle/cargo is at least partially counterbalanced. In the process and/or afterwards (or elsewhere herein), various components of the moveable weight system 510 will be discussed as well.

(ii) The Vehicle, the Cargo and Some Alternative Embodiments

In one or more, but not all, movable weight system embodiments 510 (such as can be seen in FIG. 7A) at least one weight sensor device 677 (which includes two parts/sides in FIG. 7A) weighs/measures (and/or calculates and/or estimates) the weight of at least the vehicle 100 and/or the cargo 100C. In one or more embodiments the measuring/weighing occurs at least once; in one or more embodiments the measuring/weighing occurs periodically (e.g., upon leaving a station or platform in one or embodiments where these are envisioned); in one or more embodiments the measuring/weighing occurs periodically in real time—where the latter two often are well suited for scenarios that envision passengers entering or exiting and/or (other) cargo being loaded or unloaded at one or more points (e.g., upon leaving a station or platform in one or embodiments where these are envisioned) along the rail 113, for example.

In one or more embodiments, the 'cargo' 100C is one or more goods/things and/or one or more people that is/are at least temporarily associated with the vehicle 100. However, in one or more embodiments there is no cargo 100C associated with the vehicle 100; and, in one or more further alternative embodiments, the cargo 100C is not associated with the vehicle 100 (as explained below). It should be noted here that while 'associated'—e.g., as discussed immediately above with respect to the cargo 100C associated with the vehicle 100—means 'in' with respect to at least one embodiment (e.g., 'in' the monorail 100); and, in one or more other embodiments 'associated' cargo 100C means on, held by, moved by, and/or carried by, etc. In this regard, it is important to also mention that though this document often refers to or depicts (in various Figures) one or more embodiments that include a vehicle 100 that is a monorail 100, one or more alternative embodiments include a vehicle that is of a different type than a monorail. In fact, in one or more alternative embodiments the 'vehicle' 100 is a train, alternatively it is a car, alternatively it is a platform, alternatively it is a container, alternatively it is a cage or a partial cage, or alternatively it is any other item or device capable of carrying, moving, grasping, and/or holding, etc. the cargo 100C—i.e., regardless of whether the cargo 100C is associated with it or not. Accordingly, this document often uses the term 'vehicle', even when discussing a Figure(s) that relates to one or more embodiments that involve the 'monorail' 100, at least in part to emphasize this point.

It is also important to note that one or more alternatives do not include the vehicle 100 (as defined above); rather, the cargo 100C is moved along the rail without the vehicle 100. In one or more embodiments the cargo is moved along the rail in a way(s) that is similar to which the vehicle 100 is moved, such as via the assembly 200 but where the assembly 200 is tailored for the specific cargo 100C, though various alternatives are employed in alternative embodiments. Moreover, one or more alternative embodiments do not include the assembly 200 or alternatively the assembly is incorporated as part of the vehicle 100 and/or the cargo 100C. In one or more alternative embodiments, the vehicle and/or cargo move along the rail/track 113 by moving above the rail/track, rather than below it.

(iii) Weight Derived/Estimated from Non-Weight Data

Further, while a number of the embodiments depicted herein involve the weight sensor 677 and/or involve measuring/weighing, there are a number of alternative embodiments of the movable weight system 510 that employ weight-related data associated with the vehicle 100 that is not based on measured weight but is instead at least partially derived/estimated from 'non-weight data' (e.g., determinations and/or amounts), such as (1) the presence of the vehicle (or presence of a specific type of vehicle, e.g., presence of a monorail, presence of a container), (2) length of the vehicle, (3) how many cars the vehicle (e.g. monorail, train) is composed of, (4) how long it takes the vehicle to pass a certain point, (5) the side of the column 222 and/or which rail 113 the vehicle is detected on, (6) the number of people 100C and/or number of items of cargo 100C that are associated with the vehicle (which, in one or more embodiments is obtained by one or more sensors and/or via data records, e.g., number of tickets purchased, number of packages from a shipping service), and/or (7) one or more of (i) the day of the week, a holiday or non-holiday, and/or time of day data. Regarding the latter, it might, for example, be assumed that at certain times of day (e.g., not 'rush hour'/ off-peak times) and/or on certain days of the week (e.g., weekends) and/or on certain dates (holidays) relatively lighter cargos (e.g., less people) and/or relatively (shorter and thus) lighter vehicles may be employed, where on others the opposite may be assumed. In other words, in one or more alternative embodiments, one or more of these +7 pieces of 'non-weight data' can be used instead of 'weight data' related to the actual weighing of the monorail/cargo/etc. —i.e., without the need for the weight sensor 677 being part of the movable weight system 510. For example, those skilled in the art will also recognize that at one or more of these +7 pieces of data can be obtained by or derived from the GPS 669 and/or Internet (and/or servers) and/or one or more various other sensors (e.g., a visual sensor, a motion sensor, and/or a heat sensor, etc.), which have not been shown in the Figures (but one or more appropriate locations would be readily apparent to those skilled in the art).

Accordingly, in at least one embodiment, one or more of such 'non-weight data' is used with certain predetermined (e.g., preprogrammed) correlations/relationships to determine, estimate, or otherwise assign a weight or weight range to the vehicle 100 and/or cargo 100C, which will be referred to herein as 'estimated weight'. In one or more, but not all, embodiments one or more of such relationships is based on previously measured, estimated, or otherwise assumed weight, weight ranges, minimum weight (threshold), and/or maximum weight (threshold). Some examples of such 'non-weight data to vehicle/cargo weight relationships' include the following: (a) if the vehicle/cargo is detected, then its (estimated) weight is 30,000 Kg; (b) if the vehicle 100 is a platform (e.g., rather than a monorail), then its (estimated) weight is less than 1,000 Kg; (c) if the vehicle/cargo is detected to be 50 meters long, then its (estimated) weight is at least 25,000 Kg; (d) if the vehicle/cargo has seven cars, its (estimated) weight, then its (estimated) weight is between 32,000 Kg and 35,000 Kg; (e) if the vehicle/cargo takes seven seconds to pass (at 30 miles/hour), then its (estimated) weight is greater than 40,000 Kg; (f) if the vehicle/cargo is detected on 'Track X' then its (estimated) weight is less than 32,500 Kg, (g) if it is between 3 AM to 4 AM on a Tuesday, then the cargo 100C is assumed to be between 3,000 Kg and 5,000 Kg, among other examples that can be imagined by those skilled in the art. Accordingly, often when this document refers to 'weight-related information/data' associated with the vehicle 100 and/or the cargo 100C, it should thus be understood that this would generally mean measured or estimated weight data, unless the specific context makes clear only one of the two is intended or otherwise the only logical meaning.

(iv) Movable Weight Repositioning (and/or Acceleration/De-Acceleration) without Employing 'Weight-Related Information' and/or Determining One or More Moment(s) Associated with the Vehicle/Cargo While the discussion immediately above was primarily presented to explain how in one or more alternative embodiments such 'non-weight data' is employed to determine an 'estimated weight' that can be used instead of 'measured weight'—e.g., as will be explained in detail later, to determine one or more moments associated with the vehicle/ cargo, and then determine how the movable weight 550 can be employed to at least partially counterbalance the one or more determined moments associated with the vehicle/ cargo—it may be helpful to first discuss one or more alternative embodiments that do not require one or more of these determinations steps (i.e., determining measured weight, determining estimated weight, determining one or more moments associated with the vehicle/cargo, determining how the movable weight can be employed to counter the one or more determined moments associated with the vehicle/cargo). That is, one or more alternative embodiments involve (1) employing 'estimated weight' and/or 'measured weight' to instruct the movable weight system 510 (e.g., regarding repositioning and/or acceleration/de-acceleration of the movable weight 550) without at least determining one or more moments associated with the vehicle/cargo—e.g., according to one or more (e.g., predetermined and/or preprogrammed) 'weight-related data to movable weight action relationships'; and/or, (2) employing 'non-weight data' (e.g., one or more of the above +7 mentioned above) to instruct the movable weight system 510 (e.g., regarding repositioning and/or acceleration/de-acceleration of the movable weight 550) without determining one or more moments associated with the vehicle/cargo—e.g., according to one or more (e.g., predetermined and/or pre-programmed) 'non-weight data to movable weight action relationships'.

With regard to the first of these, such 'weight-related data to movable weight action relationships', which associate one or more 'weight-related data' with one or more actions, are employed to determine one or more instructions (related to the actions) and/or the actions. For example, (a) if the vehicle 100 and cargo 100C together have a 'measured weight' of 30,000 Kg (e.g., via the weight sensor 677), the movable weight 550 is automatically moved to position 'X' along its trail/track 520; (b) if the vehicle 100 has an 'estimated weight' of 20,000 Kg (e.g., as a result of having 5 cars), the movable weight 550 is moved 1 meter to the left of its present position; (c) if the vehicle's weight (i.e., 'estimated' or 'measured') is above (or alternatively below) a certain threshold (or alternatively within a certain range), the movable weight 550 is positioned at the end of the movable weight's rail 520 and/or as far away from the vehicle/cargo as possible; etc.

With regard to the second of these, such one or more 'non-weight data to movable weight action relationships', which associate one or more of the above-mentioned +7 'non-weight data' (and/or other data not related to a measuring/weighing of the vehicle/cargo) with one or more actions, are employed to determine one or more instructions (related to the actions) and/or the actions. For example, (a) if the monorail 100 has 'X' number of cars and it is known or assumed that between 'P1' and 'P2' number of people are on the monorail 100, the movable weight 550 is (automatically) moved (and/or directed to move) to 'Position Z' (from 'Position Y'); (b) if it is 'rush hour' (e.g., 5 PM to 7 PM) and the monorail 100 has more than 'N' number of cars but the monorail 100 takes less than 10 seconds to pass a specific point (e.g., a particular column 222), the movable weight 550 is (automatically) moved a half meter from the end of the movable weight's rail 520 (e.g., almost as far away from the vehicle 100 as possible but not as far away as possible); etc.

In fact, one or more further alternatives combine one or more 'weight-related data to movable weight action relationships' with one or more 'non-weight data to movable weight action relationships'—e.g., if the monorail 100 is known to weigh 30,000 and it is rush hour on a Thursday and it is known that at least 2,000 passengers are on the vehicle, then the movable weight 500 is (automatically) moved to 'position X'. Similarly, in one or more embodiments and/or scenarios the relative magnitudes and/or the difference between the weight of the movable weight 550 and the weight (estimated or calculated) of the vehicle/cargo will reflect the relationship that determines a movable weight 550 repositioning-related action. For example, if the weight of the vehicle 100 and cargo 100C combined is 15,000 Kg more than the weight (e.g., measured or estimated) of the moveable weight 550, then the movable weight 550 is automatically triggered to move to 'Position X'; but, if the weight (e.g., measured or estimated) of the vehicle 100 is also at least 3 times the weight (e.g., measured or estimated) of the movable weight 550, the movable weight 550 is automatically triggered to move to 'Position Y'.

More generally, examples of 'triggered movable weight actions' (which are part of 'non-weight data to movable weight action relationships' and/or 'non-weight data to movable weight action relationships' and/or one or more alternatives that combine weight and non-weight data, as mentioned above) include the following: (i) reposition the movable weight 550 to a certain predetermined location/position, (ii) reposition the movable weight 550 in a certain predetermined direction, and/or (iii) reposition the movable weight 550 to a certain predetermined distance from its present position. Further 'triggered movable weight actions' include (iv) keep the movable weight 550 in its present location and/or (v) do not move the movable weight 550. And, other 'triggered movable weight actions' will be appreciated by those skilled in the art—e.g., (vi) accelerate the movable weight 550, (vii) de-accelerate the movable weight 550, as will be discussed later.

(v) 'Which Side' Data

Moreover, in one or more embodiments, one or more data associated with one or more determinations associated with positioning the movable weight (and/or accelerating and/or de-accelerating the movable weight 550) is supplemented by, or alternatively incorporates, 'which side' data—i.e., data that indicates which side of the column 222 the vehicle 100 and/or cargo 100C is on. For instance, in on one or more embodiments 'which side' data is used with 'weight-related data' (i.e., measured and/or estimated) associated with the vehicle/cargo to determine if and/or how the movable weight 550 should be repositioned (and/or accelerated/de-accelerated)—e.g., via a determination(s) of one or more moment(s) associated with the vehicle/cargo or via a 'weight data to movable weight action relationship(s)'. Further, in one or more other embodiments 'which side data' is used with 'non-weight data' via 'non-weight data to movable weight action relationship(s)'—e.g., if there are 15 or more cars associated with the monorail 100 and it is on the left side of the column 222, then the movable weight 550 is moved as far right on the movable weight's rail 520 as possible. In this light, the document is not categorizing 'which side' data as either 'weight-related data' or 'non-weight data'; rather, it is considered herein as its own category.

In fact, in one or more alternative embodiments, 'which side' data is used to instruct the movement of and/or move the moveable weight 550 without relying on any of the other data and/or methods mentioned herein. For example, in at least one embodiment if the 'which side' data indicates that the vehicle 100 and/or cargo 100C is on one side of the column 222 then the movable weight 550 is automatically repositioned—i.e., by one or more 'which side' data movable weight action relationships'—e.g., (i) on the opposite side of the column 222 that the vehicle/cargo is on and/or (ii) to the opposite end of the movable weight's rail 520 that the vehicle/cargo is on—which in many, but not necessarily all, embodiments will be the same thing. In one or more embodiments, if the 'which side' data indicates that the vehicle/cargo is on one side of the column 222 then the movable weight 550 is automatically (iii) repositioned to some (other) predetermined position along the movable weight's rail 520. In one or more embodiments, if the 'which side' data indicates that the vehicle is on one side of the column 222 then the movable weight 550 is automatically (iv) accelerated or (v) alternatively de-accelerated. In one or more embodiments, if the 'which side' data indicates that the vehicle/cargo is on one side of the column 222, then the movable weight 550 is automatically not repositioned—e.g., if the movable weight 550 is already appropriately positioned (and/or not accelerated and/or de-accelerated if the moveable weight 500 is already doing so appropriately) according to one or more 'which side data movable weight action relationships'. In one or more embodiments, 'which side' data is implied from data related to which rail (e.g., 113A) the vehicle/cargo is on. In fact, one or more embodiments employ such 'which rail' data instead of 'which side data' in one or more of the ways described in this paragraph and/or elsewhere in this document.

While this is also discussed later, it may be a helpful to note here that in one or more embodiments knowing simply whether the vehicle/cargo is on one side of the column 222 or the other—i.e., via 'which side' data—(or which track it is on) is not enough to determine whether centrifugal force-related moment(s) is (are) additive or subtractive with respect to the weight-related moment(s) associated with the vehicle/cargo—relative to point 222P of the column 222. That is, it should be emphasized that in one or more embodiments 'which side' data that is taken into account with respect to a centrifugal force-related moment associated with the vehicle/cargo—i.e., where centrifugal force-related moment associated with the vehicle/cargo is relevant (e.g., one or more curved rails 113 'near' the column 222)

and taken into account in the one or more, but not all, embodiments—includes an indication as to whether the vehicle/cargo is on the 'inside of the curve' and/or an indication as to whether the vehicle/cargo is on the 'outside of the curve'. Accordingly, in one or more embodiments 'which side' data and either of such indications (e.g., inside, not inside, outside, not outside)—or some alternative indication, or even employing some type of default—will trigger one or more of the actions via one or more predetermined relationships, such as those mentioned in the above paragraph.

While such 'which side' (and/or 'which rail') data can be known by GPS 669 (which is symbolically shown in FIG. 1 and should be understood to include a computer system 620 employing software 630, which may also include—or instead be interpreted as—the Internet) or via some other device/system, in one or more other embodiments the 'which side data' (and/or 'which rail' data) is entered by a human. In one or more alternatives, the 'which side'(and/or 'which rail') information is provided the weight sensor 677—e.g., where the measurement of the vehicle's 100 weight and/or cargo's 100C weight includes 'which side' data, or where the weight sensor 677 senses that the vehicle/cargo 100 is on a particular side of the column 222 by determining that the vehicle/cargo weight is above a predetermined amount (e.g., in some such alternative embodiments where the vehicle/cargo's exact weight is, at least sometimes, not determined by the weight sensor 677). Alternatively, a different type of sensor is employed (i.e., in addition to or instead of the weight sensor 677) that detects the vehicle/cargo's presence, its presence on a particular side of the column, and/or its presence relative to a particular track/rail 113A or 113B (in embodiments having a plurality of tracks/rails 113A, 113B)—e.g., where such a sensor has the ability to do this visually, by temperature, by motion, and/or by vibration, etc. On the other hand, as mentioned above, in one or more embodiments and/or scenarios 'which side data' can be known or determined indirectly—e.g., by knowing or determining which rail/track the vehicle 100 and/or cargo 100C is on (i.e., in the one or more embodiments that include more than one rail/track) and/or which direction and/or route the vehicle/cargo is moving (e.g., if it is known that the monorail 100 is always on track number 'X' in the Washington, D.C. to New York route and/or going northward), or any other way known to those skilled in the art.

On the other hand, in one or more embodiments and/or one or more scenarios the 'which side' data is not needed (and therefore in one or more such embodiments it is not known, obtained, determined and/or received as described above). For example, this is the case in one or more (but not all) embodiments where there is only one track on one side of the column 222. It may also be helpful to note that such 'which side' (of the column) data is also not necessary in one or more, but not all, of the one or more embodiments that only employ centrifugal force-related moment(s) (and not weight-related moment(s)) of the vehicle/cargo. As will be seen later, in one or more such embodiments moment-related estimates/calculations pertaining to centrifugal force do not differentiate between whether the vehicle is on one side of the column 222 or the other. However, this is not always the case—e.g., in one or more alternative embodiments and/or scenarios that enable a vehicle/cargo with weight 'W' at speed 'S' to be on a rail/track with a 'C' curve radius on one side of the column 222 at height 'X' and also enable the same vehicle/cargo with same weight 'W' at the same speed 'S' to be on a rail/track with the same 'C' curve radius on the other side of the column 113 at a height 'Y'; this would suggest that 'which side' data could play a role on such occasions in counterbalancing centrifugal force. In any event, one or more embodiments that leverage centrifugal force-related moment(s) are discussed later.

(vi) Some Weight to Moment to Position (and/or to Acceleration/De-Acceleration) Embodiments With the above in mind, this document will now get back to discussing how repositioning the moveable weight 550 relative to the column 222 (e.g., point 222P associated with the column 222)—e.g., along the movable weight's 550 rail 520 (and/or an accelerating or a de-accelerating the movable weight 550, as will be discussed later) to, as was discussed above, at least partially counterbalance one or more moment(s) associated with the vehicle/cargo)—is determined using the vehicle/cargo's (e.g., measured or estimated) weight and, even more specifically, by using a moment that is determined with the vehicle/cargo's weight. However, before explaining how the moment is used to determine position, it should be briefly mentioned that one or more alternative embodiments involve 'a non-weight data to moment relationship(s)'. These are similar to the 'non-weight data to movable weight action' relationships discussed above except that these involve a relationship that associates one or more 'non-weight data' with one or more moment amounts and/or magnitudes; and, the 'estimated moment' (from one or more such relationships) is then used to determined a position and/or direction, etc. for the movable weight 550 just as described below.

One or More Factors Employed in One or More Embodiments

In light of the above, it will be apparent that in one or more embodiments one or more various factors associated with determining one or more moments associated with the vehicle/cargo are employed in position-related (and/or acceleration/de-acceleration-related) determinations—i.e., in addition to weight-related (and/or mass-related) factors associated with the vehicle/cargo discussed above. For example, in at least one embodiment data reflecting a distance (e.g., Xmw in FIGS. 12A and 12L) of the vehicle/cargo from the column 222 (and/or point 222P) is employed—e.g., in calculating one or more moments associated with the vehicle/cargo (e.g., relative to the predetermined point 222P associated with the column 222). In one or more embodiments, this distance becomes 'known' by the computer system 667; and, in some of these cases this is a result of measurement by the GPS 669 and communication to the computer system 667. In other embodiments, this distance data is entered by a human, or alternatively it is at least partially determined by the computer system 667 and/or at least partially determined by a device (e.g., sensor) associated with the vehicle/cargo, assembly 200, rail 113, and/or column 222, or any other device(s). In any case, with this distance-related information, in one or more embodiments the moment exerted by the vehicle/cargo's weight (and/or acceleration/de-acceleration) relative to the column 222/point 222P is calculated/estimated/determined by multiplying this distance by the (e.g., measured or estimated) weight of the vehicle/cargo (and/or acceleration/de-acceleration). In one or more alternative embodiments, distance, and not weight, of the vehicle/cargo is used—e.g., where a distance of more than 'X' triggers, via one of the relationships described above, an automatic repositioning to a specific or relative position, positioning in a specific direction, and/or acceleration/de-acceleration of the moveable weight, etc.

In one or more embodiments, the distance of the vehicle/cargo from the column is at least partially based on a distance of the rail (e.g., 113A), on which the vehicle/cargo is traveling (or at least temporarily positioned), from the column 222 and/or at least partially based on the position of the vehicle/cargo along the rail 113 when it is near the column 222. In the two Examples (in FIG. 12K and FIG. 12W) discussed below, the distance varies when the vehicle/cargo is 'near' the column 222 and the percentage/weightings (e.g., 0.25, 0.50, 0.75, etc.) of the weight-related moment(s) and/or centrifugal force-related moment(s) are related to the varying distance, or at least estimated varying distance, of the vehicle/cargo with respect to the column 222—i.e., in light of the fact these moments vary, or are at least estimated to vary, with respect to the column 222/point 222P with varying distance of the vehicle/cargo with respect to the column 222/point 222P. In one or more embodiments the 'maximum achievable V/C magnitude' (as discussed further below) is associated with 100%, or alternatively some other percentage, of the weight-related moment(s) and/or centrifugal force-related moment(s) associated with the vehicle/cargo; and, in one or more embodiments (as discussed elsewhere) this is assumed to be when the vehicle/cargo is as close the column 222 as possible.

Moreover, one or more embodiments also, or instead, employ one or more other factors associated with determining one or more moments associated with the movable weight 550. For example, in one or more embodiments a mass or weight associated with the movable weight 550 is known (e.g., by determination, estimation, or predetermination/pre-entered)—e.g., 'X' Kg.

In one or more embodiments, a length of the movable weight's rail 520 is known. In one or more embodiments, a length of the movable weight's rail 520 on at least one side (and alternatively on each side) of the column 222 is known (e.g., by a determination, estimation, or predetermination/pre-entering), especially with respect to the side of the rail 520 (with respect to the column 222) that is the opposite of the side (with respect to the column 222) that the vehicle/cargo is on. In one or more embodiments, what is employed (e.g., by the computer system 667) is a maximum distance the movable weight 550 may achieve with respect to the column 222, on one side or alternatively both sides of the column 222. In one or more embodiments, it is known (e.g., by the computer system 667) and/or employed (e.g., by the computer system 667) whether the length of the movable weight's rail 520 is longer on one side of the column 222 or the other (or if they are substantially equal), and in one or more embodiments it is known and/or employed how much longer one side is compared to the other. In one or more embodiments, a design of the rail 520, e.g., whether it is perpendicular to the column 222 or is at some other angle and/or has some other configuration, is known and/or employed. For instance, in one or more embodiments where the 'maximum achievable MW magnitude' is employed (as discussed further below), the weight of the movable weight 550 and maximum length of the movable weight's rail 520 (e.g., with respect to side of the column 222 opposite that of the vehicle/cargo) is employed (e.g., by or via the computer system 667) in one or more determinations that lead to the at least partially counterbalancing discussed above.

In one or more embodiments, one or both data associated with the two above-mentioned factors (i.e., weight of movable weight 550, length of the movable weight's rail 520 or similar data) is a result of one or more communication links (which are wireless in FIG. 1) between the monorail's computer system 667 and a control portion 615 associated with the movable weight system 510. The movable weight system's 510 control portion 615 controls movement (repositioning and/or acceleration/de-acceleration) of the movable weight 550, though in one or more embodiments that means following instructions from the monorail's computer system 667; in other words, in one or more embodiments the control portion 615 does not necessarily have the ability to instruct the moveable weight's 550 movement but merely is able to follow the computer system's 667 instructions and move the moveable weight accordingly. In one or more alternative embodiments, the control portion 615 is able to instruct the movable weight 550 instead, or in addition to the computer system 667 of the vehicle/cargo. In one or more embodiments, the control portion 615 includes a computer and employs software. In one or more embodiments, one or both of these two items of data (reflecting these two above-mentioned factors) is entered by a human. In one or more alternatives one or both of these two items of data is at least partially determined by the computer system 667 and/or a device (e.g., one or more sensors) associated with the vehicle/cargo, assembly 200, rail 113, movable weight's rail 520, and/or column 222, or any other device(s).

Using Moment of the Vehicle/Cargo to Determine Position (and/or Acceleration)

In one or more embodiments one or more moments associated with the vehicle/cargo are employed (1) to determine a repositioning (e.g., one or more positions, a direction of movement, etc.) of the moveable weight 550 (and/or to determine not to move the movable weight or not to move it until a certain time or event occurs) and/or (2) to determine an acceleration and/or a de-acceleration of the movable weight 550 (or not do so, or not change the present acceleration/de-acceleration)—where discussion here will at least largely focus on the former, and where acceleration/de-acceleration is largely discussed in later portions of the document—and in one or more (but not all) of such embodiments one or more moments associated with the vehicle/cargo are thus determined. For instance, in one or more embodiments one of the moments associated with the vehicle/cargo that is determined (or in one or more embodiments the only moment that is determined) is a moment associated with the vehicle/cargo that reflects the maximum achievable magnitude of (i) a maximum achievable weight-related moment magnitude associated with the vehicle/cargo and/or (ii) a maximum achievable acceleration (and/or de-acceleration-related) moment magnitude associated with the vehicle/cargo—i.e., associated with the vehicle/cargo being, or expected/predicted/estimated to be, 'near' the column 222 (e.g., the point 222P of the column 222). At times, this document refers, for ease, to the maximum achievable magnitude moment associated with the vehicle/cargo as the 'maximum achievable V/C magnitude' or '(un-counterbalanced) maximum achievable V/C magnitude'.

Further, in one or more embodiments a determination is made that identifies an 'opposite moment magnitude' (e.g., actual and/or estimated/predicted/expected) associated with the movable weight 550—which is a moment associated with the movable weight 550 (e.g., its position, acceleration, and/or de-acceleration, etc. as described elsewhere) that at least partially counterbalances/mitigates the '(un-counterbalanced) maximum achievable V/C magnitude' and/or at least partially counterbalances/mitigates another moment associated with the vehicle/cargo (associated with when vehicle/cargo is, or expected/predicted/estimated to be, 'near' the column 222, e.g., the point 222P of the column 222). For instance, in one or more embodiments, a position/location of the movable weight 550 (e.g., along the movable weight's rail/track 520) on the opposite side of the column 222 relative to the location/position of the vehicle/cargo is identified—where the identified position is one that, when multiplied by the (estimated or actual) movable weight's 550 weight, yields an 'opposite moment magnitude' that is a magnitude that equals half or equals substantially half the (un-counterbalanced) 'maximum achievable V/C magnitude'. In one or more of the embodiments, in this context 'substantially half' means the 'opposite moment magnitude' is between 49% and 51% of the (un-counterbalanced) 'maximum achievable V/C magnitude'; in one or more embodiments 'substantially half' means the 'opposite moment magnitude' is between 45% and 55% of the (un-counterbalanced) 'maximum achievable V/C magnitude'; in one or more embodiments 'substantially half' means the 'opposite moment magnitude' is between 35% and 65% of the (un-counterbalanced) 'maximum achievable V/C magnitude'; and, in one or more alternative embodiments 'substantially half' means the 'opposite moment magnitude' is between 25.1% and 74.9% of the (un-counterbalanced) 'maximum achievable V/C magnitude'.

It may be helpful to point out that the 'half or substantially half' relationship sought (i.e., as part of determining a position for the movable weight) in such embodiments and/or scenarios is essentially cutting the (un-counterbalanced) 'maximum achievable V/C magnitude' in half or 'substantially half' to yield a 'new/counterbalanced maximum V/C achievable magnitude' that is smaller than a 'new/counterbalanced maximum achievable V/C magnitude' that would otherwise occur if the 'maximum V/C achievable magnitude' were not cut in half or 'substantially half'. An example may be helpful: the movable weight 550 has a weight of 500N and the vehicle/cargo is able to exert a 'maximum achievable V/C magnitude' of 1,200 KNm (i.e., without the movable weight 550), then in one or more embodiments the movable weight 550 (in this non-limiting example) could be positioned at 1.2 meters along its rail 520 so that the 'opposite moment magnitude' (of the movable weight 550) is half (600 KNm) of the (un-counterbalanced) 'maximum achievable V/C magnitude' of 1,200 KNm. Accordingly, the 'new/counterbalanced maximum achievable V/C magnitude' would be 600 KNm, which would occur (and/or be predicted to occur) when the vehicle/cargo is exerting its fullest (actual or estimated) moment on the column 222 (e.g., 1,200 KNm) and/or immediately before (and/or just as) the vehicle/cargo becomes 'near' the column 222 and/or immediately after (and/or just as) the vehicle/cargo becomes 'not-near' the column 222 (e.g., if the movable weight is positioned at 1.2 meters along its rail); and, in one or more embodiments all three occur.

A few things are worth pointing out with respect to the above example. First, it will be recognized that the moveable weight 550 could instead be positioned a bit further towards the end of its rail 520 such that the 'opposite moment magnitude' more greatly counterbalances the (un-counterbalanced) 'maximum achievable V/C magnitude'; or, the moveable weight 550 here could instead be positioned a bit closer towards the column 222 such that the 'opposite moment magnitude' does not counterbalance the (un-counterbalanced) 'maximum achievable V/C magnitude' quite as much. The downside to this first alternative movable weight 550 position-related determination (i.e., one that places it a bit further away from the vehicle/cargo and/or further away from the column 222), however, is that the resulting 'new/counterbalanced maximum achievable V/C magnitude' would be a bit higher than half of the (un-counterbalanced) 'maximum achievable V/C magnitude' (of 600 KNm)—e.g., in one or more embodiments this resulting 'new/counterbalanced maximum achievable V/C magnitude' would occur (and/or be predicted to occur) immediately before (and/or just as) the vehicle/cargo becomes 'near' the column 222 and/or immediately after (and/or just as) the vehicle/cargo becomes 'not-near' the column 222—and in one or more embodiments, both. Likewise, the downside to this second alternative position determination (i.e., one that places the movable weight 550 a bit closer to the column 222), however, is that the resulting 'new/counterbalanced maximum achievable V/C magnitude' would also be a bit higher than half of the (un-counterbalanced) 'maximum achievable V/C magnitude' (of 600 KNm)—e.g., in one or more embodiments, the resulting 'new/counterbalanced maximum achievable V/C magnitude' would occur (and/or be predicted to occur) when the vehicle/cargo is exerting its fullest (actual or estimated) moment on the column 222 (e.g., 1,200 KNm). In any event, as long as the identified position is one that when multiplied by the (estimated or actual) movable weight's 550 weight yields a (actual or estimated/predicted/expected) 'opposite moment magnitude' that equals at least 'substantially half' the (e.g., un-counterbalanced) 'maximum achievable V/C magnitude', one can see that this will be still be quite worthwhile.

That said, there are alternative embodiments that are at least largely identical—except that the identified position is one that when multiplied by the (estimated or actual) movable weight's 550 weight yields an 'opposite moment magnitude' having a magnitude that does not equal at least 'substantially half' the (e.g., un-counterbalanced) 'maximum achievable V/C magnitude'—but will still be beneficial at times, as long as the 'opposite moment magnitude' (of the movable weight 550) at least partially counterbalances the (un-counterbalanced) 'maximum achievable V/C magnitude' and/or another moment (as further discussed a couple paragraphs below) associated with the vehicle/cargo. For instance, if the moveable weight 550 were positioned at the end of its rail 520, the 'new/counterbalanced maximum achievable V/C magnitude' would be 1,000 KNm—i.e., based on the movable weight 550 exerting 1000 KNm at the end of the 2 meter rail (i.e., its length in this example) immediately before (and/or just as) the vehicle/cargo becomes 'near' the column 222 and/or immediately after (and/or just as) the vehicle/cargo becomes 'not-near' the column 222; and, thus the 'opposite moment magnitude' (of the movable weight)—i.e., 1,000 KNm—would represent about 83% of the (e.g., un-counterbalanced) 'maximum achievable V/C magnitude'(of 1,200 KNm). Thus, while this would not be considered 'substantially equal' in any of the ranges of the various embodiments described above, it would still be beneficial to some degree.

On the other hand, in one or more embodiments and/or scenarios, acceleration (and/or de-acceleration) allows for even better results (though similar or worse results are also possible, e.g., depending on what rate acceleration is employed, the starting position of the acceleration, and/or other things, as will be readily appreciated by those skilled in the art). Example 2 in FIG. 12W and related Figures demonstrate an embodiment where acceleration is employed, and in that Example the results achieved are not only different, but better, than those that would be possible without the acceleration employed there. Though Example 2 includes acceleration/de-acceleration-related moments associated with the vehicle/cargo, it will be understood by those skilled in the art that one or more aspects of the approach(es) employed there will apply to embodiments/scenarios that involve weight-related moments associated with the vehicle/cargo and do not involve acceleration/de-acceleration-related moments associated with the vehicle/cargo; and vice versa.

Moreover, as briefly mentioned above, in one or more embodiments the determined position reflects an 'opposite moment magnitude' that would at least partially counterbalance a moment associated with the vehicle/cargo that is not the 'maximum achievable V/C magnitude'. In one or more embodiments, this 'opposite moment magnitude' has a magnitude that equals half or substantially equals half the (un-counterbalanced) moment associated with the vehicle/cargo that is not the 'maximum V/C magnitude achievable'. In one or more various alternative embodiments, 'substantially half' is defined with one or more of the same ranges that are listed above with respect to the 'opposite moment magnitude' and the 'maximum V/C magnitude achievable'.

Further, in one or more embodiments one or more moments associated with the vehicle/cargo is counterbalanced by the moveable weight 550 (e.g., an 'opposite moment magnitude') without determining a position—e.g., the movable weight 550 is moved in a direction, such as until it is unable to move any further (e.g., the rail 520 ends) or simply stops moving any further for any other reason (e.g., as a result of friction). In fact, one or more additional examples of employing the moveable weight 550 without determining position are described below.

(vii) Some Embodiments Determine Movable Weight Position Via a Relationship Involving a Moment Associated with the Vehicle/Cargo In one or more alternatives, the determination of the position is not achieved via one or more moment(s) of the movable weight 550 (e.g., as described above, such as via an 'opposite moment magnitude'); rather, the position of the movable weight 550 is determined via a 'moment to position relationship'. In one or more embodiments such a relationship uses the 'maximum achievable V/C magnitude' and/or another moment associated with the vehicle/cargo to position the movable weight 550. For example, one such relationship may dictate that if the 'maximum achievable V/C magnitude' is greater than 'X' then (automatically) position the moveable weight 550 at Position 'P'. In further embodiments, two or more positions are triggered via one, two or more such relationships.

(viii) Some Embodiments Compare a 'Maximum Achievable MW Magnitude' with a Moment of the Movable Weight to Determine Position (and/or Acceleration/De-Acceleration)

In one or more embodiments a determination is made based on a comparison that involves the 'maximum achievable V/C magnitude' and a 'maximum achievable MW magnitude' of a moment—which is, as it sounds, is a moment associated with the movable weight 550, but particularly the movable weight' 550 weight (e.g., estimated/expected/predicted or actual), that reflects its maximum magnitude would be (relative to the column 222) if it were placed as far away from the column 222, along its rail 520, as possible on the side of the column 222 that is opposite of that which the vehicle/cargo is on (or expected to be on). For example, in one or more embodiments a comparison is made between (a) the 'maximum achievable V/C magnitude' (e.g., 700 KNm, provided as a non-limiting example) minus the 'maximum achievable MW magnitude' (e.g., where that calculation is 350.5 KNm) and (b) the 'maximum achievable MW magnitude' (e.g., 349.5 KNm, provided as a non-limiting example). More particularly, if it is determined that (a) and (b) are equal or at least 'substantially equal'—or that the 'maximum achievable V/C magnitude' is twice as large, or at least substantially twice as large, than the 'maximum achievable MW magnitude'—then in one or more embodiments the movable weight 550 is moved to a first position 'P1' (via a predetermined relationship that connects one or more comparisons to the position)—e.g., 'P1' can be set to a position that is as far away from the vehicle/cargo as possible and/or the far opposite end of the movable weight's rail (which will often be the same). In one or more embodiments, 'substantially equal' relates to being below a predetermined threshold (e.g., less than 'X' % difference, less than 'Y' amount of difference, etc.), and/or within a predetermined range, etc. Accordingly, if 'substantially equal' were set to 'within 1% of being equal' (for the purpose of this non-limiting example) and the predetermined position was 'P1' (at the end of the movable weight's rail 520), then the movable weight 550 would thus moved there since the comparison does yield a 'substantially equal' determination. In alternative embodiments, the movable weight 550 is not predetermined to move to position 'P1'; rather it is just predetermined to move to the opposite side of the movable weight's rail (relative the vehicle/cargo's side) since any position on the opposite side will have some counterbalancing effect. In one or more embodiments 'substantially equal' is within 1% equal, in one or more embodiments 'substantially equal' is within 10% equal, in one or more embodiments 'substantially equal' is within 25% equal, and, in one or more embodiments 'substantially equal' is within 50% equal.

On the other hand, if it is determined that (a) is larger, or substantially larger, than (b)—or that the 'maximum achievable V/C magnitude' is more than twice as large, or substantially more than twice as large, than the 'maximum achievable MW magnitude'—then in one or more embodiments the movable weight is moved to position 'P1' (e.g., via a predetermined relationship)—e.g., 'P1' can be set to a position that is as far away from the vehicle/cargo as possible and/or the far opposite end of the movable weight's rail (which will often be the same). However, while this position ('P1) for the moveable weight 550 is the most effective position for counterbalancing purposes—i.e., in embodiments that do not include acceleration/de-acceleration of the moveable weight 550—the 'maximum achievable V/C magnitude' will not be cut in half; and, depending on how much smaller the 'maximum achievable MW magnitude' is relative to the 'maximum achievable V/C magnitude' it could turn out to be a relatively small counterbalancing, especially in comparison to the above example of almost 50% reduction in the (un-counterbalanced) 'maximum achievable V/C magnitude'. That said, it should be noted again that in one or more embodiments no matter where the movable weight 550 is placed on the opposite side of the vehicle/cargo, there will be some counterbalancing achieved (at least in embodiments that do not involve centrifugal force of the vehicle/cargo). In one or more embodiments 'substantially larger' is greater than 0.9% more than equal, in one or more embodiments 'substantially larger' is greater than 10% more than equal, in one or more embodiments 'substantially larger' is greater than 25% more than equal, and in one or more embodiments 'substantially larger' is greater than 50% more than equal.

Once again, an example may be helpful. If the 'maximum achievable V/C magnitude' is 700 KNm and 'maximum achievable MW magnitude' is 100 KNm, then (a)—i.e., 600 KNm—would be greater than (b)—i.e., 100 KNm; the moveable weight 550 would move to position 'P1' (which is the end/opposite position on the rail 520 in this non-limiting example, as discussed above); and, the 'new/counterbalanced maximum V/C achievable magnitude' (600 KNm) suggests that the 'maximum achievable V/C magnitude' (700 KNm) would only be reduced by about 14%. Though this is beneficial, such conditions/scenarios highlight how one or more movable weight system 510 embodiments that employ acceleration (and/or de-acceleration) can sometimes lead to better results than one or more (but not all) embodiments that do not. For example, in one or more embodiments knowledge (e.g., of the computer system 667) of a time when (or time range, or a certain event such as when the vehicle/cargo is closest to the column 222, etc.) 100% (or a certain other percentage) of the 'maximum achievable V/C magnitude' is exerted (or expected/estimated/predicted to occur) on the column 222 is employed to trigger an acceleration of the movable weight 550 (e.g., towards the vehicle/cargo) to at least partially counterbalance the 'maximum achievable V/C magnitude'—i.e., where the 'consequential opposite force' (as per Newton's laws) related to the acceleration is leveraged in this regard. In one or more embodiments, depending on the acceleration employed, the percentage reduction achievable with respect to the 'maximum achievable V/C magnitude' will be greater than employing a 'maximum achievable MW magnitude' that does not include such acceleration (and/or de-acceleration). In fact, one or more embodiments combine the two by—e.g., accelerating the movable from a certain position, such as 'P1' (e.g., the end of the movable weight's rail); and, if this were employed in the above example, then such reductions from the acceleration of the movable weight 550 would be on top of the roughly 14% reduction was achieved via the repositioning of the movable weight 550. Accordingly, in one or more embodiments, this acceleration begins when (or during) the time that 100% of the vehicle/train's moment is being experienced by the column 222, though in alternative embodiments it begins earlier or later than that. Further still, in one or more embodiments, depending on the acceleration of the movable weight 550 employed, the acceleration (or de-acceleration) and repositioning of the movable weight 550 yield a 'new/counterbalanced maximum V/C achievable magnitude' that is less than 50% of the (un-counterbalanced) 'maximum achievable V/C magnitude'; in one or more embodiments, depending on the acceleration of the movable weight 550 employed, the acceleration (or de-acceleration) and repositioning of the movable weight 550 yield a 'new/counterbalanced maximum V/C achievable magnitude' less than 50% of the (un-counterbalanced) 'maximum achievable V/C magnitude' and equal (or alternatively substantially equal) to the 'maximum achievable MW magnitude'. In one or more embodiments, depending on the acceleration of the movable weight 550 employed, the acceleration (or de-acceleration) and repositioning of the movable weight 550 yield a 'new/counterbalanced maximum V/C achievable magnitude' less than 40% of the (un-counterbalanced) 'maximum achievable V/C magnitude'; in one or more embodiments, depending on the acceleration of the movable weight 550 employed, the acceleration (or de-acceleration) and repositioning of the movable weight 550 yield a 'new/counterbalanced maximum V/C achievable magnitude' less than 99% of the (un-counterbalanced) 'maximum achievable V/C magnitude'; in one or more embodiments, depending on the acceleration of the movable weight 550 employed, the acceleration (or de-acceleration) and repositioning of the movable weight 550 yield a 'new/counterbalanced maximum V/C achievable magnitude' less than 25% of the (un-counterbalanced) 'maximum achievable V/C magnitude'; in one or more embodiments, depending on the acceleration of the movable weight 550 employed, the acceleration (or de-acceleration) and repositioning of the movable weight 550 yield a 'new/counterbalanced maximum V/C achievable magnitude' between 40% and 60% of the (un-counterbalanced) 'maximum achievable V/C magnitude'; in one or more embodiments, depending on the acceleration of the movable weight 550 employed, the acceleration (or de-acceleration) and repositioning of the movable weight 550 yield a 'new/counterbalanced maximum V/C achievable magnitude' between 25% and 75% of the (un-counterbalanced) 'maximum achievable V/C magnitude'; in one or more embodiments, depending on the acceleration of the movable weight 550 employed, the acceleration (or de-acceleration) and repositioning of the movable weight 550 yield a 'new/counterbalanced maximum V/C achievable magnitude' between 10% and 99.9% of the (un-counterbalanced) 'maximum achievable V/C magnitude'; in one or more embodiments the acceleration (or de-acceleration) and repositioning of the movable weight 550 yield a 'new/counterbalanced maximum V/C achievable magnitude' at least 10% less than 'maximum achievable MW magnitude'; in one or more embodiments the acceleration (or de-acceleration) and repositioning of the movable weight 550 yield a 'new/counterbalanced maximum V/C achievable magnitude' at least 30% less than 'maximum achievable MW magnitude'; and, in one or more embodiments the acceleration (or de-acceleration) and repositioning of the movable weight 550 yield a 'new/counterbalanced maximum V/C achievable magnitude' at least 50% less than 'maximum achievable MW magnitude.

While more about employing acceleration and/or de-acceleration in this regard will be seen in the Example 2 of FIG. 12W, it may be useful to mention here that the above comparison(s)—i.e., if is determined that (a) is larger, or substantially larger, than (b); or that the 'maximum achievable V/C magnitude' is more than twice as large, or substantially more than twice as large, than the 'maximum achievable MW magnitude'—may, in one or more alternative embodiments, be used to trigger a predetermined acceleration (e.g., from a predetermined position, or alternatively not from a predetermined position) according a predetermined relationship (along the lines of the various relationships that have been discussed above, but where an acceleration or a certain magnitude of acceleration, such as for a certain amount of time, is automatically triggered). In fact, in one or more further alternative embodiments such a predetermined/triggered acceleration is based on how much larger (a) is compared to (b) and/or the degree to which the 'maximum achievable V/C magnitude' is greater than twice as large as the 'maximum achievable MW magnitude'). A couple examples may be helpful: (1) if the 'maximum achievable V/C magnitude' is three times as large (i.e., a 3:1 ratio) as the 'maximum achievable MW magnitude', then the movable weight 550 is accelerated at 'X' rate of acceleration (e.g., for 'S' seconds, where 'S' may be also triggered), or the movable weight 550 is accelerated at 'Y' rate of acceleration from point 'P10'; (2) if (a) is more than 'X' KNm greater than (b) then the movable weight is accelerated at 'X' rate of acceleration, or (in a further alternative) at 'Z' rate of acceleration from point 'P11' (e.g., for 'S' seconds, where 'S' may be also triggered, such as based on the vehicle's velocity); etc. Similarly, the movable weight's 550 velocity may be automatically triggered in essentially the same way.

On yet another hand (so to speak), if it is determined that (a) is smaller, or substantially smaller, than (b)—or that the 'maximum achievable V/C magnitude' is less than twice as large, or substantially less than twice as large, than the 'maximum achievable MW magnitude'—then one or more embodiments employ one or more predetermined relationships (e.g., similar to one or more of those described and employed above) that trigger action(s) if it is determined that (a) is smaller, or substantially smaller, than (b)—or that the 'maximum achievable V/C magnitude' is less than twice as large, or substantially less than twice as large, than the 'maximum achievable MW magnitude'. For instance, if either were true, then (as a non-limiting example) the movable weight 550 is directed (e.g., in one or more, but not all, embodiments by or via the computer system 667, as would be the case for the other two scenarios) to automatically move the movable weight to position 'P2', e.g., between the column 222 and the far end of the moveable weight's rail 520 away from the vehicle/cargo (e.g., at a center point between the column 222 and the far end of the moveable weight's rail 520). In one or more embodiments 'substantially smaller' is less than 0.9% less than equal, in one or more embodiments 'substantially smaller' is less than 10% less than equal, in one or more embodiments 'substantially smaller' is less than 25% less than equal, and in one or more embodiments 'substantially smaller is less than 50% less than equal. In one or more embodiments, one or more predetermined relationships are based on how much of difference there is between (a) and (b) and/or the degree to which the 'maximum achievable V/C magnitude' is less than twice as large than the 'maximum achievable MW magnitude'. A couple examples may be helpful: if the maximum achievable V/C magnitude' is 1.5 times as large (i.e., a 1.5:1 ratio) as the 'maximum achievable MW magnitude', then the movable weight 550 is moved to position 'P7'; if (a) is less than 'Y' KNm greater than (b) then the movable weight 550 is moved to point 'P8'; etc.

(ix) Additional Background on Positioning (and/or Acceleration/De-Acceleration)

Before getting into the 2 Examples below, it may also be helpful to point out a handful of additional things. First, in at least one embodiment one or more of the various position-related (and/or acceleration/de-acceleration) determinations is at least partially accomplished by the monorail's computer/computer system 667 (via software), while in alternatives a subset or alternatively all such determinations are performed there. In one or more embodiments, one or more determinations is at least partly accomplished by another computer(s), such as the control portion 615 of the movable weight system 510—i.e., in one or more embodiments that include the control portion 615, where one or more embodiments do not. In one or more embodiments the GPS 669 and/or Internet/Cloud (e.g., including one or more associated computer systems and/or servers) at least assist in making such determinations (e.g., providing data and/or making one or more determinations). In one or more further embodiments, the control portion 615 and the computer system 667 are at least partially the same; and, in one or more alternative embodiments they are the same.

Further, in one or more embodiments at least one of the determinations (e.g., that the movable weight 550 is to be moved from 'Position A' to 'Position B', and/or it is to be accelerated or de-accelerated in a certain way, etc.) is made before the arrival of the vehicle/cargo 'near' the point 222P (e.g., column 222); however, in one or more alternative embodiments, at least one of such determinations is done more-or-less when the vehicle/cargo becomes 'near' and/or while the vehicle/cargo is 'near' the column 222. And, in one or more embodiments one or more such determinations are made after the arrival of the vehicle/cargo 'near' the point 222P (e.g. column 222) and/or in real time. In fact, in one or more alternative embodiments, real-time moment and/or force data (e.g., associated with the vehicle/cargo) at or 'near' the column 222 is detected (e.g., via one or more sensors 687A, 687B, 687C, 687D, or in one or more further alternatives some other device (not shown)), and this is used in one or more such determinations (e.g., by relaying this data, as was explained elsewhere); and in one or more embodiments such determinations are implemented in real-time, though in some embodiments there is some delay from detection to implementation due to communication and/or processing. (Moreover, in one or more even further embodiments, data from one or more of the sensors 687A, 687B, 687C, 687D is used as historical data on which one or more determinations, e.g., that the movable weight 550 is to be moved from 'Position A' to 'Position B', and/or it is to be accelerated or de-accelerated in a certain way, etc., are made.)

In one or more (but not all) embodiments, when or after it is determined (e.g., by the computer system 667 associated with the vehicle/cargo) that the movable weight 550 is to be moved from 'Position A' to 'Position B', and/or it is to be accelerated or de-accelerated in a certain way, etc., this determination(s) is, reflects, or is converted to an instruction(s) that is used at/by the movable weight system's control portion 615 to cause appropriate movement of the movable weight 550 (and/or cause the movable weight 550 to not move if it is already in the appropriate position, or alternatively no instruction is sent to not move the moveable weight 550). In one or more embodiments, at least part of the instruction is received by the control portion 615 of the movable weight system 510, where in one or more of such embodiments the at least part of the instruction is sent from the computer system 667; or, alternatively it is sent from elsewhere (such as the GPS 669 and/or Internet/Cloud, for example).

For example, in one or more embodiments (e.g., those that only consider weight-related moment(s) and/or those where the rail 113 near the one or more columns 222 is not significantly curved) such instruction relates to one or more of the following: (i) whether the movable weight 550 is to be repositioned, (ii) how far the movable weight 550 is to be moved, (iii) to what location along the rail 520 it should be moved, (iv) in what direction the movable weight 550 should be moved, and/or (iv) whether to leave the movable weight 550 in place (i.e., in its present position), for example. As briefly mentioned above and will be seen later, in embodiments that consider the vehicle/cargo's centrifugal force, the instruction further—or alternatively instead—includes one or more of the following: (a) whether to accelerate the movable weight 550, (b) whether to de-accelerate the movable weight 550, (c) at what acceleration and/or de-acceleration is the movable weight 550 to be accelerated and/or de-accelerated, (d) when is the acceleration and/or de-acceleration to begin, (e) when is the acceleration and/or de-acceleration to end, (f) when and/or how is the acceleration and/or de-acceleration to be varied—e.g., with respect to time (or time range), with respect to the movable weight's position along the movable weight rail 520 (or range of positions), and/or with respect to the vehicle/cargo's position along its rail 113 (or range of positions) and/or the column or something else (such as another column, or station/platform) along the rail 113, etc., (g) what velocity is the moveable weight 550 to be moved at, (h) when and how the velocity is to be varied with respect to time (or time range), with respect to the movable weight's position along the movable weight rail 520 (or range of positions), and/or with respect to the vehicle/cargo's position along its rail 113 (or range of positions) and/or the column or something else (such as another column, or station/platform) along the rail 113, etc., among others that will be readily appreciated by those skilled in the art.

With respect to the timing of such instruction(s), in one or more embodiments the control portion 615 of the movable weight system (i) has/knows (e.g., which in one or more embodiments is a result of the control portion 615 receiving the instruction from the computer system 667) at least a portion of such instruction, (ii) begins implementing such instruction portion, and (iii) completes the implementation of such instruction portion all before the point 222P begins to experience a moment associated with the vehicle/cargo (or alternatively experience a significant moment and/or a moment greater than a certain predetermined magnitude); in one or more alternative embodiments, one of (i) to (iii), or alternatively a subset of (i) to (iii), occur before the point 222P begins to experience a moment associated with the vehicle/cargo (or alternatively experience a significant moment and/or a moment greater than a certain predetermined magnitude). However, in one or more alternative embodiments all, one, or alternatively a subset of (i) to (iii) occur afterwards. In one or more embodiments, all of (i) to (iii) occur before the vehicle/cargo arrives at a predetermined point along the rail 113 (or within a certain distance range) and/or before (or alternatively during) a specific time (or time range); in one or more alternative embodiments, one of (i) to (iii), or alternatively a subset of (i) to (iii), occur before the vehicle/cargo arrives at a predetermined point along the rail 113 (or within a certain distance range) and/or before (or alternatively during) a specific time (or time range). (In additional embodiments, all, one, or alternatively a subset of (i) to (iii) occur afterwards.) In still further embodiments, (A) all, one, or a subset of (i) to (iii) occur with respect to a first instruction portion before the vehicle/cargo arrives at a predetermined point along the rail 113 (or within a certain distance range) and/or before (or alternatively at) a specific time (or time range) and (B) all, one, or a subset of (i) to (iii) occur with respect to a second instruction portion after the vehicle/cargo arrives at a predetermined point along the rail 113 (or within a certain distance range) and/or after (or alternatively at) a specific time (or time range).

In addition, it is worth explaining here what was said above regarding the vehicle/cargo becoming 'near' (or 'nearing') the column, though some of this was mentioned above. That is, if the vehicle/cargo is not 'near' the point 222P of column 222, the one or more forces associated with the vehicle/cargo will have substantially zero or very little effect (e.g., below a threshold) on the column 222, e.g., as a moment(a) at the point 222P; on the other hand, once the vehicle/cargo becomes 'near' the column/point, the one or more moments at point 222P (associated with one or more vehicle/cargo-related forces) will be more than substantially zero, or at least be above a threshold (at point 222P). Moreover, as will be readily understood by those skilled in the art, in at least one embodiment one or more moments associated with the vehicle/cargo on the column's point 222P (e.g., its weight-related and/or its centrifugal force-related moment) vary with the vehicle/cargo's location/position (e.g., along the rail 113) with respect to the column 222 and/or vary in time—where both are reflected the two Examples of FIGS. 12K and 12W and their related Figures showing various 'positions' of the vehicle with respect to the column 222—when the vehicle/cargo is 'near' the column 222/point 222P. In other words, in one or more (but not all) embodiments the moment(s) experienced at the column 222 (e.g., at the point 222P) will grow as the vehicle/cargo moves ahead (e.g., along the rail 113) until the vehicle/cargo reaches at least one location (e.g., position along the rail 113, or range of positions, or alternatively a plurality of positions) where the moment associated with the vehicle/cargo (e.g., weight-related, acceleration/de-acceleration related, or one that includes both—as also reflected in the two Examples of FIGS. 12K and 12W—will be most strongly 'felt' by the point 222P of the column 222, which in one or more embodiments reflects the 'maximum achievable V/C magnitude'; and, then the moment associated with the vehicle/cargo will gradually be 'felt' less at the column's point 222P as the vehicle/cargo moves away from the column 222 and the vehicle/cargo eventually becomes not 'near' the column's point 222P.

In light of the above and as those skilled in the art will readily appreciate, the time(s)/estimated time(s) at which the vehicle/cargo will arrive at a position(s)/estimated position(s) that are 'near' the column 222/point 222P can be determined, or can be at least estimated—and vice versa—especially if the vehicle/cargo's velocity is known or can be estimated. In fact, as will seen below in Example 2 of FIG. 12W, the time corresponding to the at least one position (or at least one range of positions) where the 'maximum achievable V/C magnitude' occurs (or alternatively is expected to occur) is particularly relevant, e.g., as this is when the acceleration of the movable weight 550 is begun. However, even more generally, in one or more embodiments the movable weight 550 is instructed to move and/or is moved (i) at (or alternatively before) a determined time(s) (or alternatively a determined estimated time(s)) associated with the vehicle/cargo being 'near' the column 222/point 222P and/or (ii) when (or alternatively before) the vehicle/cargo arrives at a determined position(s) (or alternatively estimated position(s)) that are 'near' the column 222/point 222P. With regard to the former, in one or more alternative embodiments this occurs before (or alternatively after) a determined time, or alternatively within, before or after a time range—where in one or more embodiments that is based on the vehicle/cargo's velocity or its estimated velocity. With regard to the latter, in one or more alternative embodiments this occurs before (or alternatively after) the vehicle/cargo arrives at a position(s)/estimated position(s)—where in one or more embodiments that is based on the vehicle/cargo's velocity or its estimated velocity. In one or more embodiments, the velocity or estimated velocity is known by the computer system 667; and, in one or more embodiments the velocity or estimated velocity is received by the computer system 667, such as from the GPS 669.

Thus, in one or more embodiments, a moving-related determination, a moving-related instruction, and/or a moving associated with the movable weight—e.g., a position-related determination, a position-related instruction, a position-related moving, an acceleration-related determination, an acceleration-related instruction, an acceleration-related moving, a de-acceleration-related determination, a de-acceleration-related instruction, and/or a de-acceleration-related moving—includes (a) a time-related aspect and/or (b) a positioned-related aspect, while one or more alternatives include both. For example, in one or more embodiments the movable weight 550 is instructed to move and/or moves to a first determined position 'P1' at (or alternatively before, or alternatively after) time 'T1'. As a second non-limiting example, in one or more embodiments the movable weight 550 is instructed to move and/or moves to a first determined position 'P1' at (or alternatively before, or alternatively after) time 'T1' and to move and/or moves to a second determined position 'P2' at (or alternatively before, or alternatively after) time 'T2' (e.g., or alternatively in a determined direction, among various other options mentioned above). As a third example, in one or more embodiments the movable weight 550 is instructed to move and/or moves to a first determined position 'P1' at (or alternatively before, or alternatively after) time 'T1' and to move with a determined acceleration (or de-acceleration) at time 'T2. As a fourth example, in one or more embodiments the movable weight 550 is instructed to move and/or moves at a determined increased (or alternatively decreased) acceleration (or alternatively de-acceleration) relative to its present acceleration (or present de-acceleration) at (or alternatively before, or alternatively after) time 'T3' and/or when, or alternatively before, the vehicle/cargo arrives at position 'P3' (e.g., first becomes next to the column 222). As a fifth example, in one or more embodiments the movable weight 550 is instructed to move and/or moves at a determined velocity (or alternatively at an increased or decreased velocity relative to its present velocity) when (or alternatively before, or alternatively after) the vehicle/cargo arrives at position 'P4' or at (or alternatively before, or alternatively after) time 'T4'. As a sixth example, in one or more embodiments the movable weight 550 is instructed to move and/or moves in some way (e.g., to a determined position, at a determined acceleration, at a determined velocity, to stop moving, etc.) when the movable weight 550 arrives at a determined position along its rail 520 (or alternatively meets some other predetermined relationship)—which is a bit different than the other examples, but occurs in one or more alternative embodiments. For instance, in one or more embodiments an instruction regarding the movable weight 550 is to move until it reaches the end of the rail 520 or can't move any further in a determined direction; in one or more embodiments the movable weight is instructed to accelerate (e.g., at 'X' ms2) for 'M' meters (e.g., towards the column 222) from its present location/position.

In addition, in one or more embodiments, a moving-related determination, a moving-related instruction (based on the moving-related determination), and/or a moving (based on the moving-related instruction) associated with the movable weight—e.g., a position-related determination, a position-related instruction, a position-related moving, an acceleration-related determination, an acceleration-related instruction, an acceleration-related moving, a de-acceleration-related determination, a de-acceleration-related instruction, and/or a de-acceleration-related moving—is at least partially based on an other moving-related determination, moving-related instruction, and/or moving associated with the movable weight 559—where in one or more embodiments the moving-related determination, moving-related instruction, and/or a moving associated with the movable weight 559 is a prior (e.g., immediately previous) moving-related determination, moving-related instruction, and/or moving associated with the movable weight, where in one or more embodiments the moving-related determination, a moving-related instruction, and/or a moving associated with the movable weight 550 is a subsequent (e.g., immediately subsequent) moving-related determination, moving-related instruction, and/or moving associated with the movable weight 550, and where in one or more embodiments both occur. For instance, as also will be seen in Example 2 of FIG. 12W, once a determination, instruction, and/or moving is made to accelerate the movable weight 550 (which consequently also repositions the movable weight 550) at 2.0 seconds (i.e., 'position 4') from 6.0 M (distance along the rail 520 from the column 222, as shown in FIG. 12W) at 6.00 ms2, one or more various other—e.g., subsequent and/or previous—determinations, instructions, and/or movings are then made based on that determination, instruction, and/or moving to accelerate the movable weight at 2.0 seconds (i.e., 'position 4') at 6.0 M—i.e., in light of the fact that the movable weight 550 would be at that determined position (i.e., 6.0 M) and/or at that determined acceleration rate (i.e., at 6.00 ms2) at that time (i.e., 2.0 seconds after the monorail has become 'near' the column 222/point 222P), where all three were employed as 'assumed facts' for such one or more other (e.g., earlier or subsequent) determinations, instructions, and/or movings in the FIG. 12W Example 2. In fact, in one or more embodiments, a plurality of other (e.g., earlier or subsequent) determinations, instructions, and/or movings (and in one or more further embodiments, a plurality of one, two, and/or all three of these) is/are made based on at least one other (e.g., earlier or subsequent) determination, instruction, and/or moving; and, in one or more embodiments, a plurality of other determinations, instructions, and/or movings (and in one or more further embodiments, a plurality of one, two, and/or all three of these) is/are made based on a plurality of other (e.g., earlier or subsequent) determinations, instructions, and/or movings. Further still, in one or more embodiments the basing of the at least one (or plurality of) other determination(s), instruction(s), and/or moving(s) is (are) at least in part based on keeping the next greatest magnitude of a moment associated with the vehicle/cargo—i.e., next greater after the 'new/counterbalanced maximum V/C achievable magnitude' (e.g., of 470.8 Knm in the context of Example 2 of FIG. 12W)—as low as possible.

Moreover, in one or more embodiments, consideration is given to (i) any repositioning of the moveable weight 550 before the vehicle/cargo becomes 'near' the column 222 and/or (ii) any repositioning of the moveable weight 550 after the vehicle/cargo becomes 'not near' the column 222. In essence, what is meant by consideration here is that either or both of such repositioning of the movable weight 550 is done in a way such as to keep within check (i.e., where some attempt is made to mitigate, and/or keep below a threshold or within a range) any 'consequential opposite force' (as per Newton's laws) related to the acceleration and/or de-acceleration forces associated with such repositioning exerted on the movable weight's rail 520, where that will affect the column 222 (as a moment) as well. It is believed that this scenario/example will help elucidate the concern, goal, and approach in one or more embodiments. For instance, if a repositioning-related determination indicates that the movable weight 550 is to be moved to position 'X' (from position 'Y') before the vehicle/cargo arrives 'near' the column 222 and this moving is done quickly such that a significant magnitude(s) of acceleration and/or de-acceleration are involved—i.e., which are not intended for counterbalancing in this particular repositioning example—such significant magnitude(s) of acceleration and/or de-acceleration would, or at least could, cause a moment(s) on the column's point 222P that could be considered unwanted stress on the column 222. One scenario where this could be particularly noticeable (so to speak) is in one or more embodiments where the movable weight 550 is moved to the furthest end of its rail 520, as an initial position, before the vehicle/cargo nears the column 222—i.e., since the moveable weight 550 is positioned there in anticipation of it at least partially counterbalancing a moment associated with the vehicle/cargo when the vehicle/cargo arrives 'near' it, and so the column 222 will already be experiencing a moment associated the moveable weight 550 in that far-end position along its rail 520. Thus, any de-acceleration in the moveable weight's 550 repositioning to this far-end position would only make the temporary moment associated with the moveable weight 550 worse by adding a 'consequential opposite force' associated with the de-acceleration (for example). Similarly, this could be particularly noticeable (so to speak) in one or embodiments/scenarios where the movable weight 550 is moved from the furthest end of its rail 520 after the vehicle/cargo becomes 'not near' the column 222—e.g., if/when the movable weight 550 is accelerated away from that spot/position. Thus, in one or more embodiments this unwanted (acceleration or de-acceleration) force associated with the movable weight 550 (which is associated with a moment on the column 222) is kept in check by (a) keeping the acceleration and/or de-acceleration associated with the moveable weight 550 below a certain predetermined maximum, (b) keeping the acceleration and/or de-acceleration associated with the moveable weight 550 within a predetermined range, (c) keeping the speed of the movable weight 550 below a certain magnitude or within a certain range, and/or (d) performing repositioning—i.e., before the vehicle/cargo becomes 'near' and/or after the vehicle/cargo becomes 'not near' the column 222—in a predetermined time that is no less than 'T' and/or within a predetermined time range, for example.

In addition, it should be mentioned that it is conceivable that in one or more alternative embodiments/scenarios that the movable weight 550 associated with the column 222 (or movable weights of a plurality of columns) would permanently be left in a non-centered position—e.g., in one or more embodiments having only one rail (e.g., 113B) on only one side of the column 222. However, in embodiments that have at least two rails 113—e.g., where at least one rail (e.g., 113A) is one side of the column 222 and another rail (e.g., 113B) is on the other side of the column 222, as is mainly discussed herein—one should be able to quickly appreciate the one or more benefits achievable by moving the movable weight 550 to a first side of the column 222 (e.g., to, or towards, a first side of the movable weight's track 520) when the vehicle/cargo is traveling along a second side of the column 222 (i.e., such that the movable weight 550 is on opposite side of the column with respect to the vehicle/cargo), moving the movable weight 550 to the second side of the column 222 (e.g., to, or towards, a second side of the movable weight's track 520) when the vehicle/cargo is moving along the first side of the column 222, and/or positioning the movable weight 550 somewhere in between the ends of its rail 520 (e.g., directly above the column 222, or alternatively elsewhere) if and when there are two vehicles/cargos 'near' the column 222—e.g., if this happens at roughly the same time on the rails on opposite sides of the column (e.g., 113A, 113B).

(x) Countering the Vehicle/Cargo's Centrifugal Force-Related Moment(s)

Since both of the 2 Examples below involve the vehicle/cargo's centrifugal force, a few other related topics should be discussed here. Moreover, since Example 2 employs at least an acceleration-related force associated with the movable weight 550 in the at least partial counterbalancing there, a few further topics related to acceleration-related force(s) (and/or de-acceleration force(s)) associated with the movable weight 550 are also discussed here. That said, it should be emphasized that the acceleration-related force(s) (and/or de-acceleration force(s)) associated with the movable weight 550 are also used in one or more embodiments that do not involve the vehicle/cargo's centrifugal force—e.g., one or more embodiments that involve the vehicle/cargo's weight-related force, as was described above. Thus, what is said here about the acceleration-related force(s) (and/or de-acceleration force(s)) associated with the movable weight 550 will apply to one or more of those embodiments as well.

Factors Related to the Vehicle/Cargo's Centrifugal Force

In light of the relationship of the vehicle/cargo's centrifugal force to its mass multiplied by its velocity squared divided by curve radius, and the fact that a moment of such centrifugal force (e.g., with respect to the point 222P of the column 222) can be calculated and/or estimated in view of the height of the vehicle/cargo (e.g., relative to the point 222P and/or above ground-level), there are various factors (and data associated with these) that can come into play, in one or more but not all embodiments, when centrifugal-related forces are generated via the vehicle/cargo (e.g., in curved portions of the rail/track 113 near the column/support 222). Accordingly, one or more embodiments take one or more of these factors (i.e., data, which in one or more embodiments include one or more estimates, associated with these factors; but, in one or more embodiments the data reflects measurements, or otherwise is assumed or known in some other way) into consideration—e.g., to at least partially counterbalance a centrifugal force-related moment(s), or alternatively to at least partially counterbalance both a centrifugal force-related moment(s) and a weight-related moment(s) of the vehicle/cargo—which is the case in both Examples of FIGS. 12K and 12W. Accordingly, one or more embodiments employ at least one of these factors/data, one or more embodiments employ a subset of these factors/data, and others incorporate all of the above-mentioned factors/data.

While, as mentioned above, one or more embodiments employ measured, detected, and/or estimated data for one or more of these factors, one or more alternative embodiments employ predetermined (e.g., based on one or more predetermined relationships) data/magnitudes or data/magnitude ranges for one or more of these factors—e.g., if a vehicle is detected to be rounding a curve, the curve is 'assumed' to be 80 M, the vehicle/cargo's velocity is 'assumed' to be between 25 km/hr and 35 km/hr, and/or its mass is assumed to be no greater than 35,000 Kg. In one or more further alternatives the centrifugal force is simply assumed/predetermined to be 'X'. In yet further alternatives, one or more actions (associated with the movable weight) are automatically triggered without performing centrifugal force (or alternatively any other) calculations—e.g., if a vehicle is detected in a curved portion of the track 113, the movable weight 550 is repositioned and/or accelerated/de-accelerated according to a predetermined relationship that associates the detection with the action. However, generally speaking, the more factors associated with actual, or at least estimated, data the more effective a particular movable weight system embodiment will generally be, as will be appreciated by those skilled in the art. With all of these alternatives in mind, and while one or more movable weight system embodiments only take centrifugal force into account and/or do not take weight-related moments of the vehicle/cargo into account, most of the discussion below will focus on one or more movable weight system embodiments 510 that take both centrifugal force-related and the weight-related force of the vehicle/cargo into account.

Moreover, as was the case with respect to one or more (but not all) embodiments that mitigate the vehicle/cargo's weight (and not its centrifugal force), it should also be mentioned that one or more of the data (e.g., associated with various factors) is measured, detected, estimated, predicted, or predetermined (e.g., by pre-entering in the computer system 667 or other device, e.g., by a human) prior to the vehicle/cargo becoming near the column—i.e., in one or more but not all embodiments. As will be readily appreciated, this should not present a problem with respect to one or more factors that have associated data that is not expected (in or more embodiments) to change frequently or at all. Similarly, in one or more embodiments/scenarios only one measurement/determination/entry/etc. for a particular factor is needed—e.g., a curve radius may be assumed in one or more embodiments to be 'fixed' once it is determined/entered/preset/etc. On the other hand, in one or more embodiments one or more data associated with one or more factors—e.g., such as those that are relatively more variable/less fixed, or at least have the potential to be so—are gleaned/measured with respect to at a particular time, with respect a particular position (e.g., before the vehicle arrives at the column/point), etc. (as discussed above with respect to weight-related moments of the vehicle/cargo). In one or more alternative embodiments, one or more factors are determined, measured, or estimated in real time, and/or periodically (e.g., at particular intervals) for the sake of accuracy/effectiveness.

Figures 12B, 12C:
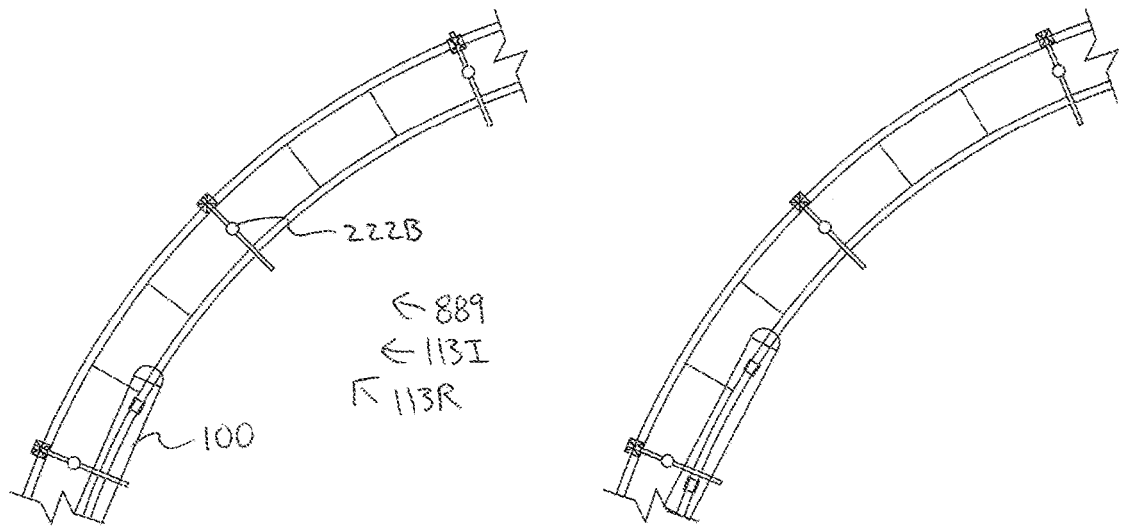
FIGS. 12B, C, D show somewhat artistic depictions of the vehicle along the track and the movement of the movable weight that correspond to Positions 0, 1 and 2 of FIG. 12K.
Figure 12D:
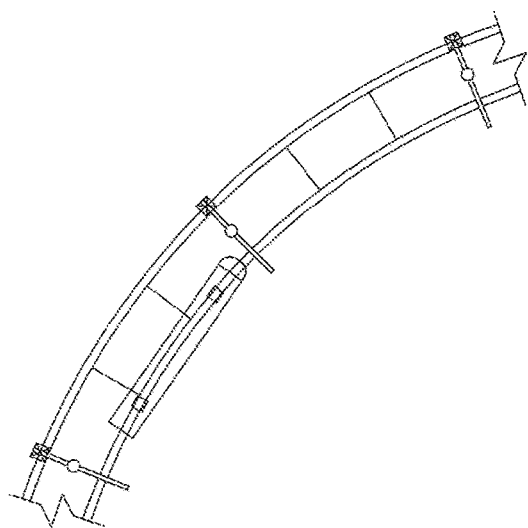
FIG. 12A shows a partially artistic side view of the movable weight system that represents (at least roughly) the forces reflected by the data of FIG. 12K.
FIGS. 12E, F, G show somewhat artistic depictions of the vehicle along the track and the movement of the movable weight that correspond to Positions 3, 4, and 5 of FIG. 12K.
FIGS. 12H, I, J show somewhat artistic depictions of the vehicle along the track and the movement of the movable weight that correspond to Positions 6, 7 and 8 of FIG. 12K.
FIG. 12K shows a table reflecting an example related to the movable weight system.
FIG. 12L shows a partially artistic side view of the movable weight system that represents (at least roughly) the forces reflected by the data of FIG. 12W.
FIGS. 12M, N, O show somewhat artistic depictions of the vehicle along the track and the movement of the movable weight that correspond to Positions 0, 1, and 2 of FIG. 12W.
FIGS. 12P, Q, R show somewhat artistic depictions of the vehicle along the track and the movement of the movable weight that correspond to Positions 3, 4, and 5 of FIG. 12W.
FIGS. 12S, T, U, V show somewhat artistic depictions of the vehicle along the track and the movement of the movable weight that correspond to Positions 6, 7, 8 and 9 of FIG. 12W.
FIG. 12W shows a table reflecting another example related to the movable weight system.
Figure 12E:
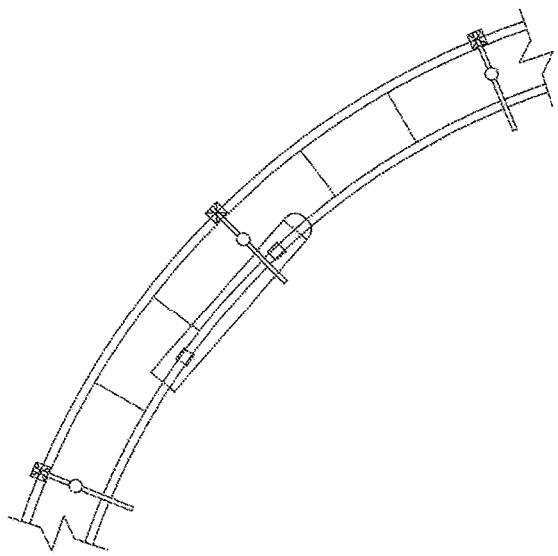
Figure 12F:
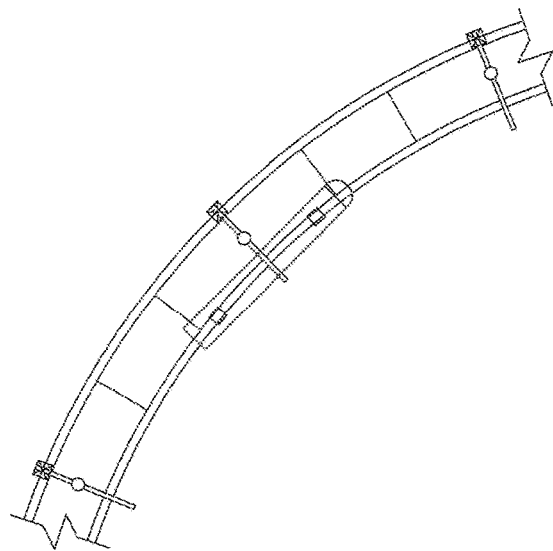
Figure 12G:
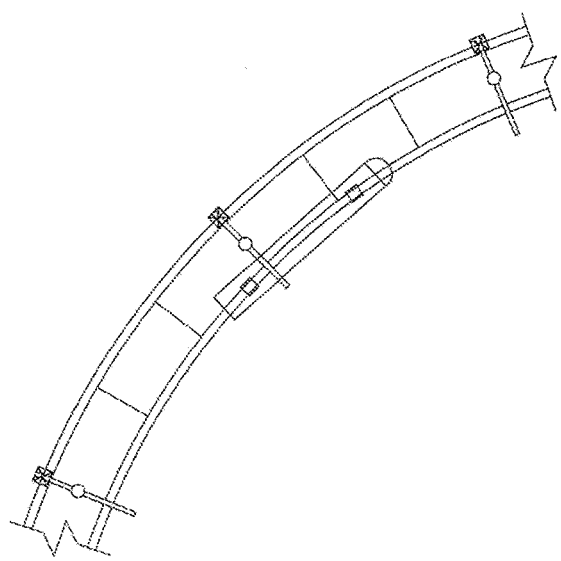
Figure 12H:
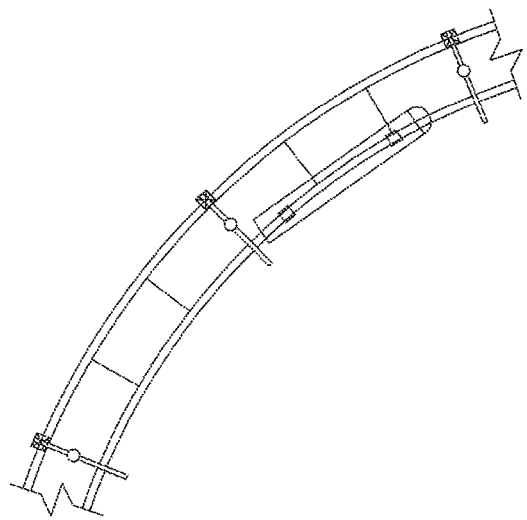
Figure 12I:
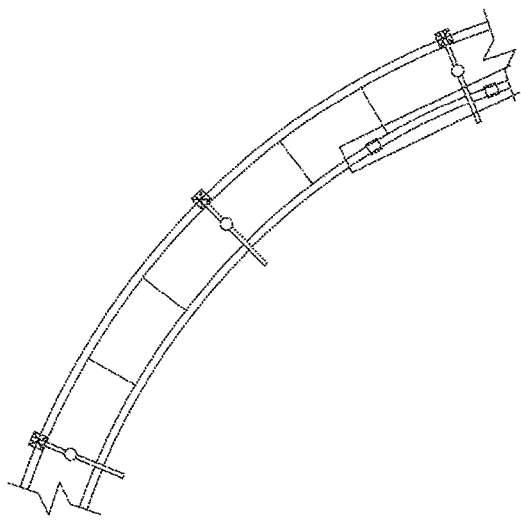
Figure 12J:
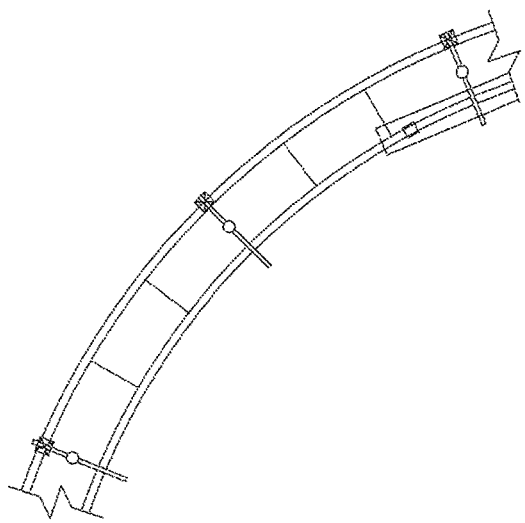

For instance, in light of the fact that a monorail track/rail 113 is typically fixed with respect to the one or more columns 222 supporting it, in one or more embodiments a curve radius 113R (e.g., as indicated in FIG. 12B) of the rail 113 'near' (or at least relative to) the column 222/222B is either entered (e.g., by a human) into the computer system 667 or measured via the GPS 669 and communicated to the computer system 667. However, in further alternatives this can be determined by one or more devices (not shown) associated with the vehicle/cargo, assembly 200, rail 113, and/or column 222, or any other device(s) and/or way(s) known to those skilled in the art.

Similarly, in one or more embodiments the height of the vehicle/cargo above the point 222P of the column 222 (and/or above the ground 222G itself) is 'known' by the computer system 667 as a result of it being entered (e.g., by a human) into the computer system 667 and/or it being measured by the GPS 669 and the data communicated to the computer system 667. However, in alternative embodiments one or both of curve radius and height of the vehicle/cargo is/are determined by one or more devices (not shown) associated with the vehicle/cargo, assembly 200, rail 113, and/or column 222, or any other device(s) and/or way(s) known to those skilled in the art.

On the other hand, since the speed/velocity of the vehicle/cargo is typically (though not in all embodiments) more variable, or at least are potentially variable, in some (but not all) embodiments this is measured/updated periodically, in real time, at certain times or positions, or intervals, etc. (as was discussed above with respect to one or more factors employed in weight-related moments). For example, on particular morning a conductor (if one is included on a monorail 100, for example) may decide to move relatively more, or relatively less, quickly than his/her usual speed from 'Station A' to 'B'—which makes knowing the speed of the vehicle/cargo at and/or near the column 222 on that morning potentially relevant. In at least one embodiment, data associated with this factor is known and/or calculated by vehicle/cargo's computer system 667 (since in at least some embodiments computer system 667 is directing the LIM system 400) or other system associated with the movement of the vehicle/cargo. In some further alternatives the speed/velocity of the vehicle/cargo are measured and/or calculated by the GPS 669 and/or the Internet, and/or some other device or computer, as will be apparent to those skilled in the art.

Another factor that will often (but not always) vary is the mass/weight of the vehicle/cargo—e.g., during evening rush hour, the vehicle/cargo may weigh more between 'Stations A' to 'B' than earlier that afternoon. Accordingly, in some embodiments, the weight of the vehicle/cargo is measured and sent to the computer system 667 when and/or after it leaves 'Station A' and/or the GPS 669 sends an updated speed/velocity soon before and/or as the vehicle/cargo nears the column. In one or more embodiments, this measuring/weighing occurs at least once, periodically (e.g. upon leaving a station), or in real time in various embodiments—where the latter two often have added value in scenarios that envision passengers entering or exiting and/or cargo being loaded or unloaded at one or more points along the rail's path, for example. While one or more embodiments employ the weight sensor 677, one or more various alternative embodiments employ at least one of the various devices and/or ways described elsewhere in this document.

Moreover, just as with the above-described embodiments that do not employ the vehicle/cargo's centrifugal force, one or more (but not all) embodiments that employ centrifugal force-related data associated with the vehicle/cargo in moving the movable weight leverage 'which side' data that indicates which side of the column 222 the vehicle/cargo is on and/or which rail/track (e.g., 113A or 113B) the vehicle/cargo is on (in embodiments where there are a plurality of rails/tracks). Moreover, in embodiments where both vehicle/cargo centrifugal force and weight are considered, the same weight measurement (of the vehicle 100 and/or cargo 110) can be used to consider each (e.g., it can be used in estimating/calculating the moment on the column 222 exerted by the vehicle/cargo's weight and it can be used in estimating/calculating the moment on the column 222 exerted by the vehicle/cargo's centrifugal force). Accordingly, what has been stated above will not be repeated here; and, it should be understood to apply to one or more of these embodiments as well (unless it would not be logical to do so for some reason). Also, the discussion above and below regarding 'inside of the curve'/'outside of the curve' applies in this regard, and as stated elsewhere in one or more embodiments is combined with 'which side' and/or 'which rail' data.

Factors Related to the Movable Weight's Acceleration and/or De-Acceleration Related Force With the one or more factors related to the centrifugal force associated with the vehicle/cargo at least generally presented above, discussion will now move towards one or more factors associated with the acceleration-related force (and/or de-acceleration-related force) associated with the moveable weight (and/or the moment associated with the column 222 as a result)—i.e., where one or both of the 'consequential opposite force' (as per Newton's laws), as was mentioned above, is leveraged to at least assist in the at least partially counterbalancing discussed above. (In one or more embodiments, the accelerating and/or de-accelerating of the movable weight 550 also includes repositioning the movable weight 550—e.g., accelerating the movable weight 550 from a determined position—as will be seen in Example 2.) In other words, this is achieved by accelerating (and/or de-accelerating) the movable weight 550, and in light of the fact that (i) the 'consequential opposite force' (relative to the movable weight rail 520) equals mass of the movable weight 550 times acceleration (or de-acceleration) of the movable weight 550 and (ii) the resulting moment(s) on the column 222 can be estimated/calculated by multiplying 'consequential opposite force' times the height of the movable weight 550 with respect to the point 222P (and/or ground 222G).

Accordingly, in one or more embodiments that employ accelerating/de-accelerating the movable weight 550, in addition to knowing the weight of the movable weight—which was discussed above—one or more embodiments also include the height of the movable weight's rail 520 and/or height of the movable weight 550 (which are generally the same) as part of determining one or more moments associated with the movable weight 550. Like some of the other factors mentioned above (such as with respect to the weight of the moveable weight 550) data relating to this factor is also 'known' by the computer system 667 as a result of it being entered (e.g., by a human) into the computer system 667, via communication with the control portion of the movable weight system, or it being measured/estimated by the GPS 669 communicated to the computer system 667. Alternatively, one or both of the weight of the movable weight and height of the movable weight's rail or movable weight is determined by one or more devices (not shown) associated with the vehicle/cargo, assembly 200, rail 113, and/or column 222, or any other device(s) and/or way(s) known to those skilled in the art.

In one or more embodiments, but not all, another factor—an acceleration, de-acceleration, and/or velocity of the movable weight 550—is also employed, such as where one of these is employed in determining whether to increase or decrease it and/or the degree of such increase or decrease. For example, in one or more embodiments instead of an instruction to move the movable weight 550 at an acceleration of 6 m/s2, the instruction would be to increase the acceleration by 4 m/s2 if it were 'known' that the movable weight 550 was presently/already accelerating at 2 m/s2. Accordingly, in one or more embodiments, but not all, the computer system 667 will also 'know' the acceleration, de-acceleration, and/or velocity of the movable weight because the computer system 667 (in at least one but not all embodiments) instructs (in such scenarios) the movable weight system 510 with respect to one or more of these; in other words, the computer system 667 will thus not need to receive it from elsewhere. However, in alternate embodiments, this data is sent to the computer system 667 in various other ways.

In one or more various embodiments, the computer system 667—e.g., with data associated with one or more of, or alternatively a subset of, or alternatively all of these factors—determines (e.g., calculates) (i) whether to accelerate the movable weight, (ii) how much to accelerate the movable weight, (iii) whether to de-accelerate the movable weight, (iv) how much to de-accelerate the movable weight, (v) when to begin such acceleration and/or de-acceleration, and/or (vi) when to end such acceleration and/or de-acceleration—e.g., in light of the 'consequential opposite force' achievable (as per Newton's laws) and/or how the 'consequential opposite force' achievable would assist in the least partial counterbalancing (discussed above). Moreover, it should be noted that these would further include, in one or more embodiments, the list of various position-related options discussed above with respect to embodiments that do not involve counterbalancing centrifugal force of the vehicle/cargo. Accordingly, in one or more embodiments, one or more instructions reflecting one or more of these (i.e., position-related and/or acceleration/de-acceleration-force-related instructions) is communicated (by being sent or pulled) to the control portion 615 of the movable weight system 510. In turn, the control portion 615 of the movable weight system 510 will implement one or more of these to at least partially counterbalance one or more moments—e.g., one or more centrifugal force-related moments and/or weight-related moments associated with the vehicle/cargo—on the column 222, as was described elsewhere in this document. In some embodiments the position-related and/or acceleration/de-acceleration-force-related instructions are distinct, while in other embodiments they are combined in a combined instruction.

Before delving further into the Examples that show how this all plays out, it is also worth mentioning that in various alternative embodiments the movable weight system uses alternatively none, one, a subset of, or all of the many factors mentioned above in repositioning and/or accelerating and/or de-accelerating the movable weight 550. Moreover, in one or more embodiments or scenarios the computer system 667 may determine the column 222 supporting a curved rail section should be treated more like a straight section of the track—i.e., by not considering the centrifugal force associated with the vehicle/cargo. Finally, this may also be a helpful time to note that in one or more alternative embodiments the vehicle/cargo's acceleration and/or de-acceleration is measured, estimated, or assumed (e.g., predetermined) since it, as will be readily appreciated by those skilled in the art, will tend to exert force in a direction that is at least largely along the rail 113. Since each column 222 tends be more stable along the rail 113, as opposed to perpendicular to the rail 113, this force is thus generally less of a concern. That said, alternative embodiments include an alternative moveable weight system—which is similar to the one shown in FIG. 1 but is rotated so that the movable weight can be moved and/or accelerated to at least partially counterbalance the vehicle/cargo's acceleration and/or de-acceleration. In some embodiments, this alternative and one or more of the various embodiments of the movable weight system 510 discussed herein work cooperatively.

(xi) Examples Taking Vehicle/Cargo's Weight and Centrifugal Force into Account

Example 1

Figure 12L:
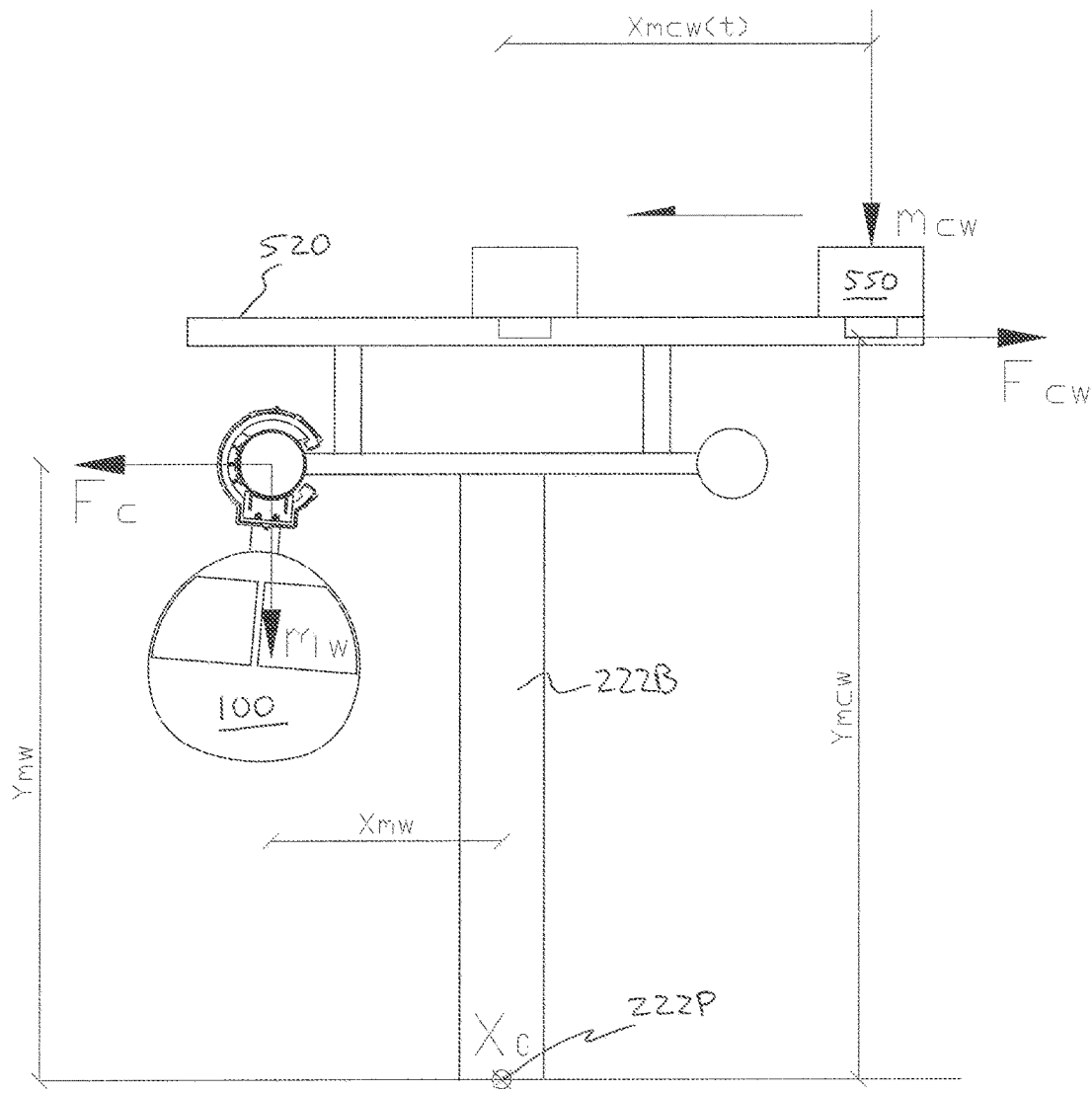
Figure 12M:
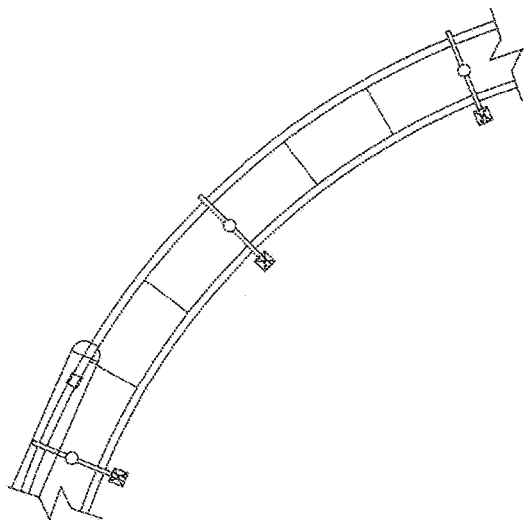
Figure 12N:
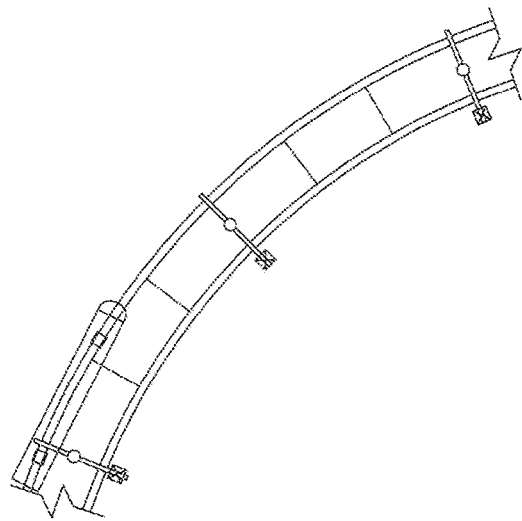
Figure 12O:
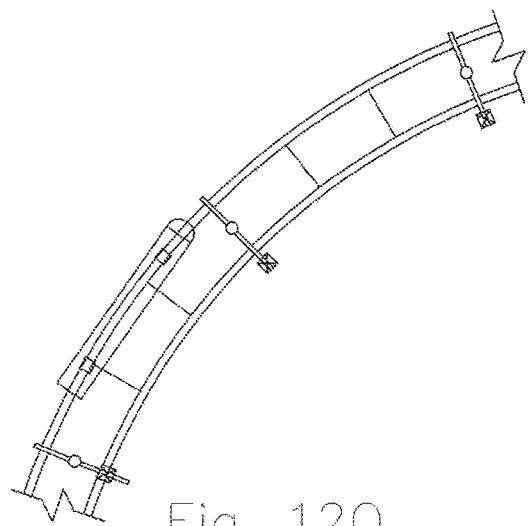
Figures 12P, 12Q:
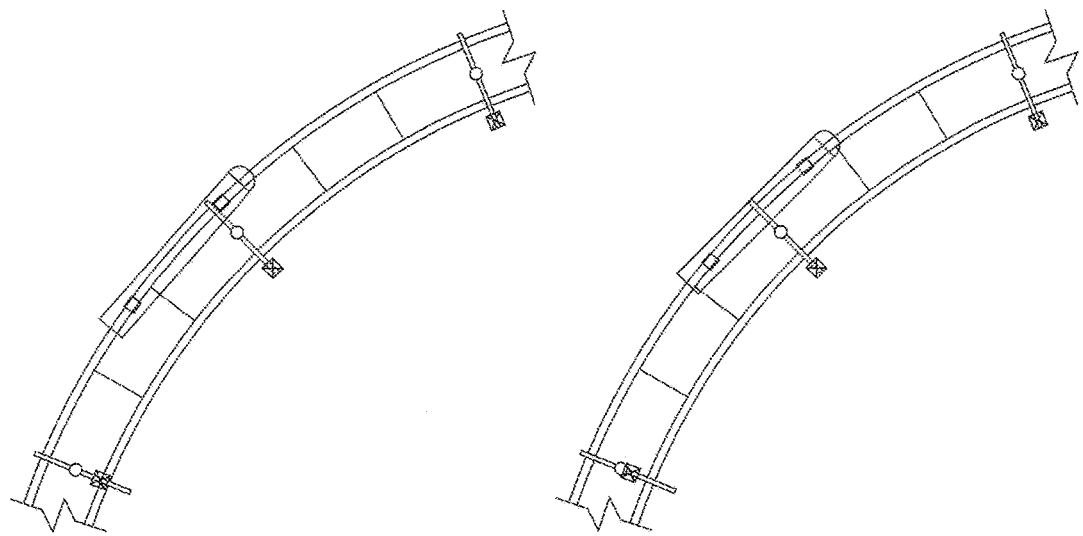
Figure 12R:
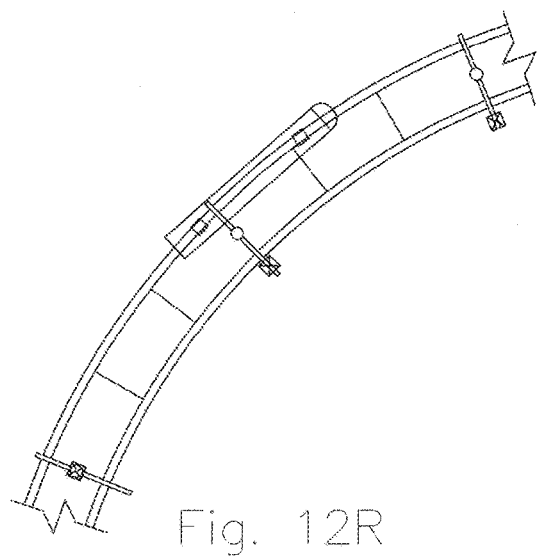
Figure 12S:
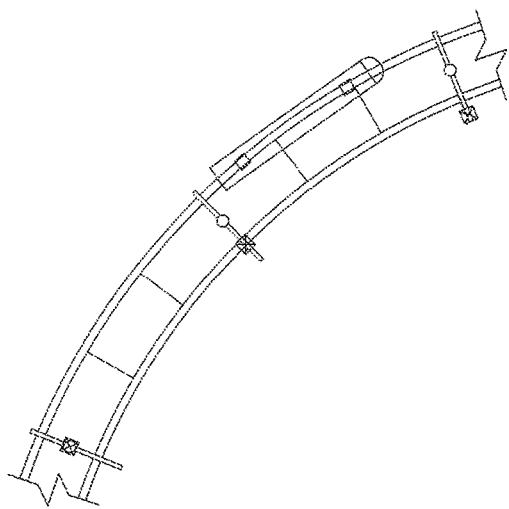
Figure 12T:
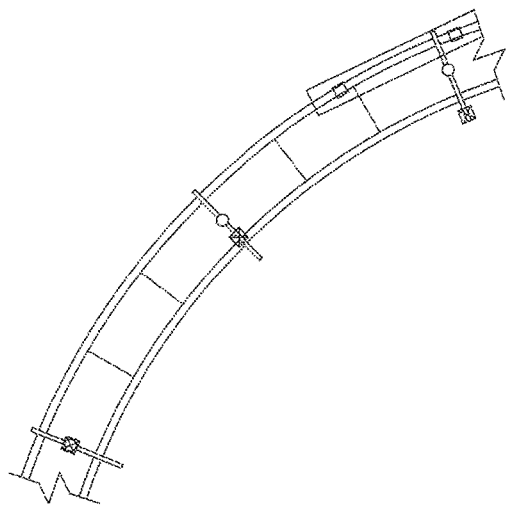
Figure 12U:
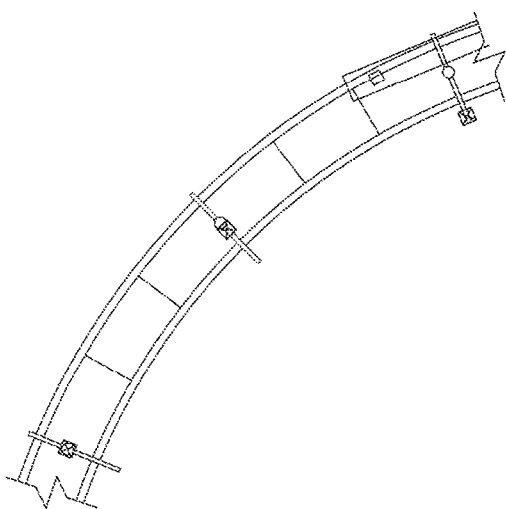
Figure 12V:
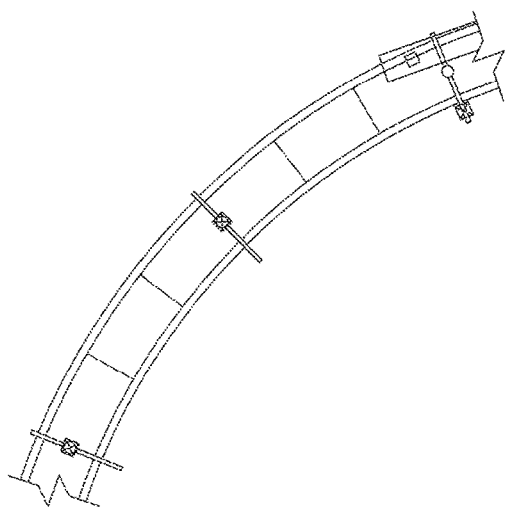

FIG. 12A to FIG. 12K reflect a first example where centrifugal force of the vehicle/cargo is taken into account. As will be readily evident, the chart of FIG. 12K essentially reflects snapshots of estimated values at various times. In FIG. 12K the following correspond: (1) 'w' signifies the vehicle 100 (e.g., wagon, train, monorail); (2) 'c.w.' signifies the movable weight 550 (also referred to as 'counterweight' and/or 'movable mass' at times herein); (3) 'X−Mcw(t)' signifies the movable weight's position in time with respect to Xo (in meters); (4) 'Fc' signifies the vehicle's centrifugal force acting on Column 2 (which is the middle of the three columns depicted in FIGS. 12B to 12J), which is an approximation that is partially based on % Fc; (5) Mw signifies the vehicle's weight and is based on the approximated percentage, i.e., % Mw, on Column 2; (6) Mcw signifies the movable weight's weight; (7) '% Fc' signifies a percentage of the vehicle's centrifugal force acting on Column 2, where this percentage is an approximation; (8) 'Σ(M−Xo)' signifies a moment sum at the base of Column 2 (which corresponds to Xo on FIG. 12A); (9) 'Red. Σ(M−Xo)' signifies a reduction of the moment sum at the base of Column 2 in light of the movable weight 550; (10) 'Mw*Xmw' signifies a moment exerted by the monorail's weight; (11) 'Fc*Ymw' signifies a moment exerted by the monorail's centrifugal force; and (12) 'Mcw*X−Mcw(t)' signifies a moment exerted by the movable weight's weight in time. It will be also apparent that the same correspondences hold true with respect to FIG. 12 J, plus two others: (13) 'Fcw' signifies a (opposite) force associated with the movable weight's acceleration, as explained elsewhere in this document; and (14) 'Fcw*Y−Mcw' signifies a moment exerted by the movable weight's acceleration in time. Further, as can be seen Fc, Mw, Mcw are indicated in FIGS. 12A and 12L and Fcw is also indicated in FIG. 12L, along with an arrow indicating the direction of the movable weight's movement; and, both Figures indicate the distances mentioned immediately above (e.g., Xmw, Ymw, X−Mcw(t), Mcw).

FIG. 12B to FIG. 12J attempt to at least roughly depict (in a somewhat rudimentary/artistic fashion) the estimated location/position of the vehicle/cargo—which is a monorail 100 in this example—with respect to the column 222/'Column 2', which is the focus of the FIG. 12K chart (though 'Column 1' and 'Column 3' can also be seen). FIG. 12A attempts to depict at least some of the forces and distances (e.g., height, length) that underlie at least some of the values set out in the FIG. 12K chart. Moreover, it will be further apparent from FIG. 12B to FIG. 12J that the monorail/wagon 100 in this example is on the inside rail 113I of a turn/curve 889—which, as discussed later, determines that the centrifugal force-related moment(s) associated with the vehicle/cargo are subtractive—where it is assumed (for this non-limiting example) that the radius of curvature is 85 meters. It is further assumed for this example that the monorail/train 100 weighs 30,000 Kg, the mass of the movable weight is 8,000 Kg, and the monorail/train's velocity is about 30 Km/hour. It is estimated that the monorail 100 crosses each 'Column 2' in about 3 seconds (according to the monorail's 100 estimated velocity). In this regard, it may be helpful to note that the total time between Position 0 and Position 9 of about 5.7—as opposed to the 4 seconds the monorail is assumed/estimated to be 'near' the column 222—reflects how long 'Column 2B' 222B is estimated to be affected by the movable weight 550 (e.g., its weight-related force and/or centrifugal-related force) for the purpose of these estimates/approximations. Also, those skilled in the art will also readily appreciate that the positive moment-related values in FIG. 12K reflect the X and Y axes relative to point 222P of the column 222, and also that the angle of tilt estimate is constant because it depends on the monorail's velocity and curve radius, which are estimated to be constant here. (Incidentally, the angle of tilt was not taken into consideration since these figures are just estimates; those skilled in the art will readily appreciate how to further sharpen these estimates if desired.)

As can be seen by the second column (entitled 'X−Mcw (t)') in the FIG. 12K chart, at 'Position 0' the movable weight 550 had already been moved to the opposite side (i.e., relative to side of the column on which the monorail is located) of the movable weight's rail/track 520—i.e., prior to the monorail 100 being 'near' the column 222B (where 'near' is discussed elsewhere in this document). And, as can be further seen from the second/X−Mcw(t) column the movable weight 550 remains at position −4.44 at least until the monorail 100 is no longer 'near' the column 222B. (For example, in one or more embodiments the movable weight 550 is afterwards moved to the 0.0 location above the column 222; or, alternatively moved to another position, such as when a monorail 100 becomes 'near' the column 222B on the other side of the column 222B at some time afterwards, among other alternatives.) Accordingly, as can be seen by the eighth column in the FIG. 12K chart (entitled Mcw*X−Mmw(t)) the weight-related moment exerted by the movable weight 550 (relative to the point 222P at the base of the column 222B) is estimated/calculated to be 348.4 KNm the entire time period. Thus, as can be further seen by the tenth column in the FIG. 12K chart (entitled Σ(M−Xo)), the 384.4 KNm has been added to the sum of the moments related to the vehicle/cargo's weight and centrifugal force—as presented in the ninth column, entitled 'Σ(M−Xo) without movable weight'—to at least partially counterbalance (in at least some positions) these. In fact, the eleventh/last column (entitled Reduction Σ(M−Xo)) shows the percentage reduction in total moments associated with the monorail 100 (i.e., as reflected in column 9) achieved by the movable weight 550. Also evident from the ninth column/'Σ(M−Xo) without movable weight' and tenth column/Σ(M−Xo) is that the greatest magnitude of total moments without the movable weight is 697.6 KNm and the greatest magnitude of total moments with the movable weight is 349.2. This almost 50% in reduction is achieved (as seen in the eleventh column) thanks to the moveable weight 550. (It should be clear to those skilled in the art from the chart and associated legend on FIG. 12K how all of the other values in the chart have been derived.)

Before shedding additional light on why the movable weight 550 is positioned at the far end of the rail 113 on the opposite side of the vehicle/cargo in this example, it should be noted (just as was discussed above) there are various alternative embodiments/algorithms/methods/approaches that can be used towards some beneficial ends in various scenarios/conditions (e.g., where certain one or more factors are associated with specific data or data ranges), though one or more of these will achieve relatively better results than one or more others. Likewise, while one embodiment/algorithm/method/approach may work best under one circumstance/condition/scenario (e.g., where certain one or more factors are associated with specific data or data ranges), that same embodiment/algorithm/method/approach may not be the most effective choice in another one or subset of circumstances/conditions/scenarios—though it still may be beneficial (or alternatively not). Moreover, many of the embodiments where a sum of both the weight-related and centrifugal force-related moments of the vehicle/cargo are to be at least partially counterbalanced are at least very similar (and in some cases almost identical) to the embodiments/approaches (e.g., result(s), determination(s), relationships(s), and/or calculation(s), etc.) discussed above with respect to embodiments that do not involve centrifugal force-related moments of the vehicle/cargo. At least one obvious difference, however, is that each of the embodiments/approaches here also incorporates the centrifugal force-related moment(s) of the vehicle/cargo. For example, the 'maximum achievable V/C magnitude'—which was discussed above with a focus on embodiments that involve weight-related moments—here includes both (i) a weight-related moment component associated with the vehicle/cargo and (ii) a centrifugal force-related moment component associated with the vehicle/cargo, rather than just the former as was discussed above.

With this in mind and returning back to FIG. 12K, it will be apparent that the 'maximum achievable V/C magnitude' (697.6 KNm) is 'substantially equal' (which in this example/embodiment is predetermined to be 2.5%) to twice the 'maximum achievable MW magnitude' of a moment associated with the movable weight's weight (348.4 KNm); and, accordingly the movable weight 550 was moved to its end position (at 4.44 meters) away from the vehicle/cargo. It is important to note that this positioning of the moveable weight could also have been done one or more various other ways that were described above, such as by one or more calculations (e.g., that solve for a position of the movable weight 550, as discussed above) rather than one or more comparisons, to determine the position of the moveable weight 550 that would at least partially counterbalance the 'maximum achievable V/C magnitude'. Also, while this should be apparent based on various statements made herein, the movable weight 550 could have alternatively also been accelerated here, but in light of the almost 50% reduction in 'maximum achievable V/C magnitude' (697.6 KNm) without needing to accelerate the movable weight 550, as reflected in the 'new/counterbalanced maximum achievable V/C magnitude' (i.e., 349.2 KNm), it was not. In one or more embodiments whether the movable weight 550 should also be accelerated and/or de-accelerated depends on whether the positioning of the movable weight 550 is able to cut (or is cutting) the 'maximum achievable V/C magnitude' in half, or substantially in half, or not. In one or more embodiments, 'substantially half' is defined with one or more of the same ranges that are listed above with respect to the 'opposite moment magnitude' and the 'maximum achievable V/C magnitude'.

Example 2

With the above in mind, attention will now turn to Example 2 as reflected in FIG. 12W and related Figures. As can be seen from that chart, 'maximum achievable V/C magnitude' is 1,215.3 KNm and the 'maximum achievable MW magnitude' is 470.8 KNm (where, once again, this does not include any possible acceleration or de-acceleration of the movable weight 550). It will be apparent, in contrast to Example 1, that here the 'maximum achievable magnitude' related to the vehicle/cargo's weight-related moment (as well as other moments related to the vehicle/cargo's weight) and the 'maximum achievable magnitude' related to the vehicle/cargo's acceleration/de-acceleration-related moment (as well as other moments related to the vehicle/cargo's centrifugal force) are added (rather than subtracted), which was explained a bit above and will be explained further later. That said, it will be apparent that the 'maximum achievable V/C magnitude' is more than twice the 'maximum achievable MW magnitude'; so, positioning the movable weight 550 at the end of its rail 520 will cut the 'maximum achievable V/C magnitude' by less than half or substantially half (which for this non-limiting example is predetermined to be 5%). Though this is beneficial in partially counterbalancing the 'maximum achievable V/C magnitude'—and reflects what is done in one or more alternative embodiments—here the movable weight is accelerated to counterbalance the 'maximum achievable V/C magnitude' even more.

It also should be noted that while the end position (6.00 M) is employed here, another position—other than where the movable weight 550 has 'maximum achievable MW magnitude'—along the movable weight rail 520 could be alternatively used instead, especially as acceleration will be employed in the at least partial counterbalancing here. And, on a related note, one or more alternative embodiments include only an acceleration-related action—e.g., where the movable weight 550 is moved from whatever position it presently is in and/or a predetermined position—such that there is no (direct) position-related determination involved, rather a 'default' position of the movable weight is essentially employed. In fact, it is believed that in further alternatives the roles of acceleration and de-acceleration are at least partially reversed; that is, de-acceleration is at least partially counterbalancing one or more moments related to the vehicle/cargo; and, it is believed that both play this role to some degree in even further embodiments.

On a similar note, it also should be emphasized that while certain acceleration(s) or de-acceleration(s) are made at certain times in Example 2, there is an array of possibilities in this regard. Moreover, in some embodiments/scenarios the acceleration yields a 'new counterbalanced maximum achievable V/C magnitude' that is different than the 'new counterbalanced maximum achievable V/C magnitude' here (i.e., 470.8 KNm). For example, a relatively higher 'new counterbalanced maximum achievable V/C magnitude' could occur in one or more alternatives where the acceleration employed was less than that employed in Example 2. On the other hand, a relatively lower 'new counterbalanced maximum achievable V/C magnitude' may occur in one or more alternatives and/or scenarios where the movable weight's 550 starting position was a bit closer to the column 222 (rather than at the position reflecting the 'maximum achievable MW magnitude'—i.e. not at 6.00 M).

Getting back to the chart of Example 2, it will further be appreciated that the movable weight 550 remains in its starting position, at 6.00 meters from the column 222, until it is expected/predicted/estimated that the vehicle/cargo will be (and/or actually is) exerting its 'maximum achievable V/C magnitude' (e.g., 100% of it, though a lesser percentage can be used as in this context in one or more alternative embodiments) on the column's point 222P. In one or more embodiments, this is implemented with reference to a time (or alternatively a time range), where it is assumed that the 'maximum achievable V/C magnitude' will occur when the column 222 is adjacent to substantially the middle of the vehicle/cargo (and/or another point, such as the center of its mass); and, that is estimated/calculated in Example 2 to be 2.0 seconds after the vehicle/cargo has become near the column 222. And, as can be seen from the Chart of FIG. 12 J, this is when the movable weight 550 has been accelerated in this Example. While the movable weight 550 remained at position 6.0 meters until 2 seconds after the vehicle/cargo became near the column, in one or more alternatives it begins to move earlier.

In one or more alternative embodiments the movable weight 550 remains in its starting position, at 6.00 meters from the column 222, until a time when it is expected/predicted/estimated that the vehicle/cargo will be (and/or actually is) exerting a moment on the column 222 that is not the 'maximum achievable V/C magnitude'. In one or more further alternative embodiments the movable weight 550 remains in its starting position until another time while the vehicle/cargo is 'near' the column 222. In one or more even further alternative embodiments, the movable weight 550 does not remain in its starting position when the vehicle/cargo first 'nears' the column 222. In one or more further embodiments, the movable weight 550 is moving when the vehicle/cargo first 'nears' the column 222. In one or more further embodiments, the movable weight 550 remains in its starting position until the vehicle/cargo reaches a certain point (i.e., regardless of time)—e.g., when the middle of the monorail 100 becomes adjacent to the column 222.

As further can be seen from the chart on FIG. 12W, the acceleration used was 6.0 m/s2, which could have been higher or lower in alternative embodiments as will be readily appreciated. With that acceleration the un-counterbalanced 'maximum achievable V/C magnitude' of 1,215.3 KNm has been knocked down to 1.68.4 KNm; and, the 'new/counterbalanced maximum achievable V/C magnitude' is 470.8 KNm. While the largest acceleration employed in Example 2 was employed at the time associated with 'maximum achievable V/C magnitude' of 1,215.3 KNm, in one or more alternative embodiments the movable weight is not accelerated at its largest acceleration at the time corresponding to the 'maximum achievable V/C magnitude'.

In Example 2, one or more accelerations was/were selected (e.g., in view of the movable weight's respective position(s) as it is accelerated and/or moved along its rail 520) to ensure that there were no moments associated with the vehicle/cargo (i.e., related to the sum of its weight and acceleration, as reflected in column 13) after the movable weight's 550 starting position that exceed the moment associated with the vehicle/cargo (i.e., related to the sum of its weight and acceleration, as reflected in column 13) at the movable weight's starting position. (While the starting position in Example 2 reflected the same position at which 'maximum achievable MW magnitude' occurs, in alternative embodiments they are different.) In fact, in one or more alternative embodiments one or more accelerations is/are selected (e.g., in view of the movable weight's respective position(s) as it is accelerated and/or moved along its rail 520) to ensure that there are no moments associated with the vehicle/cargo (i.e., related to the sum of its weight and acceleration, as reflected in column 13) after the movable weight's starting position that exceed the 'maximum achievable MW magnitude'. In one or more alternative embodiments one or more accelerations is/are selected (e.g., in view of the movable weight's respective position(s) as it is accelerated and/or moved along its rail 520) after the movable weight's starting position that exceed a predetermined amount, a predetermined percentage of the (un-counterbalanced) 'maximum achievable V/C magnitude', or some other 'ceiling'. For instance, in one or more embodiments an acceleration is selected (e.g., in view of the movable weight's respective position(s) as it is accelerated) to ensure that there are no moments associated with the vehicle/cargo (i.e., related to the sum of its weight and acceleration, as reflected in column 13) after the movable weight's starting position that are greater than 90% of the 'maximum achievable V/C magnitude', alternatively greater than 60% of the 'maximum achievable V/C magnitude', or alternatively greater than 40% of the 'maximum achievable V/C magnitude'; and, in one or more alternative embodiments an acceleration is selected (e.g., in view of the movable weight respective position(s) as it is accelerated) to ensure all moments associated with the vehicle/cargo (i.e., related to the sum of its weight and acceleration, as reflected in column 13) after the movable weight's starting position are less than 60% of the 'maximum achievable V/C magnitude', or alternatively are less than 40% of the 'maximum achievable V/C magnitude', and alternatively are as low as possible.

On a related note, the chart also shows how the acceleration winds down into a de-acceleration and the moveable weight 550 eventually stops (at position 0.31 meters). Again, this is done in an array of alternative ways in alternative embodiments, as will be readily appreciated by those skilled in the art. That said, all that was discussed in the immediately above paragraph regarding acceleration will apply to de-acceleration as well. Accordingly, in Example 2, a de-acceleration was also selected (e.g., in view of the movable weight's respective position(s) as it is de-accelerated) to ensure that there were no moments associated with the vehicle/cargo (i.e., related to the sum of its weight and acceleration, as reflected in column 13) after the movable weight's 550 starting position that exceed the moment associated with the vehicle/cargo (i.e., related to the sum of its weight and acceleration, as reflected in column 13) at the movable weight's starting position. In one or more alternative embodiments a de-acceleration is selected (e.g., in view of the movable weight's respective position(s) as it is de-accelerated) to ensure that there are no moments associated with the vehicle/cargo (i.e., related to the sum of its weight and acceleration, as reflected in column 13) after the movable weight's starting position that exceed the 'maximum achievable MW magnitude'. In one or more further alternative embodiments a de-acceleration is selected (e.g., in view of the movable weight's respective position(s) as it is de-accelerated) to ensure that there are no moments associated with the vehicle/cargo (i.e., related to the sum of its weight and acceleration, as reflected in column 13) after the movable weight's starting position that exceed a predetermined amount, a predetermined percentage of the (un-counterbalanced) ' maximum achievable V/C magnitude', or some other 'ceiling'. For instance, in one or more embodiments a de-acceleration is selected (e.g., in view of the movable weight's respective position(s) as it is de-accelerated) to ensure that there are no moments associated with the vehicle/cargo (i.e., related to the sum of its weight and acceleration, as reflected in column 13) after the movable weight's starting position that are greater than 90% of the 'maximum achievable V/C magnitude', alternatively greater than 60% of the 'maximum achievable V/C magnitude', or alternatively greater than 40% of the 'maximum achievable V/C magnitude'; and, in one or more alternative embodiments, a de-acceleration is selected (e.g., in view of the movable weight respective position(s) as it is de-accelerated) to ensure all moments associated with the vehicle/cargo (i.e., related to the sum of its weight and acceleration, as reflected in column 13) after the movable weight's starting position are less than 60% of the 'maximum achievable V/C magnitude', or alternatively are less than 40% of the 'maximum achievable V/C magnitude', and alternatively are as low as possible. Moreover, in other alternatives, the acceleration and/or de-acceleration occurs for longer or shorter times, etc.; and, the other amounts in the chart of Example 2 should be readily understood by those skilled in the art, especially in light of the discussion above regarding the chart of Example 1.

Some Related Issues

First, returning to the issue of combining moment(s) related to the vehicle/cargo's weight with moment(s) related to the vehicle/cargo's centrifugal force—e.g., whether they should be added or subtracted—in one or more embodiments this occurs in one or more ways. As discussed above, 'which side' data is employed in one or more embodiments to determine whether the weight-related moment associated with the vehicle/cargo is—relative to point 222P of the column 222—is clockwise or counterclockwise. However, in one or more embodiments simply knowing whether the vehicle/cargo is on one side of the column 222 or the other—i.e., via 'which side' data—is not enough to determine whether centrifugal force-related moment(s) are additive or subtractive with respect to the weight-related moment(s) associated with the vehicle/cargo—relative to point 222P of the column 222. That is, it should be emphasized that in one or more embodiments 'which side' data that is taken into account with respect to a centrifugal force-related moment associated with the vehicle/cargo includes an indication as to whether the vehicle/cargo is on the 'inside of the curve' and/or an indication as to whether the vehicle/cargo is on the 'outside of the curve'. For instance in Example 1, 'which side data' that includes or is accompanied by an 'inside the curve'—relative to point 222P of the column 222—indication (e.g., data, a determination, etc.) yields a subtractive result. In contrast, in Example 2 'which side data' that includes or is accompanied by an 'outside the curve' indication (e.g., data, a determination, etc.) yields an additive result. In one or more alternatives, the indication could be 'not inside the curve', or alternatively no indication has some predetermined meaning (e.g., add them), or some other predetermined indication means something else (e.g., subtract them). Other examples will be readily appreciated by those skilled in the art. Moreover, in one or more alternative embodiments such 'inside the curve'(inside rail)/ 'outside the curve' (outside rail) data or determination(s) are not employed; for example, one or more embodiments employ 'which side data'—without the inside/outside the curve data—and knowledge of the vehicle's direction and/or whether the curve is clockwise or counterclockwise. Other alternatives will be known to those skilled in the art.

In terms of how the movable weight system knows whether the vehicle/cargo is on the inside of the curve or not, this (like other data discussed above) can be determined by GPS 669, for example. Alternatively, it can be preprogrammed (e.g., by human) or based on prior experience of the vehicle/cargo, for example.

In fact, in one or more embodiments 'inside the curve' and/or 'outside the curve' data or determination(s) are used in a relationship (as discussed above) to trigger an action—e.g., whether to accelerate (or de-accelerate) the movable weight, the magnitude and/or time of such acceleration (or de-acceleration). For example, in one or more embodiments/scenarios if the movable weight system 'knows' whether the vehicle/cargo is on the 'inside the curve' the movable weight will automatically (by the trigger relationship) be accelerated (e.g., at a predetermined rate set by the trigger relationship) towards the other side of the column that the vehicle/cargo is on; in further embodiments that acceleration will occur from a predetermined position (set by the trigger relationship). Essentially, most if not all of the relationships and possibilities discussed above regarding 'which side' data (with respect to embodiments that focus on counterbalancing weight-related moment(s) associated with the vehicle/cargo) would be applicable with respect to 'inside the curve' and/or 'outside the curve' data.

Second, in one or more embodiments, position-related and/or movement-related (e.g. direction, speed, velocity, and/or acceleration) information about the movable weight 550 (which in some, but not all, cases is sent from the control portion 615 of the movable weight system) is used by the computer system 667 to direct the LIM system 400 (via a communication channel, which also could be wireless in alternative embodiments)—e.g., to speed up, slow down, or stop the vehicle/cargo. Alternatively or in addition, the computer system 667 presents this data, or determination(s) or calculation(s) based on this data, on a screen or by sound, for example, that indicates to a human conductor (who is located on, or alternatively off, the vehicle/cargo in one or more embodiments) whether a certain increase or decrease in speed would be considered safe/permissible or not (e.g., such that it would not place force/s of a certain magnitude on the column/s). In further embodiments, an alarm is triggered (e.g., visually or by sound) that indicates that the speed (present or expected) of the vehicle/cargo will not be safe based on data—e.g., from the moveable weight system 510.

Third, it is also worth reemphasizing the movable weight system 510 can be used with other monorail/train systems (which are readily known to often place various stresses on their columns) that are already exist or are invented in the future. In fact, the movable weight system 510 can even be used independently of the vehicle/cargo and/or the rail 113—i.e., by itself and attached to a column/support structure. For instance, in locations that commonly experience strong and/or varied winds, the movable weight system 510 could play a role in keeping the column 222, or any other structure, stable.

Fourth, while the embodiment of the movable weight system 510 depicted in FIG. 1 includes the weight sensor 667 and communication devices shown, alternative movable weight systems do not include the weight sensor and/or communication devices. Further, one or more alternative movable weight system embodiments instead, or in addition, include the sensor 687 and a communication device 612 associated with the column 222 (which communicates with a communication device 614 of the movable weight system), which are discussed below. Further alternatives include any sub-combination of the communication abilities shown in FIG. 1 that enable relevant data to be shared, which in some cases will determine which portions of the transportation system 10 are included, what calculations are being performed, and/or where such are being performed—as will be readily understood by those skilled in the art.

Finally, FIG. 12L depicts the forces reflected in the data of FIG. 12W. As is evident from FIG. 12L and as discussed above, the monorail 100 is on the 'outside' rail of a turn/curve and the movable weight 550 is accelerated, in a timely fashion, towards the other side of the movable weight's rail/track 520 to at least partially counterbalance one of the forces estimated in FIG. 12W, though there are a plurality counterbalanced here. The heights, distances, etc. will be readily understood by those skilled in the art in light of the discussion herein. It further bears noting that both 12K and 12W further assume there is not another/second vehicle/cargo on the other side/inside of the track 113 that is also 'near' the column 222 during this time period, where this would significantly impact the calculations of FIG. 12W, as readily appreciated by those skilled in the art. In short, when a second vehicle (not shown) arrives 'near' the column 222, one or more of the various determinations, issues, etc. discussed above apply; but, now the moment(s) associated with the second vehicle/cargo must be taken into consideration as well. While such determinations may be a bit more straight forward with respect to straight (i.e., non-curved) sections of the rail, one or more embodiments further include centrifugal-force related moment(s) associated with both vehicles.

(xii) Another Use for the Movable Weight System

In one or more embodiments, one or more portions of the movable weight system 510 functions to mitigate one or more forces and/or waves (from the ground and/or air)—such as those reflecting a tremor or earthquake—with respect to the column 222. For example, in the embodiment shown in FIG. 1 (but not all embodiments) the computer system 667 associated with the vehicle/cargo is in communication with at least one sensor, such as the column sensor 687, that detects/senses and/or measures, or estimates force and/or wave-related information with respect to the column 222 (or at or near the column 222). In one or more embodiments, the sensor 687 senses the presence of one or more forces and/or waves, and/or one or more magnitudes, one or more other characteristics (e.g., such as that of a certain magnitude, frequency, pattern, and/or duration, etc.), and/or changes in one or both of these. In one or more embodiments the communication between the computer system 667 and the column sensor 687 is via a communication device 616 associated with the computer system 667 and the communication device 612 associated with the column sensor 687 such that the computer system 667 is able to receive data/information sensed/detected by the column sensor 687, and/or data/information derived from data/information sensed by the column sensor (e.g., in alternative embodiments where a computer or other device, not shown in FIG. 13, is associated with the column sensor 687 and modifies data from the sensor 687 and/or uses data from the sensor 687 to create an other data/instruction, such as an alert and/or an instruction regarding the movable weight 550).

Figure 13:
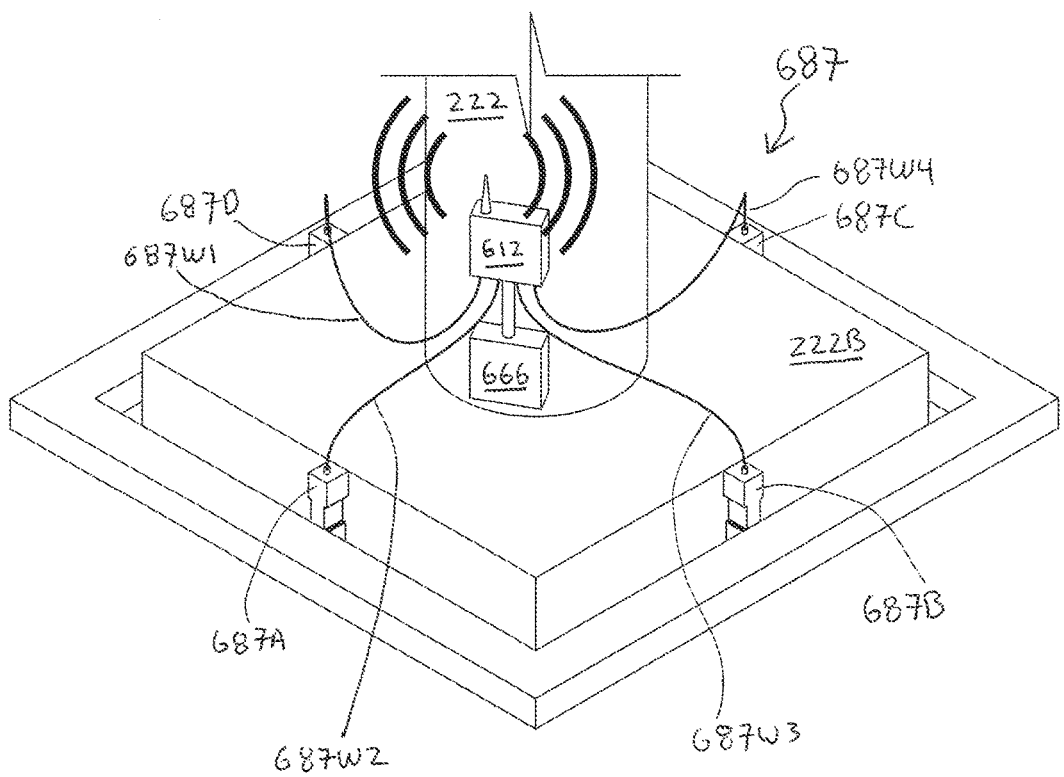
FIG. 13 shows a close-up view of the base of the column shown in FIG. 1.

As can be seen in FIG. 1 and more closely in FIG. 13, in one or more embodiments the column sensor 687 has four parts 687A, 687B, 687C, 687D, each of which is respectively connected to the communication device 612 via a wire 687W1, 687W2, 687W3, 687W4. In one or more alternative embodiments the column sensor 687 has one or more parts. As further depicted in FIGS. 1 and 13, the sensor 687 is in communication with the column 222, meaning that it is positioned with respect to the column 222 such that it is at least able to sense/detect the presence of one or more forces and/or waves with respect to the column 222, or it is alternatively able to sense/detect one or more characteristics associated with a force and/or a wave with respect to the column 222. In the FIG. 1 embodiment, the sensor 687 touches a base 222K associated with the column 222 (or alternatively the column or an area near the column) and, more specifically, is kept in a touching relationship with the column 222 via one or members (which are connected in the form of a frame 222C in FIG. 13) that sandwich (the plurality of parts of) the sensor 687 in place. Alternative locations and/or design will be readily appreciated by those skilled in the art.

As mentioned above, the sensor 687 allows the movable weight system 510 to be leveraged in another way—i.e., to help counterbalance forces from events like earthquakes or other tremor-related events, and even some weather conditions in some embodiments. The four sensor parts 687A, 687B, 687C, 687D and/or the communication device 612 are powered through the 3 wires/channels 877A, 877B, 877C via a connection/wire running through or outside the column 222 (but is not shown) or via a power supply box 666 as shown in FIG. 13, or alternatively through another source.

In one or more embodiments, like that shown in FIG. 1, the computer system 667 is able to distinguish 'unexpected/unplanned' data from other data it receives from the communication device 612 and/or originating from the column sensor 687. In one or more alternative embodiments the computer system is able to recognize 'unexpected/unplanned' data it receives from the column sensor 687 and/or originating from the column sensor 687. In one or more embodiments, the 'unexpected/unplanned' data is (i) related to one or more forces and/or one or more waves and/or an alert and/or an instruction and/or (ii) unrelated to one or more forces exerted by the vehicle/cargo (with respect to the column 222).

In one or more embodiments a portion of the movable weight system 510 will receive data from the computer system 667 that relates to and/or is based upon the 'unexpected/unplanned' data from the communication device 612 and/or originating from the column sensor 687. For example, in the FIG. 1 embodiment, the movable weight portion is the control portion 615 of the movable weight system 510 and the data received by the control portion 615 is an instruction that is at least partially based on the 'unexpected/unplanned' data and regards the movable weight 550. In one or more embodiments, but not all, the instruction is determined and/or prepared at the computer system 667 (e.g., based on unexpected/unplanned data, such as data or an alert related to one or more forces and/or one or more waves); in other embodiments the instruction is received by the computer system 687 (e.g., from a computer or other device associated with the column sensor 687) and passed along to the control portion 615. In yet other embodiments, the control portion 615 determines its own instruction based on unexpected/unplanned data, such as data or an alert related to one or more forces and/or one or more waves—e.g., where such unexpected data comes from the communication device 612 associated with the sensor 687, the computer system's communication device 616, and/or the sensor through a connection with the control portion 615. In one or more embodiments, one or more determinations are based on one or more predictions regarding a force or wave (e.g., a tremor signaling a possible earthquake).

In any event, in one or more embodiments the instruction relates to at least one of (i) repositioning, (ii) accelerating and/or de-accelerating the movable weight, and (iii) enabling the movable weight to move at least relatively freely with respect to the movable rail/track 520. In one or more embodiments, the enabling of the movable weight to move relatively freely is achieved by disconnecting the movable weight 550 from its connection to the chain/cable and/or the motor (e.g., via a clutch or clutch-like device). In fact, it is assumed by the patent applicant that the latter will be most effective in case of an earthquake and/or a wave in mitigating the effect/impact on the column.

While the inventor does not intend to be limited in any one way this mitigation occurs, it is believed that a significantly free movable weight's weight and ability to more-or-less freely move as the rail slides back and forth under it would serve to mitigate a motion, vibration, and/or oscillation (e.g., harmonic)—e.g., by reducing a frequency and/or magnitude—if one were to occur with respect to the column (e.g., as a result of a tremor, wind, etc.). For instance, if the movable weight 550 was positioned directly above the column 222 and the instruction were to substantially free/disconnect it, then it is believed that in some circumstances the movable weight 550 would not move significantly from that position and its rail/track 520 would slide back and forth under it. (In situations where the movable weight 550 is not directly above the column 222 when the 'trigger event' occurs, in one or more embodiments the instruction involves both moving the movable weight to (directly) above the column 222, or at least become relatively more centered/closer to the column, and allowing the weight to move more freely.) Thus, it is further believed, that this would naturally lead to angle(s) naturally formed between the movable weight's rail 520 and movable weight 550—i.e., as the movable weight's rail 520 moves back and forth because of the tremor or wind, etc. —to cause the change/mitigation described above with respect to the column 222. In one or more embodiments that employ movable weight air bearings 575B, air would remain flowing to them, but in other embodiments that is not the case; and in embodiments that employ wheels or lubrication, etc. maintaining air pressure would not be an issue. Moreover, in one or more embodiments the computer 667 also instructs the LIM 400 to slow down or stop the monorail 100.

In one or more alternative embodiments the column sensor 687 is not included; e.g., the 'unexpected/unplanned' data is received by the control portion 615 (directly or indirectly, e.g. via the computer system 667) from a computer or other device detecting tremors and/or wind strengths or patterns, etc. in the region of the column 222, or is received via a human (e.g., at a station) who has such knowledge and entered it into a device capable of communicating with the control portion 615 (directly or indirectly, e.g. via the computer system 667). In one or more alternative embodiments the 'unexpected/unplanned' data received relates to a prediction (e.g. of a tremors/wind strength/etc); and in one or more embodiments the control system 667 determines a prediction based on 'unexpected/unplanned' data received.

It should be emphasized that one or more embodiments of the movable weight system 510 is not able to mitigate tremor-related (whether natural or man-caused) and/or wind-related force and or waves with respect to the column 222; and one or more embodiments of the movable weight system 510 is not able to counterbalance forces and/or moments related to the vehicle/cargo but is able to mitigate tremor-related and/or wind-related force and/or waves with respect to the column 222. Also, for the sake of clarity and/or emphasis it should be pointed out that the column sensor 687 is not included in one or more embodiments that do counterbalance vehicle/cargo-related moment(s) and/or force(s) but do not mitigate tremor-related and/or wind-related force and/or waves; however, there are various exceptions to this, such as one or more embodiments that employ historical data to make one or determinations related to such counterbalancing—i.e., where the column sensor 687 is included to assist in gathering data for such purpose.

(xiii) Components of One or More Embodiments of the Movable Weight System

The Weight Sensor Device and the Connector

As can bee seen FIG. 1, one or more embodiments of the transportation system (but not all) include the movable weight system 510. In one or more of such embodiments, the movable weight system 510 is in communication with one or more sensors—such as the weight sensor device 677, which is well seen in FIG. 7A, among other Figures. (In one or more further embodiments, the sensor (e.g., the weight sensor 677) is included as a portion/part of the movable weight system 510.) In one or more embodiments (such as that shown in FIG. 1) the communication between the movable weight system 510 and the one or more sensors—such as the weight sensor device 677—is via the vehicle/cargo's computer system 667, which includes software. (While in the FIG. 1 embodiment the movable weight system 510 is in communication with the computer system 667, in alternative embodiments the computer system 667 is included as/considered a portion of the movable weight system 510.) For instance, data from the sensor 677 is received by the computer system 667, and the computer system 667 employs the data in creating an instruction that is received by the communication device 614 associated with a control portion 615 (which is a computer implementing software in some embodiments) of the movable weight system 510 (i.e., by sending it and/or pulling it). In alternative embodiments, at least part of the instruction is prepared by the movable weight system's control portion 615. In yet alternative embodiments there is a direct communication link (that is wireless, for example) between the weight sensor portion 677 and the control portion 615 of the movable weight system 510; in one or more such cases, data and/or instructions are received by the control portion 615 of the movable weight system 510 from the weight sensor 677, depending on whether instructions regarding the movable weight 550 are at least partially prepared by the weight sensor portion 677 or not. It should also be stressed that in one or more embodiments data and/or instruction received by the control portion 615 of the movable weight system 510 and/or the vehicle/cargo's computer system 667 is from another sensor (not shown)—e.g., where such other sensor data is an indication of the presence of the vehicle 100/cargo 100C, its length, and/or how many cars it is composed of, etc., as discussed elsewhere in this document.

While the weight sensor device 677 is located (a) above the vehicle 100/cargo 100C, (b) below the rail 133, and (c) between at least a portion of the assembly 200 and the vehicle 100/cargo 100C here, it can be located in just one, or alternatively a subset of these three spots, or elsewhere, in one or more alternative embodiments—e.g., such as above the rail/track 113. Even more precisely with respect to the FIG. 1 embodiment of the movable weight system 510, the weight sensor device 677 is located in a connector 700. (Though, in one or more alternative embodiments it is located elsewhere). The connector 700, as is seen well in FIG. 7A, essentially (a) at least temporarily connects and/or at least temporarily secures the vehicle/cargo to the assembly 200 (at least indirectly) and (b) at least partially enables the vehicle 100 and/or cargo 100C to move (e.g., rotate) relative to the assembly 200 and/or the assembly 200 to rotate slightly relative to the train. Though both rotations are possible in the embodiment depicted in FIG. 7A, the rotation of the assembly 200 (relative to the monorail) will often be the larger of the two in at least one or more embodiments and/or scenarios that include the connector and involve curved rails 113, as will be readily appreciated by those skilled in the art. However, in one or more alternative embodiments the connector 700 does not enable rotation, in one or more alternative embodiments the connector 700 enables rotation but does not connect or secure the vehicle/cargo to the assembly 200 (at least indirectly), and one or more further embodiments do not include the connector 700—e.g., the weight sensor device 677 is located elsewhere, another sensor (e.g., visual, heat, etc.) is employed instead, the GPS 669 is employed (e.g., to provide data about the vehicle and/or cargo as described elsewhere in this document).

As can be seen in FIG. 7A, in one or more embodiments the connector 700 includes a first/outer member 705 that at least temporarily is connected to the monorail/vehicle 100 (or alternatively the cargo 100C) by one or more fasteners 710 (e.g. screws, bolts). The first member 705 has a cavity 705C (i.e., is hollow) that defines an inner diameter 705D1 of the first member 705, and the first member 705 further includes a first member lip 705L that defines a lip diameter 705D2 of the first member 705. Likewise, the connector 700 depicted further includes a second/inner member 715 that is connected to the assembly 200 by one or more fasteners 722 (e.g., screws, bolts). As can be seen, the second member 715 has an outer diameter 715D1, and the second member 715 further includes a second member lip 715L defining a lip diameter 715D2 of the second member 715. In one or more alternative embodiments—e.g., where cargo 100C is moved instead of the vehicle 100—the connector 700 is adapted to more quickly/easily (than, for example, bolts or screws associated the first member 705 and/or the second member 715) allow the cargo 100C to be unconnected from the assembly (such as a via a claw, latch, magnet, suction, etc.)

As can further be seen particularly with respect to FIG. 7A, the second member 715 resides within the first member 705 such that the two lips 705L, 715L face each other. Thus, when the first lip 705L exerts a force (e.g., essentially reflecting the weight of the vehicle/cargo) towards the second member lip 715L, the weight sensor 677—which is positioned between the two lips 705L, 715L—is able to measure that force. In one or more alternative embodiments, the weight sensor 677 instead detects the presence of the force (e.g., the weight of the vehicle/cargo) and/or detects if the force (e.g., the weight of the vehicle/cargo) is greater than a predetermined threshold/amount/percentage/etc (as discussed above).

In some (but not all) embodiments like that shown here, one or more additional components are included to assist in enabling the above-described movement/rotation—i.e., one or more bearings 730 (e.g., roller bearings, such as tapered roller bearings) and an unattached/movable ring 715R around second portion 715 that enables the bearings 730 to be sandwiched between it and the lip 705L of the first member 705, while at the same time enabling the force (e.g., of the monorail) to be 'felt' by the weight sensor device 677. Those skilled in the art may recognize alternative ways to enable rotation without one or more of the bearings 730 and/or the ring 715R. In any event, in one or more embodiments where there is no rotation, these will not be needed. Moreover, while the two lips 705L, 715L sandwich the weight sensor 677 in one or more embodiments, directly or indirectly (as in the embodiment of FIG. 7A), in one or more further alternative designs a non-lip portion of the first member and a non-lip portion of the second member do the sandwiching.

Figure 7B:
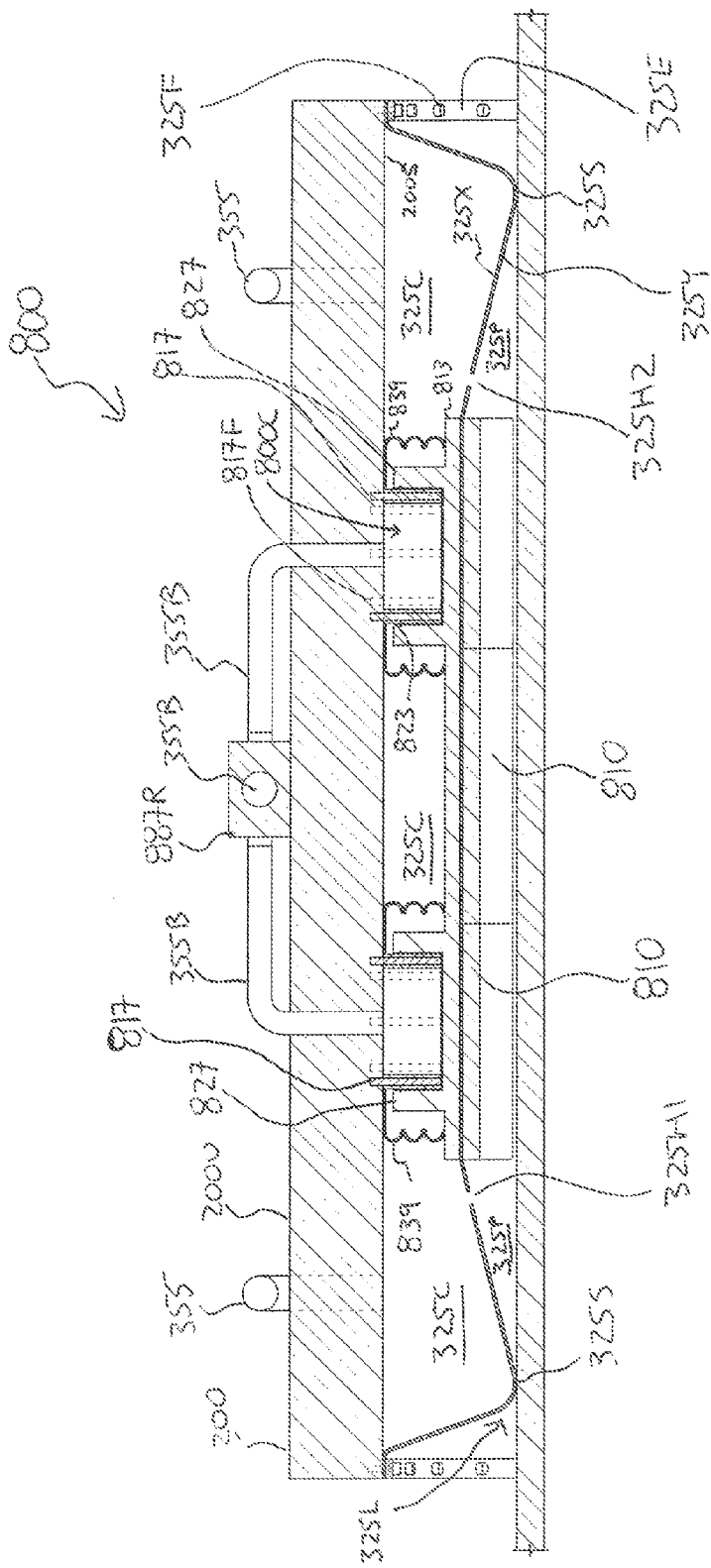
FIG. 7B shows a close-up view of a portion of FIG. 7A that, among other things, shows a portion of the brake system in an un-activated position/state.
Figure 7C:
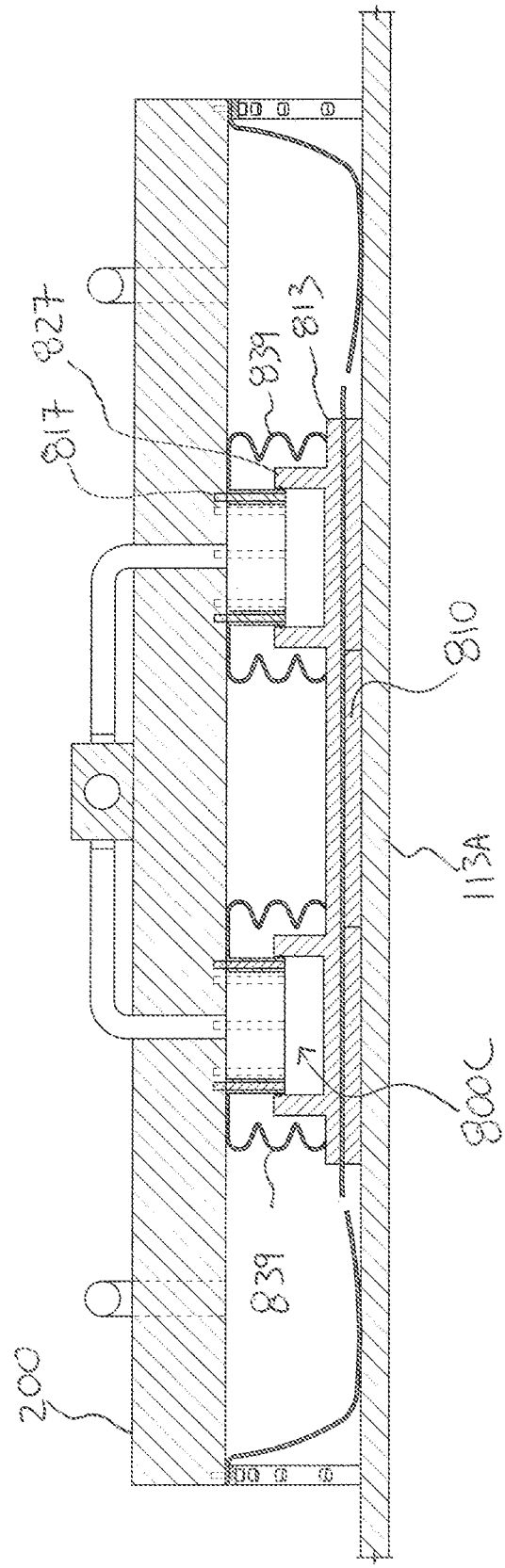
FIG. 7C shows a close-up view of a portion of FIG. 7A that, among other things, shows a portion of the brake system activated/in action.
Figure 7D:
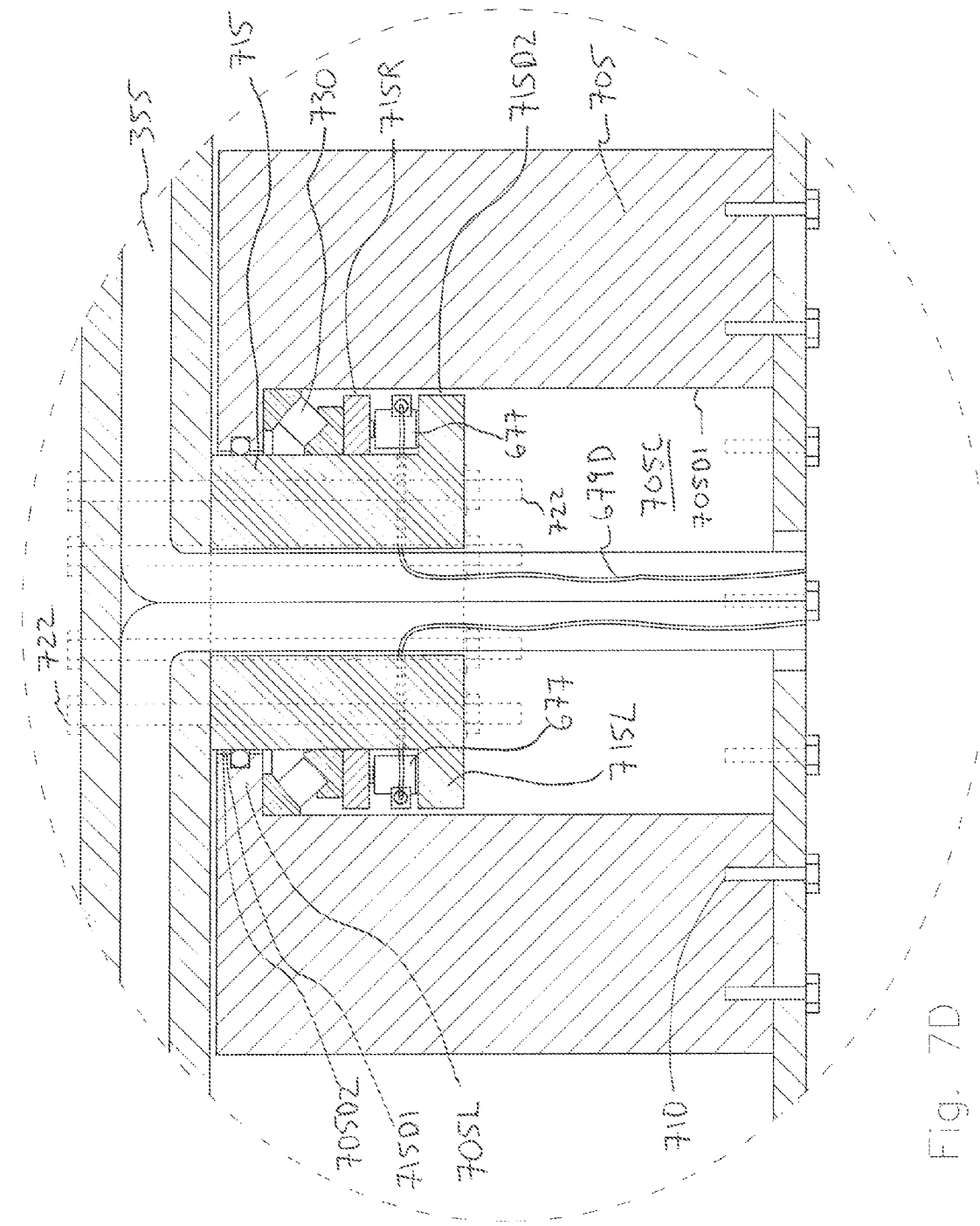
FIG. 7D shows a close-up view of the dashed circle 'FIG. 7D' in FIG. 7A.

FIG. 7A also reveals, particularly in close-up view FIG. 7D, a connection 679D between the weight sensor 677 and the monorail's computer system 667 that enables the computer system 667 to receive data (by it being sent and/or pulled) from the weight sensor 677 (e.g., where data is weight/force, presence of force, and/or presence of force greater than 'X', etc.). Though the connection 679D is implemented via one or more wires 679D, it is wireless in one or more alternative embodiments. Further, although a connection between the weight sensor 677 and the power source connection 666 is not shown in FIG. 7A, in one or more embodiments the weight sensor is powered indirectly via the computer system whose supplied power will be explained later. In alternative embodiments, the weight sensor-677 is connected to the power supply without the computer system 667 as an intermediary, so to speak.

Further evident from FIG. 7A is that in one or more embodiments the second/inner member 715 also has a cavity 715C, which enables one or more air tubes 355 to pass from the (e.g., pressured) air supply 900 to one or more air bearings—which will be discussed further in other portions of this document. The cavity 715C and tubes 355 are also quite visible in FIG. 5 (which is the E-E' view of FIG. 4A) among other Figures. Speaking of the air supply 900, this may be a good time to point to FIG. 15, which shows how the air supply in the monorail is connected to the pipes 355 that ultimately weave through and around the assembly 200 and supplies air 910 to various components and systems, as is discussed elsewhere in this document.

Figure 5:
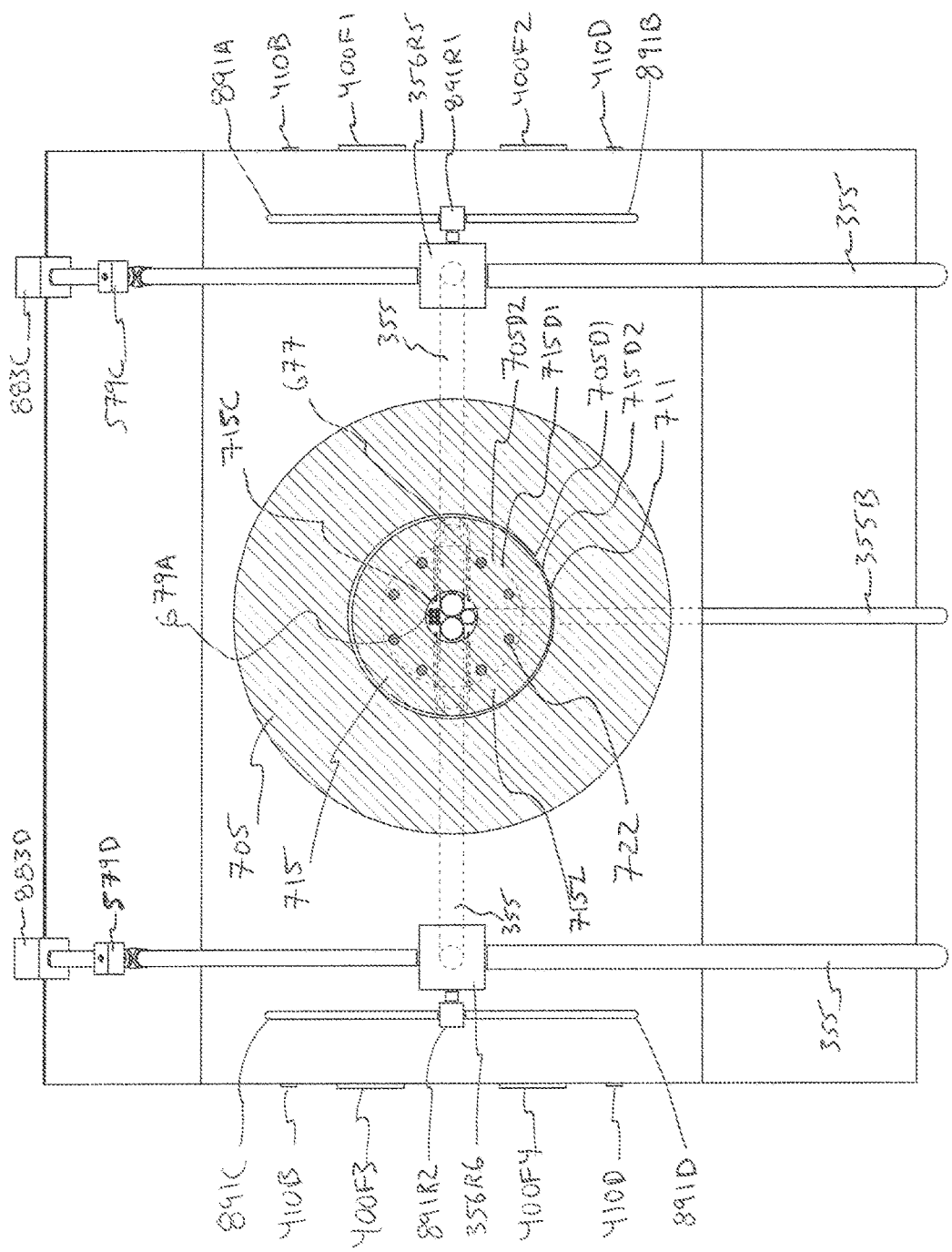
FIG. 5 shows a cross-sectional view taken along the E-E' axis of FIG. 4A, which shows a cross-sectional view of the connector.

FIG. 5, among other things that will be discussed later, should also make it easy to see how the first member 705 and second member 715 can rotate relative to the other, especially as the outer diameter 715D2 of the lip 715L of the second member 715 is quite evident in respect to the inner diameter 705D1 of the first member 705. In fact, this view enables a thin gap 711 between these two diameters 715D2, 705D1 to be easily seen. As well, one can see the fasteners 722 that secure the second member 715 to the assembly 200, and that how weight sensors 677 are positioned with respect to the lip 715L of the second member 715.

Components Relating to the Movable Weight's Movement

Figure 2A:
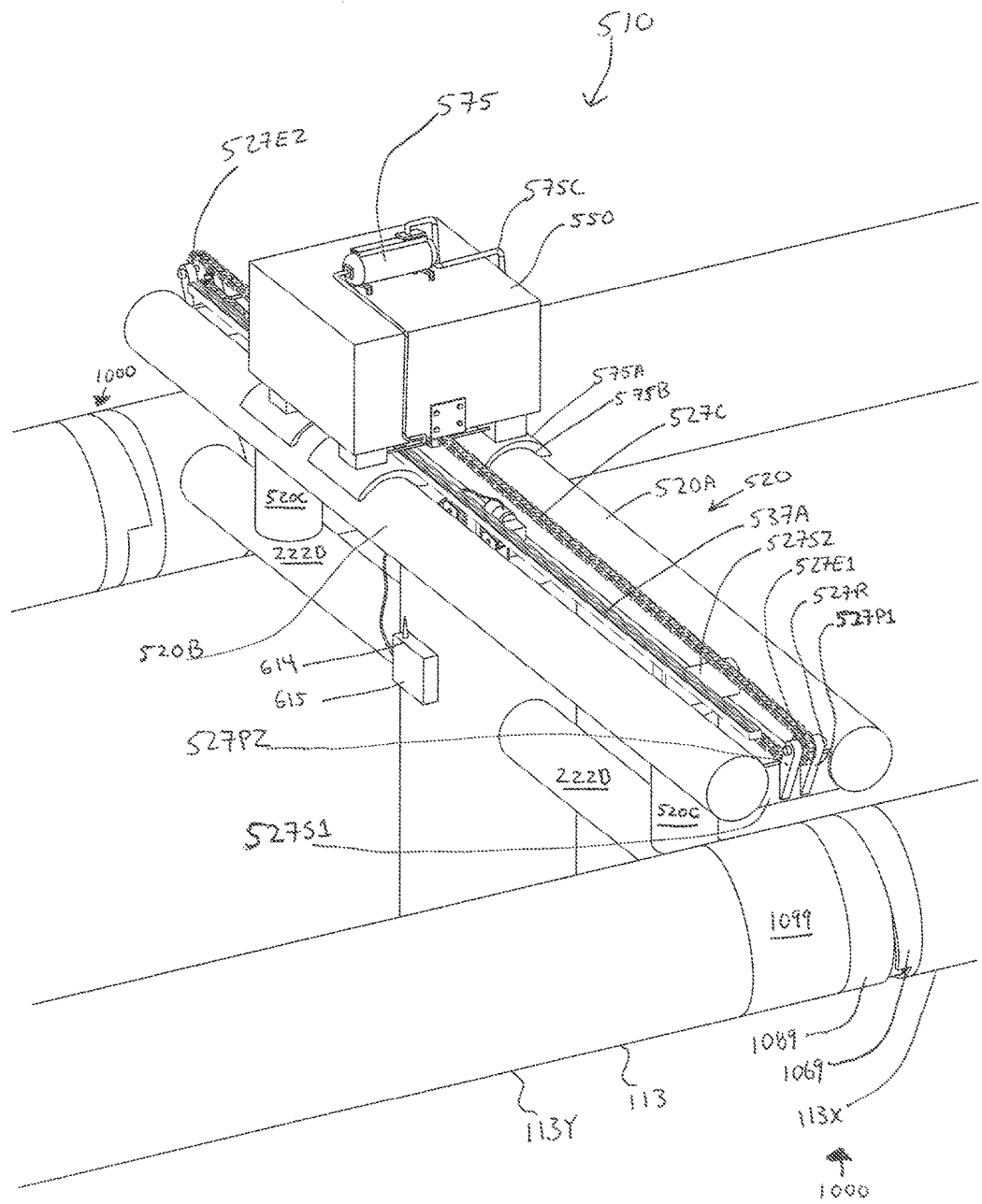
FIG. 2A shows a perspective view of at least portions the movable weight system of FIG. 1, among other things.

FIG. 2A shows a perspective closer view of various components of the movable weight system 510 of FIG. 1. Among other things, some of the components that can be easily seen here include the wireless communication device 614, the control portion 615 (discussed elsewhere herein), the movable weight 550, and the movable weight rail/track 520. Each of the two rails 520A, 520B that make up the rail/track 520 in this embodiment has a diameter of roughly 25-30 cm; though, those skilled in the art will readily appreciate various other shapes, materials, sizes, non-hollow alternatives, etc. and/or single-rail designs, are possible in alternative embodiments.

As is also easily seen in FIG. 2A, the movable weight's rail/track 520 is connected to the column 222. While this is done in one or more alternative ways in one or more alternative embodiments, here the connection is an indirect one—i.e., via (i) one or more member/beams 520C (e.g., of the same design as the movable weight rails/track 520, where there are two employed in FIG. 2A), (ii) one or more connections/members/beams 222D (e.g., of the same design as the movable weight rails/track 520) between the rail/track 113 and the column 222, and (iii) a member/beam 527S2 (e.g., of the same design as the movable weight rails/track 520) connected to with the movable rail/track 520 (which in this embodiment is between the two rails 520A, 520B). While in the FIG. 2A embodiment the movable weight rail/track 520 is also connected to each of the two rails 113A, 113B of the vehicle/cargo—albeit indirectly through the connection/member/beam 222D (in essence to take advantage of the connection 222D between the rail/track 113 and the column 222)—in one or more alternative embodiments the movable weight rail/track 520 is connected to the column 222 without also being (indirectly) connected to the rail/track 113 of the vehicle/cargo. Moreover, in one or more further alternative embodiments the movable weight rail/track 520 is connected to the column 222 via the rail/track 113.

Various other components related to the movable weight's movement relative to its rail/track 520 are seen in FIG. 2A, though some of these are even better seen in FIGS. 2C, 2B, and/or 2D, for example—and so will be discussed with respect to one or more of those Figures also or instead. For instance, also depicted in FIG. 2A is an air supply 575 (which is attached to the movable weight via a fastener 575F) and its connection 575C to a plurality of assemblies 575A, with which a plurality of movable weight's air bearings 575B are associated. Further, as easily seen in FIG. 2C, an electrical contact 537A that runs parallel to the movable weight's rails 520A, 520B, which as will be explained later, connects power to the air supply 575 via another electrical contact 573B via connection/pipe/wire 537B 1 associated with the movable weight. Even though this should be readily apparent, it will be noted that the track-like shape of the electrical contact 537A enables the two contacts 537A, 537B to remain in contact as the movable weight 550 moves along the rail/track 520. Moreover, the power associated with the air supply 575 and the moving of the movable weight 550 (e.g., via a motor 527) is via the three conducting channels 887A, 877B, 877C on the rail 113 (which connect to the power source connection 666).

In addition, in FIG. 2A one can see the motor 527, which is partially visible from under the track-shaped electrical contact 537A, as well as a chain 527C that is driven by the motor 527—via one or more sprockets/gears 527S seen more clearly in FIG. 2B—to move the movable weight 550. As can be seen in FIG. 2C, the chain 527C is connected to the movable weight 550 via a connection 529 (e.g., a member/rod 529) that is secured between two members 529J, 529K that are, in turn, fastened to the movable weight 550 via a fastener 529L (e.g., a plate and bolts/screws). Accordingly, the movable weight 550 in the FIG. 1 embodiment is able to be pulled, and in one or more embodiments is pulled, along the movable weight's rail/track 520 by the motor 527 via the chain 527C.

Before moving on with further discussion of components associated with the moving of the movable weight 550, it should be noted that there are various other ways to move the movable weight. Accordingly, it should be understood that one or more of such alternatives that will be readily appreciated by those skilled in the art will also be able to move the moveable weight 550—e.g., by pushing or pulling it, or a combination of both. It should be further understood from the discussion and Figures herein that one or more embodiments of the movable weight system 510 (such as shown in FIG. 1) not only moves the movable weight, but also accelerates and/or de-accelerates it, where the opposite of such force(s)—according to Newton's laws—is employed for counterbalancing purposes. While the patent applicant does not necessarily desire to be tied to any one specific way that such opposite forces are imparted on the column 222 (e.g., at point 222P), it is assumed that this occurs in one or more embodiments via the chain 527C, at least one of end sprockets 527E1, 527E2, a member/rod 527R that is connected between a pair of members 527P1, 571P2, and an element/plate 527S1—which (indirectly) connects the chain 527C to the column 222 via the movable weight's rail 520, the member/beam 520C, the connection/member/beam 222D between the rail/track 113 and the column 222, and the member/beam 527S2. Further, as also will be readily understood by those skilled in the art, de-acceleration would cause essentially the opposite effect.

Figure 2C:
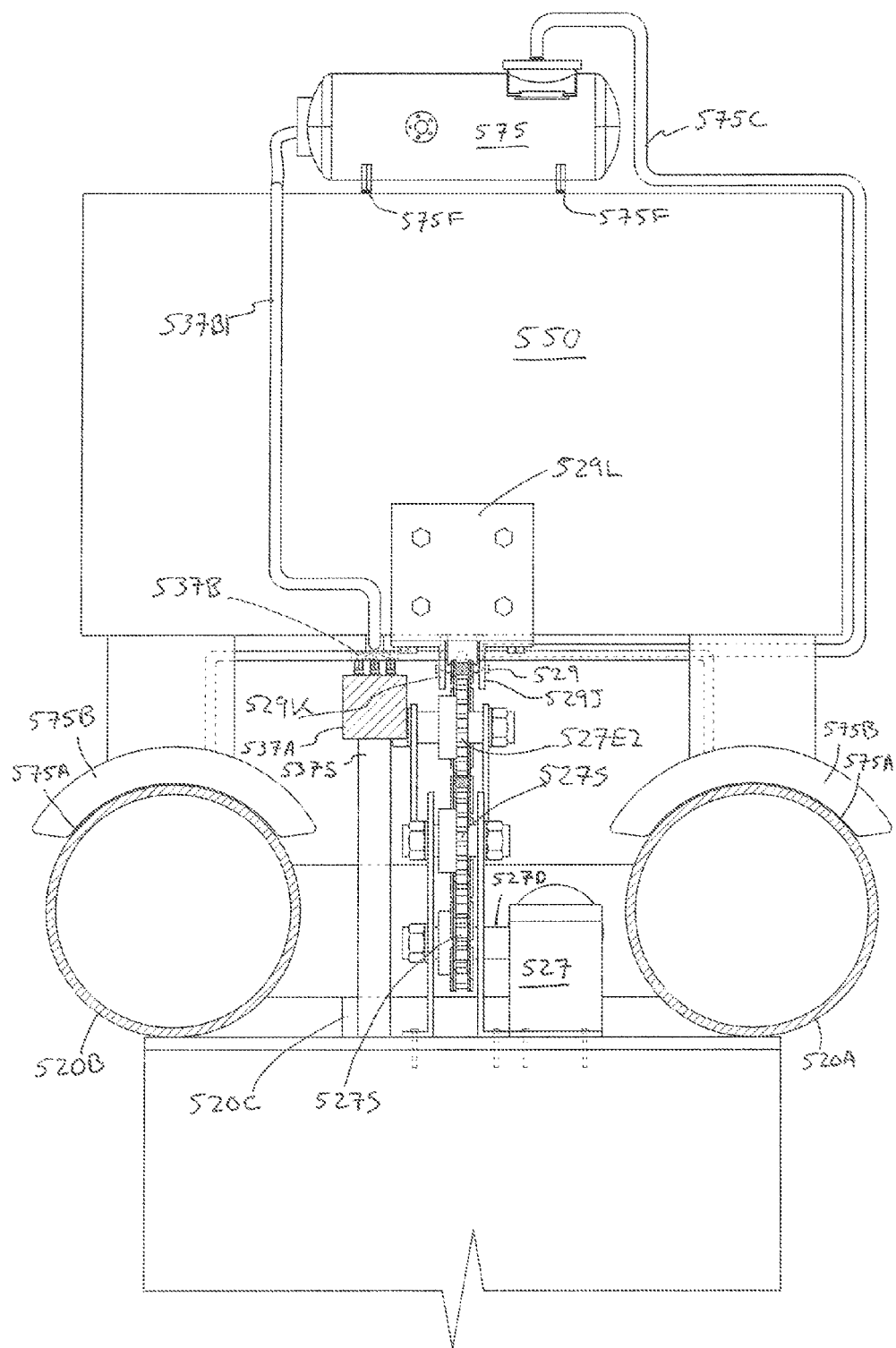
FIG. 2C shows a cross-sectional view taken along the C-C' axis of FIG. 2B, which depicts portions of the movable weight system.

FIG. 2C shows the C-C' view of FIG. 2B, where many of the visible components and relationships have been already discussed above and/or elsewhere, or will be readily apparent to those skilled in the art. That said, FIG. 2C provides a reasonably unobstructed view of the motor 527, a shaft 527D that connects the motor to at least one of its sprockets 527S, the electrical contacts 537A, 537B (discussed elsewhere), and a support member 537S that assists in keeping the contacts adjacent, among other components that were discussed elsewhere.

Figure 2D:
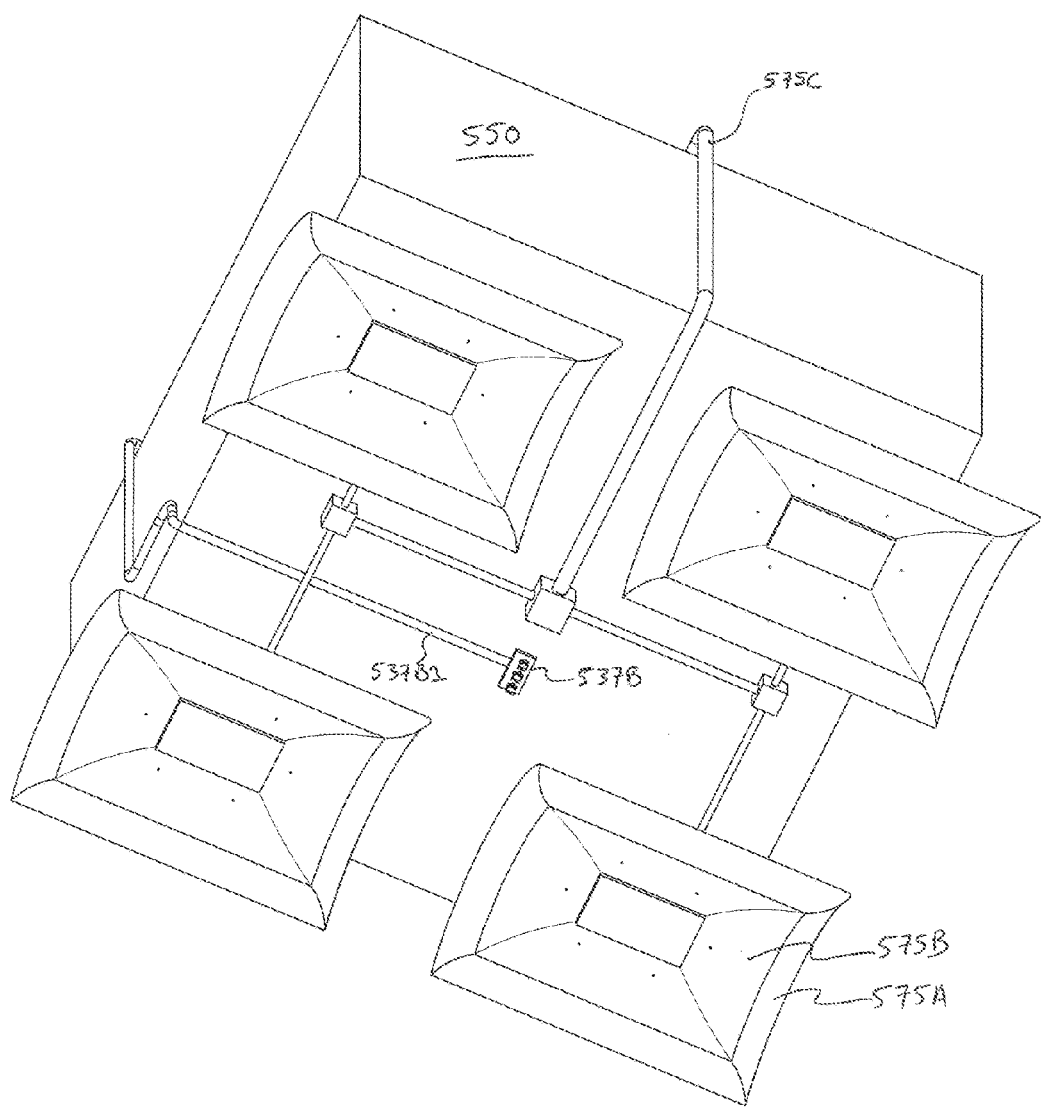
FIG. 2D shows a perspective view of a portion of the movable weight system.

FIG. 2D shows the 'underbelly' of the movable weight 550. Among other things, this view shows how the pipes 575C from the air supply source 575 above the movable weight 550 feed each of the air bearings 575B. Also, the electronic connection/contact 575B (shown attached to and under the movable weight) is also shown. As can be seen by the look of the movable weight air bearings 575B, they are quite similar to the air bearings 325 of the vehicle/cargo's assembly 200 discussed elsewhere in this document; thus, they will not be discussed here. It is worth mentioning that one or more alternative embodiments do not include the movable weight air bearings 575B, or just include a single movable weight air bearing 575B, or alternatively two movable weight air bearings 575B (rather than the four shown here). To be clear, one of the reasons the air bearings 575B are employed in the FIG. 1 embodiment is that they deliver a certain efficiency, due to their similarity with respect to vehicle/cargo's air bearings 325/assembly 200. As those skilled in the art will readily appreciate almost any component/device can be used that allows the movable weight 550 to be moved along one or more rails—e.g., one or more wheels, air (without the air bearing), a lubricant, etc.

The Power Supply

As depicted in FIG. 1, a power source connection 666 (i.e., a power supply box connected to a not-shown power supply) feeds the movable weight's 550 compressed air supply 575 so it can deliver air to the movable weight air bearings 585, and it also feeds the motor 527 so it can reposition and/or accelerate and/or de-accelerate the movable weight 550. Power flows via one or more wires (not shown) through the column 222 to these components 527, 575. In this embodiment, the power supply connection 666 also supplies power to the communication device 614 and control portion 615 via the wire(s). In one or more alternative embodiments their power is provided by other ways—e.g., a battery, solar panel, etc.

The Assembly, Air Bearing System, and Brake System

As can be seen from FIG. 1, in one or more embodiments the one or more (where here two are employed) assemblies 200 (i) at least assists in keeping the vehicle/cargo from directly touching the ground and/or (ii) at least assists in enabling the vehicle/cargo to be moved (and/or assists in moving the vehicle/cargo) relative to (and/or a path at least partially defined by) the track/rail 113—where both (i) and (ii) occur in FIG. 1. In somewhat rougher/looser language, this is at least partially accomplished in the FIG. 1 embodiment (but not all embodiments) by the assembly 200 enabling the monorail 100 to effectively 'hang' from the rail 113 (e.g., indirectly via the connector 700) without falling off and thus the movement of one means the movement of the other. In one or more (but not all) embodiments, the rail 113-assembly 200 relationship is at least partly reflective of the fact that associated with each assembly 200 is at least a portion of the air bearing system 300, which at least serves to form a lubrication zone 325L (e.g., a layer of air) between the rail 113 and the assembly 200—which is discussed in further detail elsewhere in this document. Moreover, in the FIG. 1 embodiment (but not all embodiments) a linear induction motor/'LIM' system 400, which is positioned with respect to the rail by and/or attached to the assembly 200, moves the assembly 200 and thus the monorail 100 moves relative to (e.g., along the path of) the rail 113—as also is discussed further elsewhere in this document. The assembly 200 is made of steel, but can be constructed from any number or various metals, fiberglass, and many more materials known to those skilled in the art.

Figure 9A:
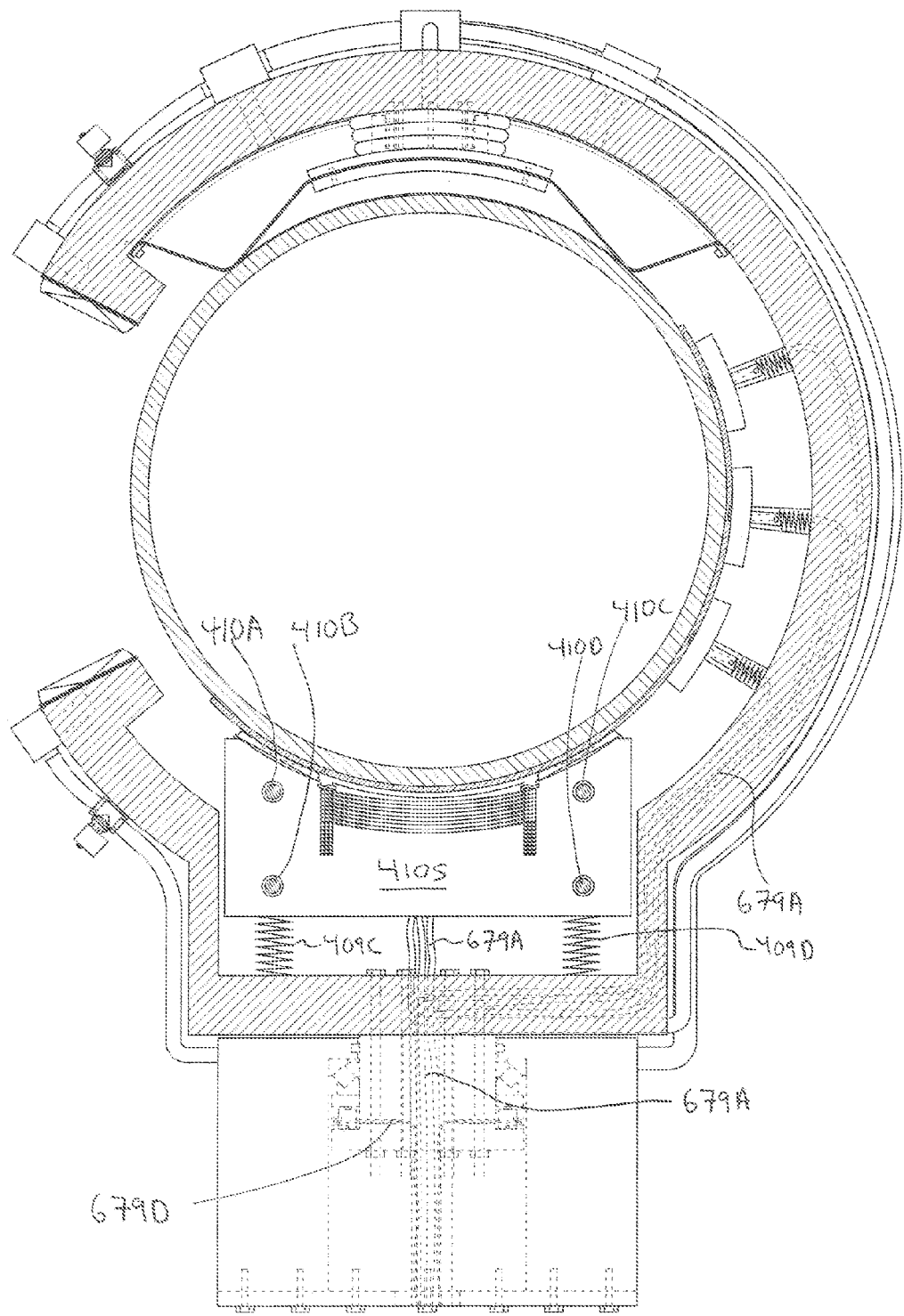
FIG. 9A shows a cross-sectional view taken along the B-B' axis of FIG. 4A.
Figure 15:
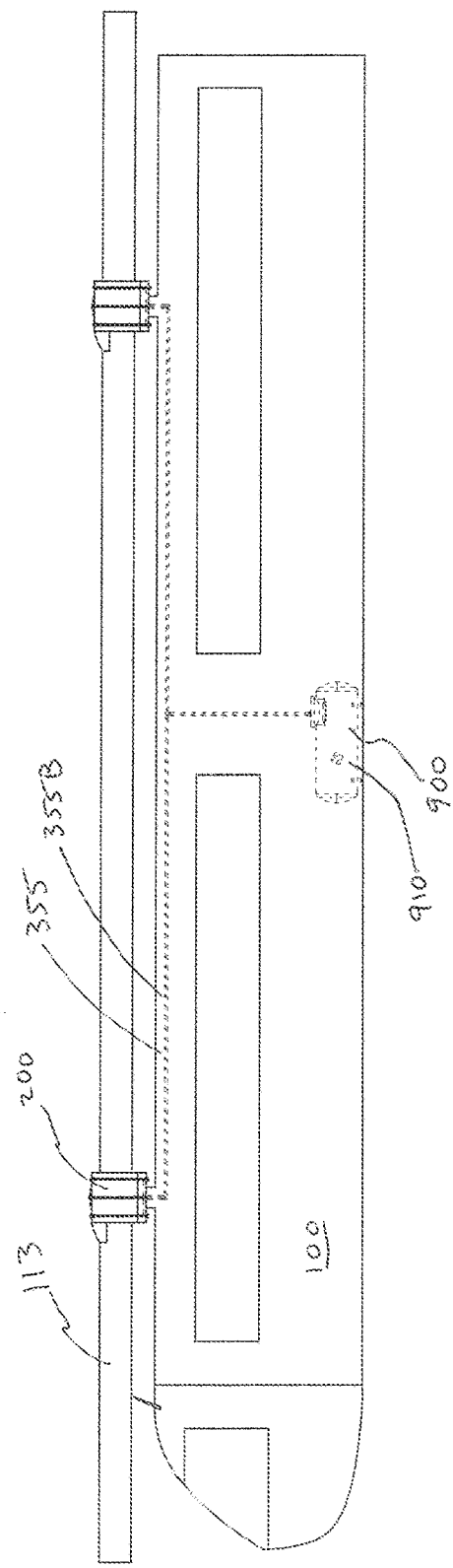
FIG. 15 shows the air supply in the monorail and some of the air pipes.
Figure 16:
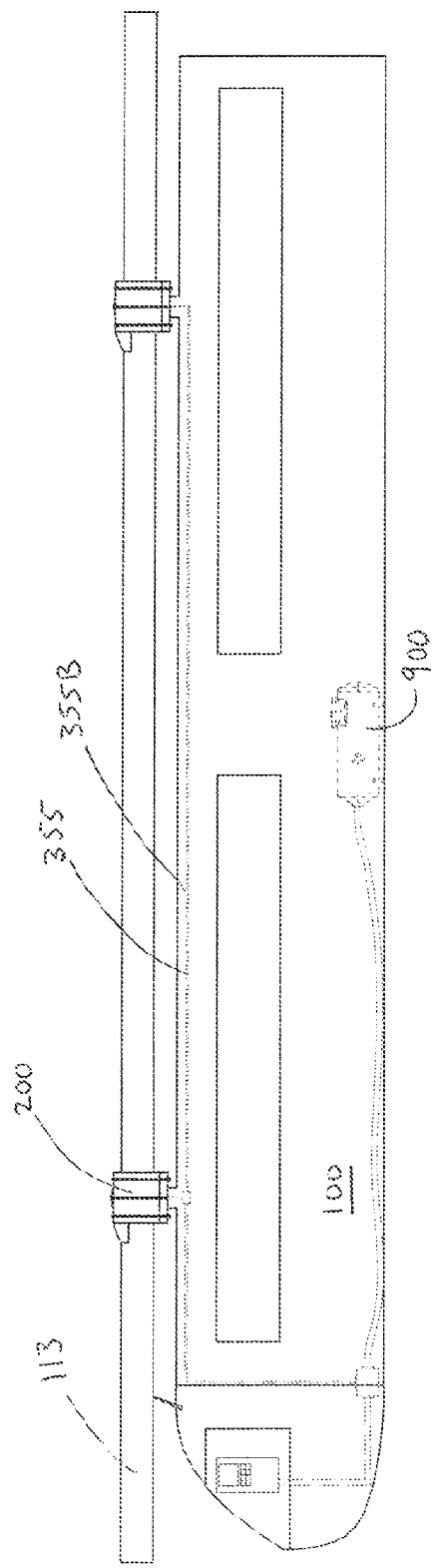
FIG. 16 shows a computer/control system associated with the monorail and some of the electrical connections related to it.

As was mentioned elsewhere, FIG. 15 shows how the air supply 900 associated with the monorail 100 is connected to the pipes 355, 355B that ultimately weave through and/or around the assembly 200 and supplies air to various components and systems. As can be seen (or at least is meant to be implied even if not shown or shown in full detail) in FIG. 16, each of the computer system 667 (which in one or more embodiments serves as a central control system, and in one or more embodiments is directable and/or programmable by a human) and the air supply (e.g., air compressor) 900 are connected through electrical connections/wire(s) 679A—a number of which are seen better in FIG. 9A. While these wires are not individually discussed herein it will be apparent that one or more of these serve a variety of functions related to powering one or more components and/or systems and/or transmission of data (e.g., information, instruction)—as will be readily appreciated by those skilled in the art—and thus they are all referenced generally as 679A. In any event, at least some of the connections 679A in FIG. 9A can be seen connecting to three brushes 888A, 888B, 888C and the LIM 400L. FIG. 9A also shows how the three brushes 888A, 888B, 888C are in contact with a current-carrying portion 877 of the rail 113—e.g., in the form three lines/strips of copper 877A, 877B, 877C, or alternatively another material that allows for the transmission of electricity—running along the rail 113, which is eventually connected to the a-power source connection 666 (e.g., through a wire/connection, not shown, running from these lines/wires 877A, 877B, 877C via (e.g., largely within) the column 222 to the power box 666). It will be readily appreciated by those skilled in the art that there are various ways to supply electric current/power to these components and/or systems in one or more alternative embodiments, and the document is not intended to be limited to those provided as examples/embodiments herein.

FIG. 3A shows a perspective view of one of the two assemblies 200 shown in FIG. 1. In one or more embodiments, the one or more assemblies 200 are positioned at least partially around at least one rail—e.g., rail 113A or 113B. Among other things, from this view a first (e.g., top) positioning air bearing 880A and a second (e.g., bottom) positioning air bearing 880B (which may be also referred to as 'lateral' air bearings herein, though in alternative embodiments they are not lateral with respect to assembly 200) can be easily seen. It is first important to emphasize that these are only included optionally in one or more embodiments; that is, they are not included, and in fact not needed, in many other embodiments, as will be explained. Second, they are referred to as positioning air bearings at least in part to distinguish them from one or more other air bearings discussed herein (e.g., the main air bearing 325). That said, their role is perhaps best appreciated with FIG. 14A and FIG. 14B in mind, where the former reflects the R-R' view of FIG. 4A as the assembly 200B of FIG. 1 (which has the same design as assembly 200A of FIG. 1) is facing the column 222 and thus support/member 222D is depicted as attached to the rail 113A; and, the latter is the exact same view except that it reflects an alternative embodiment that includes an element 222X between the support member 222D and the rail 113. As can be understood by imagining the assembly 200B of FIG. 4A facing the element 222X, a portion 222Y (as shown in FIG. 3A) of the assembly 200B and element 222X have, generally speaking, a groove-and-tongue relationship—where the 222X element is figuratively the tongue, and the portion 222Y of the assembly 200B is figuratively the groove. In other words, element 222X (e.g., its shape and/or size) serves to get the assembly 200B into a certain position and/or keep the assembly 200B in a certain position—e.g., a rotational position—(or alternatively a range of positions) with respect to the rail 113 via a portion 222Y of the assembly 200 that essentially mates with the element 222X. For instance, in one or more embodiments, it is desirable to keep the assembly 200 from significantly rolling relative to the rail 113, as that may cause the vehicle/cargo to move from a desired and/or natural orientation (e.g., roughly parallel to the rail 113, roughly perpendicular to the ground, and/or perpendicular to a platform/station, which is not shown in the Figures, etc.). In one or more embodiments, the element 222X has a shape and dimensions that are slightly smaller than the groove/slot/aperture/gap 222Y associated with the assembly 200—which is discussed elsewhere; however, in one or more embodiments (but not all) it enlarges from relatively smaller proportions until it reaches that size/dimensions to sort of 'ease' the monorail 100 into the desired alignment, as will be readily understood by those skilled in the art. Its length can be almost any length depending on the embodiment, but will normally be at least as long as the assembly 200 and often at least several times longer, as will be appreciated by those skilled in the art.

In light of the above, those skilled in the art should readily appreciate how the air bearings 880A, 880B, with their position on opposite sides of the groove/slot/aperture/gap 222Y associated with the assembly 200, serve to assist the assembly 200 in moving along the element 222X. Moreover, as will be described in more detail with respect to the main air bearing 325, the lateral/positioning air bearings have one or more features that are advantageous. Those and the structure/design of the positioning air bearings 880A, 880B will thus not be detailed extensively here since it will be readily apparent to those skilled in the art in light of the description and Figures herein with respect to the main air bearing 325. In other words, in many respects the positioning air bearings 880A, 880B are similar to the main air bearing 325 except for their shape and location. Also, while the lateral air bearings 880A, 880B do not have a brake system in one or more embodiments, in alternative embodiments they are adapted with a brake system 800 comparable to that of at least one embodiment of the main air bearing 325.

Before moving on, it should be noted that the relationship between the assembly portion 222Y and the element 222X is instead tongue-and-groove, rather than groove-and-tongue, in alternative embodiments—e.g., in one or more embodiments where the element 222X has a different design that enables a tongue-and-groove relationship and the lateral bearings have more of a 'tongue' design. It also should be noted that while in the FIG. 14B embodiment the element 222X is attached to rail 113 and the support 222D, and also between them, that another way of viewing/considering the design is that the element is part of the support 222D and/or part of the rail 113. Further, in one or more embodiments just one positioning air bearing 880A is employed.

Figure 14A:
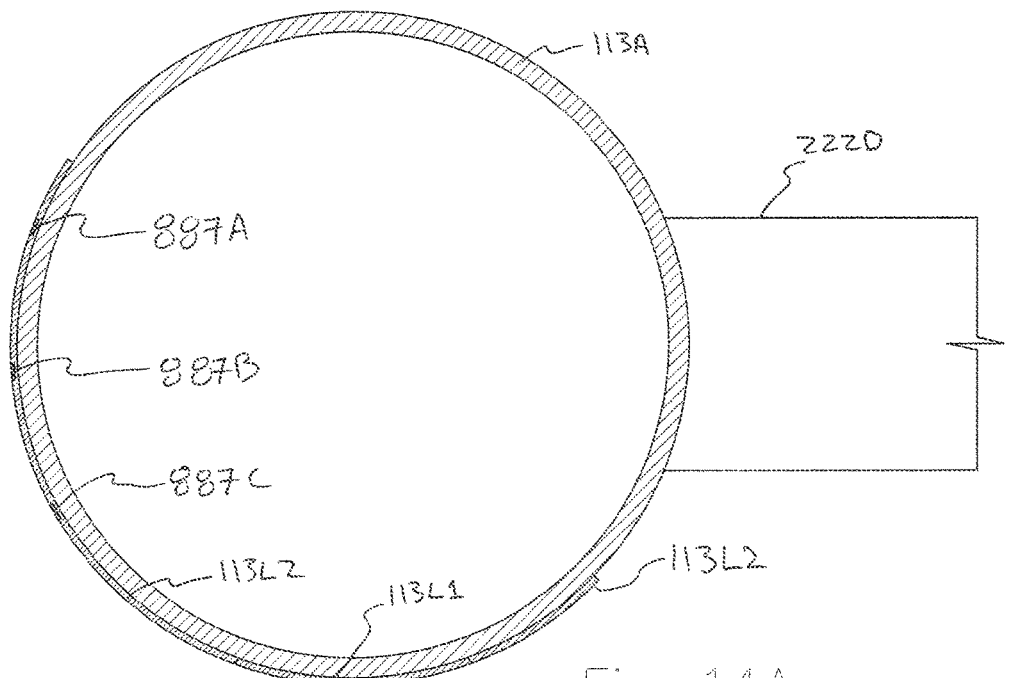
FIG. 14A shows a cross-sectional view taken along the R-R' axis of FIG. 4A, which depicts the rail connected to a support member.
Figure 14B:
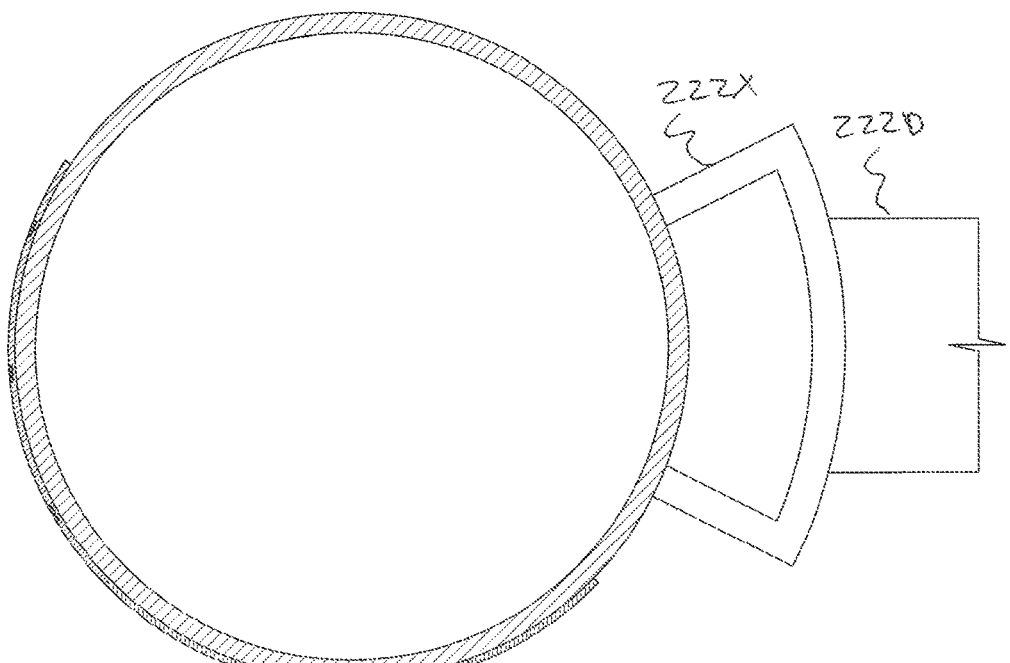
FIG. 14B depicts the same view as FIG. 14A but with an element described below.

In addition, FIG. 14A also shows how in one or more embodiments various portions (e.g., layers) of aluminum 113L1 and ferromagnetic material 113L2 optionally are included to increase performance of the LIM 400L (as will be appreciated by those skilled in the art). In one or more embodiments, the ferromagnetic material is cold rolled steel. Also visible are one or more wires—which are three 887A, 877B, 877C here—that carry current/power from the power source connection 666. It should be noted that the word 'wire(s)' is used a bit loosely in this context since a more precise description would probably include a continuous strip/layer/line/channel. Their relationship with the corresponding brushes 888A, 888B, 888C associated with the assembly 200 is discussed elsewhere.

Figure 6A:
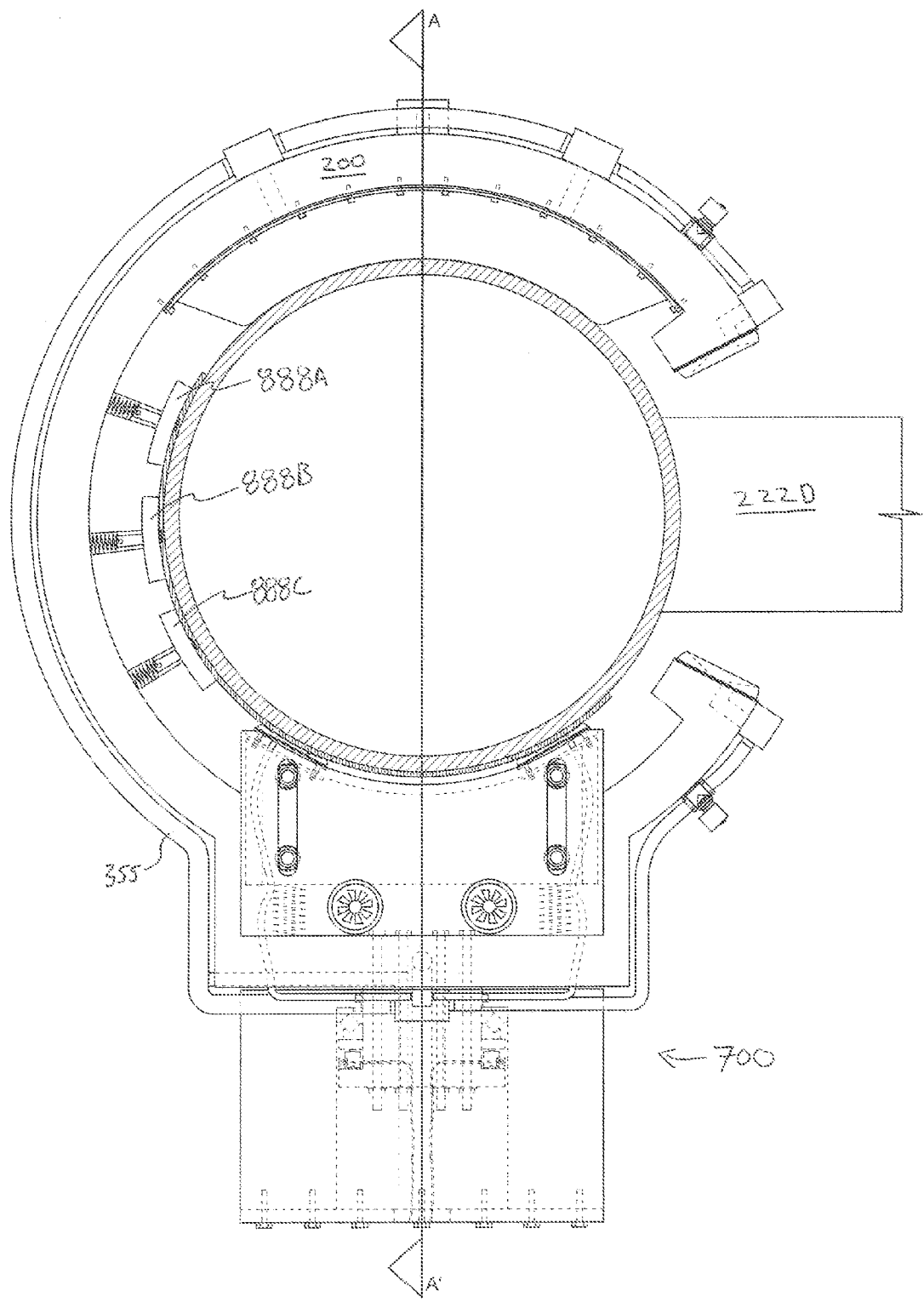
FIG. 6A shows a rear view of the assembly and connector, which is a cross-sectional view taken along the K-K' axis of FIG. 4A.
Figure 6B:
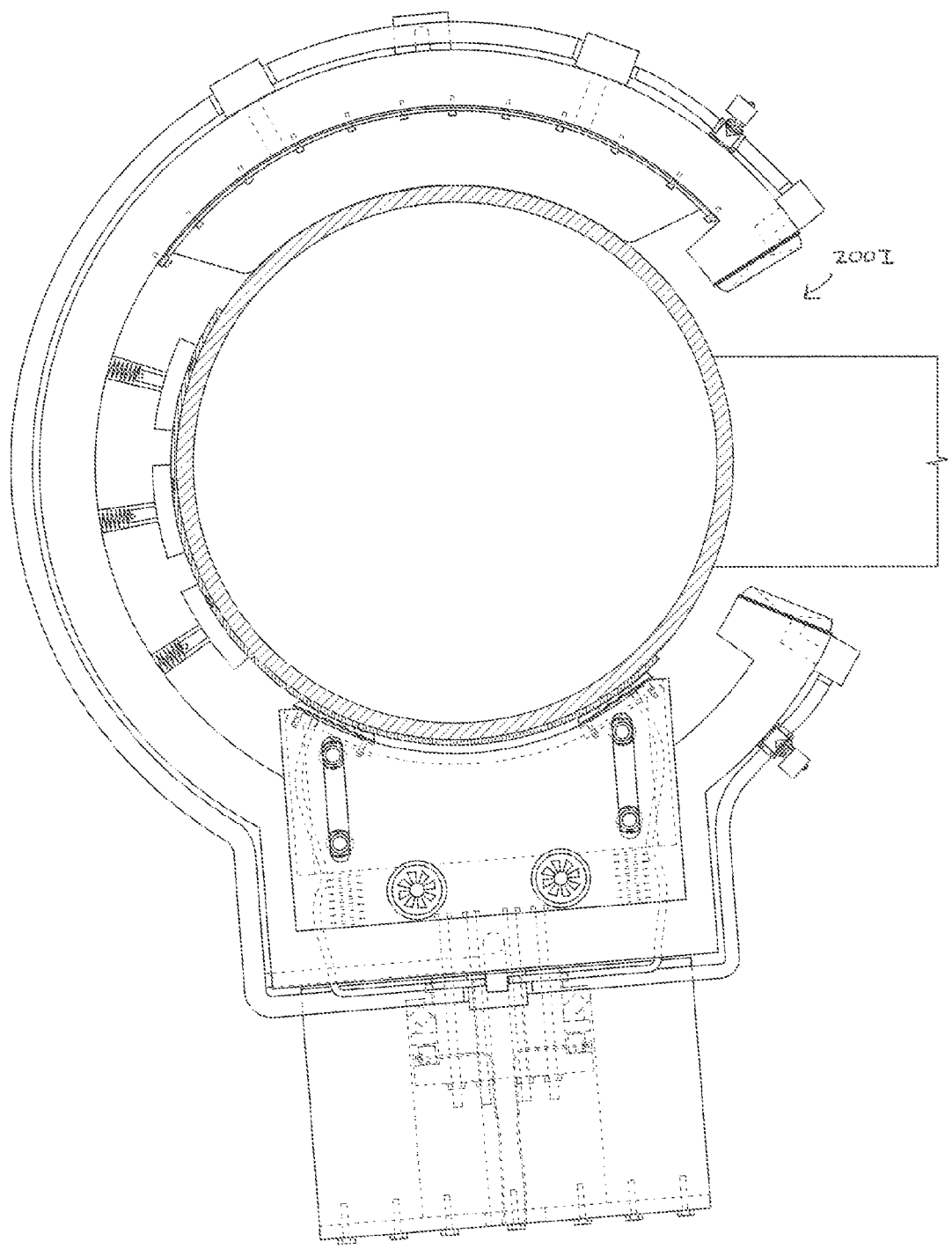
FIG. 6B shows the same view as FIG. 6A, but here the assembly is a bit rotated/tilted.

Also, this may be a helpful time to briefly discuss FIG. 6B. FIG. 6B depicts what is shown in FIG. 6A but where the assembly 200 is tilted. As discussed elsewhere, and as reflected in the 2 Examples/Charts herein, this is possible in one or more embodiments when the vehicle/cargo takes on certain curves at certain speeds, such as via centrifugal force, as will be readily appreciated by those skilled in the art. As one can see, an aperture 2001 associated with the assembly 200 enables the assembly 200 to move (e.g., rotate) relative to the rail 113 without hitting (or at least without hitting up to a certain degree of rotation) the structural component 222D that connects the rail 113 to the column 222. FIG. 6B provides a particularly good view of how the brushes 888A, 888B, 888C remain in contact with the wires 877A, 887B, 887C when the assembly moves/rotates (which is sometimes referred as 'tilt' herein). Once again, various other components/features depicted in FIG. 6B were discussed elsewhere, and thus will not be repeated here.

FIG. 3A depicts portions of the various pipe(s)/tube(s) 355 that connect the air supply 900 with one or more air bearings, as discussed elsewhere. In light of the discussion immediately above, it may be further helpful to point out the one or more portions (e.g., junctions) 883A, 883B, 883C, 883D of the pipes/tubes 355 that lead into the lateral air bearings 880A, 880B and various pressure release valves 579A, 579B, 579C, 579D. In addition, in one or more embodiments that include the brake system 800 (though not all do), the air supply 900 also feeds a tube system portion 335B associated with the brake system 800, as is the case here.

In FIG. 3A one can also see one or more front vents, such as one or more fans, though here two front ones 400F1, 400F2 are employed (and two rear ones are employed 400F3, 400F4, as seen in FIG. 3D, in a back cover portion 400C2) associated with a cover portion 400C1, which helps to at least partially enclose and/or protect the LIM and behind which the LIM 400L resides. As will be understood by those skilled in the art, the vent(s) 400F1, 400F2 are included in some (but not all) embodiments to allow ambient air to flow around the LIM 400L and out through the rear vent(s)/fan(s) 400F3, 400F4 (not seen in FIG. 3A) and thereby help keep the LIM 'comfortable' temperature-wise (e.g., not too hot that it significantly impedes its ability to function).

Also visible in FIG. 3A are three of the four respective front ends of each of the four rods 410A, 410B, 410C, 410D that weave through the LIM 400L (as better seen in other Figures), where these are poking out through a pair of cavities/apertures 415A, 415B of the cover portion 400C1. As will be apparent from this Figure and others, the one or more cavities/apertures 415A, 415B allow the rods 410A, 410B, 410C, 410D—and thus the LIM 400L—to move a bit, e.g., tilt (e.g., forward and/or backwards, etc.), as will be explained in more detail later.

Further, the wind deflector 1200 attached to the assembly 200 can also be seen in FIG. 3A. This is included in some, but not all, embodiments to reduce the wind pressure on certain portions of the assembly 200, such as the main air bearing 325 in one or more (but not all) embodiments, as the vehicle/cargo moves along the rail/track 113. FIG. 19 is a close-up view of the wind deflector.

Figure 3C:
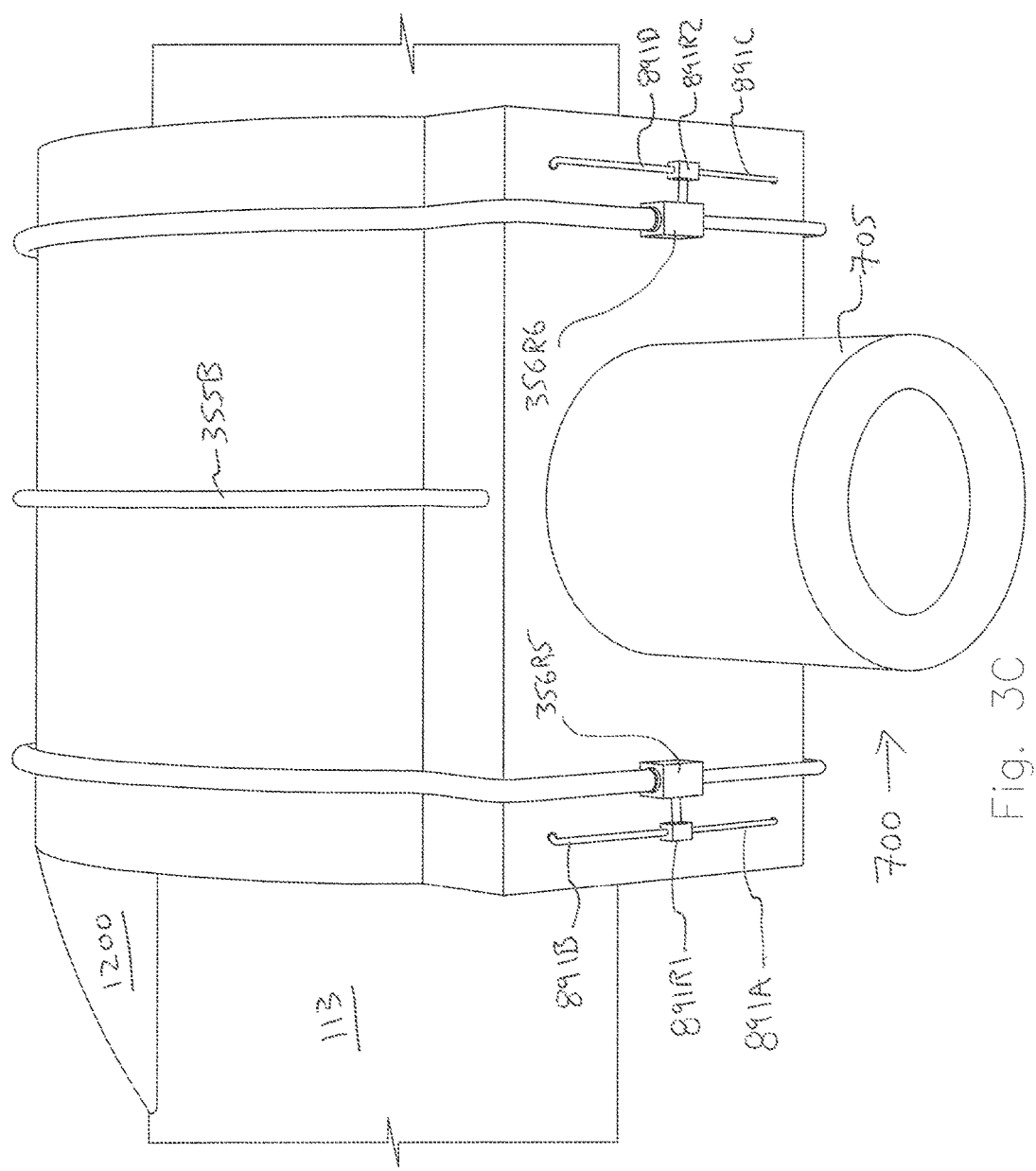
FIG. 3C shows another perspective view of the assembly shown in FIG. 3A.

FIG. 3B shows another perspective view of the assembly 200, among other things; and, it essentially reflects what is shown in FIG. 3A from another angle/perspective, i.e., from more-or-less an opposite side compared to FIG. 3A. Similarly, FIG. 3C shows yet another perspective view of the assembly 200, but the angle/perspective here reveals the underside of the assembly 200. As can be seen in FIG. 3C, there are the two air pipe(s)/system 355 used to feed each of four LIM air bearings 450L1, 450L2, 450L3, 450L4 of the four followers 449A, 449B, 449C, 449D of the LIM 400L (which are not visible in FIG. 3C but will all be more clearly seen in other figures), as well as the main air bearing 325 and the two lateral bearings 880A, 880B (which are seen in other Figures). Even more specifically, the Figure shows the plurality of portions 891A, 891B, 891, 891D of the pipe system 355 that connect with each of these four LIM air bearings 450L1, 450L2, 450L3, 450L4 (which can't be seen here), as well as a pair of regulators 365R5, 365R6 and a pair of junctions 891R1, 891R2 (which are also regulators in one or more embodiments). One can also see the pipe 355B that connects the air supply 900 to the brake system 800. Finally, one can also see the connector 700 quite prominently as well, and even more specifically the first/outer member 705 of the connector (without its attachment to the monorail, and thus without any fasteners/bolts/screws).

FIG. 3D's top view of the assembly 200 (without the rail/track 113 and the wind deflector 1200) provides a clear view of one or more various air regulators employed. In this embodiment, four 356R1, 356R2, 356R3, 356R4 are associated with the main air bearing system 300 and one (or alternatively more) air regulator 887R is associated with the brake system 800. Also, the regulators 883A, 883B associated with one the lateral/positioning air bearings 880A are also seen in this view. In addition, peaking out from its sides are the vents/fans 400F1, 400F2, 400F3, 400F4 and some of the rods (e.g., 410A, 410C) of the LIM 400L.

FIGS. 4A and 4B show side views of the assembly 200, connector 700, wind deflector 1200, and rail 113A. The fact that various components located behind others are also depicted—i.e., with dashed lines—should make their respective operation and/or relationship(s) to other components, systems, and/or the rail 113A readily evident. For example, FIG. 4A shows the main air bearing's 325 shape/curve relative to the shape/curve of the rail 113A in this embodiment; or, more generally, how in one or more (but not all) embodiments the main bearing 325 has a shape that at least partially mirrors that of the rail 113. As also is seen here, the same can more or less can be said with respect to the LIM 400L and its followers 449A, 449B, 449C, 449D. Since a number of components in FIG. 4A have been discussed above and/or will be discussed later, that discussion will not be repeated here with respect to FIG. 4A.

FIG. 5 shows the E-E' view of FIG. 4A, and is discussed elsewhere in this document particularly with respect to the design of the connector 700. However, this Figure also shows how at least in this embodiment (but not all) the air pipes 355, 355B (discussed in other Figures) are weaved through the connector 700, and particularly through the cavity 715C of the second/inner member 715. It will be apparent to those skilled in the art that alternative embodiments accomplish various air-related needs—e.g., in some cases depending on how many bearings are employed and/or if the brake system 800 is included—with more or fewer pipes, more or fewer regulators, and/or more or fewer pressure release valves. Other items that can be seen here include end portions of two of the rods 410D, 410B (that weave through the LIM 400L), as well as portions of the vents/fans 400F1, 400F2, 400F3, 400F4—which are all sort of peaking out from behind the assembly 200.

FIG. 6A is a rear view of the assembly 200 and connector 700. Among other things, this view makes clear how the rear of the bearing 325 appears relative to the rail 113A, and how the air tubes 355 feed into each LIM bearing (such as 450L3, 450L4), which are discussed elsewhere in this document. Since many of the components shown in FIG. 6A are discussed elsewhere in this document they will not be discussed here.

FIG. 7A shows the A-A' view of FIG. 6A. Since many of the components shown in FIG. 7A have already been discussed above and elsewhere, they will also not be discussed here. Moreover, since FIG. 7B is a close up view of a portion of FIG. 7A various topics are discussed with reference to FIG. 7B instead since it allows for easier viewing of some of the various components depicted in FIG. 7A. Among other things, FIG. 7B shows a close-up view of the air bearing 325 and its relationship to the rail 113A. It also provides a good view of at least a portion of the brake system 800, especially when FIG. 7B is considered in view of FIG. 7C—which depicts the brake system 800 in action, as will be discussed later. With that in mind, the discussion immediately below will largely focus on the air bearing 325, the role(s) of air with respect to the main bearing 325, and one or more characteristics of the main bearing—such as its compliance/flexibility and/or resilience. That is, in one or more embodiments, the bearing 325 is not just compliant/flexible, but it is both compliant/flexible and resilient—i.e., it deforms/undergoes deflection and returns to its at least substantially previous (i.e., before the deformation/deflection) shape, or alternatively becomes a shape similar to its previous shape, or alternatively a shape that is less deformed/deflected than its deformed/deflected shape, or alternatively a different shape that is different than the deflected/deformed shape.

(i) The Flow of Air into the Air Bearing and Some Alternative Bearing Embodiments For example, one can see from FIG. 7B how air (e.g., such as pressurized air from the air supply 900) flows into an area/cavity/chamber 325C via one or more of the air tubes 355. In one or more embodiments (such as the FIG. 7A/B embodiment), the air-fillable (and/or air-filled) cavity 325C is between the bearing 325 and the assembly 200. In one or more embodiments (such as the FIG. 7A/B embodiment), the chamber/cavity 325C is at least partially defined by the air bearing 325. In one or more embodiments (such as the FIG. 7A/B embodiment), the chamber/cavity 325C is at least partially defined by the air bearing 325 and the assembly 200. In one or more embodiments (such as the FIG. 7A/B embodiment), the air-fillable (and/or air-filled) cavity 325C is between an inner surface 325X of the bearing 325C and an inner surface 200S of the assembly 200; and, in one or more (but not all) such embodiments the chamber/cavity 325C is at least partially defined by the inner surface 325X of the bearing 325C and the inner surface 200S of the assembly 200. And, in one of more alternative embodiments, the cavity 325C is defined only by the bearing 325.

It should also be pointed out that in one or more embodiments (but not all) that include a brake system 800—e.g., like FIG. 7A/B—that a portion of the brake system 800 (e.g., a cuff 839 and/or a plate 813, which are described below) also defines part of the cavity 325C. However, it should be noted that while a portion of the cavity 325C is shown to be directly above the brake pad 810 in the FIG. 7B embodiment, a portion of the cavity 325C will not be directly above the brake pad 810 in various alternative embodiments—e.g., where the cuff 839 (e.g., in embodiments that include the brake system 800) and/or some other component (not shown) covers this area.

In one or more alternative embodiments, the cavity 325C is not defined by the assembly 200—e.g., the bearing 325 defines the whole cavity 325C, and/or another component (not shown) is between the air bearing 325 and the assembly 200 (e.g., engaged with or attached to the assembly) and defines part of the cavity instead of the assembly 200. For example, one such alternative includes a plate or ring (not shown) that is connectable/attachable to the assembly 200 (e.g., via a slot or another way that would be recognized by those skilled in the art) that when engaged/attached enables the cavity 325C between it and the bearing 325, to which is attached, to fill with air (e.g., via an air passage through the plate or ring). In one or more alternative embodiments, the air bearing 325 is thus indirectly attached to the assembly 200, instead of being directly attached as in FIG. 7B.

In light of the above, one should be able to readily appreciate how the flow of air into the cavity 325C in one or more (but not all) embodiments results in the main air bearing 325 becoming at least substantially inflated (i.e., filled with air), and how in some (but not all) embodiments the bearing 325 also becomes a bit distended (e.g., as a result of air pressure and the material of which the air bearing 325 is made). In fact, this is what occurs in the FIG. 7A/B embodiment, even though the shape of the air bearing 325 is not depicted here to indicate such distention. Also, one should be able to readily appreciate how the flow of air into the cavity 325C—e.g. its inflation—in one or more (but not all) embodiments serves to at least assist in moving (e.g., lift) a portion (e.g., upper portion 200U) of the assembly away from the rail 113, as it does in FIG. 7A/B. Moreover, in one or more embodiments (but not all)—such as the FIG. 7A/B embodiment—the flow of air into the cavity 325C—e.g. its inflation—also serves to move (e.g., lift) a portion (e.g., a lower portion 200L) of the assembly 200 towards the rail 113. In one or more embodiments (but not all), such as the FIG. 7A/B embodiment, the flow of air into the cavity 325C—e.g. its inflation—serves to at least assist in moving the LIM system 400, or at least the LIM 400L, towards the rail 113 (where, as discussed elsewhere, the springs 409A, 409B, 409C, 409D (and/or gears) associated with the followers 449A, 449B, 449C, 449D and/or LIM air bearings 450L1, 450L2, 450L3, 450L4 also play a role in properly positioning the LIM 400L relative to the rail 113). In the FIG. 7A embodiment (though not the case in all embodiments), it is the movement of the assembly portion (e.g., the lower portion 200L)—e.g., closer to and/or further from the rail 113A—that causes the LIM system 400, or at least the LIM 400L, to move relative to the rail 113A—e.g., closer to and/or further from the rail 113A.

(ii) The Composition of the Air Bearing and Some Alternative Embodiments

As discussed in other portions of this document, in some embodiments like the one depicted in FIG. 7A/B, the air bearing 325 not only derives its compliant and/or resilient characteristics from being filled with air (or alternatively one or more of the alternatives mentioned below) but in one or more (but not all) embodiments it also relates to the fact that the bearing 325 is made of an at least compliant material; and in some embodiments the material is both compliant and at least partially (or alternatively fully) resilient. For example, without intending to be limiting in any way, the material can be partially or fully comprised of reinforced neoprene, urethane, and/or polypropylene; though, it will be readily understood to those skilled in the art that other materials can achieve some, or all, of these or sufficiently similar or otherwise suitable characteristics. It should also be pointed out that the shape of the air bearing 325 depicted in the view of FIG. 7A (e.g., which appears a bit triangular, for example) is not meant to be an exact reflection of what the bearing 325 looks like when it is filled/inflated. While in one or more embodiments the air bearing could conceivably have a shape quite reflective of the one in FIG. 7A, in one or more embodiments where the bearing 325 is made of a compliant/flexible material it is assumed the bearing will appear a bit more swollen and/or rounded—e.g., especially between the lubrication zone 325L and the brake pad 810, for example. While in one or more embodiments it is also desirable to construct the air bearing 325 out of a relatively sturdy material, particularly in portions adjacent to the lubrication zone 325L, not too much wear-and-tear is expected in normal use—e.g., since contact with the rail 113 is not expected to be frequent.

In one or further alternatives the air bearing is prefilled with air or alternatively filled or prefilled with another gas(es), or alternatively a liquid, or alternatively a gel, or alternatively a material or combination of materials like cotton, soft plastic pebbles, or alternatively is a compliant solid or composition, etc.). In one or more, but not all, of such embodiments, the air flows directly into the plenum region 325P described below. On a related note, it should also be mentioned in respect to at least most, if not all, references to the flow of air in this document that one or more other gasses can be used instead of air; and, even a liquid can be used in one or more embodiments (though that may not always be the most practical alternative), as will be readily appreciated by those skilled in the art.

It also should be noted that while a number of the embodiments discussed and/or depicted herein refer to the assembly 200 having one plenum 325P and/or one air bearing 325, etc., in one or more embodiments there are two or more air bearing-plenum relationships associated with the assembly. For example, instead of having one air bearing of the size depicted in the FIG. 7A/B embodiment, two smaller sized ones are associated with the assembly instead. For example, in one alternative embodiment, two are placed next to each other, where their width (relative to the width of the rail 113A) is at least roughly the same as the bearing 325 shown in the FIG. 7A/B embodiment and each of their respective lengths (relative to the length of the rail) are each at least roughly half (or a little less than half) of the length of the bearing 325 the FIG. 7A/B embodiment.

(iii) The Plenum and the Lubrication Zone

As also seen in FIG. 7B, in one or more (but not all) embodiments at least some of the air in the cavity 325C is able to exit the cavity 325C via one or more passageways—e.g., the two holes 325H1, 325H2 of the air bearing 325 depicted in FIG. 7A (though other Figures will depict many more such holes/passageways)—and the exited air enters the plenum region 325P. (However, it should be noted that in one or more alternative embodiments air fills the cavity 325C and plenum 325P separately and/or the air in one does not flow into the other, and the hole(s)/passageway(s) is thus not needed.) In one or more embodiments the plenum 325P is at least partially defined by (i) at least an outer surface portion 325Y (i.e., at least a part/portion of the outer surface) of the air bearing 325 and/or (ii) the rail 113A—where both define the plenum 325P in the FIG. 7A/B embodiment. In addition to both (i) and (ii), or (i) or (ii), in one or more embodiments that include the braking system 800, but not all, the plenum 325P is also at least partially defined by one or more portions of the brake system 800, such as a brake pad(s) 810—which is what occurs in the FIG. 7A/B embodiment.

In one or more embodiments, such as that of FIG. 7A/B/C, (a) at least a portion 325S of the air bearing 325 (e.g., a portion 325S of its outer surface) touches the rail and/or (b) air (e.g., which has exited the cavity 325C and is) in the plenum 325P is not able to exit/escape (or at least substantially exit/escape) between the bearing 325 (e.g., the touching portion 325S of the bearing 325) and the rail 113A—where both occur in the FIG. 7A/B/C embodiment—until air pressure in the plenum 325P is large enough/sufficient. In one or more embodiments (but not all) the air pressure in the plenum 325P that is large enough/sufficient in this regard means that (1) the touching portion 325S of the bearing 325 no longer touches the rail 113B; (2) an air layer 325L—often referred to as a lubrication zone 325L in this document—flows from the plenum 325P and between the bearing 325 and the rail 113; and/or (3) the air pressure in the plenum 325P is at least equal or greater (e.g., at least slightly greater) than a load (e.g., of the weight of the vehicle/cargo or alternatively including the weight of the vehicle/cargo) on the bearing 325 divided by the effective area of the bearing 325 (where effective area will be readily understood by those skilled in the art in this context). In one or more embodiments, like the FIG. 7A/B/C embodiment, all three conditions are met, and all three are met more-or-less simultaneously. In fact, in the FIG. 7A/B/C embodiment it is believed that when the pressure in the plenum 325P becomes equal or greater than the load (e.g., that at least includes, or is, the vehicle/cargo) divided by the effective bearing area, that that causes the bearing portion 325S to no longer touch the rail 113A, and the lubrication zone 325L forms as a result. (In one or more embodiments, but not all, the flow of air into the plenum 325P also serves to at least assist in moving (e.g., lift) the brake pad 810 away from, and in some embodiments also off of, the rail 113—which is also believed to occur in the FIG. 7A/B/C embodiment; and, in one or more but not all embodiments, the flow of air into the plenum 325P also helps the lifting/moving that the main air bearing 325 does with respect to the upper 200U and lower 200L portions of the assembly 200, which was described elsewhere in this document.) Moreover, it is worth emphasizing that in one or more (but not all) embodiments, at least a portion (or alternatively all) of the air bearing portion 325Y that at least partially defines the plenum 325P does not include the touching portion 325S of the bearing (which, as described above, ceases to touch the rail under one or more conditions); in one or more other embodiments it is included.

In light of the above, in one or more (but not all) embodiments the pressure and/or amount of air pumped into the cavity 325C and/or indirectly into the plenum 325P (from the cavity 325C) is based on the weight of the vehicle/cargo; and, in one or more embodiments the air pressure pumped into the cavity 325C and/or into the plenum 325P (from the cavity 325C) is adjusted in response to one or more changes in weight of the cargo/vehicle (e.g., resulting from the adding or subtracting of passengers 100C or other 'cargo' 100C). Accordingly, in one or more (but not all) embodiments, data associated with the weight sensor 677 and/or one or more other sensors (e.g., visual, motion, and/or heat, etc., which is/are not shown) mentioned herein is employed in one or both regards. For instance, in one or more embodiments, data from the weight sensor 677 is received by the computer system 667 (of the vehicle/cargo), and the air supply 900 and/or one or more of the regulators associated with the air supply 900 is instructed accordingly—e.g., to increase and/or reduce pressure. In other embodiments, weight information may be sent directly to the air supply source 900 and/or the one or more associated regulators without going through the computer system 667, for example.

Accordingly, in one or more embodiments the air in the plenum 325P is able to (and does) travel out of the plenum 325P via the 'lubrication zone' (of air) 325L. In one or more embodiments the height of the lubrication zone (i.e., distance between the portion 325S and the rail 113) created between the bearing 325 and rail 113 is as small as possible. In fact, in some embodiments, the thin lubrication zone 325L that can consistently (or at least mostly) be maintained during certain conditions will be as low as 0.001 to 0.002 inches, as discussed further below; though other ranges occur in one or more embodiments, as explained below. (It thus may be helpful to note that the lubrication zone 325L is intentionally not 'visible', such as by a noticeable gap, in FIG. 7B since it is depicted as very thin there and in many other Figures; but, there should be no doubt that it is between the bearing 325 and the rail 113A, for example as in FIG. 7A/B/C.) Moreover, in one or more embodiments, such as FIG. 7A/B/C, the lubrication zone 130 enables the bearing 325 (and thus the assembly 200) to move relative to the rail in any non-restricted direction (though one or more factors will also play a role in this regard in one or more embodiments, as will be readily appreciated by those skilled in the art—e.g., rotation of the bearing 325 relative to the rail 113 may be, practically speaking, limited to some extent by the weight and/or position of the vehicle/cargo).

Before moving further, a bit more will be said about the lubrication zone 325L. First, in one or more embodiments the lubrication zone 325L functions sort of like a relief valve. That is, since the height of the lubrication zone (i.e., distance between the bearing 325 and rail 113 in the lubrication zone 325L) can increase to relieve excess pressure in the plenum 325P, in one or more embodiments the relatively equal pressure in the plenum 325P and bearing cavity 325C are determined by the load and effective area of the bearing 325. In other words, if the pressure in the pressurized zone were to be increased beyond the height of the gap/lubrication zone 325L, it would increase and thereby allow more air to escape the plenum 325P. Accordingly, the gap acts like a relief valve that tends, in one or more but not all embodiments, to maintain the appropriate pressure in the bearing cavity 325C and plenum 325P.

Second, in one or more embodiments, the lubrication zone is self-regulating. As air escapes the plenum 325 and enters the lubrication zone, it is believed that its velocity increases but, as a result of the commonly understood Bernoulli principles, or Venturi effect, a bearing portion that at least partially defines the lubrication zone 325L—e.g., the portion 325S of the bearing 325 that was touching the rail 113 immediately prior to the creation of the lubrication zone 325L—is drawn closer to the rail 113B. In other words, assuming the pressure in the plenum 325P remains relatively constant, the height of the lubrication zone/gap 325L thus will remain relatively constant; thus, the lubrication is self-regulating in this way. Thus, assuming the pressure in the plenum 325P is roughly equal to (or slightly larger than) the load (e.g., of the vehicle/cargo) divided by the effective area of the bearing 325, the height along the (e.g., entire) lubrication zone 325L will be quite small.

Third, in one or more embodiments the self-regulating nature of the lubrication zone 325L also exists when the rail 113 is not straight—e.g., undulated and/or curved (and/or is sloping, such as inclined or declined, and/or is angled). And, another way of describing the self-regulating and/or adjustable nature of the lubrication zone 325L is the air bearing 325 (e.g., the surface portion of the bearing 325 that at least partially defines the lubrication zone 325L) is self-regulating and/or adjustable in terms of maintaining a consistently thin lubrication zone 325L—not only in relatively straight sections of the rail 113 but also in non-straight sections of the rail 113. As will be discussed further elsewhere, in one or more embodiments this relates to the complaint and/or resilient nature of the air bearing (e.g., its material and/or the fact that it is filled with air/gas). Moreover, the compliant and/or resilient nature of the air bearing 325 (e.g., the surface of the bearing 325 that at least partially defines the lubrication zone 325L) enables it to withdraw slightly in response to certain sized obstacles and/or partially fill in (or at least move towards) depressions on the rail's 113 surface, i.e., as the bearing 325 moves along the rail 113 with a thin lubrication layer/zone 325L of air sandwiched in between them.

(iv) Some Issues Related to Bearing Performance/the Lubrication Zone

In light of the above and other discussions herein, in one or more embodiments the air bearing 325 is able to maintain a thin lubrication zone 325L in one or more conditions—i.e., not only in ideal rail/track 113 conditions (such as smooth, polished, not cracked, clean, and/or others appreciated by those skilled in the art), but also under certain non-ideal rail/track conditions, such as (i) non-ideal surface related conditions (such where one or more portions of the rail is unsmooth, unpolished, cracked, dirty, and/or others appreciated by those skilled in the art) and/or (ii) non-straight conditions where one or more portions of the rail/track 113 is curved, undulated (e.g., at least one convexity and/or at least one concavity), otherwise dented/indented (that is not a concavity), otherwise bumped/distended (that is not a convexity), sagged, and/or is sloping (such as inclined or declined) and/or is angled (to some degree), and/or has an inconsistent shape. (An example of the latter is a cylindrical rail having a diameter of a first magnitude in one location along the rail and a second diameter of another magnitude at a second/adjacent location along the rail such that rail sort of flares outward, or alternatively tapers inwards a bit, at one or more various points, etc.). As those in the field will readily appreciate, ideal conditions are not always readily available and/or truly straight rails are often expensive to manufacture. Accordingly, in one or more embodiments the air bearing's 325 ability to adjust to one or more non-ideal rail/track conditions, and thus keep the lubrication zone thinner than it would otherwise be—but for its compliant and/or resilient nature—would tend to mean relatively less air needed, and thus relatively less power needed to supply that air, than would otherwise might be necessary—but for its compliant and/or resilient nature—in one or more conditions.

For instance, in one or more embodiments the bearing 325 exhibits a compliant and resilient response to certain imperfections and/or obstacles associated with the rail's 113 surface, such as porosity, non-smooth sections, bumps/dents, dirt, particles, chips, small cracks, imperfections, among others; in one or more embodiments the lubrication zone 325L that can consistently (or at least mostly) be maintained during such conditions will be as low as 0.001 to 0.002 inches, for example. Further, in some embodiments, the lubrication zone 325L that can consistently (or at least mostly) be maintained during certain size curves and/or undulations (and/or sloping portions of the rail 113, such as inclines or declines, and/or angles of certain magnitudes) will be as low as 0.001 to 0.002 inches. In alternative embodiments and/or certain conditions/scenarios, the range is 0.002 inches to 0.020 inches, while in others the range is 0.020 inches to 0.2 inches, while in others the range is 0.2 inches to 2 or more inches; that said, embodiments that allow for thinner lubrication zones/air cushions will tend to be relatively more effective in employing air from the air supply and thus also more efficient in power usage, as will be readily appreciated by those skilled in the art.

To appreciate the air-related efficiency achievable in one or more embodiments of the bearing 325, it may be helpful to compare it to a hypothetical bearing (as in prior art) that is stiff (rather than compliant and/or resilient). For instance, it may be helpful to imagine a ½-meter long bearing made of steel, where the steel bearing more-or-less mirrors the shape of the rail along which it moves via a layer of air—e.g., such as a cuff-like bearing, having a half-cylinder shape, moving along/relative to a cylindrical rail—and further imagine the steel bearing as it passes over a 5-inch bump that is 0.03 inches tall. While the steel rail may perhaps be able travel over the rail at 0.003 inches above the rail (via the air layer) prior to the bump, the steel bearing will either hit the bump—which is not a good outcome—or it will have to increase its height above the rail to more than 0.03 inches before it reach reaches the bump until it pass the bump, at the very least. Accordingly, if it is expected that there are other bumps along the rail's path a common approach in such a scenario will have the steel/stiff bearing always riding along the rail at more than 0.03 inches above it. In any case, at least most times when the steel/stiff bearing is not as close to the rail as possible—which in this hypothetical is 0.003 inches—relatively more air is being used than ideal, which tends to means more power/energy/cost; and, it should not be forgotten that is on top of such designs' inherent limitations when it comes to curves, where the viability of increasing a cylindrical cuff's height above a curve (as opposed to a bump) in a cylindrical rail to avoid contact seems questionable to say the least, i.e., despite the air loss that would otherwise result if it were possible. In contrast, the air bearing 325 is able to essentially mold its shape automatically in response to such a bump and retain the same, or substantially the same, lubrication zone 325L height/gap before, during, and after the bump; and, in one or more embodiments the bearing 325 is also similarly able to handle curves in this effective fashion. Alternatively, the lubrication zone would be slightly larger immediately before, during, and/or after the bump but would still be less than the height of the bump during at least one of these; and, in one or more embodiments it would still be less with respect to all three of these. Moreover, the same would essentially occur if the bump were an indentation/dent in the rail instead—i.e., where the stiff bearing would be unable to adapt in an efficient way compared to the air bearing 325. An example showing how the air bearing 325 complies with an undulation is provided later.

(v) Some Other Aspects of the Air Bearing's Design

While at least some of these are evident from one or more Figures associated with this document, a few characteristics of one or more, but not all, embodiments of the air bearing 325 will be further highlighted here. In one or more embodiments, at least a portion of the outer surface portion 325Y of the bearing 325 that at least partially defines the plenum 325P is not parallel to—i.e., is at a non-zero angle—relative to the outer surface portion 325S of the bearing 325 that at least partially defines the lubrication zone (i.e., when air is exiting through the lubrication zone 325L). (In this regard, it should be pointed out that it is believed that at least in one or more, but not necessarily all, embodiments that the outer surface portion 325S of the bearing 325 that at least partially defines the lubrication zone and rail are substantially parallel, i.e., when air is exiting through the lubrication zone 325L.) In any event, in one or more embodiments an angle between them is at least 1 degree; in one or more embodiments the angle between them is at least 5 degrees; in one or more embodiments the angle between them is at least 15 degrees; in one or more embodiments the angle between them is at least 30 degrees; and, in one or more embodiments the angle between them is between 30 degrees and 90 degrees or even more. Moreover, in one or more but not all embodiments the outer surface portion 325Y of the bearing 325 that at least partially defines the plenum 325P and/or the brake pad 810 (or alternatively another component surrounded by the outer surface portion 325Y of the bearing 325 that at least partially defines the plenum 325P instead) and/or a portion of the assembly that at least partially defines the plenum 325 (in one or more embodiments where a portion of the assembly at least partially defines the plenum 325) is/are at a distance(s) from the rail 113 that is/are greater than a distance between the outer surface portion 325S of the bearing 325 that at least partially defines the lubrication zone (i.e., when air is exiting through the lubrication zone) and the rail 113. In one or more embodiments at least one of the distances is at least 1.1 times as great, in one or more embodiments at least one of the distances is at least 10 times as great, in one or more embodiments at least one of the distances is at least 100 times as great, and in one or more embodiments at least one of the distances is at least 10,000 times as great. In one or more embodiments the brake pad/s 810 (or alternatively another component surrounded by the outer surface portion 325Y of the bearing 325 that at least partially defines the plenum 325P instead) is substantially parallel to the rail and at a greater distance from the rail 113 than the outer surface portion 325S of the bearing 325 that at least partially defines the lubrication zone (i.e., when air is exiting through the lubrication zone).

In light of one or more of the above relationships/features and/or other relationships/features associated with the air bearing 325, it is believed that the air bearing is advantageous over designs that do not include one or more of these. For example, it is believed that air moving between the steel cuff and rail in the hypothetical example above, or other similar bearing design where the bearing essentially mirrors the shape of the rail (even if the mirrored cuff were compliant instead of stiff), would be relatively less efficient by comparison. Likewise, it is also presently believed that the steel cuff—if it were hypothetically instead compliant and/or resilient rather than stiff—would experience a relatively greater friction moving along the rail, particularly under certain non-ideal conditions, than one or more embodiments of the air bearing 325.

FIG. 9A is a cross-sectional view that enables one to get a good sense as to what the bearing 325 and brake pad(s) 810 look like sort of from within inside the perimeter of lubrication zone 325L, which is also sort of how the bearing 325 and brake pad(s) 810 are seen in FIG. 7B but in FIG. 9A it is a view reflecting a different 'cross-sectional slice'. Among other things, FIG. 9A shows, along with other Figures including FIG. 6A, that in one or more (but not all) embodiments that at least a portion of the cavity 325C of the bearing 325 is curved; and, in one or more (but not all) embodiments the portion of the cavity 325C of the bearing 325 that is curved is, or at least includes, that which is adjacent to assembly 200. In one or more embodiments at least part of the curved portion of the cavity 325C is at least substantially parallel to the assembly 200, which is also curved; in one or more embodiments at least part of the curved portion of the cavity 325C is at least substantially parallel, to the rail 113, which is also curved; and, in one or more embodiments at least part of the curved portion of the cavity 325C is at least substantially parallel, to the brake pad(s) 810, which is also curved.

FIG. 9B (which is a close-up view of a portion of FIG. 9A) also shows a semi-enclosed cavity 325X1 associated with the air bearing 325 and an aperture 325X2 of the air bearing. In one or more (but not all) embodiments, such as the one depicted in FIG. 9B the aperture 325X2 is at least substantially defined by the bearing portion 325S—i.e., which, as explained above, touches the rail 113 just before the lubrication zone 325L begins to form and then does not touch the rail once the lubrication zone 325L has formed. In turn, the semi-enclosed cavity 325X1 is at least partially defined not only by its aperture 325X2 but also the bearing's outer surface portion 325Y that defines the plenum 325P, as was also described above. (In one or more embodiments, the semi-enclosed cavity 325X1 is also at least partially defined by the brake pad 810.) Accordingly, in one or more embodiments such as the one depicted in the FIG. 9B, a difference between the plenum 325P and the semi-enclosed cavity 325X1 is that the latter does not include the rail 113. With that in mind, as seen clearly in FIG. 9B a rail portion 325X3 is inside the semi-enclosed cavity 325X1 when the lubrication zone 325 has formed between the air bearing 325 and the rail 113. Another way to look at this is that if, hypothetically speaking, the rail 113 in FIG. 9B were a flat surface—e.g., one that was a bit wider than the aperture 325X2 and/or the plenum 325P—the (hypothetical) flat rail would not be able to physically enter the semi-enclosed cavity 325X1. The hypothetical horizontal plane depicted in FIG. 9B by a dot-dash-dot line should make this evident.

Moreover, in one or more embodiments the structural relationship described immediately above enables the bearing to function in one or more respects that one or more prior art bearings—e.g., those where the rail/surface 113 does not and/or is not able to enter the semi-enclosed cavity described above (e.g., where the prior art rail is a substantially flat rail or other surface, or where the prior art bearing sits only above a substantially flat surface/floor). For instance, as is discussed elsewhere in this document, the air bearing 325 is able to conform (and in one or more embodiments maintain a thin lubrication zone 325L and/or a substantially unchanged lubrication zone 325L, or at least a relatively less thick lubrication zone 325L than it would otherwise be but for the conformance, for example) not only to vertically oriented curves (and/or other non-straight conditions mentioned herein)—which are sometimes referred to as undulations (or hills) herein—but also to laterally oriented curves (often described more commonly as turns, e.g., towards the 'left' or 'right', and/or other non-straight conditions mentioned herein). Moreover, in one or more embodiments, the bearing 325 is able to conform (and in one or more embodiments maintain a thin and/or substantially unchanged lubrication zone, for example) to curves that are blended lateral and vertical curves (and/or other non-straight conditions mentioned herein).

In one or more embodiments the semi-enclosed cavity 325X1 has a larger area than the area of the plenum 325 associated with the air bearing 325. In one or more embodiments the semi-enclosed cavity area is at least 0.1% larger than the area of the plenum 325P; in one or more embodiments the semi-enclosed cavity area is at least 1% larger than the area of the plenum 325P; in one or more embodiments the semi-enclosed cavity area is at least 10% larger than the area of the plenum 325P; in one or more embodiments the semi-enclosed cavity area is more than 2.5% larger than the area of the plenum 325P; in one or more embodiments the semi-enclosed cavity area is more than 25% larger than the area of the plenum 325P; and in one or more embodiments the semi-enclosed cavity area is at least 50% larger than the area of the plenum 325P. In one or more embodiments, the rail portion 325X3 extends at least 0.1 inches into the semi-enclosed cavity 325X1; in one or more embodiments the rail portion 325X3 extends at least 0.001 inches into the semi-enclosed cavity 325X1; in one or more embodiments the rail portion 325X3 extends at least 0.05 inches into the semi-enclosed cavity 325X1; in one or more embodiments the rail portion 325X3 extends at least 0.5 inches into the semi-enclosed cavity 325X1; in one or more embodiments the rail portion 325X3 extends at least 2 inches into the semi-enclosed cavity 325X1; in one or more embodiments the rail portion 325X3 extends more than 0.025 inches into the semi-enclosed cavity 325X1; in one or more embodiments the rail portion 325X3 extends more than 0.25 inches into the semi-enclosed cavity 325X1; in one or more embodiments the rail portion 325X3 extends more than 2.5 inches into the semi-enclosed cavity 325X1; and, in one or more embodiments the rail portion 325X3 extends more than 5 inches into the semi-enclosed cavity 325X1.

(vi) The Brake System

FIG. 7C shows the brake system 800 of FIG. 7B activated/in action. As can readily be seen from this Figure and FIG. 7B, air flows (from the air supply 900) through one of the air tubes/pipes 355B, and then into and through a first tube 817—e.g., which has a cylindrical shape in this embodiment (but not all)—that is attached to the assembly 200 by one or more fasteners 817F, such as bolts or screws. As can further be seen here, another tube 827, which also has a cylindrical shape in this embodiment (but not all), is positioned such it is engageable with the first tube 817 in a slidable fashion. In one or more (but not all) embodiments, a seal 823 is included between the two engageable tubes 817, 827, where in the FIG. 7C embodiment it is positioned in a ring-shaped indentation along the inner diameter of the second tube 827, where a portion of the seal 823 sticks out a tiny bit such that it touches the outer perimeter of the first cylinder 817 and assists in the slidable engagement of the two engageable tubes 817, 827. Further, connected to the second tube 827 is a plate/element 813 that is connected to the brake pad(s) 810 (via one or more fasteners, such as bolts or screws, which are not shown), where in this embodiment (but not all) a portion of the air bearing 325 is sandwiched in between the plate/element 813 and the brake pad(s) 810. While here the second tube 827 is the outer one of the set/pair of tubes 817, 827 (i.e., relative to the first tube 817) in alternative embodiments it is the inner of the pair/set of tubes 817, 827.

Accordingly, in one or more embodiments when air of sufficient pressure (or alternatively another force) is supplied in a cavity 800C—which is defined in the FIG. 7C embodiment by at least a portion of the assembly 200, the first tube 817, the second tube 827, and the plate/element 813—the attached brake pad 810 moves towards the rail 113 and ultimately makes contact with the rail 113 (as depicted in FIG. 7C). In one or more embodiments, a connecting element 839 keeps the brake pad 810 from making contact with the rail 113 until appropriate/sufficient air pressure is applied and/or the brake system 800 is triggered/switched on—which are the same in the FIG. 7B/C embodiment. The connecting element in this embodiment is a sleeve 839 that connects the plate 813 to the assembly 200. In this but not all embodiments, the sleeve 839 has a natural/initial state (e.g., a contracted state and/or a non-expanded/non-lengthened state) but will begin to expand/lengthen if a certain force is applied, will expand further as the force is increased, and will return towards it natural/initial state as the force is lessened. The natural/initial state of the sleeve/element is depicted in FIG. 7B, and the extended/lengthened state is depicted in FIG. 7C. Accordingly, in one or more embodiments when air of sufficient pressure (or alternatively another force) is supplied in the cavity 800C the pressure is, or becomes, great enough to expand/lengthen the sleeve/connecting element 839, and as that occurs the attached brake pad (along with the plate 813 and second tube 827) moves towards the rail 113 and ultimately makes contact with the rail 113 (as depicted in FIG. 7C). In one or more embodiments, the brake system 800 is triggered/switched on via the control/computer system 667, such as via human interaction or automatically if a certain condition is encountered. In one or more embodiments, this occurs via the computer system's 667 connection to the air supply 900 and/or at least one of the regulators connected to it; alternatively, the control system 667 is connected directly to the brake system 800 or one or more regulators connected to the brake system 800.

In one or more (but not all) embodiments the sleeve 839 also, or alternatively instead, serves to prevent the plate 813 from slamming into the first tube 817 and/or prevent the second tube 827 from ramming into the assembly 200. This is not to say that these components do not touch, they do in some embodiments and do not in others, rather it is more a matter of preventing unnecessary force that could potentially lead to damage—as will be readily appreciated by those skilled in the art. In one or more embodiments, like the one of FIG. 7A/B, the sleeve 839 is made of a flexible material and has a spring-like shape; in fact, it has spring properties (e.g., tension/extension spring or both tension and compression), or is a spring, in one or more embodiments.

In one or more alternative embodiments, the cavity 800C is defined by the first tube 817, the second tube 827, and the plate/element 813 (and not the assembly 200); and, in one or more embodiments, the cavity 800C is defined by the second tube 827 and the plate/element 813 (and not the first tube 817 and not the assembly 200). In one or more alternative embodiments, the cavity 800C is defined by the brake pad(s) 810 rather than the plate/element 813 (e.g., where the tube 827 is connected to the brake pad(s) 810 without the plate 813 being included).

Moreover, since the air bearing 325 is attached between the plate 813 and brake pad(s) 810, the air bearing 325 essentially follows the movement of the brake pad(s) 810 and sort of dips towards the rail 113 when the brake system 800 is applied/in action. In one or more embodiments, when and/or during the time the brake system 800 is engaged the air provided to the air bearing's cavity 325C is adjusted—e.g., reduced or turned off—in alternative embodiments it is not.

Further, in one or more alternative embodiments the brake system 800 is not connected to the air bearing system 300 and/or the air bearing 325. For example, in one or more alternatives, the same brake system(s) described herein is/are connected to the assembly 200 in front or behind, or at another location, with respect to the air bearing 325 and/or air bearing system 300; and, one or more of these alternatives would look the same except for not being attached to the air bearing 325. In fact, in one or more alternative embodiments the brake system 800 remains positioned where it is in FIG. 7B/C, within the air bearing system 800, except it is not connected to the air bearing 325—e.g., where the air bearing 325 is connected to the assembly 200 rather than to the brake system 800. It is also worth noting that the brake system 800 shown here is typically a secondary/emergency brake system, but can function as a primary brake system in some embodiments.

While two sets of engageable tubes 817, 827 are depicted in the FIG. 7A/B embodiment, one or more alternative embodiments employ only one set of engageable tubes 817, 827. One of the reasons the pair is employed in the FIG. 7A/B/C embodiment is to attempt to at least partially balance the application of the brake pad(s) 810 to the rail 113, as will be readily appreciated by those skilled in the art.

While the brake system 800 is incorporated as part of the air bearing system 300 depicted in the FIG. 7A/B embodiment, it also should be noted that one or more alternative air bearing system embodiments (and transportation system embodiments) do not include the brake system 800. For instance, some of these alternative air bearing system embodiments instead include a relatively stiff material/plate (e.g., of metal) instead of a brake pad 810 (e.g., attached to the air bearing 325 like the brake pad 810 is or where the stiff material is attached at or near its perimeter), and without any of the other components associated with the brake system 800 shown in FIG. 7B, for example.

Before moving on, it should be mentioned that the brake system depicted in FIG. 7B is also adaptable to other air bearings (e.g., bearings filled with air and ride on a layer of air) or even other bearings (e.g., including stiff ones) that ride on a layer of air but are not filled with air. Such bearings include those that are employed on a rail, such as one with a cylindrical shape (as in the FIG. 7B/C embodiment), and/or those that ride along a floor or other substantially flat surface.

In one or more embodiments the brake (or 'braking') system 800 includes the (i) brake pad(s) 810, (ii) the plate 813, (iii) the two tubes 817, 827, (iv) the air supply, and (v) one or more tubes that connect the air supply 900 to the two tubes 817, 827. In one or more embodiments the brake (or 'braking') system 800 includes the (i) brake pad(s) 810, (ii) the plate 813, and (iii) the two tubes 817, 827—which are connectable to an air supply (such as the air supply 900 shown in one or more Figures). In one or more embodiments the brake (or 'braking') system 800 includes the (i) brake pad(s) 810 and (ii) the two tubes 817, 827—which are connectable to an air supply (such as the air supply 900 shown in one or more Figures).

In one or more brake system 800 embodiments, such as that of FIG. 7A/B/C, at least one of the tubes 817, 827 is connected to the assembly 200 (which is the first tube 817 in the FIG. 7A/B/C embodiment). In one or more brake system 800 embodiments, the air tube(s) 355B supply air through the assembly 200. One or more alternative brake system 800 embodiments reflect the various alternatives described elsewhere in this document—e.g., where one or more of these do not include the plate 813, one or more of these do not include the brake pad 810, one or more of these include one of the tubes 817, 827 but not both, one or more of these include the tube/s not being connected to the assembly, and some do not include tubes, for example. In one or more embodiments air pressure is applied indirectly or indirectly to a brake pad which makes contact with the rail when the pressure is applied, where in some but not all of such embodiments the brake pad is attached to a bearing, and where in some (but not all) such embodiments the bearing is an air bearing (such as the air bearing 325 depicted in FIG. 8E.)

(vii) Views of the Air Bearing

Figure 8A:
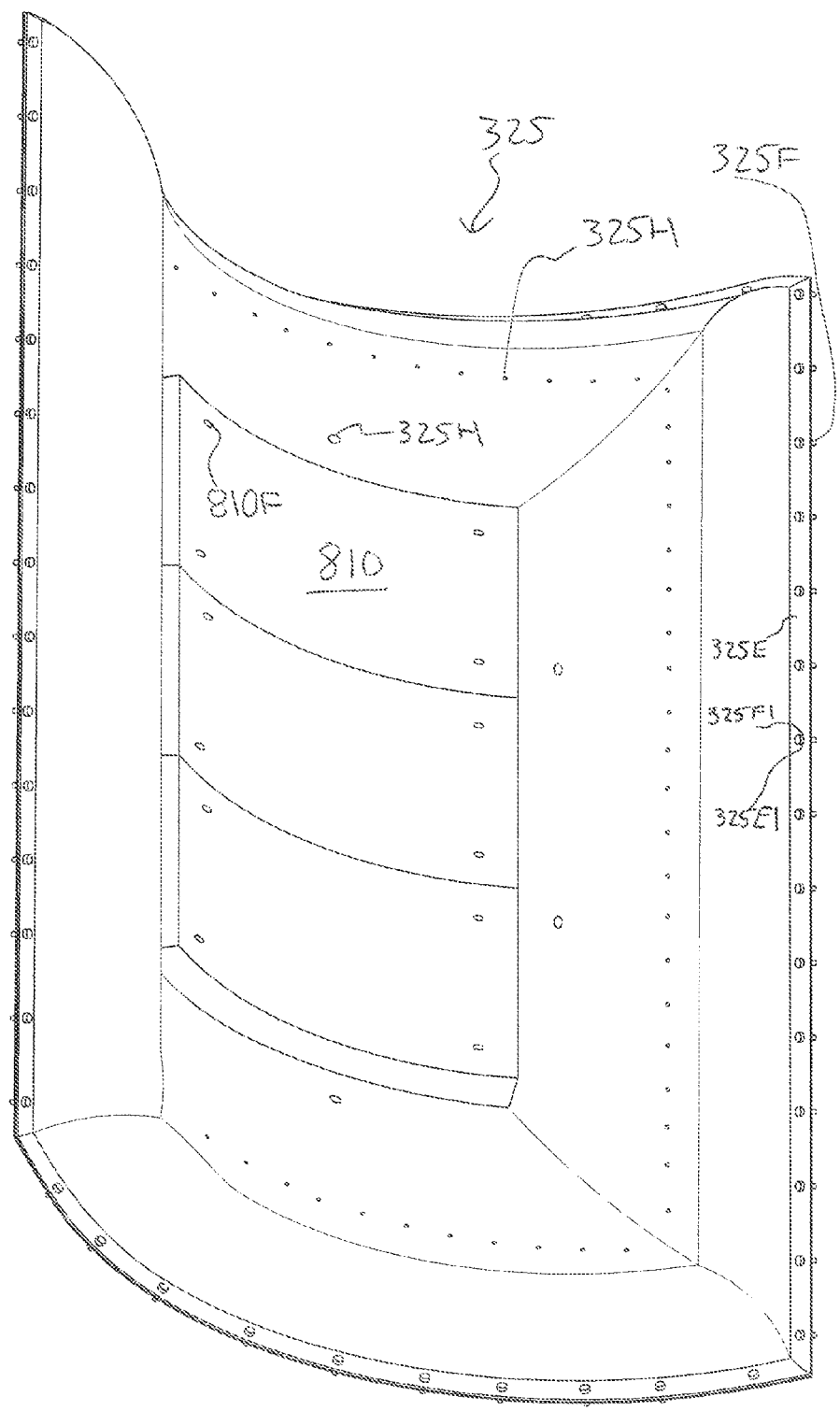
FIG. 8A shows a perspective view of the air bearing (of the air bearing system) and the brake pad/s (of the brake system)

FIG. 8A shows a perspective view of the air bearing 325, which also shows the brake pad 810 (which is in three parts in this embodiment, but is just one part in alternative embodiments), the one or more fasters 810F (e.g., bolts, screws) that fasten the brake pad to the plate 813 (which is shown in other Figures), the one or more holes 325H in the air bearing 325 that enable air from the cavity 325C to enter the plenum, an element 325E (e.g., ring of metal, for example) that is used (in one or more but not all embodiments) to help secure the air bearing 325 to the assembly via one or more fasters 325F (e.g., bolts, screws). While a certain number of holes, with six of the holes 325H larger than the others, are depicted in the FIG. 8A embodiment, various alternative embodiments have less or alternatively more holes. Moreover, alternative embodiments have holes with different shapes and relative sizes compared to those shown here, and in one or more embodiments the holes are of uniform size and/or shape. This will be readily understood by those skilled in the art. It also should be pointed out that each of the fasteners 325F that secure the air bearing 325 to the assembly 200 via the ring/frame 325E do so through corresponding holes 325F1 in the air bearing 325 and corresponding holes 325E1 in the ring/frame 325E.

Figure 8B:
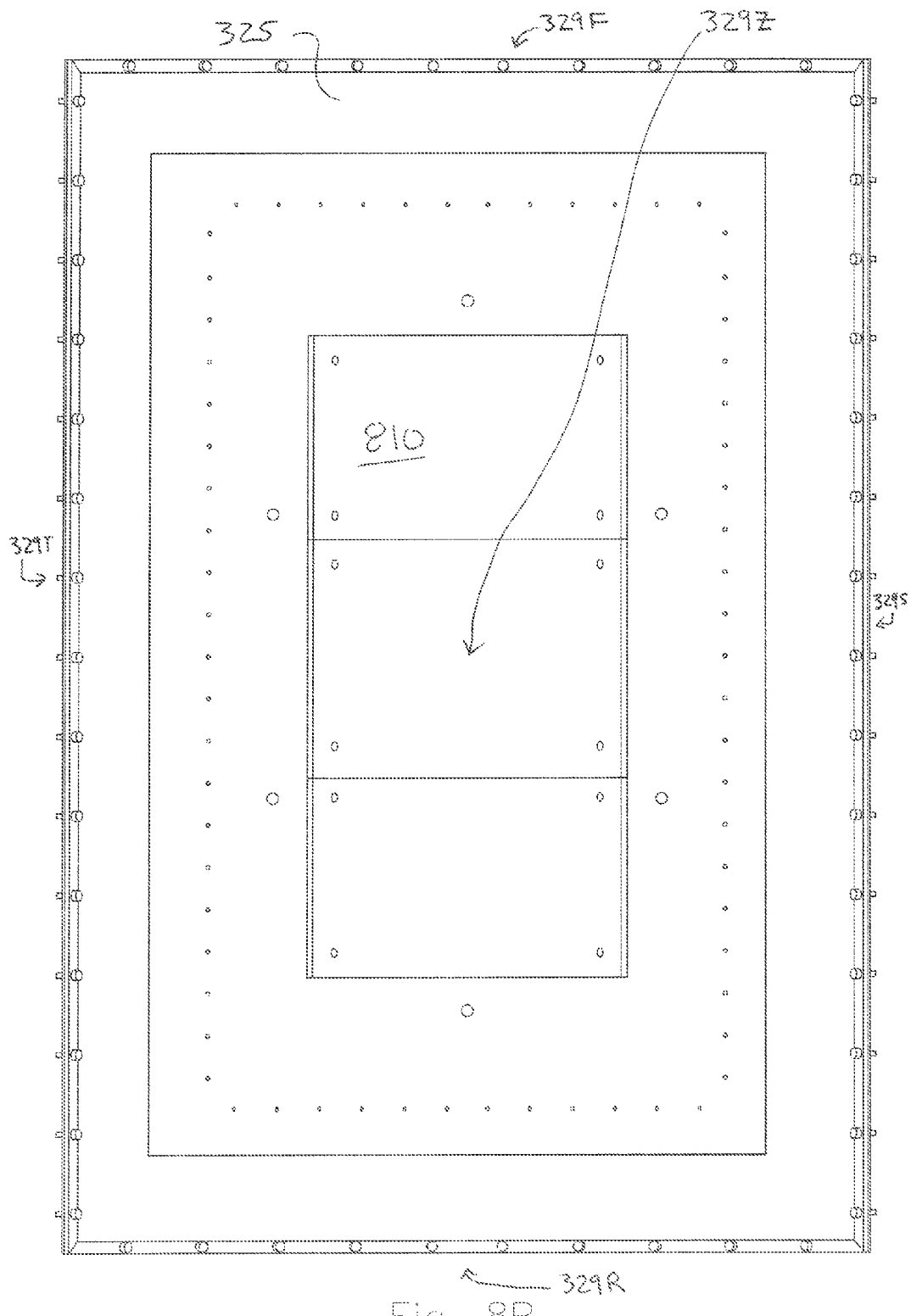
FIG. 8B shows a bottom view of the air bearing (of the air bearing system) and the brake pad/s (of the brake system) of FIG. 8A.
Figure 8C:
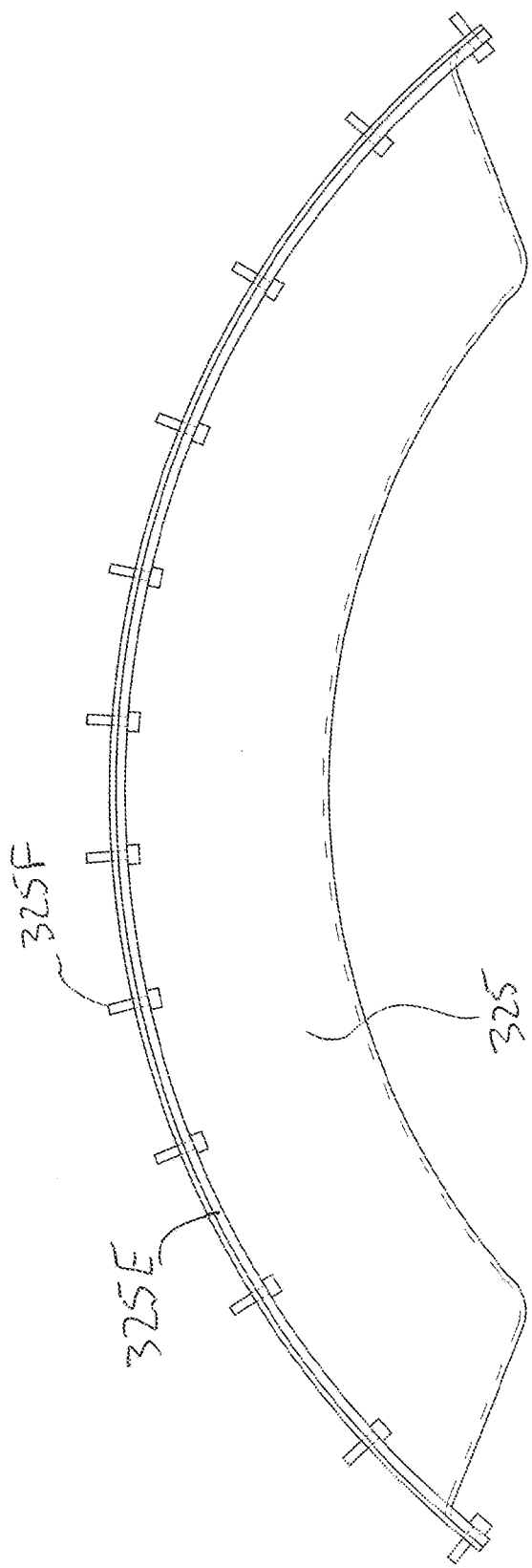
FIG. 8C shows a front view of the air bearing (of the air bearing system) and the brake pad/s (of the brake system) of FIG. 8A.

A few additional views of what is shown in FIG. 8A are provided. For instance, FIG. 8B shows a bottom view of what is shown in FIG. 8A and FIG. 8C shows a front view of what is shown in FIG. 8A. FIG. 8D shows a side view of what is shown in FIG. 8A, and this side view is the side view of FIG. 4B; in effect, a portion of FIG. 4B has been enlarged in FIG. 8C to more clearly see it. Accordingly, the view depicts the various components of FIG. 8A from the side when the air bearing 325 is attached to the assembly 200 (which is not shown in FIG. 8C but is shown in FIG. 4B) and adjacent to the rail 113 (but not touching the rail 113 because of the lubrication zone 325L). It will also be apparent that while the brake pad 810 is shown in FIG. 8C, the plate 813 is not.

Figure 8E:
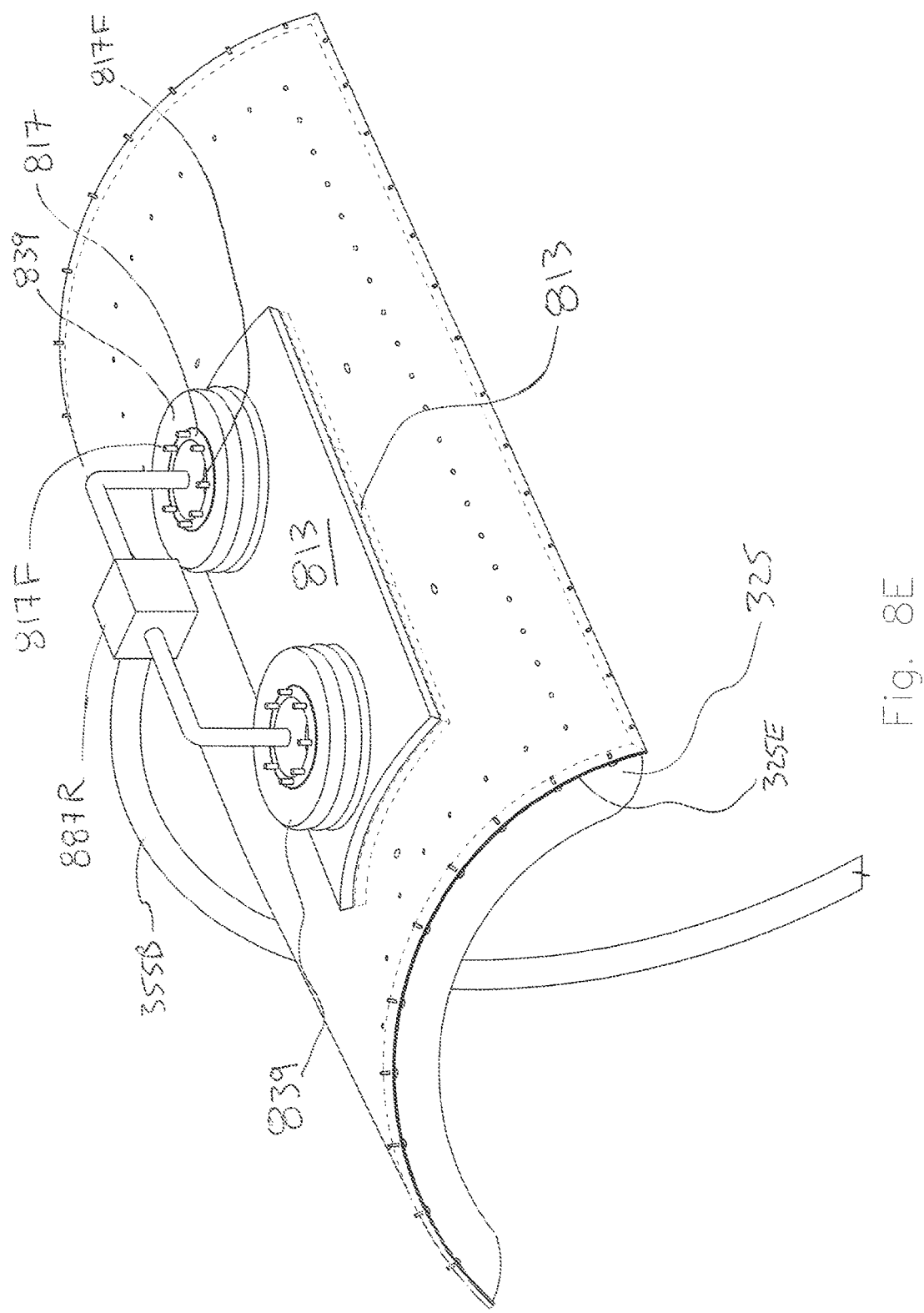
FIG. 8E shows another perspective view of the air bearing and the brake pads of FIG. 8A, among other things.

FIG. 8E shows another perspective view of what is shown in FIG. 8A, but here one or more other portions of the brake system 800 are also included. In fact, this is sort of a top perspective view of the brake system 800 but without showing the assembly 200 or the pipes/tubes 355 that feed air into the cavity 325C. For instance, in this Figure one can see the plate 813, the cuff/sleeve 839 (that surrounds the second tube 827), the one or more pipes 355B that feed the brake system 800, and the regulator 887R associated with the pipe(s) 355B. As stated elsewhere, the pipe(s) 355B shown are connected to the air supply 900.

Figure 26A:
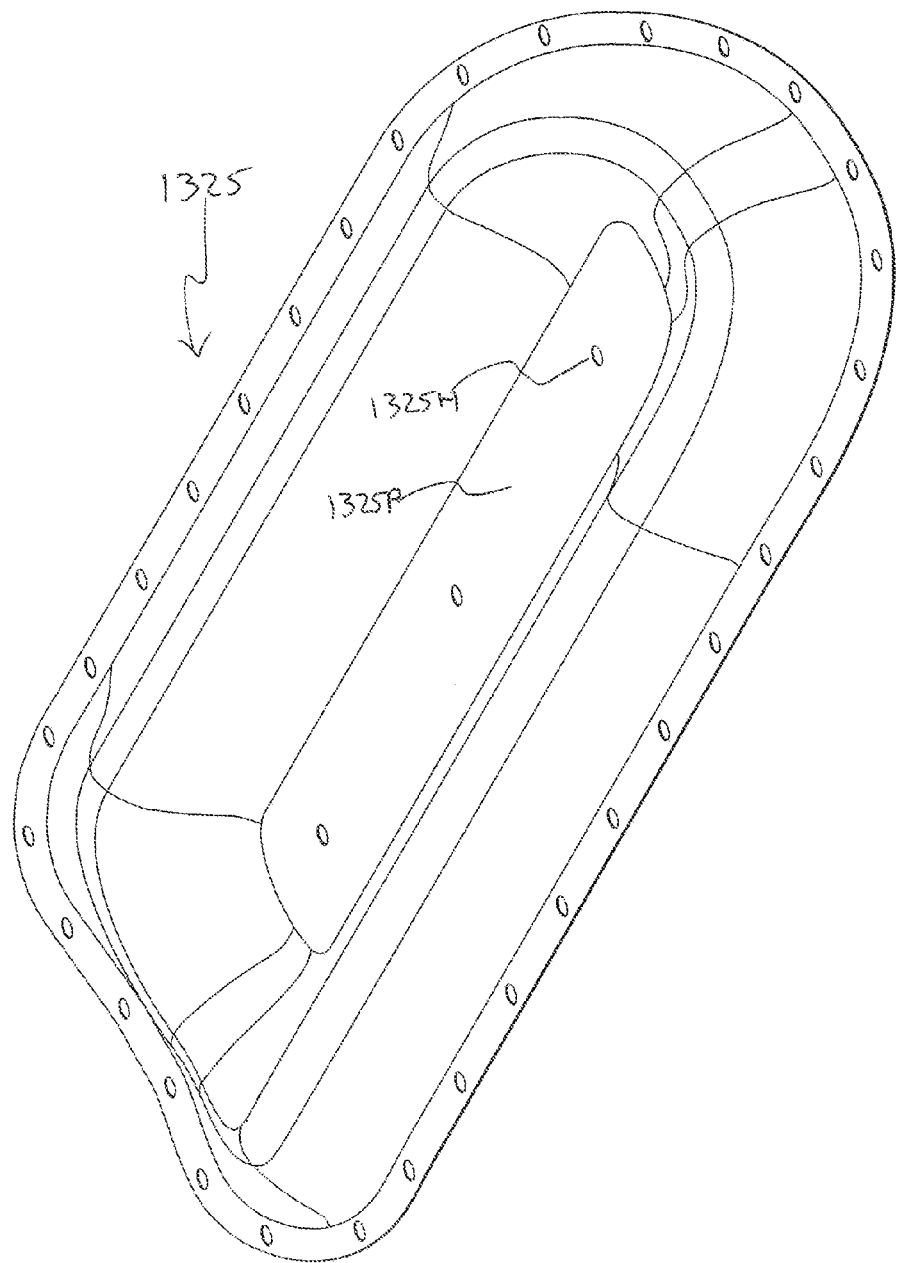
FIG. 26A shows an alternative air bearing embodiment.
Figure 26B:
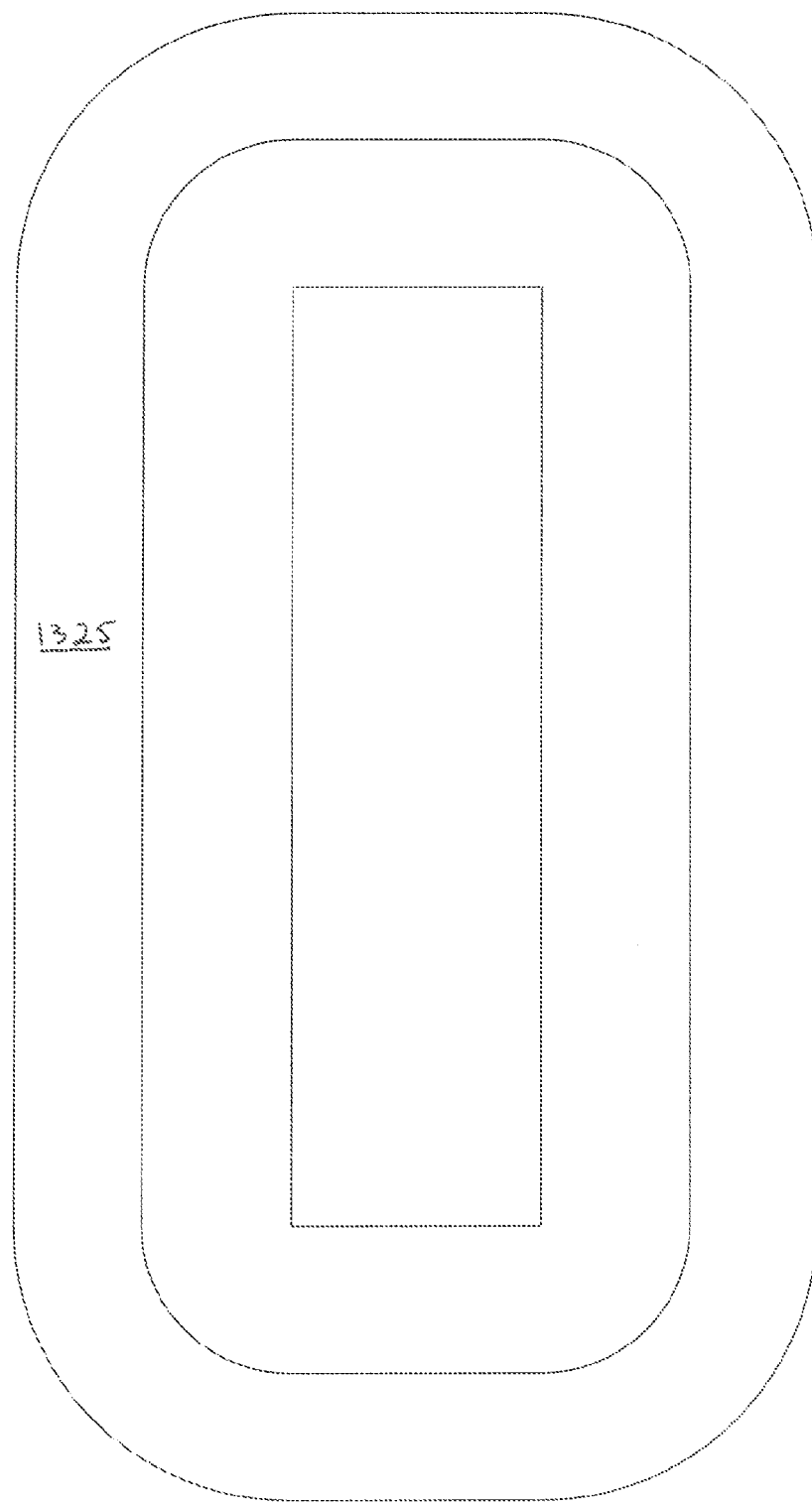
FIG. 26B shows a rough/somewhat artistic, top-down view of FIG. 26A.

FIG. 26A is an alternative embodiment 1325 of the air bearing 325. As can be seen this air bearing 1325 is relatively more curved, has one or more holes 1325H (here three holes) in a stiff metal (or hard plastic) center 1325P through which air flows, which is surrounded by compliant/resilient material just like the main air bearing 325. In most if not all respects it operates with the same principles as the main air bearing 325 discussed herein. FIG. 26B is a rough/artistic top-down view of 26A.

In one or more (but not all) embodiments, the air bearing system 300 includes (i) the air bearing, (ii) the cavity 325C, (iii) the plenum 325P, (iv) the air supply 900, and (v) the one or more tubes 355 that connect the air supply 900 to the cavity 325C. In one or more (but not all) embodiments, the air bearing system 300 includes (i) the air bearing, (ii) the assembly 200, and (iii) the air supply 900, where the air supply is connected (e.g., via one or more tubes 355) to supply air between the air bearing and the assembly 200. In one or more (but not all) embodiments, the air bearing system 300 includes (i) the air bearing, and (ii) the assembly 200, and (iii) the air supply 900, where the air supply is connected (e.g., via one or more tubes 355) to supply air between the air bearing and the rail 113. In one or more (but not all) embodiments, the air bearing system 300 includes (i) the air bearing, and (ii) the air supply 900, where the air supply is connected (e.g., via one or more tubes 355) to supply air to the air bearing and/or between air bearing 325 the rail 113, where in on or more further embodiments one or both of these occur indirectly and/or at different times.

It should be noted that in the FIG. 9A embodiment the air bearing system's 300 cavity 325C includes the ability to allow air to exit the cavity and enter the plenum 325P, and do so by the one or more holes 325H; in alternative embodiments, air in the cavity 325C exits the cavity and into the plenum 325P without the holes 325H, for example by spilling out of the cavity 325C and into the plenum 325P. In one or more alternative embodiments, such as where the bearing 325 is prefilled with air (e.g., like a tire), the air bearing system does not include the ability to allow air to exit the cavity and enter the plenum 325P. In fact, it is important to note that one or more alternative air bearing systems include (i) a bearing that is not filled with air or is solid (e.g., a compliant/resilient solid), (ii) the plenum 325P, (iii) the air supply 900, and (iv) one or more tubes, not shown, that connect the air supply 900 to the plenum 325C (and not to the cavity 325C, though in solid bearings there is no cavity anyway).

(viii) The Air Bearing in Action

Hills, Curves, Etc. Along the Rail

Figure 17:
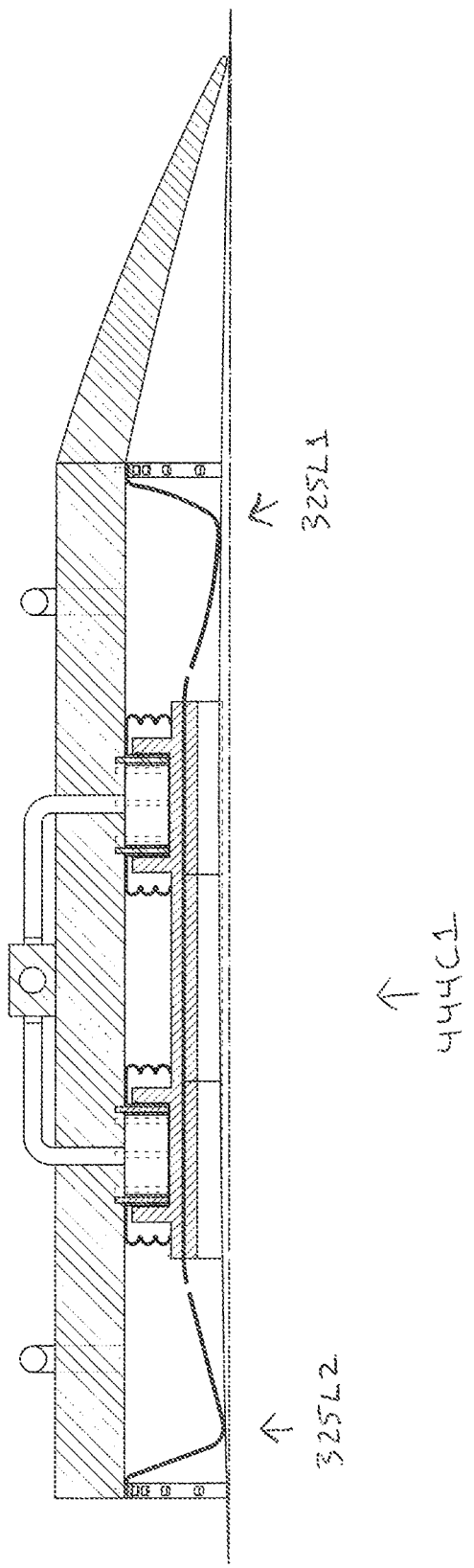
FIG. 17 is a close-up view of a portion of FIG. 7A that shows the air bearing and assembly, but where the rail is a bit convex, as discussed below.

FIG. 17 is meant to depict, at least roughly, how the air bearing 325 (which is both compliant and resilient in the FIG. 17 embodiment) behaves when it encounters an undulation/vertical curve (e.g., hill), and/or one or more other non-straight conditions, associated with the rail 113. It may thus be useful to compare FIG. 17 to FIG. 7A since FIG. 17 is the exact same cross-sectional view of FIG. 7A, but where FIG. 17 only shows the portion of FIG. 7A above the rail 113 and shows the (at least substantially) straight rail of FIG. 7A undulated instead. However, for reference the dash-dot-dash line near the rail 113 has been added in FIG. 17 to show what (an at least relatively) straight/non-undulated rail 113 would look like by comparison. (Moreover, the dashed line is meant to show the line of the brake pad 810 'if' the rail were non-undulated so one can see, by comparison, that the brake pad 810 becomes slightly angled.) As can be seen in FIG. 17, in order to maintain a lubrication zone 325L of the same (or at least roughly the same) thickness as compared to when the air bearing 325 is moving over a straight/substantially straight rail, such as in FIG. 7A, the bearing's 325 shape automatically becomes altered (from a first to a second shape). In one or more embodiments, such as the one depicted here, the shape alteration is in response to the shape of the rail 113 and/or a change in shape of the rail 113 relative to another shape of the rail 113 (e.g., from a first rail shape to a second rail shape). In one or more embodiments, the bearing's 325 ability to automatically change/alter its shape is a reflection of its flexibility/compliance. In one or more embodiments the bearing is able to (and does) automatically return from its second shape to its first shape; in one or more embodiments this is a reflection of the bearing's 325 resilience.

Figure 23A:
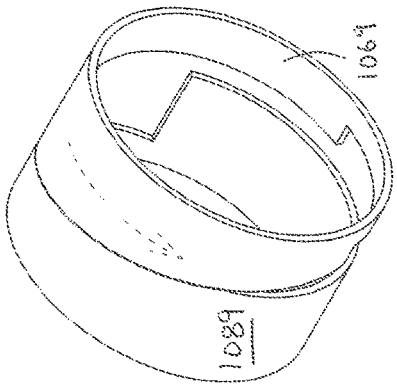
FIGS. 23A, 23B, 23C show three close-up perspective views of the wedge of FIG. 22 and depict its rotation from FIG. 23A to FIG. 23B as well its rotation from FIG. 23B to FIG. 23C.
Figure 24B:
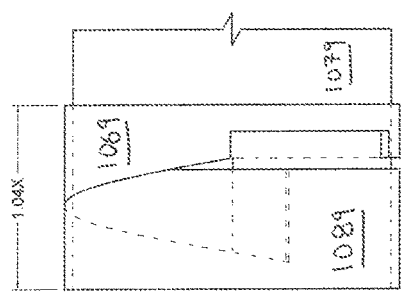

With the above in mind, one can see that the bearing 325 has a first shape in FIG. 7A and a second (slightly different) shape in FIG. 23A. In particular, one can see that the portion of the bearing 325 between the wind deflector 1200 and the brake pad 810 has complied with respect to the undulated rail portion over which is positioned. Especially notable is how the portion of the bearing 325 at the lubrication zone (325L1) near the wind deflector 1200 is noticeably higher (i.e., closer to the assembly 200) than the portion of the bearing 325 at the lubrication zone (325L2) on the opposite end of the air bearing 325. Moreover, the portion of the bearing 325 at the lubrication zone (325L2) on the opposite end of the air bearing 325 has a much less altered shape since the rail 113 is less undulated under that portion of the bearing 325 by comparison (though its slightly altered shape is not noticeable from its depiction here, and in one or more alternative embodiments its shape is not altered depending on a variety of factors such as the level of its flexibility, angle of the undulation, etc.). Further, while the discussion here is pointing out two cross-sectional portions of the air bearing 325 and comparing those, partly because this cross-sectional view makes it convenient to do so and partly because is cross-sectional view shows portions of the air bearing 325 (e.g., along its central axis) that become particularly conformed in one or more undulation scenarios, it will be readily understood that other portions of the bearing (e.g., to both sides of its central axis) will also comply to some degree in one or more, but not all, embodiments (e.g., the alteration in shape may gradually decrease from front to back and/or the alteration in shape may be less extreme with respect to portions of the bearing that are to the side(s) of the portions shown in FIG. 17—i.e., portions away from the longitudinal center of the bearing and closer to the lateral/width/side of the air bearing 325, which are further away from the undulation).

Likewise, one can easily imagine how, as the assembly 200 continues to move forward along the rail 113 (in the direction of the wind deflector 1200) how the respective shapes of these portions of the air bearing 325 will gradually reverse, where at some moment soon (depending on the velocity of the vehicle/cargo/assembly) the back portion will have an at least relatively more similar shape compared to the front and the front portion will have an at least relatively more similar shape compared to the back portion (as will be appreciated by those skilled in the art.) For instance, it is expected that the height of the back portion relative to the front will be roughly the same as the height of the front to the back portion in FIG. 17 at some further point. It is also expected that the back portion will have a relatively more altered shape than the front portion when the back portion reaches the point along the rail where the front portion presently is located, but its shape may not be exactly like the shape of the front portion in FIG. 17. (It should be noted that 'undulated' or 'undulation' herein should not necessarily imply a series/plurality of wave-like shapes, rather just at least one (like as shown in FIG. 17); and, in some cases the undulation may only occur with respect to top or bottom portion of the rail rather than both—though the Examples in FIGS. 17 and 18 reflect a rail where the top and bottom undulations are related, such that a height increase/convexity on the top side is reflected by a height decrease/concavity on the other.) Since it is assumed in FIG. 17 that the rail is substantially straight beyond the wind deflector 1200, it is also assumed that the front portion will gradually return to its normal shape (e.g., something like what the back portion looks like in FIG. 17), or at least a shape similar to it, as it reaches the assumed straight portion of the rail 113 ahead.

It is also expected that the assembly 200 does not change, or at least change substantially, its normal alignment with respect to the rail when the bearing 325 encounters an undulation; i.e., if the assembly 200 and rail were parallel before the undulation they should remain at least substantially so during the undulation. In other words, it is the bearing 365 that is doing all, or substantially all, the adapting. As one skilled in the art will appreciate, the weight of the vehicle/cargo and compliant nature of the bearing will mean little, if any, tilting of the assembly 200 in one or more (but not all) embodiments. That said, in one or more alternative embodiments where (for example) the load is light, it is possible to have some tilting of the assembly along with the bearing 325 compliance. Likewise, in one or alternative embodiments the assembly is made of a flexible material (as opposed to steel, for example) and thus may contribute some compliance of its own.

While this is not intended this to be limiting in any way, it is presently believed that the main air bearing 325 is, in at least some embodiments, able to comply to an undulation—or alternatively one or more other non-straight conditions (listed herein), or alternatively two of the non-straight rail conditions listed herein, or alternatively at least three of the non-straight rail conditions listed herein, or alternatively all listed (herein) non-straight rail conditions—and/or one or more of the other non-ideal rail/track conditions, such as one or more surface-related conditions (such as one of the surface related conditions listed herein, or alternatively at least three of the surface related conditions listed herein, or alternatively all of the surface related conditions listed herein). And, in one or more embodiments the bearing 325 is able to comply as much as at least 1-2% of its length; and, it is conceivable that this percentage reaches 2-3%, or possibly even greater in some embodiments. That said, in one or more embodiments the bearing 325 is able to comply 0.01-1% of its length; in one or more embodiments the bearing 325 is able to comply in this regard 0.1% to 2% of its length; in one or more embodiments the bearing 325 is able to comply in this regard 0.001% to 1% of its length; in one or more embodiments the bearing 325 is able to comply in this regard 0.001% to 2% of its length; in one or more embodiments the bearing 325 is able to comply in this regard 0.001% to 4% of its length; in one or more embodiments the bearing 325 is able to comply in this regard more than 0.1% of its length; in one or more embodiments the bearing 325 is able to comply in this regard more than 1% of its length; in one or more embodiments the bearing 325 is able to comply in this regard more than 2% of its length; in one or more embodiments the bearing 325 is able to comply in this regard more than 3% of its length; in one or more embodiments the bearing 325 is able to comply more than 0.01% in of its length and more than 0.01% of its width; in one or more embodiments the bearing 325 is able to comply more than 0.1% in of its length and more than 0.1% of its width; in one or more embodiments the bearing 325 is able to comply more than 1% in of its length and more than 1% of its width; in one or more embodiments the bearing 325 is able to comply more than 2% in of its length and more than 1% of its width; and, in one or more embodiments the bearing 325 is able to comply more than 2% in of its length and more than 2% of its width.

Figure 21A:
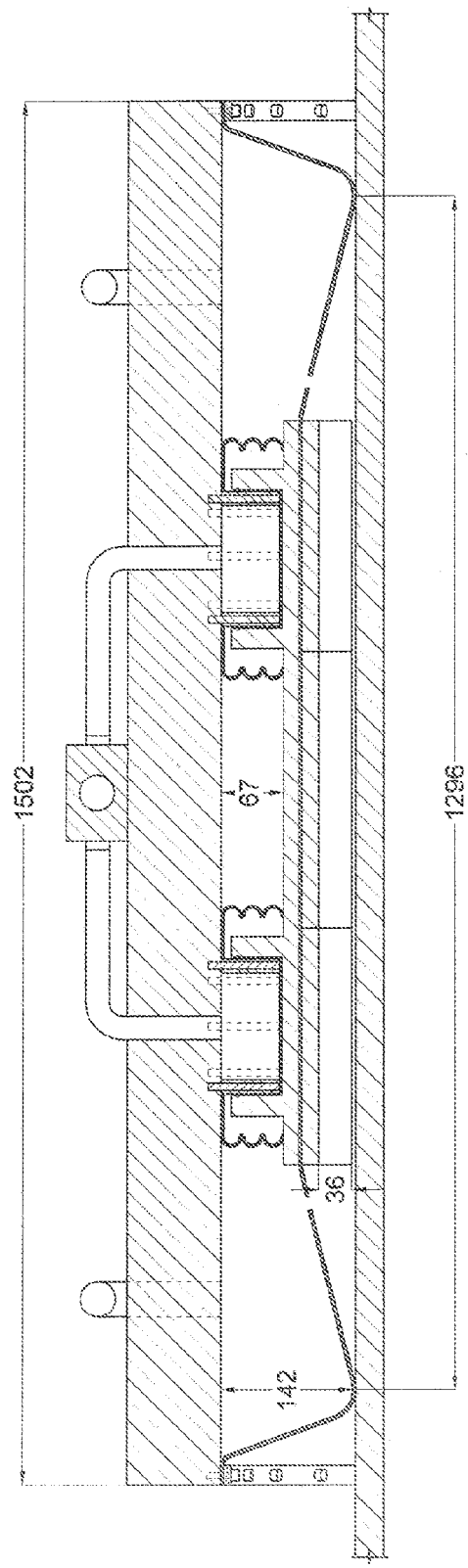
FIGS. 21A and 21B show two non-limiting examples, where
Figure 21B:
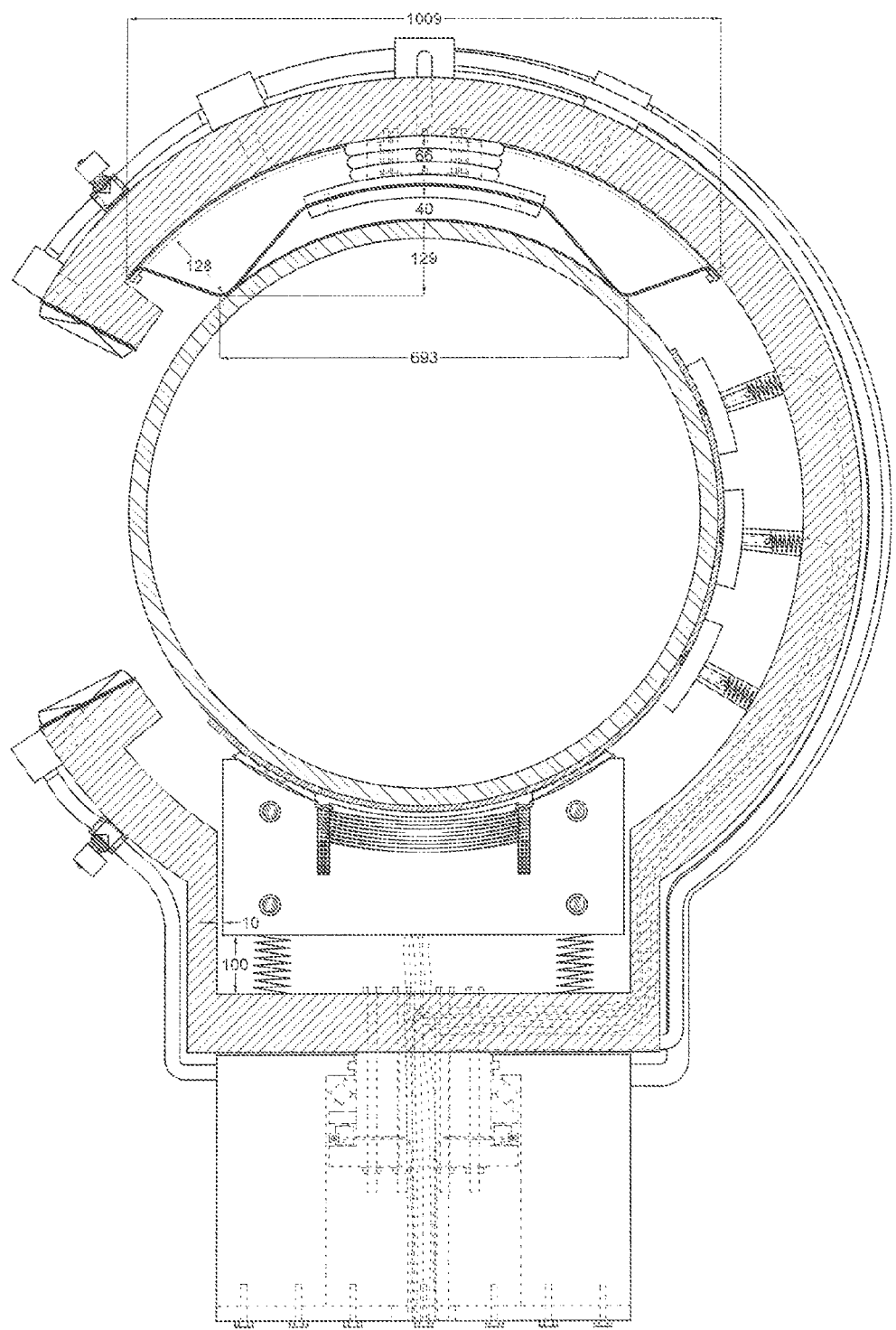

In one or more embodiments, depending on the compliance potential of the bearing and/or the compliance anticipated in light of one or more non-ideal conditions along the rail (e.g., magnitude of an undulation) the height of the brake pad 810 relative to the rail 113 may be adjusted or simply built with such in mind, as will readily be appreciated by those skilled in the art. In one or more non-limiting embodiments, such as depicted in FIG. 21A, the brake pad 810 is positioned a bit more than 36 mm above the rail. And for an at least roughly 1.5 meter long air bearing 325, where in one ore more embodiments it has at least a 1% compliant ability with respect to its length, this would translates to about 15 mm. Likewise, if is assumed that the air bearing 325 will not encounter any non-ideal conditions (e.g., an undulation) that would require more than a 1.5 mm compliance, it is easy to see that the position of the brake pad 810 is not only appropriate but has a built in safety factor.

Some Definitions of 'Comply/Compliance' in One or More Embodiments

In one or more embodiments, comply/compliance in this context means that the bearing 325 (e.g., its shape) is able to become and/or does become altered—e.g., as a result of its compliant nature—and in one or more embodiments the altering is an automatic/natural one that is in response to an adjacent surface, such as the rail 113 (or something associated with, such as on, the rail 113). In one or more embodiments, comply/compliance means that the bearing 325 (e.g., its shape) is able to and/or does become (just as described above with respect to the surface/rail, something associated with the rail, etc.) altered—e.g., as a result of its compliant nature—and is able to and/or does automatically/naturally return (e.g., as a reflection of its resilience) to its shape, or at least a substantially similar shape—e.g., in one or more embodiments 'at some point' after the surface, such as the rail 113, becomes no longer adjacent—prior to it becoming altered. In one or more embodiments 'at some point' is within 0.001 seconds, alternatively is within 0.01 seconds, alternatively is within 0.1 seconds, alternatively is within 1 second, or alternatively is within 10 seconds. In one or more embodiments substantially similar means at least 99% the same, in one or more alternative embodiments substantially similar means at least 90% the same, in one or more alternative embodiments substantially similar means at least 75% the same, in one or more alternative embodiments substantially similar means at least 50% the same, and in one or more alternative embodiments substantially similar means at least 25% the same.

In one or more embodiments, comply/compliance in this context means that (1) the bearing 325 (as described above) is able to become and/or does become (just as described above with respect to the surface/rail, something associated with the rail, etc.) altered—e.g., as a result of its compliant nature—and in one or more embodiments the altering is an automatic/natural one that is in response to an adjacent surface, such as the rail 113 and (2) the complied/altered portion of the bearing 325 is able to maintain the same, or at least 'substantially similar', height of lubrication zone 325L that the (un-complied/altered) bearing 325 would be able to otherwise maintain but for the one or more non-ideal conditions that are causing the bearing to comply/alter its shape (e.g., in ideal rail/track conditions on a perfectly straight rail). In one or more embodiments 'substantially similar' in this context means that the altered/complied height of the lubrication zone is 100.001% to 101% the height of lubrication zone 325L that the (un-complied/altered) bearing 325 would be able to otherwise maintain but for the one or more non-ideal conditions that are causing the bearing to comply/alter its shape; in one or more embodiments 'substantially similar' in this context means that the altered/complied height of the lubrication zone is 101% to 110% the height of lubrication zone 325L that the (un-complied/altered) bearing 325 would be able to otherwise maintain but for the one or more non-ideal conditions that are causing the bearing to comply/alter its shape; in one or more embodiments 'substantially similar' in this context means that the altered/complied height of the lubrication zone is 110% to 200% the height of lubrication zone 325L that the (un-complied/altered) bearing 325 would be able to otherwise maintain but for the one or more non-ideal conditions that are causing the bearing to comply/alter its shape; in one or more embodiments 'substantially similar' in this context means that the altered/complied height of the lubrication zone is 200% to 1,000% the height of lubrication zone 325L that the (un-complied/altered) bearing 325 would be able to otherwise maintain but for the one or more non-ideal conditions that are causing the bearing to comply/alter its shape; in one or more embodiments 'substantially similar' in this context means that the altered/complied height of the lubrication zone is ten times to one hundred times the height of lubrication zone 325L that the (un-complied/altered) bearing 325 would be able to otherwise maintain but for the one or more non-ideal conditions that are causing the bearing to comply/alter its shape; in one or more embodiments 'substantially similar' in this context means that the altered/complied height of the lubrication zone is one hundred times to one thousand times the height of lubrication zone 325L that the (un-complied/altered) bearing 325 would be able to otherwise maintain but for the one or more non-ideal conditions that are causing the bearing to comply/alter its shape; in one or more embodiments 'substantially similar' in this context means that the altered/complied height of the lubrication zone is one thousand times to ten thousand times the height of lubrication zone 325L that the (un-complied/altered) bearing 325 would be able to otherwise maintain but for the one or more non-ideal conditions that are causing the bearing to comply/alter its shape.

In one or more embodiments comply in this context means that the altered/complied height of the lubrication zone 325L when the bearing 325 is complied is less than a height (relative to a perfectly straight/horizontal surface) of the one or more non-ideal conditions that are causing the bearing 325 to alter its shape/become complied. FIG. 17 provides a good example of this—i.e., as the lubrication zone 325L there remains tiny in the face of a much larger convexity along the rail 113, where the much larger relative height of the convexity is easily seen in relation to the perfectly straight rail depicted by the dot-dash-dot line. In one or more embodiments comply in this context means that the altered/complied height of the lubrication zone 325L when the bearing is complied is more than 1% less than the height of the one or more non-ideal conditions that are causing the bearing 325 to alter its shape/become complied; in one or more embodiments comply in this context means that the altered/complied height of the lubrication zone 325L when the bearing is complied is more than 10% less than the height of the one or more non-ideal conditions that are causing the bearing 325 to alter its shape/become complied; in one or more embodiments comply in this context means that the altered/complied height of the lubrication zone 325L when the bearing is complied is more than 50% less than the height of the one or more non-ideal conditions that are causing the bearing 325 to alter its shape/become complied; in one or more embodiments comply in this context means that the altered/complied height of the lubrication zone 325L when the bearing is complied is more than 90% less than the height of the one or more non-ideal conditions that are causing the bearing 325 to alter its shape/become complied; in one or more embodiments comply in this context means that the altered/complied height of the lubrication zone 325L when the bearing is complied is more than 99% less than the height of the one or more non-ideal conditions that are causing the bearing 325 to alter its shape/become complied; in one or more embodiments comply in this context means that the altered/complied height of the lubrication zone 325L when the bearing is complied is more than 99.9% less than the height of the one or more non-ideal conditions that are causing the bearing 325 to alter its shape/become complied; and, in one or more embodiments comply in this context means that the altered/complied height of the lubrication zone 325L when the bearing is complied is more than 99.99% less than the height of the one or more non-ideal conditions that are causing the bearing 325 to alter its shape/become complied.

On a related note, in one or more (but not all) embodiments it will be appreciated that one or more portions of the air bearing 325 complies relatively more than one or more other portions of the air bearing 325 in one or more non-ideal rail conditions. For instance, in a situation like that shown in FIG. 17, it will be apparent that a front-center portion 329F (with reference to FIG. 8B) and a rear-center portion 325R (with reference to FIG. 8B) of the air bearing 325 will comply (and/or need to comply) more than a left-side portion 329T (with reference to FIG. 8B) and/or a right side portion 329S (with reference to FIG. 8B) of the air bearing 325. In one or more embodiments (i) the front-center portion 329F (with reference to FIG. 8B) and/or the rear-center portion 325R comply more than (ii) the left-side portion 329T (with reference to FIG. 8B) and/or the right side portion 329S by at least 1%; in one or more alternative embodiments it is at least 10% more; in one or more alternative embodiments it is at least 50% more; in one or more alternative embodiments it is at least 75% more; in one or more alternative embodiments it is at least 95%; and, in one or more alternative embodiments the left-side portion 329T (with reference to FIG. 8B) and/or the right side portion 329S do not comply at all when the front-center portion 329F (with reference to FIG. 8B) and/or the rear-center portion 325R comply in one or more non-ideal conditions.

In one or more embodiments the relatively greater compliance of one or more portions of the air bearing relative to one or more other portions of the air bearing 325 in one or more non-ideal rail conditions is at least in part due to one or more of the various structural features and/or structural relationships discussed herein. For instance, in one or more embodiments a ratio of a distance (e.g., 696D1 shown in FIG. 9B) between the assembly 200 and the aperture 325X2 discussed earlier (e.g., if the hypothetical horizontal plane—as depicted in FIG. 9B as a dot-dash-dot line—was placed adjacent to the aperture 325X2 and the distance 696D1 between the assembly, through the center 329Z (with reference to FIG. 8B) of the air bearing 325, and the horizontal plane were measured) and a width 325W of the aperture 325X2 is at least 1:25; in one or more embodiments it is at least 1:7; in one or more embodiments it is at least 1:5; in one or more embodiments it is at least 1:4, in one or more embodiments it is at least 1:3, in one or more embodiments is at least 1:2; and, in one or more embodiments it is at least 1:1. In addition, in one or more embodiments a ratio of a distance (e.g., 696D2 shown in FIG. 9B) between above the brake pad 810 and the aperture 325X2 discussed earlier (e.g., if the hypothetical horizontal plane—as depicted in FIG. 9B as a dot-dash-dot line—was placed adjacent to the aperture 325X2 and the distance 696D2 between the center 329Z (with reference to FIG. 8B) of the air bearing 325 and the horizontal plane were measured) and the width 325W of the aperture 325X2 is at least is at least 1:25; in one or more embodiments it is at least 1:7; in one or more embodiments it is at least 1:5; in one or more embodiments it is at least 1:4, in one or more embodiments it is at least 1:3, in one or more embodiments it is at least 1:2; and, in one or more embodiments it is at least 1:1. In one or more of such embodiments, one or more modifications—e.g., alteration of the curvature of the air bearing and/or assembly, or enlarging or reducing the width of one or both of these—occurs compared to the embodiment depicted in FIG. 9A. Also, in one or more embodiments the rail 113 is oval, or some other shape that includes a concavity, or at least a curved portion.

Before moving on to the topic of lateral curves, it is assumed that in one or more embodiments and/or scenarios that the bearing portion 325S that at least partially defines the lubrication zone when the rail is relatively straight may, in some cases, be replaced (so to speak) by another portion of the bearing sometimes when the bearing is encountering an undulation, albeit temporarily and where the other bearing portion is relatively near the bearing portion 325S that, under straight/normal conditions, at least partially defines the lubrication zone 325L.

(ix) Compliance Under (Lateral) Curve Conditions

In one or more embodiments, the bearing 325 complies with respect to (laterally oriented) curves—i.e., in addition or alternatively instead of longitudinally/vertically curves, e.g., an undulation. Though certain force(s) and/or stress(es) on the main air bearing 365 would be different when it complies with a lateral curve (as opposed to a longitudinal curve, e.g., undulation), the main air bearing 365 can take on lateral curves while keeping the lubrication zone 325L the same as described, or at least in a similar way as described, above with respect to longitudinal curves and/or other non-ideal rail conditions. Moreover, all of the various alternative meanings of compliance, with respect to various embodiments and/or alternatives, discussed above with respect to longitudinal curves (and/or one or more other non-ideal rail conditions) apply here as well. That said, it will further be appreciated that the various complied shapes of the bearing 325 will often, but not necessarily always, be relatively different when it is complying with certain lateral curves—e.g., as in the non-limiting examples shown in FIGS. 20A and 20B—compared to the various complied shapes it may take on when complying/conforming/adapting to a longitudinal curve (and/or one or more other non-ideal rail conditions), or a combination of both (lateral and longitudinal curve).

Figure 20A:
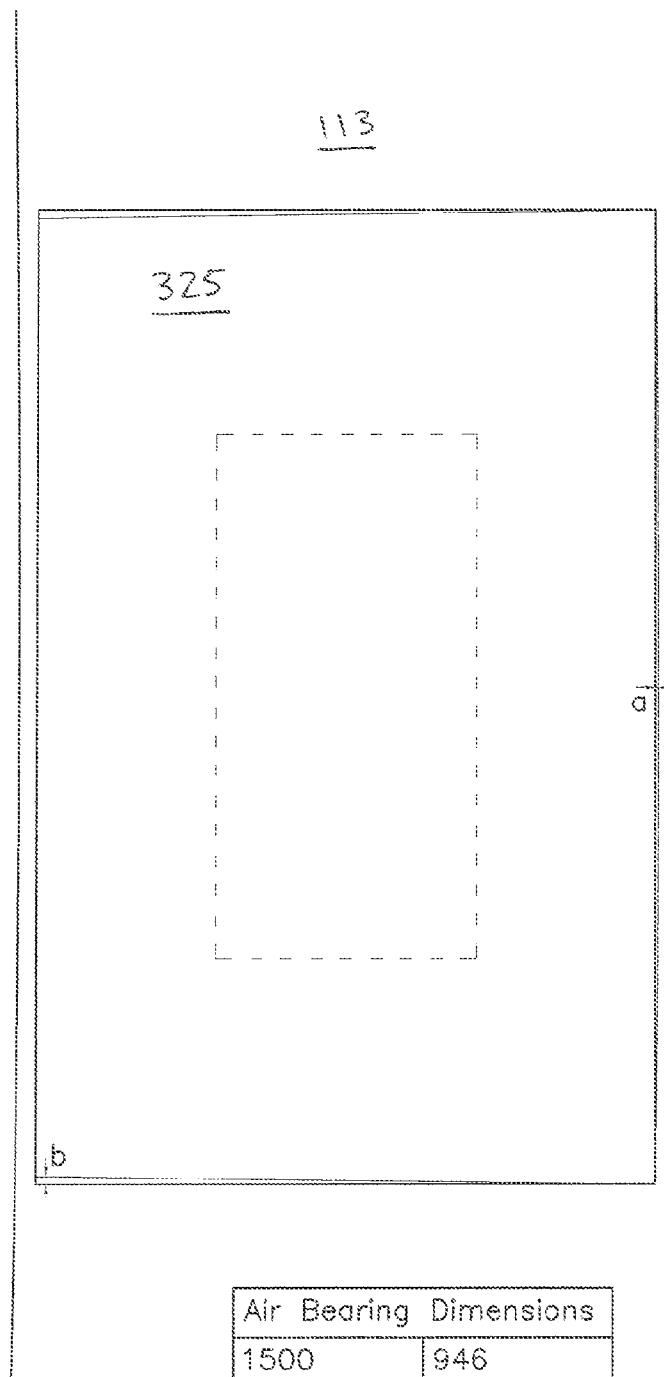
FIGS. 20A and 20B show examples reflecting the air bearing in lateral curves/turns.
Figure 20B:
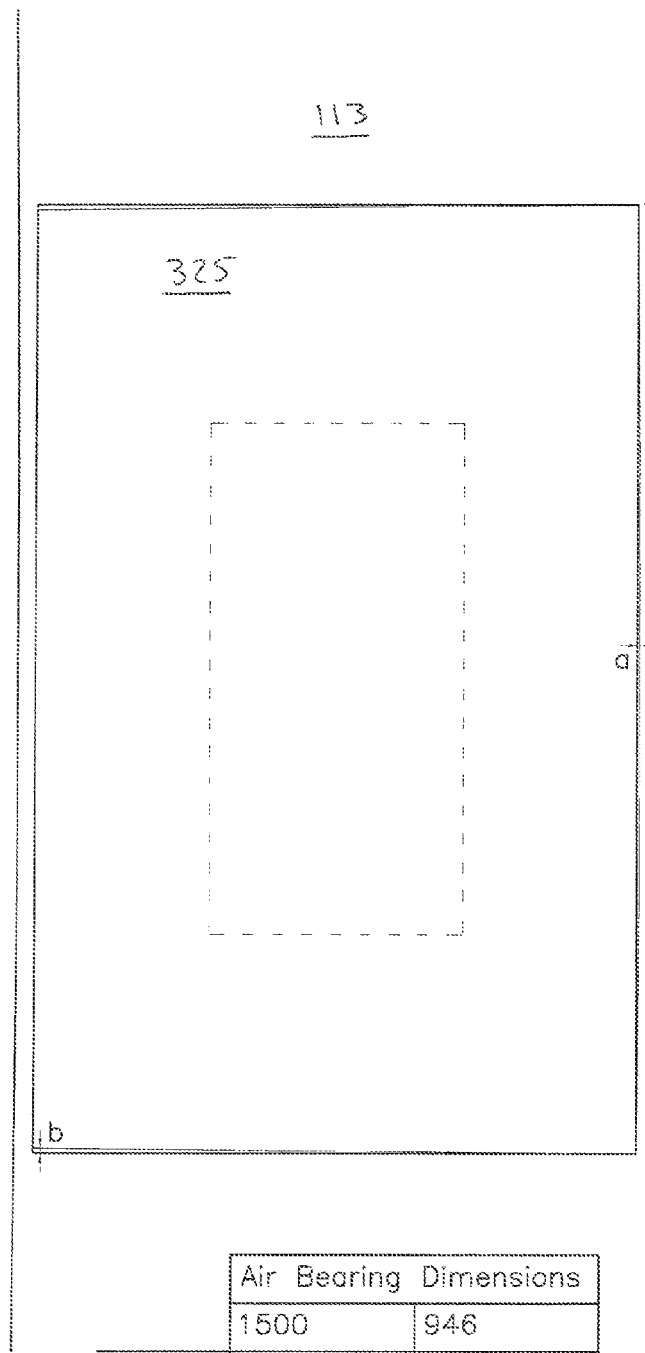

FIGS. 20A and 20B are depictions representing rough estimates of the lateral deformation and/or compliance of the main air bearing 365 that are estimated to occur under certain circumstances Taking a closer look at FIG. 20A, this top-down view of the bearing 325 (without the assembly 200 shown), which is somewhat rudimentary/artistic in nature with the brake pad 810 dashed in to indicate its relative location, provides a rough/estimate depiction of the bearing 325 in the middle of a 60 M radius counterclockwise turn (from the bottom towards the top of the page); and, FIG. 20B provides the same with respect to a 85 M radius counterclockwise turn (from the bottom towards the top of the page). More specifically, as the accompanying chart in FIG. 20A indicates the front-left and left-back portions of the bearing 325 alter their shapes 11.64 mm such that length of the bearing on its left side temporarily becomes 23.28 mm longer than the right side. And, at roughly the same time the center-right portion of the bearing 325 becomes altered outward about 4.61 mm. These differences reflect 0.30% and 0.77% respectively of the bearing's length (1.5 M), and represent 0.48% and 1.23% of the bearing's width (of 946.38 mm). As can be further seen in FIG. 20B, the estimated rough estimates are even smaller when the bearing 325 encounters an 85 M turn. Specifically, it is roughly estimated that the left-front and left-back of the bearing 325 will temporally lengthen by 8.3 mm at (for a total of 16.6 m); and the bulge at the center-right of bearing 325 will be roughly about 3.92 mm. These reflect 0.26% and 0.55% of the bearing's length and 0.41% and 0.87% of the bearing's width.

It should be pointed out that the deformations shown do not necessarily reflect a 1:1 deformation:compliance relationship. That is, the compliance could be somewhat more or somewhat less than the deformation depicted, or it could be at least roughly 1:1. But, what is pretty clear is that the bearing does comply; and what is also pretty clear is that this compliance is, or should be, within a range that makes the bearing practical in curves commonly undertaken—e.g., a 60 M turn, an 85 M turn. Finally, whether a specific compliance associated with an 85 lateral curve will demonstrate the exact same specific compliance associated with an 85 longitudinal curve or not—it is believed the lateral compliance is a viable one, and in one or more embodiments and/or conditions it is believed they would. Moreover, it is believed that the various ranges discussed above would apply to lateral curves as well and thus they will not be repeated here.

(x) Compliance with Curves that are Simultaneously Lateral and Vertical

In one or more embodiments, the air bearing's ability to alter its shape (e.g., in response to the rail's shape and/or change in shape) includes not its ability to do so when faced with longitudinal curve and a lateral curve, but also a combination of the two. An example of this would be an embodiment where the rail has sort of slight twisting appearance. It is presently assumed that this compliance is also a viable one. Moreover, it is believed that the various ranges discussed above would apply to lateral curves as well and thus they will not be repeated here.

The LIM System (i) Some Components of One or More LIM System Embodiments

Figure 10A:
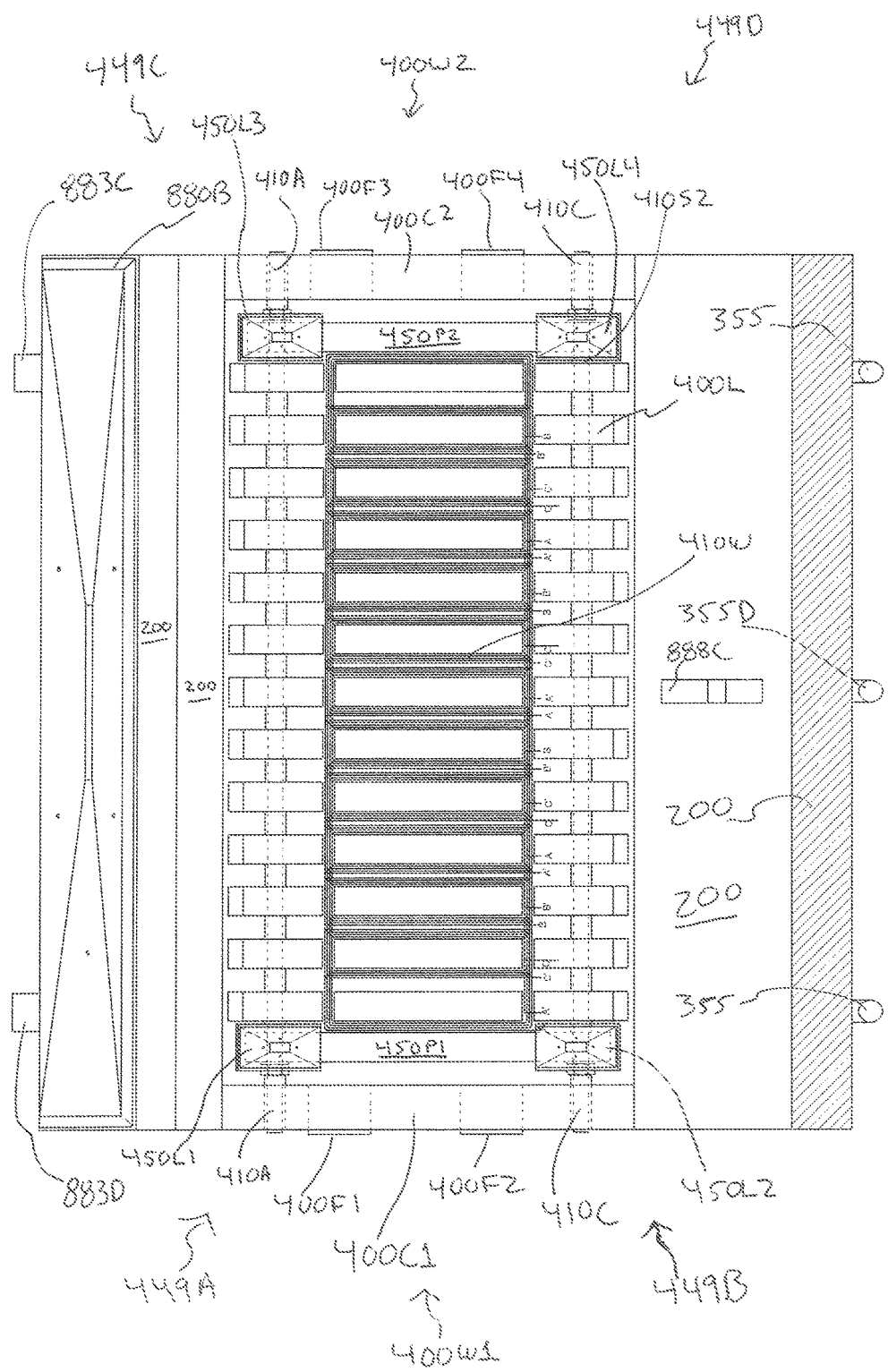
FIG. 10A shows a cross-sectional view taken along the D-D' axis of FIG. 4A, which is in many respects a top view of the 4-follower LIM with respect to the assembly within which it resides.

FIG. 10A shows the D-D' view of FIG. 4A, which is sort of a bird's eye view of the LIM 400L (which is part of the LIM system 400 and will be described later) situated with respect to the assembly 200. Along with the LIM 400L, one can see a pair of LIM cover portions 400C1, 400C2, some of the (four) LIM rods 410A, 410C, the vents (or fans) 400F1, 400F2, 400F3, 400F4, a plurality of (thirteen) LIM 'slices' 410S, a LIM winding(s) 410W, a plurality of spacers/elements 410S1 between the LIM 'slices' 410S, a plurality (of four) spacing elements 450S2 between each plate 450P1, 450P2 and the LIM 400L, a plurality (of four) LIM air bearings 450L1, 450L2, 450L3, 450L4, and a plurality (of two) plates/elements 450P1, 450P2 that help secure the (one or more but in this embodiment) four LIM air bearings 450L1, 450L2, 450L3, 450L4 to the LIM 400L, among others. The fundamental operation of the LIM 450L will not be discussed; suffice it to say that LIM technology has been around for a number of years and the LIM depicted in FIG. 10A helps move the vehicle/cargo in way that employs such fundamentals. That said, the LIM 400L and/or LIM system 400 includes one or more various features that attempt to maximize (or maintain, or at least mitigate the lessening of) the LIM's ability to move the assembly 200 and/or vehicle, especially under certain circumstances, and this will be discussed in more detail below, among other topics.

Figure 10B:
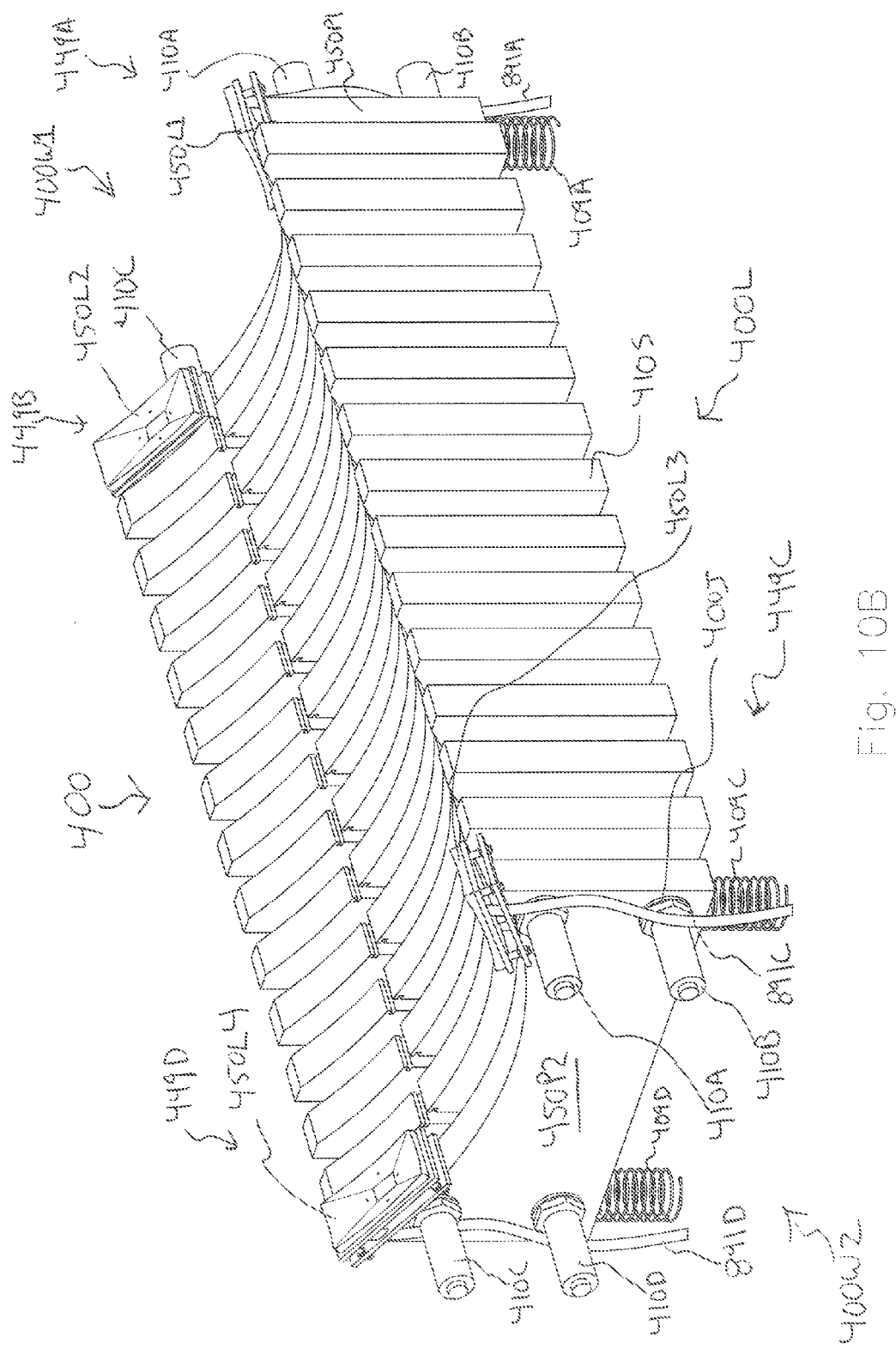
FIG. 10B shows a perspective view of the 4-follower LIM shown in FIG. 4A, among other Figures.

FIG. 10B shows a perspective view of the 4-follower LIM 400L depicted in FIG. 10A. Aside from the various components mentioned with respect to FIG. 10A, others that are perhaps more easily seen here include three of the four tubes 891A, 891B, 891C, 891D connecting the each of the four LIM air bearings 450L1, 450L2, 450L3, 450L4 to the air supply 900, and four of the eight fasteners 400J (which are nuts here) that help secure the plates/elements 450P1, 450P2 to the LIM. Also two springs 409A, 409B are shown attached to one plate 450P1 (though spring 409B cannot be seen in this Figure) and two springs 409C, 409D are shown attached to the other plate 450P2. In one or more alternative embodiments some other element(s) is employed rather than one or more springs, such as a piece of rubber; almost anything that has the property of and/or acts like a spring (e.g., an elastic object that applies force when compressed) is employed in various alternative embodiments. In this embodiment, one spring/element is employed for each LIM air bearing; however, in alternative embodiments one (e.g., relatively wider spring or piece or rubber, for example) is associated with the two LIM bearings on one end of the LIM, and another (e.g., relatively wider spring or piece or rubber, for example) is associated with the two LIM bearings on the other end of the LIM. In fact, in one or more further embodiments, one spring or alternatively one big piece of rubber (or other element with such properties) is placed under the LIM 400L, or alternatively the LIM and plates 450P1, 450P2.

This may also be helpful time to point out that FIG. 9A shows a side view of one of the various LIM slices 410S of the LIM 400L, and how the four rods 410A, 410B, 410C, 410D weave through them. Also, one can see there two 409C, 409D of the four springs 409A, 409B, 409C, 409D that are under the plate/element 450P2 in this 4-follower LIM embodiment. (Other components depicted in FIG. 9A are discussed elsewhere in this document.)

Also, in the context of this four-follower 449A, 449B, 449C, 449D embodiment it is meant that each follower (e.g., 449A) includes one of the four LIM air bearings (e.g., 450L1), one of the four springs (e.g., 409A), and an element (e.g., plate 450P1) that connects the bearing 450L1 to the spring 409A and the LIM 400L. In this embodiment, but not all embodiments, the same plate (e.g., 450P1) also serves the same function for one of the other air bearings 450L2 with respect to one of other springs 409B (which can't be seen in FIG. 10B); but, in one or more alternative embodiments two different elements are employed instead of one for these two air bearings and springs. Similarly, in one or more alternative embodiments, two (of the four) air bearings (and thus two of the four followers) share just one spring, so that the four followers employ two springs (or alternatively three if only one pair share a spring).

Figure 10C:
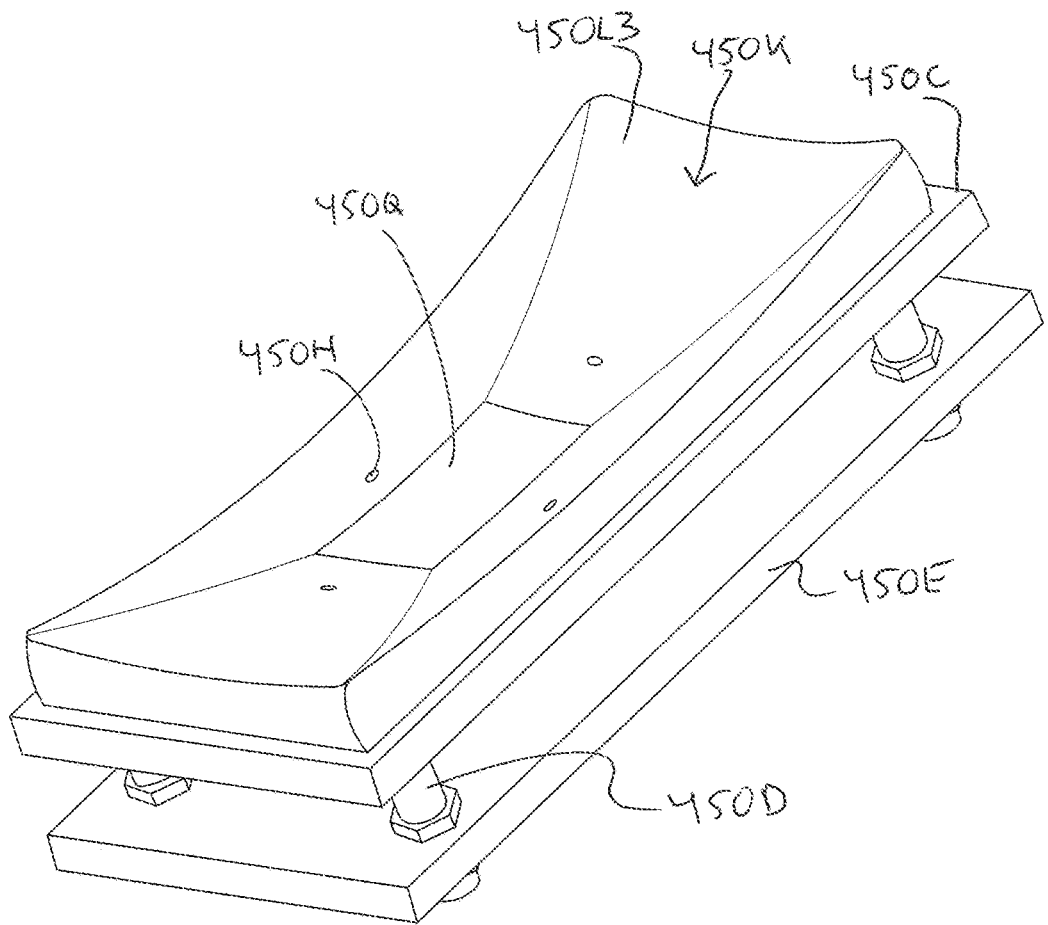
FIG. 10C shows a close up view of the LIM air bearing of the 4-follower LIM shown in FIG. 10B.

FIG. 10C shows a close-up view of one of the four LIM air bearings 450L1, 450L2, 450L3, 450L4 of FIG. 10A and FIG. 10B. The design and operation of the LIM air bearing 450L3 (and the others) is similar to that of the lateral air bearings 880A, 880B, which as was said above is similar to that of the main air bearing 325. That is, a cavity 450K of air is formed between the compliant/resilient air bearing 450L3 and the element/plate 450C to which it is attached (largely as the main air bearing 325 is to the assembly 200) and the air that exits/escapes out via the LIM air bearing holes 450H flows into a LIM air bearing plenum 400P (as shown in FIG. 10D) between each LIM air bearing (e.g., 450L3) and the rail 113; and a LIM air bearing lubrication zone 450Z is formed (largely as was described with respect to the main air bearing 325 and the rail 113).

In one or more but not all embodiments, an element 450Q, such as plate or relatively stiff plastic is also secured to the element/plate 450C (and in some but not all of these embodiments the bearing 450L3 is sandwiched in between). In one or more alternative embodiments the bearing 450L3 is attached directly to the element/plate 450C not only along or near its outer perimeter but also at or near its center (and there is no center element/plate 450Q). In one or more embodiments another element/plate 450E is optionally added to help connect the air bearing 450L3 to the plate 450P2 connected to the LIM 450L, where one or more rods 450D connect these, as shown in FIG. 10C. In alternative embodiments the element/plate 450C that helps form the cavity 450 is attached directly to the plate 450P2 connected to the LIM 450L.

(ii) LIM Bearing Compliance

Also, similar to the discussion of the main air bearing 325, the air provided to the LIM air bearings 450L1, 450L2, 450L3, 450L4 is (in some but not all embodiments) regulated to help keep them as close as possible to the rail 113 without touching it, or at least attempt to minimize the possibility of any such contact. As will be appreciated by those skilled in the art, the amount and/or pressure of air admitted to the LIM air bearings 450L1, 450L2, 450L3, 450L4 will, at least in one or more embodiments, be at least partially based on the force exerted (or estimated or predicted to be exerted) by the springs 409A, 409B, 409C, 409D. That said, if there is somewhat more air pressure provided than needed, in one or more but not all embodiments each of the LIM air bearings act as a release valve to some degree—e.g., where its compliant nature enables the lubrication zone 450Z to increase in height (similar to what was discussed in relation to the main bearing 325) and/or the spring (e.g., 409A) compresses slightly to enable the lubrication zone 450Z to increase in height. In one or more embodiments, the LIM air bearings 450L1, 450L2, 450L3, 450L4 are self-regulating, essentially just as was described with respect to the main air bearing 325 above.

Also, the fact the LIM air bearings 450L1, 450L2, 450L3, 450L4 are compliant and/or resilient (where they are both in FIGS. 10B and 11A), in one or more but not all embodiments, also helps them overcome certain inconsistencies— e.g., defect, dirt, damage, etc. —on the rail 113. Again, their operation is similar to the main air bearing 325 in this regard, as well as the lateral air bearings' 880A, 880B. Further, like these other bearings 325, 880A, 880B the one or more LIM air bearings' 450L1, 450L2, 450L3, 450L4 compliant and/or resilient nature relates to their material (which is the same as the main air bearing, or reflects one of the alternative materials of the main air bearing 325) and/or the fact they are filled with air (or alternatively other substances as was discussed in relation to the main air bearing 325). While the size (e.g., height) of the LIM air bearings 450L1, 450L2, 450L3, 450L4 in the FIG. 10C/D embodiment does not afford them the same amount of compliance compared to that of the main air bearing 325 (which is much larger by comparison), the LIM bearings are able to comply (as one or more ways defined above) to at least some degree (at least in one or more, but not all, embodiments). That said, the LIM air bearings' 450L1, 450L2, 450L3, 450L4 compliance in this regard(s) is enhanced greatly by the springs 409A, 409B, 409C, 409D; in effect, the springs 409A, 409B, 409C, 409D and LIM bearings 450L1, 450L2, 450L3, 450L4 sort of function (e.g., with the two plates 450P1, 450P2) as four followers 449A, 449B, 449C, 449D collectively somewhat like the main air bearing 325—where this analogy/statement is only meant to provide some general guidance and is not meant to be limiting in any way.

It may further be helpful to point out that in one or more but not all embodiments the springs 409A, 409B, 409C, 409D have a stabilizing effect in certain unexpected and/or undesired circumstances. For instance, if the air bearing 325 goes into resonance (e.g., vertical resonance), such as a result of high speeds and/or high magnitude voltages applied to the LIM 450L, the LIM springs 409A, 409B, 409C, 409D serve to at least partially damp the magnitude of such events and thus mitigate any associated reduction in the LIM's 450L effectiveness.

(iii) The Relationship Between the LIM System and the Air Bearing System

While this should be evident from various Figures, like FIGS. 7A and 9A, it is worth discussing the relationship (e.g., cooperation, assistance, dependence) between one or more portions/components of the LIM system 400 and one or more portions/components of the air bearing system 300 (e.g., the air bearing 325). In one or more but not all embodiments this relationship at least involves one or more portions of the air bearing system (e.g., the air bearing 325) at least assisting in (i) positioning and/or maintaining one or more of the LIM air bearings 450L1, 450L2, 450L3, 450L4 in a close relationship (as defined elsewhere) to the rail 113, (ii) positioning and/or maintaining the LIM 400L in a close relationship (as defined elsewhere) to the rail 113, (iii) positioning one or more of the LIM followers 449A, 449B, 449C, 449D relative to the rail 113, and/or (iv) positioning one or more of the springs 409A, 409B, 409C, 409D (or other comparable element capable of providing force when under compression) relative to the rail.

In one or more embodiments, the assisting ((i), (ii), (iii), and/or (iv)) relates to the inflation of the air bearing 325 (e.g., via the air supply 900). In one or much such embodiments the inflation of the air bearing 325 moves a portion (e.g., 200U) of the assembly 200 away from the rail 113 and/or maintains (at least under certain conditions, such as straight portions of the rail and/or undulations less than a certain magnitude and/or curves less than a certain magnitude) the assembly 200 at least a certain distance from the rail 113. And, in one or much such embodiments the certain distance is related to, or alternatively is, a height of the inflated air bearing 325 (e.g., such as a largest height associated with the inflated air bearing 325) between the rail 113 and the assembly 200 immediately prior to the formation of the lubrication zone 325L. In one or more embodiments, the assisting ((i), (ii), (iii), and/or (iv)) relates to the cavity 325C (e.g., a height of the cavity 325C, such as a largest height associated with the cavity 325C) and or the plenum 325P (e.g., a height of the plenum 325P, such as a largest height associated with the plenum 325P) of the air bearing 325. In one or more embodiments, the assisting ((i), (ii), (iii), and/or (iv)) relates to the lubrication zone 325L.

In one or more embodiments the relationship between one or more portions/components of the LIM system 400 and one or more portions/components of the air bearing system 300 concerns their respective positions relative to the rail 113. In one or more embodiments the relationship between one or more portions/components of the LIM system 400 and one or more portions/components of the air bearing system 300 concerns their respective positions on opposite sides of the rail 113. In one or more embodiments the relationship between one or more portions/components of the LIM system 400 and one or more portions/components of the air bearing system 300 concerns their respective positions relative to the assembly 200. In one or more embodiments the relationship between one or more portions/components of the LIM system 400 and one or more portions/components of the air bearing system 300 concerns their respective positions on opposite sides of the assembly 200.

For instance, looking at FIG. 7A one can see how the air bearing 325 and the LIM are on opposite sides of the rail 113 and on opposite sides of the assembly 200 such that the inflation of the air bearing 325 has caused the upper assembly portion 200U to move upwards, which has caused the lower assembly portion 200L to move upwards, and—since the LIM 400L (and LIM system 400) is positioned between the lower assembly portion 200L and the rail 113—it has moved towards the rail 113. Moreover, once the bearing 325 has been inflated to the point where the lubrication zone 325L has formed, the position of the LIM will largely be maintained towards the rail 113 in this fashion. Moreover, the role of the springs 409A, 409B, 409C, 409D should not be forgotten; as one can see the inflation of the bearing 325 moves the LIM towards the rail, and the springs 409A, 409B, 409C, 409D bring the LIM close to the rail. Even more specifically, the springs 409A, 409B, 409C, 409D move the four air bearings 450L1, 450L2, 450L3, 450L4 close (as defined elsewhere) to the rail, where the four air bearings 450L1, 450L2, 450L3, 450L4 would touch the rail but for the lubrication zone 450Z between each of the four air bearings 409A, 409B, 409C, 409D and the rail 113. In other words, the inflation of the air bearing 325 (or the inflation of the air bearing 325 and the formation/inflation of the plenum 325) brings the lower assembly portion 325L towards the rail, and is assisted (in one or more embodiments) in positioning the four LIM air bearings and the LIM 400L in a close relationship (as defined elsewhere) to the rail 113 in this way. In one or more alternative embodiments, the above occurs without the assistance of the springs; i.e., in one or more alternative embodiments the inflation of the air bearing 325 (or the inflation of the air bearing 325 and the formation/inflation of the plenum 325) positions the four LIM air bearings 450L1, 450L2, 450L3, 450L4 and the LIM 400L in a close relationship (as defined elsewhere) to the rail 113.

In one or more (but not all) embodiments, the lubrication zone 450Z of the LIM bearings 450L1, 450L2, 450L3, 450L4 and/or the LIM spring(s) 409A, 409B, 409C, 409D has substantially zero (or little) effect on the magnitude of the height of the main air bearing 325. At least part of the reason for this is because the load of the vehicle/cargo, and thus that on the air bearing 325, is assumed be fairly large in many (but not all) scenarios here (e.g., at least 5,000 Kg) and the force applied by the springs 409A, 409B, 409C, 409D is quite small by comparison. Practically speaking, the force of the springs 409A, 409B, 409C, 409D is at least mainly employed to push the LIM 400L towards the rail 113. And, the (four portions of the) lubrication zone 450Z respectively associated with each of the LIM air bearings 450L1, 450L2, 450L3, 450L4 essentially prevents them from being pushed against the rail 113; thus, the LIM 450L (and its bearings) is able to move along the rail 113 and close to the rail without touching the rail 113.

Before moving on, it should be pointed out that in one or more (but not all) embodiments the relative positions of the LIM 400L (and/or LIM system 400) and air bearing 325 with respect to one another—e.g., in one or more embodiments where the LIM 400L and air bearing 325 are not adjacent to one another, or even relatively near each other—make any LIM 400L temperature increases relatively less likely to impact the air bearing 325. In fact, in one or more embodiments any LIM temperature increases do not affect the air bearing 325 at all, or alternatively would be negligible or at least relatively small. In addition, in one or more but not all embodiments the relative positions of the LIM 400L and air bearing 325 with respect to one another enables the LIM to help the air bearing move (e.g., lift) and/or maintain the assembly 200 away from the rail, so that relatively less pressure needs to be supplied to the cavity 325 and/or the plenum 325P (compared to without such assistance of the LIM 450L). For instance, it is believed that in one or more embodiments there is an attraction between the LIM and the lower assembly portion 200L that serves to help move the upper assembly portion 200U away from the rail 113. In one or more other embodiments, there is some LIM repulsion with respect to the assembly that instead (or alternatively in addition) does the same thing with respect to a portion of the assembly adjacent (or near) the air bearing 325. While the extent to which this occurs in various embodiments is still being explored, it is believed that this force(s) of the LIM can serve to reduce the air pressure needed to be supplied in the cavity 325C and/or plenum 325P by more than 0.1%, alternatively more than 1%, alternatively more than 10%, alternatively more than 25%, alternatively more than 50%, alternatively more than 65%, or even as high as 70% or more.

(iv) The LIM System in Action

FIG. 10D shows the G-G' cross-sectional view of FIG. 4A. In essence, this view shows what various portions of the LIM system 400—which includes the LIM 400L and the four followers 449A, 449B, 449C, 449D that are connected to the air supply 900—look like from 'behind' the cover portion 400C1. As one can see from FIG. 10D, two/front springs 400A, 400B are positioned between the assembly 200 and the plate 450P1. It may be useful to view FIG. 10D with FIG. 9A, which shows the B-B' cross-sectional view of FIG. 4A, as that includes a good view of one of the LIM slices 410S (rather than the plate 450P1 shown in FIG. 10D) with the two/rear 409C, 409D springs, which 'may' appear to be under the LIM slice 410S but are under the other plate 450P2. It also may be useful to keep FIG. 7A, FIG. 4A, and FIG. 4B in mind in this regard, as these also provide informative views of the LIM's 400L relationship to the springs 409A, 409B, 409C, 409D, the plates 450P1, 450P2, and the LIM air bearings 450L1, 450L2, 450L3, 450L4 in relation to the rail 113 and assembly 200.

With these Figures in mind, one should be able to readily appreciate how the LIM 400L is able to move (via the assembly 200) along the rail 113 while being close to the rail 113 without touching the rail 113, and without any other part of the LIM system 400 touching the rail 113 (though part of the LIM or one or more of the air bearings may end up touching the rail temporarily if something unexpected occurs). For instance, one should be able to readily appreciate how, in one or more but not all embodiments, the pair of front springs 409A, 409B and the pair of rear springs 409C, 409D keep the front follower plate 450P1 and rear follower plate 450P1—and/or the LIM 450L—at respectively the same (or at least at a similar) distance from the assembly 200 (and/or rail 113) when the assembly 200 is traveling along a substantially straight portion of the rail 113 and/or at least keep the two plates 450P1, 450P2 and/or the LIM 450L at a certain orientation (e.g., parallel, at a certain angle) with respect to the assembly 200 (and/or the rail 113) when the assembly 200 is traveling along a substantially straight portion of the rail 113. Even more relevant in terms of the LIM's efficient operation is that in one or more embodiments the springs 409A, 409B, 409C, 409D at least keep the LIM air bearings 450L1, 450L2, 450L3, 450L4 all at least substantially the same distance from the rail 113 since, as will be explained below, the orientation of the plates 450P1, 450P2 and/or the followers 449A, 449B, 449C, 449D varies to (i) keep the bearings 450L1, 450L2, 450L3, 450L4 close to the rail 113 and/or (ii) keep the LIM 450L close to the rail—and ideally both in one or more embodiments.

In light of the above and FIGS. 7A and 10D, among others, one should be able to easily visualize (in one or more but not all embodiments) how one or more portions of the LIM system 400 respond when it encounters an undulation/hill/convexity and/or a depression/concavity and/or one or more other non-ideal rail conditions (as discussed above), such as one or more other non-straight rail conditions. (It should be noted that in this context an undulation/hill/convexity is one with respect to the LIM system 400; i.e., in one or more but not all embodiments this will mean that the main air bearing 325 is simultaneously experiencing a corresponding depression/concavity, e.g., when the bearing 300 and LIM 400L are on opposite sides of the rail, and vice versa. But, in one or more other embodiments it will not mean this.) For instance, with respect to FIG. 10D, one can easily visualize how the front springs 409A, 409B under the front plate 450P1 will (automatically) begin to compress when the front end 400W1 of the LIM system 400 encounters an undulation/hill/convexity (for example); and, that this will mean that the front followers 449A, 449B move towards the assembly 200 (to which they are attached or otherwise positioned) such that the distance between the two front air bearings 450L1, 450L2 and the assembly 200 becomes relatively smaller than it was before the front springs 409A, 409B compressed as they encountered the undulation/hill/convexity.

Roughly speaking, the relationship between the front followers 449A, 449B and the rear followers 449C, 449D will look something loosely like the FIG. 17 view of the air bearing 325 as the front end 400W1 of the LIM system 400 passes over the undulation (but the rear end 400W2 of the LIM system 400 has not done so or has only partially done so). That is, in one or more embodiments during the passage of the LIM system 400 over the undulation/hill/convexity the (smaller) distance between the two front air bearings 450L1, 450L2 and the assembly 200 becomes smaller than the distance between the two rear air bearings 450L3, 450L4 and the assembly 200, whose springs 410C, 410D have not yet compressed, or have compressed relatively less than the front springs 409A, 410A—at least temporarily. Furthermore, in a way similar to what was explained with regard to the air bearing 325 in FIG. 17, as the assembly 200 continues to move forward over the undulation/hill/convexity, the distance between the two front air bearings 450L1, 450L2 and the assembly 200 stops decreasing and gradually begins to increase. And, in one or more but not all embodiments the distance between the two front air bearings 450L1, 450L2 and the assembly 200 then increases until the distance between the front LIM air bearings 450L1, 450L2 and the assembly 200 returns to the one it had, or at least relatively close to it, prior to encountering the undulation/hill/convexity; and/or, the distance between the two front air bearings 450L1, 450L2 and the assembly 200 then increases until the distance between the front LIM air bearings 450L1, 450L2 and the assembly 200 returns to the one it (normally/typically) has when the LIM system 400 is positioned on a substantially straight portion of the rail 113, or at least relatively close to it; and/or the distance between the two front air bearings 450L1, 450L2 and the assembly 200 then increases until the distance between the front LIM air bearings 450L1, 450L2 and the assembly 200 is one that is substantially the same as the distance between the rear LIM air bearings 450L3, 450L4 and the assembly 200 (even if it is just for just an instant).

Simultaneously while at least part of the above is happening with respect to the front air bearings 450L1, 450L2 and/or followers 449A, 449B, the two back air bearings 450L3, 450L4 and/or followers 449C, 449D do more-or-less same thing, or at least act in at a similar way. It will be readily apparent, however, that in one or more but not all embodiments there is a sequential nature to the response of the LIM bearings 450L1, 450L2, 450L3, 450L4 and/or followers 449A, 449B, 449C, 449D and/or springs 409A, 409B, 409C, 409D—e.g., here the respective front pairs 450L1, 450L2/449A, 449B/409A, 409B begin their response before the back pairs 450L3, 450L4/449C, 449D/409C, 409D begin their response and/or the respective front pairs end their response before the back pairs end their response, though both occur in the embodiment depicted in the Figures referred to in this discussion.

Moreover, as will be appreciated by those skilled in the art, essentially the opposite occurs if the undulation/hill/convexity were an undulation/depression/concavity instead. That is, one should be able to also easily visualize how the front springs 409A, 409B will (automatically) begin to expand when the front end 400W1 of the LIM system 400 encounters the depression/concavity; and that this will mean that the front followers 449A, 449B move away from the assembly 200 (to which they are attached or otherwise positioned) such that the distance between the two front air bearings 450L1, 450L2 and the assembly 200 becomes relatively greater than it was before the front springs 409A, 409B expanded as they encountered the depression/concavity. Likewise, one should be able to also easily visualize how the distance between the two front air bearings 450L1, 450L2 and the assembly 200 stops increasing and gradually begins to decrease. And, in one or more but not all embodiments the distance between the two front air bearings 450L1, 450L2 and the assembly 200 then decreases until the distance between the front LIM air bearings 450L1, 450L2 and the assembly 200 returns to the one it had, or at least relatively close to it, prior to encountering the depression/convexity; and/or the distance between the two front air bearings 450L1, 450L2 and the assembly 200 then decreases until the distance between the front LIM air bearings 450L1, 450L2 and the assembly 200 returns to the one it (normally/typically) has when the LIM system 400 is positioned on a substantially straight portion of the rail 113, or at least relatively close to it; and/or, the distance between the two front air bearings 450L1, 450L2 and the assembly 200 then decreases until the distance between the front LIM air bearings 450L1, 450L2 and the assembly 200 is one that is substantially the same as the distance between the rear LIM air bearings 450L3, 450L4 and the assembly 200 (even if it is just for just an instant). Further, just as above, simultaneously while at least part of the above is happening with respect to the front air bearings 450L1, 450L2 and/or followers 449A, 449B, the two back air bearings 450L3, 450L4 and/or followers 449C, 449D do more-or-less the same thing, or at least act in at a similar way. Here as well there is a sequential nature (in one or more but not all embodiments) such that the response of the LIM bearings 450L1, 450L2, 450L3, 450L4 and/or followers 449A, 449B, 449C, 449D and/or springs 409A, 409B, 409C, 409D—e.g., here the respective front pairs 450L1, 450L2/449A, 449B/409A, 409B begin their response before the back pairs 450L3, 450L4/449C, 449D/409C, 409D begin their response and/or the respective front pairs end their response before the back pairs end their response, though both occur in the embodiment depicted in the Figures referred to in this discussion.

(v) Potential Benefit(s) Associated with LIM System's Design and/or Responsiveness In light of the above, it will be apparent that in one or more (but not all) embodiments and/or scenarios (e.g., via one or more of the above-mentioned responses), the LIM air bearings 450L1, 450L2, 450L3, 450L4 are able to remain relatively close to the rail 113 when the LIM 400L (and thus the assembly 200) moves (e.g., from a relatively straight portion of the rail to) along a portion of the rail 113 that is convex (e.g., 444C1) and/or concave (e.g., 444C2)—and/or reflects one or more of the various non-straight conditions mentioned above and/or reflects one or more of the non-ideal conditions mentioned above. As those skilled in the art will readily appreciate, maintaining relatively small distances between the one or more air bearings (e.g., 450L1, 450L2, 450L3, 450L4) and a surface (e.g., rail 113) on which it is acting is generally reflective of relatively efficient air usage since air will escape from between them at a relatively slower rate as a result. (In fact, the LIM bearing-rail distances achievable should be in the same ballpark as the ranges provided elsewhere in this document with respect to the main air bearing 325, which achieves this in a somewhat different way.)

Figure 18:
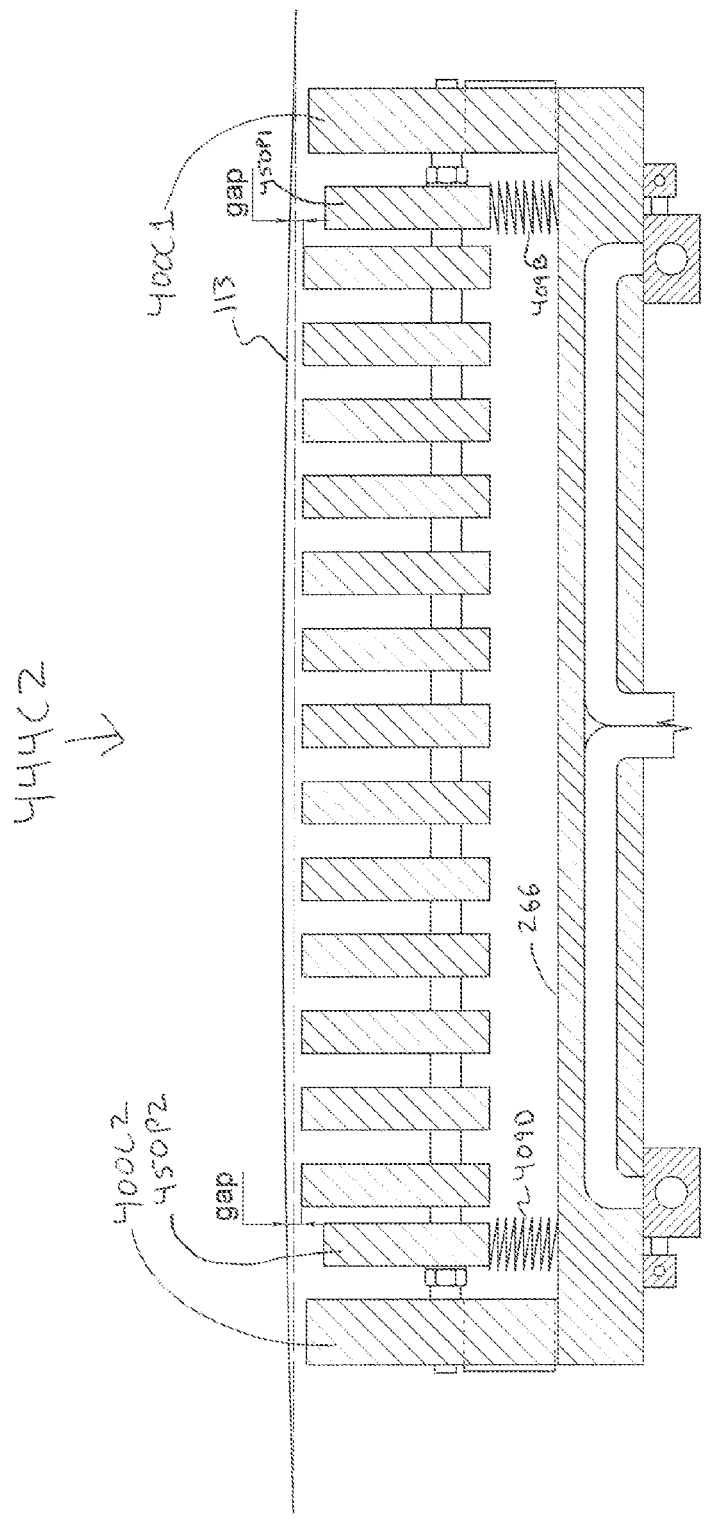
FIG. 18 is a close-up view of a portion of FIG. 7A that shows the LIM, assembly, etc., but where the rail is a bit concave, as discussed below.

Moreover, while the above discussion was largely couched in moving air bearings 450L1, 450L2, 450L3, 450L4 by reducing or increasing the their distance from the assembly (e.g., via compression and/or expansion of the springs 409A, 409B, 409C, 409D), what is also going on (or instead happening in one or more alternative embodiments, e.g., by spring compression and/or expansion) is that the LIM 400 is tilting—e.g., forward and/or backward, and both in the FIG. 18 embodiment (and/or side-to-side and diagonally to some degree in one or more alternative embodiments, especially when the LIM system encounters a lateral curve and/or diagonal curve). And, in one or more (but not all) embodiments this titling serves to keep at least a portion of the LIM closer to the rail than if the LIM were not able to tilt. Those skilled in the art will appreciate the distance adjusting (e g, minimizing) between the LIM 450L and the rail 113, such as via one or more of the responses described above, will in one or more but not all embodiments have the effect of mitigating any LIM thrust loss that would (or at least might) otherwise occur (if at least portions of the LIM were relatively further from the rail 113). Moreover, the tilting is forwards and/or backwards (or both in the FIG. 18 embodiment)—e.g., with respect to the assembly 200 and/or towards rail 113 in one or more but not all embodiments (and both the FIG. 18 embodiment). That is, by tilt it is meant that the orientation (e.g., angle) of the LIM 400L relative to the assembly changes. For instance, if the LIM 400L were parallel (e.g., zero degrees) to one or more surfaces of the assembly 200 (e.g., surface 266 depicted in FIG. 18), the LIM 400L would be become not-parallel to the surface 266 (e.g., at a non-zero angle). If the LIM 400L were at 'X' angle relative to the surface 266, or any other portion of the assembly 200 when the LIM is along a first portion (e.g., straight) of the rail 113, then the LIM 400L becomes at 'Y' angle relative to the surface 266, or the any other portion of the assembly 200, when the LIM is along a second portion (e.g., curved, such as convex or concave portion) of the rail 113. In one or more embodiments, the tilt (or other movement) of the LIM 400L relative to the assembly 200 moves at least a portion of the LIM 400L (or all of the LIM 400L) towards the rail 113. In one or more embodiments the tilting (or moving) of the LIM 400L is relative to the vehicle 100 and/or cargo 100C; in one or more embodiments the tilting (or moving) of the LIM 400L is relative to the ground (or floor); and, in one or more embodiments the tilting (or moving) of the LIM 400L is not relative to the assembly 200.

In light of the above, if the followers 449A, 449B, 449C, 449D were not movable/responsive in the one or more ways described above (and elsewhere), not only would a larger distance (and thicker layer of air) result between at least one of the LIM air bearings and the rail 113 in one or more (but not all) embodiments, but one or more (or all) of the LIM slices 410S of the LIM 400L would (or at least could), at least in certain situations (e.g., concavities, convexities), experience thrust losses (e.g., compared to when the LIM is on relatively straight portions of the rail 113) or relatively greater thrust losses than if the LIM were not able to tilt (or, more generally, move)—e.g., relative to the assembly 200. In one or more embodiments, this is accomplished by spring(s) 409A, 409B, 409C, 409D or another element having spring-like properties; and, in one or more alternative embodiments this is accomplished by one or more gear(s), such as in FIG. 11A. In one or more embodiments this is accomplished by four-followers (e.g., FIG. 10B); in one or more alternative embodiments this is accomplished by two-followers (e.g., FIG. 11A); in further one or more alternative embodiments this is accomplished by one follower; and, in further one or more embodiments this is accomplished by one spring, one other spring-like element, and/or one gear.

As can be seen from the above, most of the discussion focused on the LIM 400L tilting with respect to the assembly 200; so, before moving further the relative alignment of the assembly 200 in one or more but not all embodiments will be discussed here. As can be seen in a number of Figures (such as FIG. 4A), in one or more embodiments it is expected that the assembly 200 will be roughly parallel with respect to the ground/floor (or other surface in which the rail-supporting columns 222 are planted), at least in relatively straight (i.e., non-curved) portions of the rail 113— e.g., where in one or more embodiments the relatively straight (i.e., non-curved) portions of the rail 113 are at least roughly parallel to the ground (and/or a horizontal plane associated with the surface of the earth under, or at least near, the rail 113) and/or at least roughly parallel to the vehicle/cargo. And, while the patent applicant is not intending to suggest that the assembly 200 in all embodiments always remains parallel to ground/floor when the assembly is encountering a non-straight portion of the rail 113—and/or always remains in the at least substantially same alignment in non-straight portions of the rail as when in straight portions of the rail 113—this is what is believed to occur at least in one or more embodiments and/or one or more scenarios (e.g., depending on the magnitude and/or length of the concavity or convexity). For instance, if an embodiment of the assembly 200 were moving along an at least relatively straight section of the rail 113 and the alignment of the assembly 200 and ground/surface were not greatly different, it is believed that they would remain aligned in the same way if and when the assembly 200 encountered a convex or concave portion of the rail 113—though, it is further believed, that would at least in part depend on the degree of the convexity or concavity in some embodiments, one or more characteristics (e.g., related to compliance) of the springs (or gears in the case of the two-follower embodiment), and/or one or more characteristics (e.g., related to compliance) of the main air bearing 325. That said, it is also believed that in one or more embodiments and/or one or more scenarios (e.g., depending on the magnitude and/or length of the concavity or convexity) that the assembly 200 will tilt (e.g., in way towards matching the curvature of rail 113), at least somewhat, relative to the ground/floor (and/or its normal/typical alignment), but that will be in addition to the tilt of the LIM and/or the compliance of the main air bearing 325; and, that in one or more of such embodiments that the tilt of the LIM 400L and/or the angle (e.g., from a complied/compressed front portion to a not complied/compressed back portion) of the main air bearing 325 will still serve to achieve one or more of the benefits described with such tilting and/or compliance. In fact, it believed that in one or more embodiments and/or one or more scenarios (e.g., depending on the magnitude and/or length of the concavity or convexity) that the tilt of the LIM 400L and/or the angle (e.g., from a complied/compressed front portion to a not complied/compressed back portion) of the main air bearing 325 will be greater than any tilt associated with the assembly 200 relative to the ground; and, that in one or more of such embodiments that the tilt of the LIM 400L and/or the angle (e.g., from a complied/compressed front portion 325 to a not complied/compressed back portion) of the main air bearing 325 will still serve to achieve one or more of the benefits described with such tilting and/or compliance. Moreover, it also believed that in one or more embodiments and/or one or more scenarios (e.g., depending on the magnitude and/or length of the concavity or convexity) that the tilt of the LIM 400L and/or the angle (e.g., from a complied/compressed front portion to a not complied/compressed back portion) of the main air bearing 325 will be smaller than any tilt associated with the assembly 200 relative to the ground; and, that in one or more of such embodiments that the tilt of the LIM 400L and/or the angle (e.g., from a complied/compressed front portion to a not complied/compressed back portion) of the main air bearing 325 will still serve to achieve one or more of the benefits described with such tilting and/or compliance. Further, it also believed that in one or more embodiments and/or one or more scenarios (e.g., depending on the magnitude and/or length of the concavity or convexity) that the assembly 200 will tilt relative to the ground, the LIM 400L will not tilt, but the main air bearing 325 will still exhibit some compliance. In addition, in one or more but not all embodiments the connector 700 is adapted/modified to accommodate tilting, the degree of tilting expected, or the not tilting of the assembly 200 with respect to the ground/floor (and/or in a way towards matching the curvature of rail 113). Accordingly, in one or more of such embodiments, the titling ability of the LIM 400L enables the LIM to function more effectively than if it was unable to do so.

With the above in mind, this may be an opportune time to discuss FIG. 18. While FIG. 18 is meant to depict at least portions of the LIM System 400 that are, via the assembly 200, associated with the air bearing 325 shown in FIG. 17, it should be noted that the depression/concavity 444C2 shown in FIG. 18 is not intended to match/correspond to the convexity/hill/undulation 444C1 in FIG. 17 (e.g., as one can see it is a bit shorter in length, and the LIM is further along the depression/concavity 444C2 depicted n FIG. 18 than it would be if, hypothetically, the depression/concavity 444C2 depicted in FIG. 18 matched/corresponded to the convexity/hill/undulation 444C1 in FIG. 17). Moreover, just as in FIG. 17, the rail 113 in FIG. 18 is depicted by the solid line, where the dash-dot-dash line reflects what a straight/non-undulated rail would look like by comparison. Among other things, FIG. 18 provides a good reference to discuss the distance between the LIM 400L and the rail 113, and how this varies, when the LIM 400L encounters a depression/concavity and/or a hill/convexity (and/or one or more other non-straight rail conditions mentioned herein). As is seen in FIG. 18, various LIM slices have different gaps between it/them and the rail 113. For instance, the gap between each of the first slice and thirteenth slice and the rail 113 is less than the gap between the seventh/middle slice (of the thirteen in this embodiment) and the rail 113. And, so it would appear that the maximum gap between the LIM 400L and the rail 113 in this embodiment and this particular instance as the LIM 400L moves along the rail 113 is reflected by the gap/distance between the seventh/middle slice (of the thirteen in this embodiment) and the rail 113. As those skilled in the art will appreciate, one generally wants to keep the LIM as close to the rail as possible without touching it, and it would generally be better to (i) have a maximum gap that is as small as possible and/or (ii) minimize the amount of time that a maximum gap occurs—and ideally both.

Without recounting how the LIM followers move and/or how the LIM tilts, it will be sufficient in this discussion to generally point out how the LIM 400L is oriented with respect to the rail 113, and how that changes, as it moves along the depression/concavity 444C2 of FIG. 18 and how that relates to the distance between the LIM 400L and the rail 113. While FIG. 18 shows the LIM more or less under the concavity, one can easily imagine what occurs as the LIM begins to encounter the concavity: spring 409B and spring 409A (which is not shown in the cross-sectional view of FIG. 18) will expand and the front end of the LIM will tilt into the concavity (with the assembly, at least in this embodiment, remaining in at least substantially the same alignment it had prior to encountering the concavity). In one or more but not all embodiments, this further tilting (e.g., further expansion of the springs 409A, 409B) will continue until roughly speaking the first (i.e., closest to the front of the LIM) LIM slice 410S is about at the deepest part of the concavity and/or when the LIM follower plate 450P1 is about at the deepest part of the concavity 444C2. Accordingly, but for the tilting of the LIM 400L (relative to the assembly 400L), the gap/distance between the first handful of slices of the LIM would be relatively larger at this juncture (and relatively more air would be lost in that larger gap); and, in particular, the gap between the first slice and the rail would be at least roughly the magnitude of the maximum gap—which, as will be appreciated, would not be beneficial with respect to the LIM's efficiency in delivering thrust.

Soon afterwards, the front portion of the LIM gradually 'un-tilts'—as reflected in FIG. 18. Importantly, one can see (i) that the maximum gap occurs only with respect to the seventh/middle LIM slice (or perhaps a couple of the LIM slices in some embodiments and/or scenarios) and (ii) this only occurs during the mere instant that the seventh/middle LIM slice is passing this point (of the maximum depth of the concavity 442C2). Next, one can imagine the LIM beginning to move away from concavity 444C2 and the back portion of the LIM tilting into the concavity 444C2—similar to how the front portion did so when the LIM first began to encounter the concavity 444C2. In one or more but not all embodiments, this further tilting (e.g., further compression of the spring 409D and the spring 409C (not shown in this cross-sectional view)) will continue until roughly speaking the last (i.e., closest to the back of the LIM) LIM slice 410S is about the deepest part of the concavity 444C2 and/or when the LIM follower plate 450P2 is about the deepest part of the concavity 444C2. Accordingly, but for the tilting of the LIM 400L (relative to the assembly 400L), the gap/distance between the last handful of slices of the LIM would be relatively larger at this juncture (and relatively more air would be lost in that larger gap); and, in particular, the gap between the last slice and the rail 113 would be at least roughly the magnitude of the maximum gap—which, as will be appreciated, would also not be beneficial with respect to the LIM's efficiency in delivering thrust. In fact, it would seem that every single LIM slice (i.e., all thirteen in this embodiment) would otherwise, but for the LIM's 400L ability to tilt, pass over the deepest part of the concavity— which, as will be appreciated, would also not be beneficial with respect to the LIM's efficiency in delivering thrust and would not be beneficial in terms of air usage (not to mention the power to deliver that air).

Figure 23B:
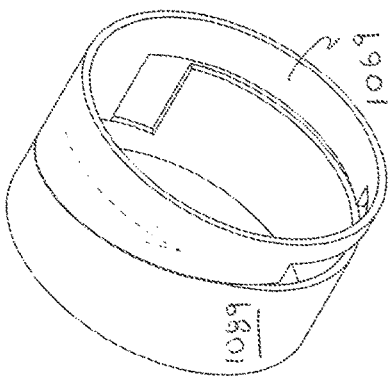
Figure 24C:
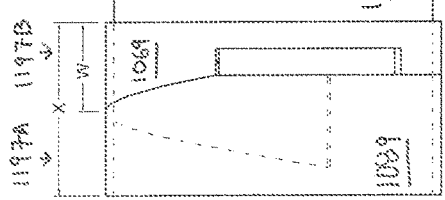
Figure 23C:
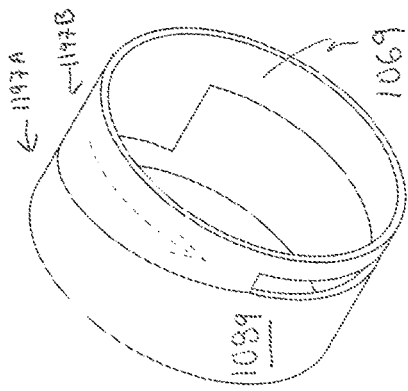

Before discussing gaps of specific magnitudes and/or ranges, it is important to mention the more-or-less opposite will occur when the LIM encounters a convexity, e.g., of similar length and depth as the convexity in FIG. 18. However, as should be apparent from the above discussion the design of the LIM system 400 should be such that the LIM—e.g., the middle LIM slice—does not hit the convexity when it is in a position relative to the convexity like the one depicted in FIG. 23 (with respect to the convexity there).

With the above in mind, it is expected that in one or more embodiments (but necessarily all) and/or scenarios (e.g., rail designs having certain convexities and/or concavities) that the maximum gap that the LIM will experience be less than 7 mm; in one or more embodiments the maximum gap that the LIM will experience be less than 5 mm; in one or more embodiments the maximum gap that the LIM will experience be less than 2 mm; in one or more embodiments the maximum gap that the LIM will experience be greater than 1 mm; in one or more embodiments the maximum gap that the LIM will experience be greater than 7 mm; in one or more embodiments the maximum gap that the LIM will experience be between 1 mm and 100 mm; in one or more embodiments the maximum gap that the LIM will experience be between 1.2 and 1.3 mm; in one or more embodiments the maximum gap that the LIM will experience be less than 0.1 mm; in one or more embodiments the maximum gap that the LIM will experience be between 0.01 mm and 2 mm; in one or more embodiments the maximum gap that the LIM will experience be between 1 mm and 3 mm— where in one or more embodiments, at least one of these at least partially defines a 'close relationship' between the LIM 400L and the rail 113. That said, it is not expected that the LIM will have to confront 'maximum' gaps with great frequency; accordingly, in one or more embodiments it is expected that the LIM will spend most (e.g., at least 99.99%, alternatively 99.9%, alternatively 99%, alternatively 90%, alternatively 75%, alternatively 51%) of its time (so to speak) within a LIM 400L-rail 113 distance range that in one or more embodiments is between 0.001 mm and 1 mm, in one or more embodiments is between 0.001 mm and 0.002 mm, in one or more embodiments is between 0.001 mm and 0.01 mm, in one or more embodiments is between 0.001 mm and 2 mm, in one or more embodiments is between 0.01 mm and 0.03 mm, in one or more embodiments is between 0.01 mm and 1.25 mm, in one or more embodiments is between 0.001 mm and 1.25 mm, in one or more embodiments is between 0.001 mm and 1.50 mm, in one or more embodiments is between 0.0001 and 3 mm, 1 mm, in one or more embodiments is between 0.001 mm and 10 mm, in one or more embodiments is less than 2 mm, in one or more embodiments is less than 1 mm, in one or more embodiments is less than 0.1 mm, and in one or more embodiments less than 0.01 mm—where in one or more embodiments at least one of these at least partially defines a 'close relationship' between the LIM 400L and the rail 113.

As will be understood, there are one or more factors that may affect which maximum and/or distance range occurs in various embodiments, but design considerations should bear in mind LIM thrust efficiencies and mitigating the possibility of the LIM hitting the rail (e.g., as mentioned above with respect to convexities) in light of various other considerations (e.g., geographic). For instance, on the one hand some designs will want to position the top surface of the LIM air bearing(s) so they are only slightly closer (or potentially even with, in some alternative embodiments) to the rail 113 than the slices of the LIM (to try to maximize thrust by keeping the rail-LIM distance relatively small) but, on the other hand, not making the top surface of the LIM bearings too close to the height of the LIM slices to cause the slices to hit the rail in certain-sized undulations, for example. Without intending to be limiting in any way, it is presently believed that the potential rail concavity/convexity between the front and back of a LIM of roughly 1 M in length (associated with a roughly 1.5 M long air bearing 325 in one or more, but not all, assembly 200 embodiments) would, at least under one or more conditions, not often exceed about 1¼ mm. In addition, another design consideration would also take into account the air cushion/layer between the LIM air bearings and the rail 113. As discussed elsewhere, it is believed that the ranges achievable for the main bearing are also at least roughly achievable for the one or more LIM bearings associated with the various LIM embodiments.

(vi) Some Alternative LIM System Embodiments

Figure 11A:
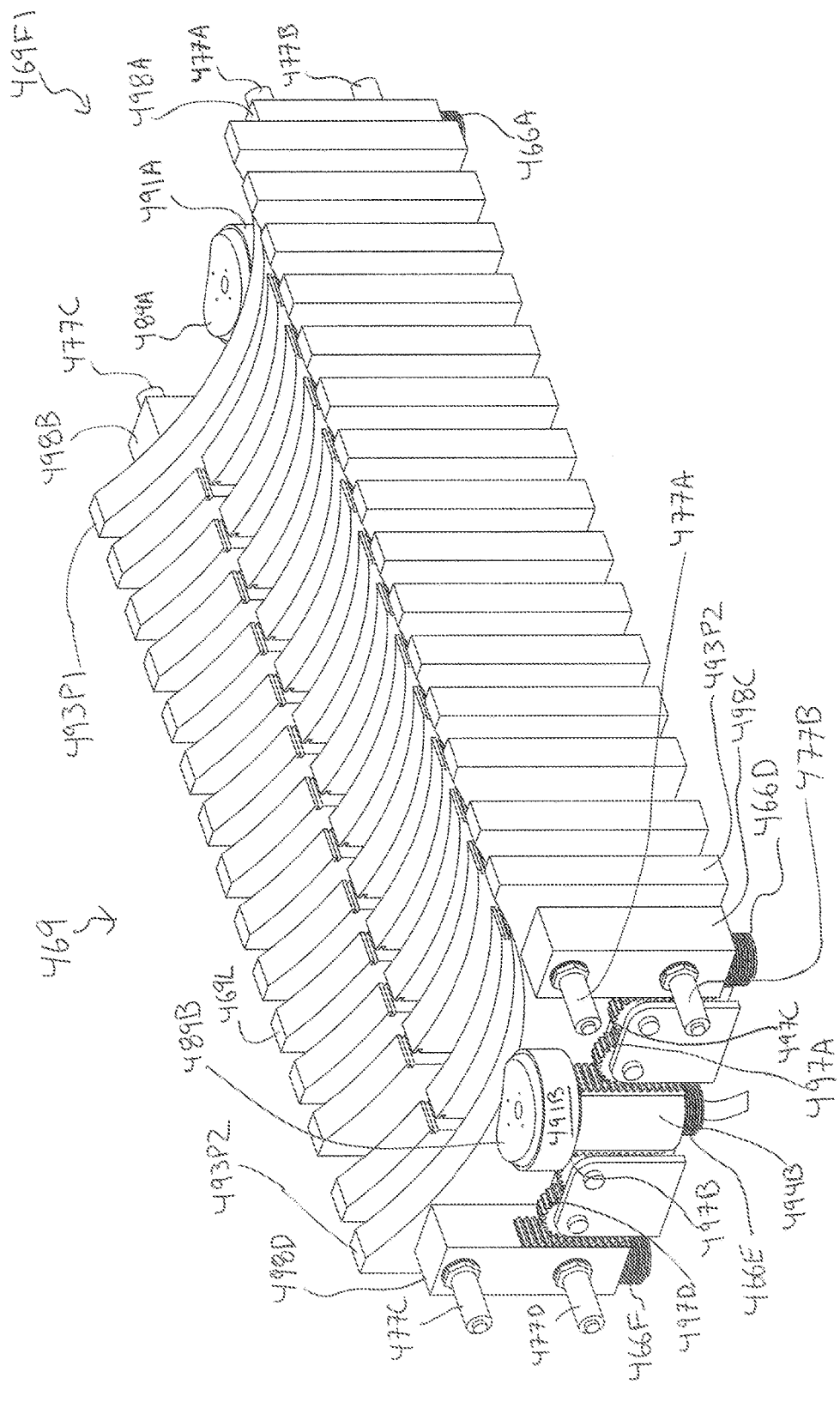
FIG. 11A shows a perspective view of an alternative LIM embodiment that has two-followers.

FIG. 11A and FIGS. 11B, 11C, and 11D show an alternative LIM system 469 embodiment which has two followers 469F1, 469F2 instead of four followers, as in the FIG. 10B embodiment. Aside from its front and rear portions, the 2-follower LIM system 469 is quite similar to the 4-follower version, and since its similarities will be apparent to those skilled in the art based on the various discussions herein regarding the four-follower LIM system embodiment 400 those will not be discussed or otherwise pointed out here. What will be discussed is the two followers 469F1, 469F2, since these differ in some respects from the four followers 449A, 449B, 449C, 449D. As can be seen in FIG. 11A, each of the air bearings 489A, 489B have a more curved/oval shape here—e.g., which in one or more embodiment substantially mirrors the shape of the rail 113. Moreover, each of the air bearings 489A, 489B is attached to a base portion 491A, 491B that enables a cavity to form between the associated air bearing 489A, 489B and the base portion 491A, 491B. Further, each base portion 491A, 491B is respectively connected to an element 494A (which can't be seen in FIG. 11A), 494B that is neither connected to the LIM 469L (which is at least substantially the same as the LIM 400L in FIG. 10B) nor the plates 493P2, 493P1 (on both sides of the LIM 469L), but is engaged by at least one element attached to the plate 493P2, 493P1 (and/or the LIM 469L) such that it is movable with respect to the element. Moreover, as can be seen in these four Figures, in one or more embodiments the element is a pair of rotating gears/sprockets 497A, 497B. Though the element 494B is not attached to the LIM 469 or the plate 493P2, it remains securely in place because its cogs are meshed (with the pair of rotating gears/sprockets 497A, 497B) on both of its sides. Also, just in case the element 494B begins to slide away from the plate 493P2, the cover 400C2 will tend to prevent it from becoming unmeshed, at least in one or more (but not all) embodiments.

As can be further seen from these four Figures the movement of the element 494B is translated, via the movement/rotation of the pair of rotating gears/sprockets 497A, 497B, to another pair of rotating gears/sprockets 497C, 497D and to a pair of elements 498C, 498D that are connected to the plate 493P2 (and/or the LIM 469L). Each of the two movably engageable elements 494A, 494B and each of the non-movably engageable elements 498A, 498B, 498C, 498D each have a spring positioned between it and the assembly 200 (though in other embodiment, just as was discussed with respect to the springs in the four-follower LIM system 400, one or more other components and/or materials are employed, such as those that are at least resilient, or those that are compliant and resilient) 466A, 466B, 466C, 466D, 466E, 466F (though 466B and 466C can't be seen in FIG. 11A). Thus, each of the two followers 469F1, 469F2 thus reflect the set of components that enable the LIM to be tilted in at least one direction—e.g., one of the followers 449B includes the LIM air bearing 489B, the base 491B, the engageable element 494B, four pairs of gears/sprockets 497A, 497B, 497C, 497D (though rotating elements without interlocking teeth/cogs are employed in one or more alternative embodiments) that are connected and movable/rotatable relative to the plate 493P2 (and/or the LIM 469L), the pair of elements 498C, 498D that are engageable with the second pair of gears/sprockets 498C, 498D that are connected to the LIM (and in this embodiment, but not all, they are connected to the rods 477A, 477B, 477C, 477D that weave through the LIM 469L), and the three springs 466D, 466E, 466F (though there is just one spring or even no springs in one or more alternative embodiments).

Figure 11B:
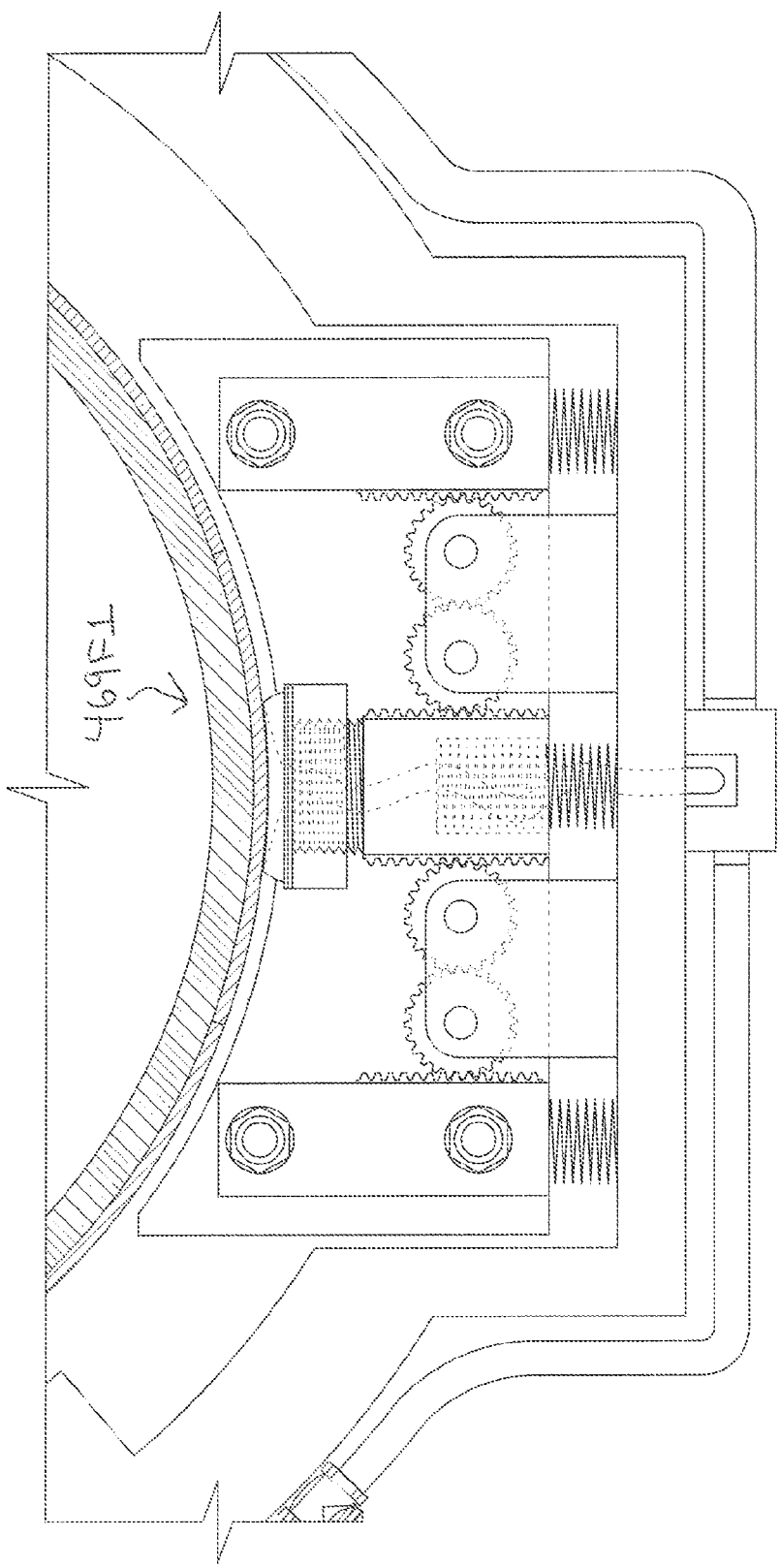
FIG. 11B shows essentially a front view of the (alternative) 2-follower LIM embodiment shown in FIG. 11A, which reflects the same cross-sectional view taken along the G-G' axis as FIG. 10D but if the 2-follower LIM were situated in FIG. 4A instead (i.e., rather than the 4-follower LIM of FIG. 4A)
Figure 11D:
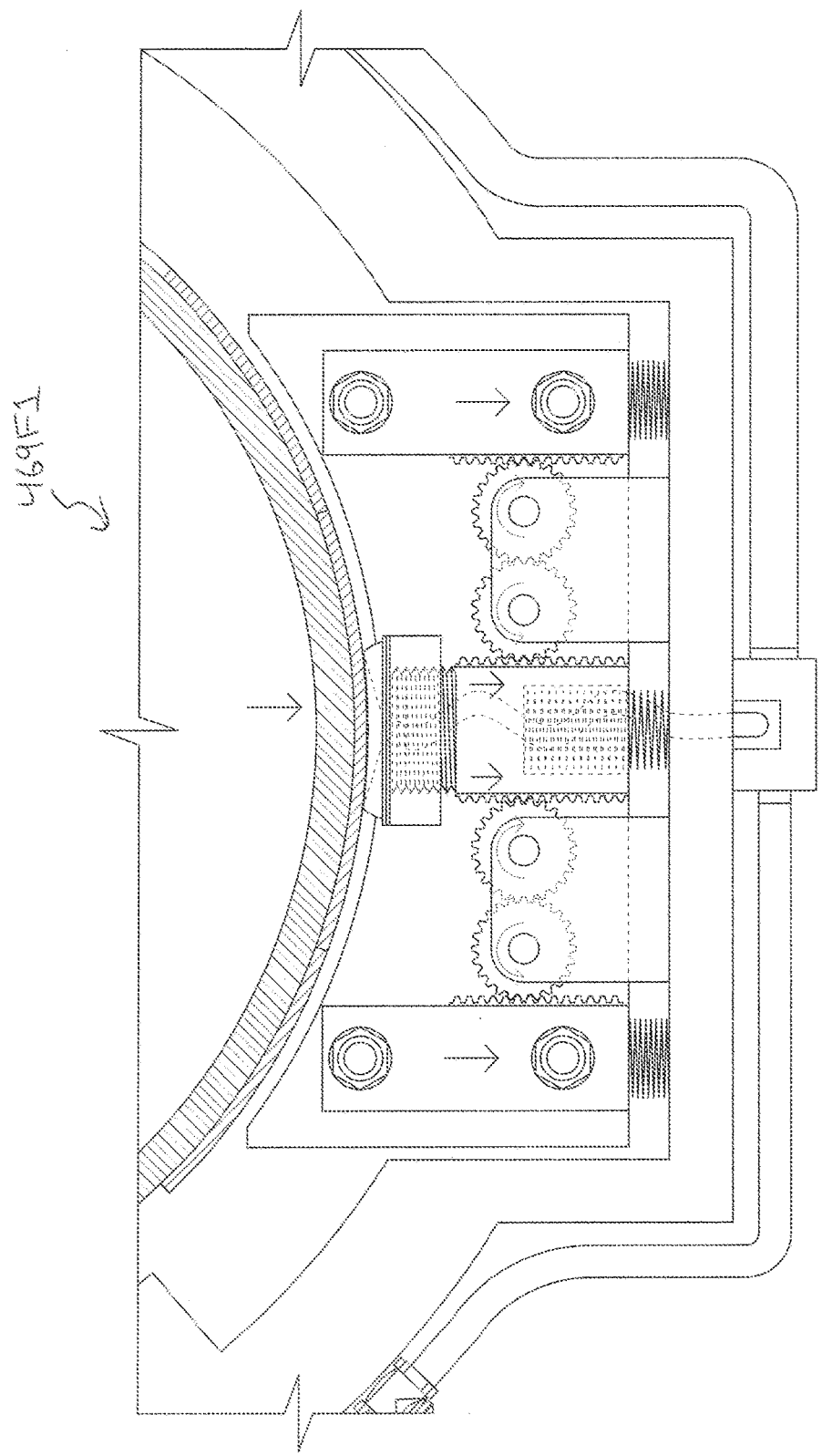
FIG. 11D is also same view as the FIG. 11B view but shows another movement shows movement of the LIM relative to the assembly.

FIG. 11B is essentially the same view as FIG. 10D, except the two-follower LIM system 469 is depicted instead of the four-follower LIM system 400. The LIM bearing 489A depicted here behaves the same way as the other bearings described herein; it essentially just has a different shape. FIGS. 11C and 11D are mainly intended to show the movement of the front follower 469F1 (e.g., relative to the rail) where the arrows indicate directions of movement of various parts (e.g., with respect to the assembly 200). FIG. 11C reflects as expansion of the springs 466A, 466B, 466C—e.g., in relation to a concavity as discussed above—and there will also be some tilting, as also discussed above, that is not shown in FIG. 11C. FIG. 11D reflects a compression of the springs 466A, 466B, 466C—e.g., in relation to a convexity as discussed above—and there will also be some tilting, as also discussed above, that is not shown in FIG. 11D either. In at least most respects, what was said regarding the four-LIM follower system embodiment 400 is applicable to the two-LIM follower system embodiment 469, and so will not be repeated here. That said, the fact that the two-follower LIM system 469 has two bearings 489A, 489B positioned such that they are aligned with/above the central longitudinal axis of the LIM, rather than the four followers that have a pair 450L1, 450L3 to one side of the central longitudinal axis of the LIM and the second pair 450L2, 450L4 to the other side of the central longitudinal axis of the LIM, may result in slightly different relative behavior in lateral curves and/or diagonal curves. But, at least with respect to vertical curves (e.g., convexities, concavities, etc. as listed above) these two LIM system embodiments 400, 469 behave at least largely the same.

(vii) Lateral and Diagonal Curves

Moreover, in some embodiments, the LIM may not only have forward/backward tilting abilities, but also can become laterally angled, as necessary (i.e., with or without being horizontally angled). To be clear, horizontal angling/tilting is referring to the forward/backward tilt of the LIM, such as when the front of the LIM is higher or lower than the rear of the LIM (as discussed above), which in some embodiments would reflect the compression or expansion of the respective front and rear springs. In comparison, lateral tilting is meant to reflect the left or right side of the LIM being relatively higher than the other side of the LIM, e.g., when the two right springs are more compressed or expanded than the left side. Finally, by diagonal tilting it is meant the right-rear is relatively expanded or contracted compared to the left-front spring or the left-rear is relatively expanded or contracted compared to the right-front spring. Various embodiments allow for at least one of these three types of tilting, some allow for two types, other embodiments allow for all three, and still others allow for one or more permutations of the three—e.g., concurrent horizontal and lateral tilting, concurrent horizontal, lateral, and diagonal tilting. That said, the degree of lateral and/or diagonal tilting may, in some cases, be limited to some degree by the dimensions of the cavities of the (optional) two cover portions; but, it will be clear that the design of the cover portions could be altered in other embodiments if necessary.
The Rotatable Wedge System One can also see the rotatable wedge system 1000 in FIG. 1, and perhaps even better in FIG. 2A, which in many respects serves as an automatically adjustable bridge between two rail portions 113X, 113Y to minimize (or eliminate) any gap/distance that might otherwise occur between the two, as described below. In one or more but not all embodiments, the rotatable wedge system 1000 can also, or instead, serve to mitigate resonance.

Figure 22:
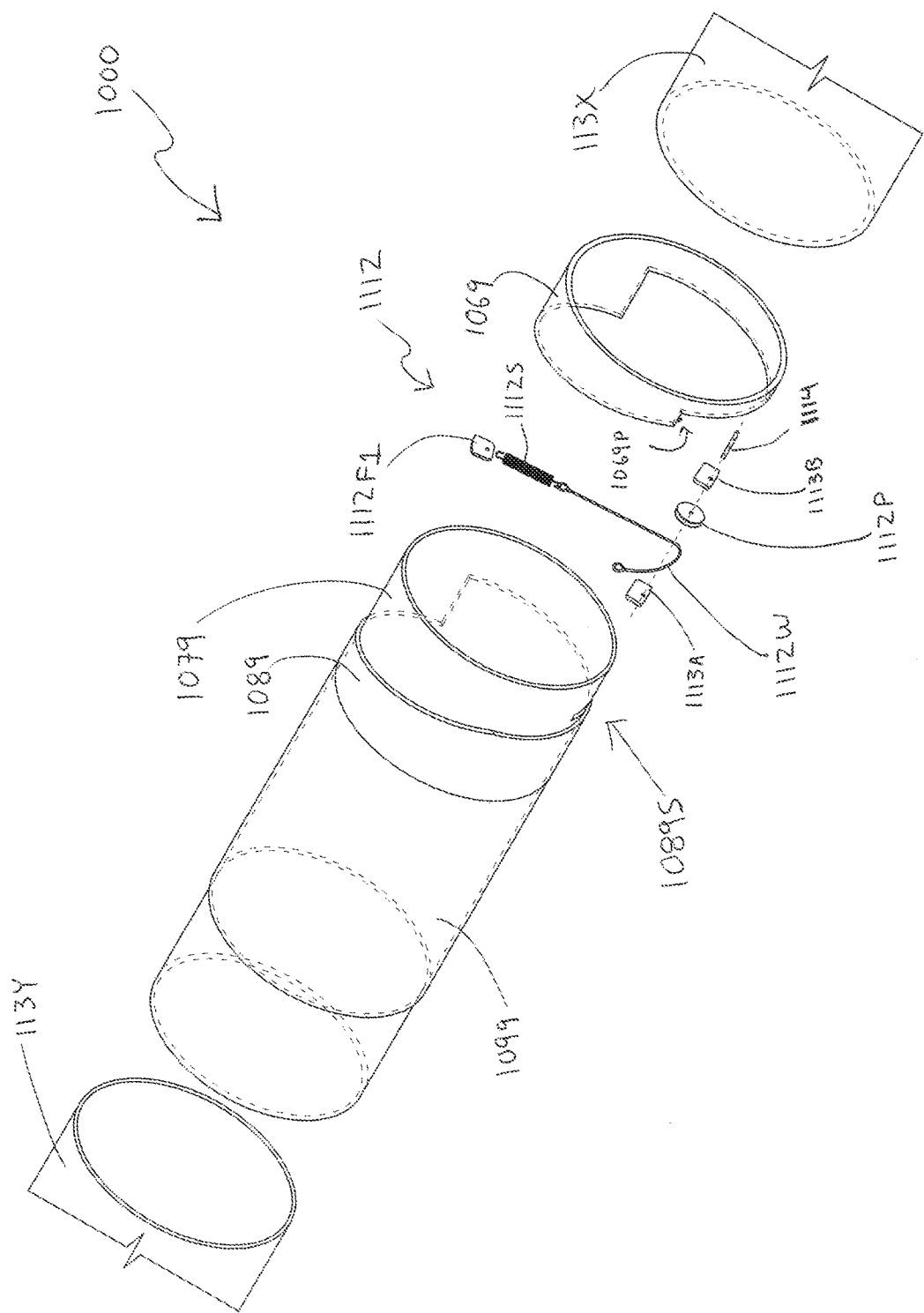
FIG. 22 shows an exploded view depicting the rotatable wedge system of FIG. 1.
Figure 24A:
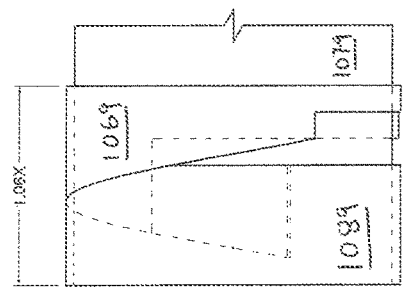
FIGS. 24A, 24B, 24C show three side views that respectively correspond to each of the three close-up perspective views of FIGS. 23A, 23B, 23C, which further show part of the inner rail support.

FIG. 22 is an exploded view of the movable/rotatable wedge system 1000 that is optionally included as part of the transportation system 10. It should emphasized that the system 1000 works on its own—e.g., with a rail—and/or with other transportation systems in one or more alternative embodiments. That said, one can see a first element 1069 (which is referred to herein for ease as a 'wedge') that is mountable (at least partially) around and rotatable with respect on an inner rail support 1079. The first element 1069 has a shape that makes it able to be mated with a second element 1089, which is also mountable with respect to the inner rail support 1079. While the second element 1089 is shown adjacent to a third element 1099, which is also mountable with respect to the inner rail support 1079, in one or more alternative embodiments these are combined. Accordingly, in one or more embodiments the inner rail support 1079 is a bit longer than the three elements 1069,

1089, 1099 when they are all mounted on the inner rail support 1079 and at least partially adjacent to one another. This should be quite evident from FIG. 22, particularly as the two rail portions 113X, 113Y are shown there as well, where one can see that they too are mountable with respect to the inner rail support 1079. Moreover, it will be apparent that at least one dimension (e.g., diameter) and/or the outer surfaces of the three elements are consistent with the rail portions 113X, 113Y. In one or more embodiments, at least a portion (e.g., a top surface) of the five portions should be at least reasonably consistent, sort of almost as if the five portions 1069, 1089, 1099, 113X, 113Y were a (hypothetical) 'single rail'.

Figure 25A:
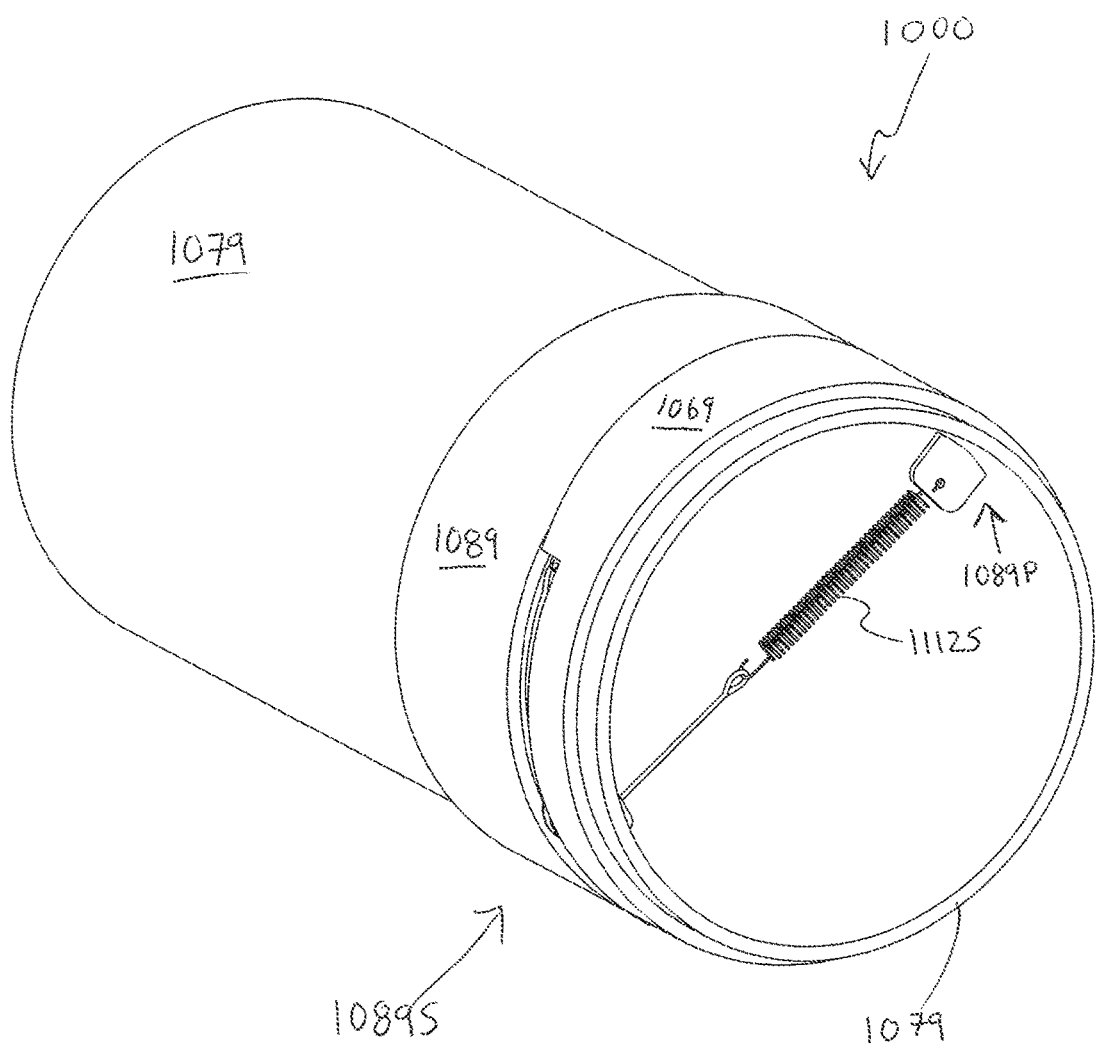
FIG. 25A shows a perspective view of the rotatable wedge system.
Figure 25B:
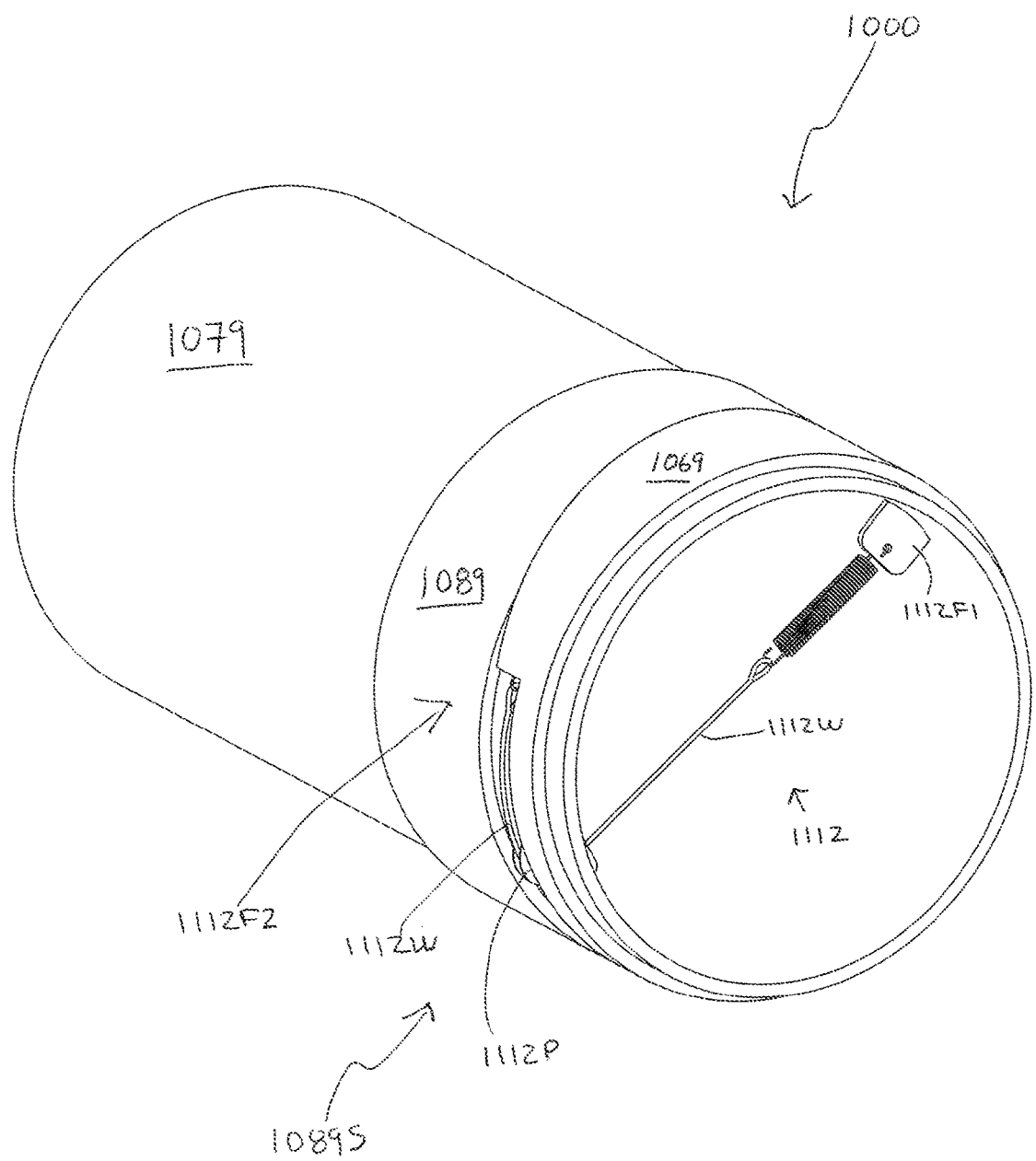
FIG. 25B shows a perspective view of the rotatable wedge system, where the wedge has become more 'expanded' relative to FIG. 25A as a result of the rotation of the wedge.

One can also imagine in FIG. 22, but better see in FIGS. 25A and 25B, how a connecting element 1112 is fastened/connected to the inner rail portion 1079 (e.g., an inner surface of the inner rail portion 1079) in two locations, on a first portion 1089P (e.g., inner surface) and second portion associated with a slot/aperture 1089S associated with the inner rail portion 1079. The connecting element is also connected to a portion 1069P of the wedge 1069, as indicated in FIG. 22. As one can further see, the connecting element in this embodiment includes a first fastening element 1112F1, a spring 1112S, a wire 1112W, a wheel/pulley 1112P, a second fastening element 1112F2 (which here includes two fastening element portions 1113A, 1113B and pin 1114, around which the wheel/pulley 1112P rotates). In one or more alternative embodiments, the connecting element includes less of these elements; and in one or more embodiments another element with such spring like properties is used instead of the spring 1112S. As one will appreciate, there are a variety of alternatives that enable the rotatable wedge system to function as described below. In fact, there are various alternative wedge shapes in one or more alternative embodiments beyond the one shown here.

With a number of the components described above, in the context of FIGS. 23A, 23B, 23C, 24A, 24B, 24C the rotation of the wedge 1069 will now be discussed. As shown there, one can see how the wedge 1069 can be rotated—e.g., by the spring 1112S—to at least partially fill in/bridge a gap (that has opened in this example) between the first rail portion 113X and the third (rail) element 1099 (and/or the second rail portion 113Y). In essence, the spring 1112S is 'on call'/ready to rotate the wedge 1069 if there is some slack there, so to speak. On the other hand if the gap/distance between the first rail portion 113X and the third (rail) element 1099 (and/or the second rail portion 113Y) becomes smaller the natural forces between the two will cause the wedge 1069 to rotate—in light of the shape of the wedge and/or the shape of the second (rail) element 1089 and/or their mated surface relationship—to lessen that gap/distance. In many respects FIGS. 23A, 23B, 23C, 24A, 24B, 24C are self-explanatory, where rotation here reflects the wedge bridging a gap/distance between the first rail portion 113X and the third (rail) element 1099 such that a portion—e.g., the upper surfaces of the first rail portion 113X and the third (rail) element 1099 remain adjacent (where alternatively they are at least substantially, or alternatively at least partially adjacent) as a result. While the bottom surfaces of the first rail portion 113X and the third (rail) element 1099 are not adjacent, this is less of a concern since, in at least this embodiment (but not all embodiments) the air bearing 325 is riding along the top surface of the rail 113, the wedge 1069, etc.

Accordingly, in one or more embodiments the wedge 1069 is movable (e.g., with respect to the inner rail portion 1079, the first rail portion 113X, the third (rail) element 1099, and/or the second rail portion 113Y) in two directions—e.g., forward and backward; and, in one or more embodiments this accomplished by the wedge 113 rotating clockwise and counterclockwise. (In one or more alternatives, it rotates only in one direction.) Moreover, in one or more embodiments, one of those directions is caused by the spring 1112S—e.g., a contraction causing a pulling and/or rotation of the wedge 1069—where in one or more embodiments that causes the wedge to at least partially fill in the gap/distance, and in one or more embodiments that causes the wedge to fill in substantially all, or all, of the gap/distance. In one or more embodiments, the shape of the wedge 1069 and/or the shape of the second (rail) element 1089 and/or the at least partially mated relationship between them (e.g., their edges)—assists the spring 1112S in this regard, as will commonly be understood by those skilled in the art. In one or more embodiments, the edges are smoothed to lessen friction between the edges. For instance, one can see a bit of an angled relationship between them in the various Figures, such that a turning/rotation of the wedge 1069 essentially causes it to move itself away from the third (rail) element 1099 (in some embodiments a bit like a corkscrew) and/or the second rail portion 113Y.

As can be seen in FIGS. 23A, 23B, 23C, 24A, 24B, 24C, in one or more embodiments the 'expansion' of the wedge is in proportion to a change (e.g., increase) in the gap (indirectly depicted in FIGS. 23A, 23B, 23C, 24A, 24B, 24C). In one or more (but not all) embodiments the wedge 1069 will rotate (e.g., up to its maximum design capabilities) to, in essence, 'expand' and 'retract' (so to speak) as much as needed and not more.

In one or more embodiments, the increase is up to 1.06X—where 'X' is the combined length of the wedge 1069 and second element 1089, e.g., at at least their top adjacent surfaces 1197A,1197B where (in this non-limiting example) each roughly have the same length (e.g., ½ X) as shown. In one or more embodiments, it is between greater than 1.001X to 1.10X, in one or more embodiments it is 1.01X to 1.20X, in one or more embodiments it is more than 1.20X. It should be understood that the ratios discussed in this regard would be adjusted accordingly in alternative embodiments where the respective lengths the wedge 1069 and second element 1089 do not have a ½ X to ½ X (1:1) relationship as here, and the performance of the wedge in expanding with respect to the gap and the ranges and numbers above with respect to 'X' should be easily understood (and extrapolated accordingly) in such alternative embodiments.

In one or more embodiments 'W' is the length of the wedge 1069—e.g., between two rail portions (e.g., portion 113X and the second portion 1089) when it is in a non-expanded state—and 'W' becomes 0.01% to 1% greater when the wedge is in an expanded state (e.g., when the wedge is rotated to fill in a gap, such as between those portions 113X, 1089); in one or more embodiments 'W' becomes 0.001% to 3% greater; in one or more embodiments 'W' becomes 0.01% to 10% greater; in one or more embodiments 'W' becomes 0.1% to 3% greater; in one or more embodiments 'W' becomes at least 0.01% greater; in one or more embodiments 'W' becomes at least 0.1% greater; in one or more embodiments 'W' becomes at least 1% greater; in one or more embodiments 'W' becomes at least 5% greater; and, in one or more embodiments 'W' becomes between 1% and 10% greater.

In one or more embodiments, the movement in another (e.g. opposite) direction is caused by natural forces (e.g., temperature, geologic); and, in one or more embodiments the spring complies (e.g., by expanding). In one or more embodiments, the shape of the wedge 1069 and/or the shape of the second (rail) element 1089 and/or the at least partially mated relationship between them (e.g., their edges)—assists the spring 1112S in this regard, as will commonly be understood by those skilled in the art. In one or more embodiments, the edges are smoothed to lessen friction between the edges.

Moreover, it should be understood that various references to 'top' portion are not meant as limiting; in alternative embodiments, the similar relevance of the bottom portion, side, or other portion would be the focus. This embodiment was designed for the air bearing system 300 described herein (that is, it rides on the top of the rail) and thus this design choice was made to leave the bottom portion not fully bridged in this embodiment. While it may not be ideal for the LIM bearings, the choice here was made prioritizing the performance of the main air bearing 325—e.g., so it avoids a sudden change in pressure (e.g., in the lubrication zone 325L and, in some cases, the plenum 325P and/or cavity 325C) that might otherwise result from not being able to travel over the rail 113 in an uninterrupted fashion.

Such a separation/gap between the two rail portions may, for example, be caused by temperature (e.g., cold). Conversely, if and when the two components (e.g., the two rail portions 113X, 113Y, which may in some cases also involve the second portion 1089) become closer again (e.g., by warmer weather conditions) the force of these towards each other will cause the opposite rotation of the wedge 1069 to overcome the force of the spring 1112S (and some friction in some embodiments) so that the two rail portions 113X, 113Y become closer and the wedge 'bridge' becomes 'smaller' (so to speak) with respect to its bridging function.

It should also be noted that the ability of the wedge 1069 to rotate, e.g. as described above, can also (in one or more but not all embodiments) play a valuable role in countering resonance conditions if they begin to develop. For example, it is believed that the rotation of the wedge 1069 and/or the friction between the wedge 1069 and the second (rail) element 1089—as they are pushed against each other—will help dissipate/reduce such forces.

FIGS. 25A and 25B depict perspective views of the wedge system 1000. These should be pretty clear based on the above discussion. As can be seen, in FIG. 25A the wedge 1069/wedge system 1000 is in a non-expanded state, where the spring 1112S is a bit extended. In contrast, FIG. 25B shows the wedge 1069/wedge system 1000 in an expanded state with the spring contracted.

Construction and Energy Costs

The relatively lower energy requirements and/or construction costs of one or more aspects of one or more (but not all) embodiments described will be readily apparent to those skilled in the art, not only compared to at least some other air-powered systems but also particularly with respect to MAGLEV systems. For example, the force required to lift the load off the rail 113 and move the load along the rail 113 are each relatively lower compared to at least some other air-powered systems, and especially compared to MAGLEV designs. That said, it should be mentioned that in one or more embodiments the power supplied via the box 666 and three wires on the rail 113 is supplemented, or needs to be supplemented, such as by a solar panel on the monorail and/or a fuel powered engine associated with the monorail (neither of which is shown in the Figures).

Some Additional Alternative Embodiments

It is important to mention some various alternatives envisioned, though one or more of these may have been mentioned above as well. For example, though the monorail 100 in this embodiment of the transportation system 10 is able to travel back and forth along each of the two rails 113, it should be noted in alternative embodiments that just one rail is possible and/or the vehicle/cargo 100 would travel in just one direction along it. Further, in some alternative embodiments alternate carrying/holding means are used instead of a monorail/train, such as a basket, platform, vice, hook, etc.; in effect, almost any reasonable means can be employed that is able to hold/carry and move goods and/or people from 'point a' to 'point b' along (the path of) the track 113. In addition, some alternative assemblies (and thus alternative transportation systems 10) only contain just one of the air bearing system 300 and/or the LIM system 400. For example, an alternative assembly embodiment (and thus an alternative transportation system) includes the air bearing system 300 but the monorail instead is powered along the track/rail 113 in a different way known to those skilled in the art (such another LIM design, an engine powered by fossil fuel or solar power, for example). In further alternatives of the assembly (and thus in an alternative transportation system) the LIM system 400 cooperates with an alternate system (other than the air bearing system 300) that assists the assembly 200 and/or vehicle/cargo in moving relative to the rail 113. Additionally, while the movable weight system 510 embodiment shown in FIG. 1 is located above both the rail-supporting column 222 and the rails 113 connected to it, in other embodiments it could be positioned elsewhere, as will be readily understood by those skilled in the art.

Finally, the examples provided are not the only contemplated embodiments and the scope of the present invention should be limited only by the claims. In fact, it will be apparent to those skilled in the art that only a limited number of the exemplary methods and materials are described herein and that many various other modifications, methods, materials, etc. similar or equivalent to those described herein can also be used besides those already described without departing from the concepts discussed herein. Thus, the inventive subject matter/scope of the claims should not to be unduly restricted (i.e., it should include such apparent changes, variations, alterations, transformations, and/or modifications). It should be further understood that the terminology used herein is for the purpose of describing particular embodiments only and thus is not intended to be limiting, all terms should be interpreted in the broadest possible manner consistent with their context, and any use of the terms "comprises" and/or "comprising" in the Specification should be interpreted in a non-exclusive manner. Also, while components in the Figures herein are not necessarily drawn to scale, those skilled in the art should be able to get a good sense of the relative sizes of various components and/or systems in one or more (but not all) embodiments, and readily appreciate how various alternatively sized and/or shaped components are used in one or more various alternative embodiments.

The invention claimed is:

1. A rail system for preventing a gap along a rail in order to attempt to prevent, or at least attempt to mitigate, a potential performance impairment that might otherwise occur if a bearing were to instead travel along the rail without the gap having been prevented, including:
   (i) an inner rail support member;
   (ii) a first rail section, wherein the first rail section is positioned at least partially around the inner rail support member;
   (iii) a second rail section, wherein the second rail section is positioned at least partially around the inner rail support member, and the first rail section and the second rail section are at a first distance from each other;

(iv) a third rail section, wherein the third rail section is positioned at least partially around the inner rail support member, the third rail section is positioned between the first rail section and the second rail section, and an outer surface portion of the third rail section is adjacent to an outer surface portion of the second rail section;

(v) a rotatable rail section, wherein the rotatable rail section is positioned at least partially around the inner rail support member, the rotatable rail section is rotatable at least partially around the inner rail support member, the rotatable rail section is positioned between the third rail section and the first rail section, and an outer surface portion of the rotatable rail section is adjacent to both the outer surface portion of the third rail section and an outer surface portion of first rail section;

(vi) wherein when the first rail section and the second rail section are at the first distance from each other (a) a gapless rail surface includes the outer surface portion of the second rail section, the adjacent outer surface portion of the third rail section, the adjacent outer surface portion of the rotatable rail section, and the outer surface portion of the first rail section and (b) the adjacent outer surface portion of the rotatable rail section has a first length; and, (vii) wherein in response to the first rail section and the second rail section becoming a second distance from each other, wherein the second distance is greater than the first distance, a rotating of the rotatable rail section in a first direction occurs that at least assists in (a) causing the adjacent outer surface portion of the rotatable rail section to have a second length that is greater than the first length and (b) keeping the gapless rail surface gapless when the first rail section and the second rail section have become the second distance from each other, which would not otherwise be gapless when the first rail section and the second rail section have become the second distance from each other but for the rotating of the rotatable rail section in the first direction.

2. The rail system of claim 1, wherein a portion of the rotatable rail section pushes another portion of the rotatable rail section further away from the third rail section and towards the first rail section when the rotating of the rotatable rail section occurs in the first direction.

3. The rail system of claim 2, wherein the portion of the rotatable rail section that pushes the other portion of itself the rotatable rail section further away from the third rail section and towards the first rail section, when the rotating of the rotatable rail section occurs in the first direction, is an edge of the rotatable rail section.

4. The rail system of claim 3, wherein an edge of the third rail section assists in enabling the edge of the rotatable rail section to push the other portion of the rotatable rail section further away from the third rail section and towards the first rail section when the rotating of the rotatable rail section occurs in the first direction.

5. The rail system of claim 1, wherein a shape of the rotatable rail section assists in enabling a portion of the rotatable rail section to push another portion of the rotatable rail section further away from the third rail section and towards the first rail section when the rotating of the rotatable rail section occurs in the first direction.

6. The rail system of claim 5, wherein a shape of the third rail section assists in enabling the portion of the rotatable rail section to push the other portion of the rotatable rail section further away from the third rail section and towards the first rail section when the rotating of the rotatable rail section occurs in the first direction.

7. The rail system of claim 1, wherein a mated relationship between the rotatable rail section and the third section assists in enabling a portion of the rotatable rail section to push another portion of the rotatable rail section further away from the third rail section and towards the first rail section when the rotating of the rotatable rail section occurs in the first direction.

8. The rail system of claim 1, wherein:
(i) an edge of the rotatable rail section pushes a portion of the rotatable rail section further away from the third rail section and towards the first rail section when the rotating of the rotatable rail section occurs in the first direction; and,
(ii) the edge of the rotatable rail section is at least partially angled with respect to a longitudinal direction of the inner rail support member.

9. The rail system of claim 8, wherein:
(i) an edge of the third rail section assists in enabling the edge of the rotatable rail section to push the portion of the rotatable rail section further away from the third rail section and towards the first rail section when the rotating of the rotatable rail section occurs in the first direction; and,
(ii) the edge of the third rail section is at least partially angled with respect to the longitudinal direction of the inner rail support member.

10. The rail system of claim 1 wherein when the rotating of the rotatable rail section occurs in the first direction a rubbing of an edge of the rotatable rail section against an edge of the third rail section simultaneously occurs.

11. The rail system of claim 10, wherein:
(i) a rotating of the rotatable rail section at least partially around the inner rail support member is able to occur in a second direction that is opposite the first direction;
(ii) the rotating of the rotatable rail section in the second direction causes the adjacent outer surface portion of the rotatable rail section to either (i) return to the first length or (ii) become another length that is less than the second length;
(iii) the edge of the rotatable rail section assists in enabling the rotating of the rotatable rail section in the second direction to cause the adjacent outer surface portion of the rotatable rail section to either (i) return to the first length or (ii) become the other length that is less than the second length;
(iv) the edge of the rotatable rail section is at least partially angled with respect to a longitudinal direction of the inner rail support member;
(v) the rotating of the rotatable rail section in the second direction results from a squeezing of the rotatable rail section between the third rail section and the first rail section; and,
(vi) the rubbing of the edge of the rotatable rail section against the edge of the third rail section also occurs, simultaneously, when the rotating of the rotatable rail section occurs in the second direction.

12. The rail system of claim 11, wherein the simultaneous rubbing of the edge of the rotatable rail section against the edge of the third rail section, when (a) the rotating of the rotatable rail section occurs in the first direction and (b) the rotating of the rotatable rail section occurs in the second direction, is able to mitigate a potential resonance condition, if occurring, with respect to the rail system.

13. The rail system of claim 10, wherein the rubbing of the edge of the rotatable rail section against the edge of the third rail section is able to cause a mitigating of a resonance condition, if occurring, with respect to the rail system.

14. The rail system of claim 13, wherein:
(i) a rotating of the rotatable rail section in a second direction causes the adjacent outer surface portion of the rotatable rail section to either (i) return to the first length or (ii) become another length that is less than the second length; and,
(ii) the rubbing of the edge of the rotatable rail section against the edge of the third rail section also occurs when the rotatable rail section rotates in the second direction.

15. The rail system of claim 1, wherein the rotating of the rotatable rail section in the first direction occurs automatically in response to the first rail section and the second rail section becoming the second distance from each other.

16. The rail system of claim 15, wherein the rotating of the rotatable rail section in the first direction occurs automatically, in response to the first rail section and the second rail section becoming the second distance from each other, due to an energy storage device.

17. The rail system of claim 16, wherein the rotatable rail section is able to rotate at least partially around the inner rail support member in a second direction without any assistance from the energy storage device.

18. The rail system of claim 16, wherein the energy storage device is a spring connected to the rotatable rail section.

19. The rail system of claim 16, wherein the energy storage device is a spring-like element connected to the rotatable rail section.

20. The rail system of claim 15, wherein the rotating of the rotatable rail section in the first direction occurs, simultaneously, as the first rail section and the second rail section become the second distance from each other.

21. The rail system of claim 20, wherein the rotating of the rotatable rail section in the first direction occurs, in response to the first rail section and the second rail section becoming the second distance from each other, due to an energy storage device that is in communication with the rotatable rail section.

22. The rail system of claim 21, wherein the energy storage device is connected to the rotatable rail section and the inner rail support member, and wherein the energy storage device is a spring, or at least has spring-like properties.

23. The rail system of claim 1, wherein:
(i) a rotating of the rotatable rail section at least partially around the inner rail support member is able to occur in a second direction that is opposite the first direction;
(ii) the rotating of the rotatable rail section in the second direction causes the adjacent outer surface portion of the rotatable rail section to either (i) return to the first length or (ii) become another length that is less than the second length;
(iii) an edge of the rotatable rail section assists in enabling the rotating of the rotatable rail section in the second direction to cause the adjacent outer surface portion of the rotatable rail section to either (i) return to the first length or (ii) become the other length that is less than the second length; and,
(iv) the edge of the rotatable rail section is at least partially angled with respect to a longitudinal direction of the inner rail support member.

24. The rail system of claim 23, wherein the rotating of the rotatable rail section in the second direction results from a squeezing of the rotatable rail section between the third rail section and the first rail section.

25. The rail system of claim 24, wherein the rotating of the rotatable rail section in the second direction occurs automatically.

26. The rail system of claim 25, further including an energy storage element, wherein:
(i) the rotating of the rotatable rail section in the first direction results from a first force associated with the energy storage element, wherein the rotatable rail section is able to receive the first force from the energy storage element; and,
(ii) the rotating of the rotatable rail section in the second direction results when a second force is greater than the first force.

27. The rail system of claim 26, wherein the second force is a force of nature.

28. The rail system of claim 27, wherein the force of nature is at least one of: (i) a temperature related force, and (ii) a geologic force.

29. The rail system of claim 25, wherein the rotating of the rotatable rail section in at least one of (a) the first direction and (b) the second direction is able to cause a mitigating of a potential resonance condition if occurring, with respect to the rail system.

30. The rail system of claim 29, wherein an element connected to the rotatable rail section is able to assist, when the rotatable rail section rotates in the at least one of (a) the first direction and (b) the second direction, in the mitigating of the potential resonance condition, if occurring.

31. The rail system of claim 30, wherein the element one of (a) is a spring and (b) has spring-like properties, wherein the element is connected between the inner rail support member and the rotatable rail section.

32. The rail system of claim 26, wherein the energy storage element that provides the first force is a spring that is connected between the rotatable rail section and the inner rail support member.

33. The rail system of claim 1, wherein the second length is at least 1% greater than the first length.

34. The rail system of claim 1, wherein an element connected to the rotatable rail section is, via the rotating of the rotatable rail section in the first direction, able to assist in a mitigating of a resonance condition, if occurring, with respect to the rail system.

35. The rail system of claim 34, wherein the element is a spring, or at least has spring-like properties, and is connected to the rotatable rail section.

36. A rail system for preventing a gap along a rail in order to attempt to prevent, or at least attempt to mitigate, a potential performance impairment that might otherwise occur if a bearing were to instead travel along the rail without the gap having been prevented, including:
(i) a first rail section;
(ii) a second rail section, wherein the first rail section and the second rail section are at a first distance from each other;
(iii) a third rail section, wherein the third rail section is positioned between the first rail section and the second rail section;
(iv) a rotatable rail section, wherein the rotatable rail section is positioned between the third rail section and the first rail section, and the rotatable rail section is rotatable in a first direction;
(v) wherein when the first rail section and the second rail section are at the first distance from each other before a rotating of the rotatable rail section in the first direction occurs: (a) a gapless rail surface includes an outer surface portion of the second rail section, an outer surface portion of the third rail section, an outer surface portion of the rotatable rail section, and an outer surface portion of the first rail section and (b) the outer surface portion of the rotatable rail section, of the gapless rail surface, has a first length, wherein the first length is associated with a longest part of the outer surface portion of the rotatable rail section of the gapless rail surface before the rotatable rail section has rotated in the first direction; and,
(vi) wherein when the first rail section and the second rail section are at a second distance from each other, wherein the second distance is greater than the first distance, after the rotating of the rotatable rail section in the first direction occurs: (a) the outer surface portion of the rotatable rail section, of the gapless rail surface, has a second length that is greater than the first length, wherein the second length is associated with a longest part of the outer surface portion of the rotatable rail section, of the gapless rail surface, after the rotatable rail section has rotated in the first direction, and (b) the gapless rail surface remains gapless, which would not otherwise remain gapless when the first rail section and the second rail section are at the second distance from each other but for the rotating of the rotatable rail section in the first direction that has caused the outer surface portion of the rotatable rail section, of the gapless rail surface, to have the second length.

37. The rail system of claim 36, further including a spring, or at least a spring-like element, attached to the rotatable rail section that (a) at least partially assists in the rotating of the rotatable rail section in the first direction and (b) enables the rotating of the rotatable rail section in the first direction to be automatic; and,
wherein:
(i) a difference between the first length and the second length is at least substantially equal to a difference between the first distance and the second distance;
(ii) the second length is at least 0.001% greater than the first length;
(iii) an edge of the rotatable rail section and an edge of the third rail section have a mated relationship that assists in the first length becoming the second length;
(iv) the mated relationship assists in a reducing of the second length at least towards the first length as a result of a rotating of the rotatable rail section in a second direction that is opposite the first direction; and,
(v) the mated relationship is an at least partially angled one with respect to a longitudinal direction of at least one of (a) the first rail section and (b) the second rail section.

38. The rail system of claim 36, further including: (i) a mated relationship between the rotatable rail section and the third rail section, (ii) an element that causes a force to operate on the rotatable rail section such that the rotatable rail section rotates in the first direction in response to the force, and (iii) a support member that at least helps keep the rotatable rail section positioned between the third rail section and the first rail section.

39. The rail system of claim 36, further including:
(i) an energy storage device that is in communication with the rotatable rail section, wherein the energy storage device is able to supply a force that causes the rotating of the rotatable rail section in the first direction to occur; and,
(ii) a support member that at least helps enable the rotatable rail section to be positioned relative to the third rail section.

40. The rail system of claim 36, further including a support member that at least helps enable the rotatable rail section to be positioned relative to the third rail section.

41. The rail system of claim 40, further including an energy storage device that is in communication with the rotatable rail section, wherein the energy storage device is able to supply a first force that enables the rotating of the rotatable rail section in the first direction to occur.

42. The rail system of claim 41, wherein:
(i) the rotatable rail section is able to rotate in a second direction that is opposite the first direction; and,
(ii) the rotating of the rotatable rail section in the second direction results from a second force.

43. The rail system of claim 40, further including a spring, wherein the spring is connected to (a) the rotatable rail section and (b) the support member, and wherein the spring is able to cause the rotating of the rotatable rail section in the first direction to occur, automatically and as, the first rail section and the second rail section become the second distance from each other.

44. A transportation system for preventing a rail gap in order to attempt to prevent, or at least attempt to mitigate, a potential performance impairment that might otherwise occur without the rail gap having been prevented, including:
(i) a vehicle;
(ii) a rail;
(iii) an air bearing attached to the vehicle such that the vehicle travels along the rail when the air bearing travels along the rail;
(iv) an inner rail support member, wherein the inner rail support member includes a curved outer surface portion;
(v) a first rail section of the rail, wherein the first rail section is positioned at least partially around the inner rail support member;
(vi) a second rail section of the rail, wherein the second rail section is positioned at least partially around the inner rail support member, and the first rail section and the second rail section are at a first distance from each other;
(vii) a third rail section of the rail, wherein the third rail section is positioned at least partially around the inner rail support member, the third rail section is positioned between the first rail section and the second rail section, and an outer surface portion of the third rail section is adjacent to an outer surface portion of the second rail section;
(viii) a rotatable rail section of the rail that has a curved inner surface portion, wherein the curved inner surface portion of the rotatable rail section is positioned at least partially around the curved outer surface portion of the inner rail support member, the curved inner surface portion of the rotatable rail section is rotatable at least partially around the curved outer surface portion of the inner rail support member in a first direction, the rotatable rail section is positioned between the third rail section and the first rail section, and an outer surface portion of the rotatable rail section is adjacent to both the outer surface portion of the third rail section and an outer surface portion of first rail section;

(ix) wherein when the first rail section and the second rail section are at the first distance from each other (a) a gapless rail surface includes the outer surface portion of the second rail section, the adjacent outer surface portion of the third rail section, the adjacent outer surface portion of the rotatable rail section, and the outer surface portion of the first rail section and (b) the adjacent outer surface portion of the rotatable rail section has a first length;

(x) wherein in response to the first rail section and the second rail section becoming a second distance from each other, wherein the second distance is greater than the first distance, a rotating of the curved inner surface portion of the rotatable rail section at least partially around the curved outer surface portion of the inner rail support member in the first direction occurs that at least assists in (a) causing the adjacent outer surface portion of the rotatable rail section to have a second length that is greater than the first length and (b) keeping the gapless rail surface gapless when the first rail section and the second rail section have become the second distance from each other—which enables the air bearing to travel over the gapless rail surface, when the adjacent outer surface portion of the rotatable rail section has the second length, which would not otherwise be gapless when the first rail section and the second rail section have become the second distance from each other but for the rotating of the curved inner surface portion of the rotatable rail section in the first direction; and, (xi) an energy storage device that is in communication with the rotatable rail section, and wherein the energy storage device is able to supply a force that at least assists in the rotating of the curved inner surface portion of the rotatable rail section around the curved outer surface portion of the inner rail support member in the first direction.

45. The rail system of claim 44, wherein the energy storage device is one of (a) a spring and (b) a spring-like element, wherein the energy storage device is connected to the rotatable rail section.

46. The rail system of claim 45, wherein the curved inner surface portion of the rotatable rail section is able to rotate at least partially around the curved outer surface portion of the inner rail support member in a second direction without any assistance from the energy storage device.

47. The rail system of claim 46, wherein the curved inner surface portion of the rotatable rail section is able to rotate around the curved outer surface portion of the inner rail support member in the second direction via a force of nature.

* * * * *